(12) United States Patent
Okada et al.

(10) Patent No.: US 7,106,668 B2
(45) Date of Patent: *Sep. 12, 2006

(54) DISK DRIVE APPARATUS

(75) Inventors: Takanori Okada, Moriguchi (JP); Shuichi Yoshida, Osaka (JP); Masaharu Imura, Neyagawa (JP); Kiyoshi Masaki, Amagasaki (JP); Kazuhiro Mihara, Moriguchi (JP); Tsutomu Kai, Katano (JP); Noritaka Akagi, Osaka (JP); Masanori Harui, Minoh (JP); Kazuhiko Kouno, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/963,243

(22) Filed: Oct. 12, 2004

(65) Prior Publication Data

US 2005/0083800 A1    Apr. 21, 2005

Related U.S. Application Data

(62) Division of application No. 10/458,899, filed on Jun. 11, 2003, now abandoned, which is a division of application No. 09/836,932, filed on Apr. 18, 2001, now Pat. No. 6,654,321, which is a division of application No. 09/031,281, filed on Feb. 26, 1998, now Pat. No. 6,249,495.

(30) Foreign Application Priority Data

Feb. 27, 1997 (JP) ................................... 9-043218
Mar. 28, 1997 (JP) ................................... 9-077009
Apr. 3, 1997 (JP) ................................... 9-084956
Oct. 3, 1997 (JP) ................................... 9-270934

(51) Int. Cl.
*G11B 21/08* (2006.01)
(52) U.S. Cl. .................................... 369/30.27; 720/659
(58) Field of Classification Search .................... None
See application file for complete search history.

(56) References Cited

U.S. PATENT DOCUMENTS

| 4,323,997 | A | * | 4/1982 | Kuribayashi et al. | ..... 369/33.01 |
| 4,453,243 | A | * | 6/1984 | Tanaka et al. | ........... 369/219.1 |
| 4,583,212 | A | * | 4/1986 | Koide et al. | ................ 720/666 |
| 4,627,043 | A | * | 12/1986 | Uehara | ..................... 369/215.1 |
| 4,799,205 | A | * | 1/1989 | Maeda | .................... 369/30.27 |

(Continued)

FOREIGN PATENT DOCUMENTS

JP          57055567 B2        4/1982

(Continued)

*Primary Examiner*—Tan Dinh
(74) *Attorney, Agent, or Firm*—Akin Gump Strauss Hauer & Feld, LLP

(57) ABSTRACT

A disk drive apparatus for a disk having helically-formed or concentric circle-like formed tracks includes a spindle motor for controlling a rotation of the disk; a pick-up device for recording or reproducing information on or from the disk; a stepping motor for moving the pick-up device in a radial direction of the disk in accordance with a drive current; a system controller for tracking a rotation speed of the spindle motor and for outputting command signals according to the rotation speed of the spindle motor; and a stepping motor controller for controlling the stepping motor by changing a slope of a rising part and a falling part of a waveform of the drive current of the stepping motor according to the command signals.

1 Claim, 66 Drawing Sheets

U.S. PATENT DOCUMENTS

| | | | |
|---|---|---|---|
| 4,890,277 A * | 12/1989 | Tateishi | 720/666 |
| 5,111,088 A * | 5/1992 | Fujino | 310/12 |
| 5,231,615 A * | 7/1993 | Endoh | 720/673 |
| 5,298,846 A | 3/1994 | Shimizu et al. | |
| 5,303,223 A | 4/1994 | Sakaguchi et al. | |
| 5,381,399 A * | 1/1995 | Uehara | 369/30.36 |
| 5,687,142 A | 11/1997 | Tamada | |
| 5,825,151 A | 10/1998 | Ikawa et al. | |
| 5,929,589 A | 7/1999 | Suzuki et al. | |
| 6,026,064 A * | 2/2000 | Izumi et al. | 369/44.22 |
| 6,111,385 A | 8/2000 | Nozaki et al. | |
| 6,249,495 B1 | 6/2001 | Okada et al. | |
| 6,341,103 B1 | 1/2002 | Takeda et al. | |
| 6,445,649 B1 | 9/2002 | Saito et al. | |
| 6,445,673 B1 * | 9/2002 | Park | 720/675 |
| 6,567,370 B1 * | 5/2003 | Weisser | 720/607 |
| 6,744,702 B1 * | 6/2004 | Yonezawa | 369/30.17 |

FOREIGN PATENT DOCUMENTS

| | | | |
|---|---|---|---|
| JP | 5953700 U | 4/1984 |
| JP | 61189196 B2 | 8/1986 |
| JP | 63144797 A | 6/1988 |
| JP | 64-32469 A | 2/1989 |
| JP | 1-229475 A | 9/1989 |
| JP | 3294000 A | 12/1991 |
| JP | 05314679 A | 11/1993 |
| JP | 05325439 A | 12/1993 |
| JP | 6-195862 A | 7/1994 |
| JP | 07-046894 A | 2/1995 |
| JP | 07-272291 A | 10/1995 |
| JP | 8149892 A | 6/1996 |
| JP | 8-275591 A | 10/1996 |
| JP | 08279257 A | 10/1996 |
| JP | 63-112858 A | 5/1998 |

* cited by examiner

FIG. 2 STEPPING MOTOR DRIVING CURRENT IN THE FIRST EMBODIMENT

STEPPINGMOTOR CONFIGURATION

FIG. 16
(a)
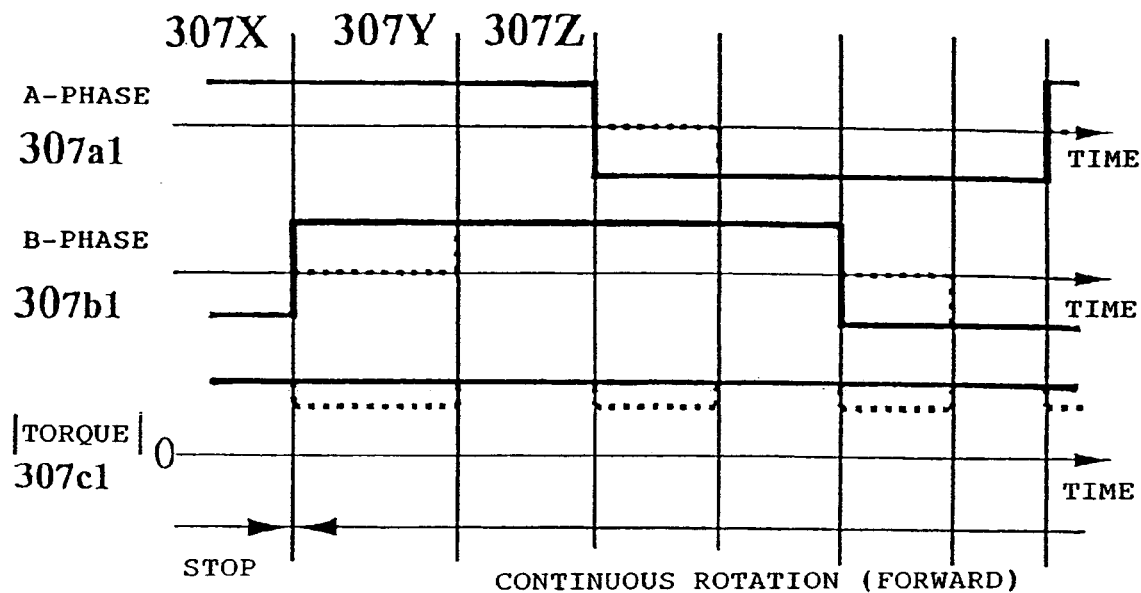
(b)
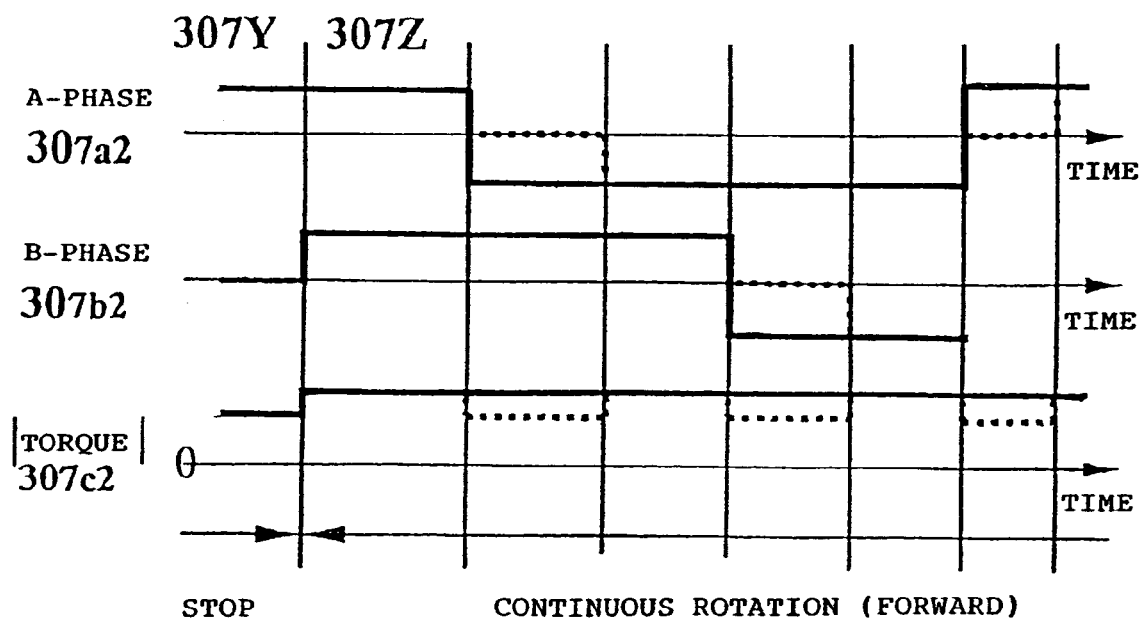

FIG. 17
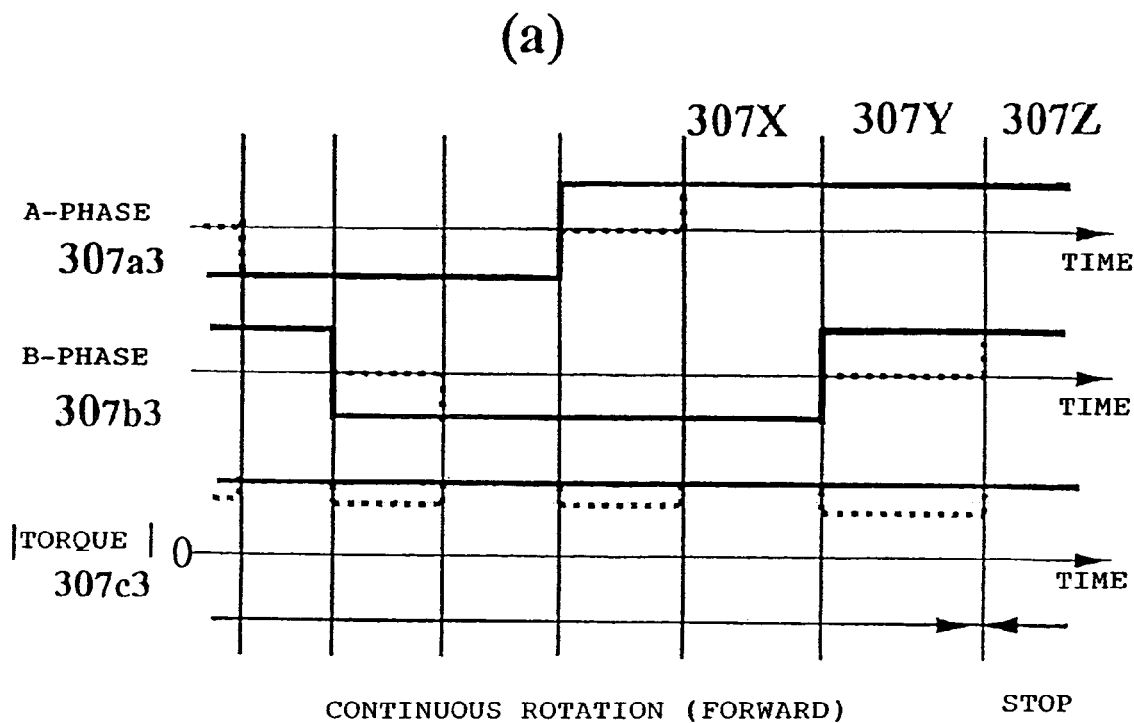
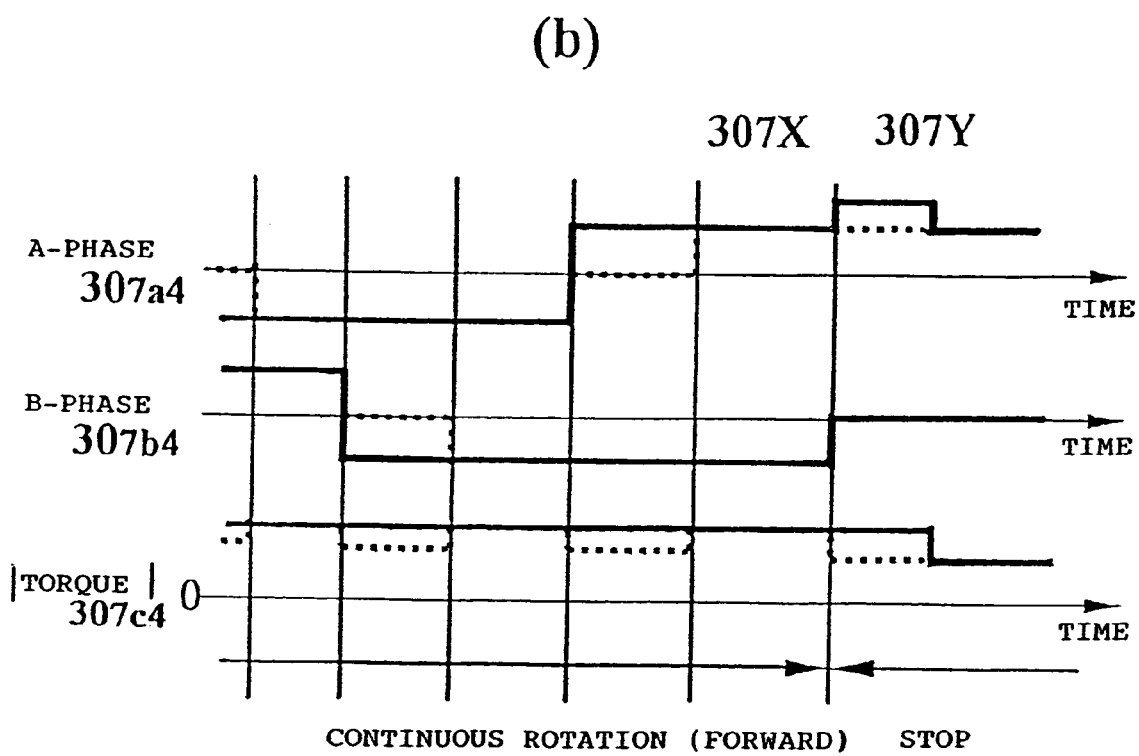

STEPPING MOTOR CONFIGURATION

FIG. 30 PRIOR ART DRIVING SIGNAL PATTERN 1 (FOR EAST ROTATION)

FIG. 34 PRIOR ART DRIVING SIGNAL CHANGE-OVER PATTERN 2

FIG. 35 RELATIONSHIP BETWEEN POSITION AND TORQUE OF STEPPING MOTOR

FIG. 36 STEPPING MOTOR CONTROL CIRCUIT OF PRESENT INVENTION

DRIVING SIGNAL CHANGE-OVER PATTERN IN THE 23RD EMBODIMENT OF PRESENT INVENTION

FIG. 38 DRIVING SIGNAL CHANGE-OVER PATTERN IN THE 24TH EMBODIMENT OF PRESENT INVENTION

FIG. 53
(a) 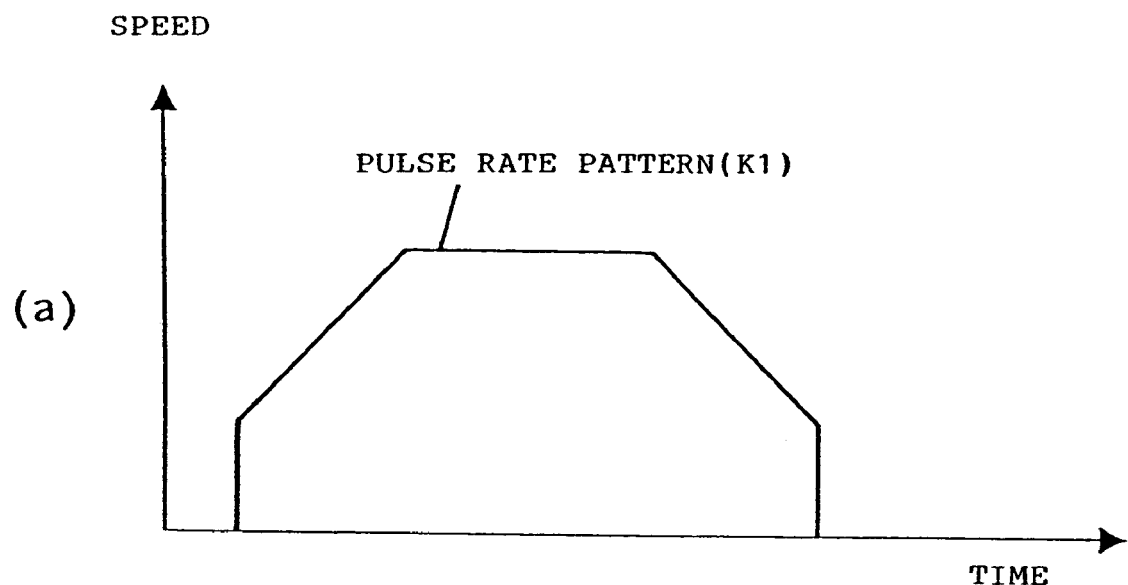
(b) 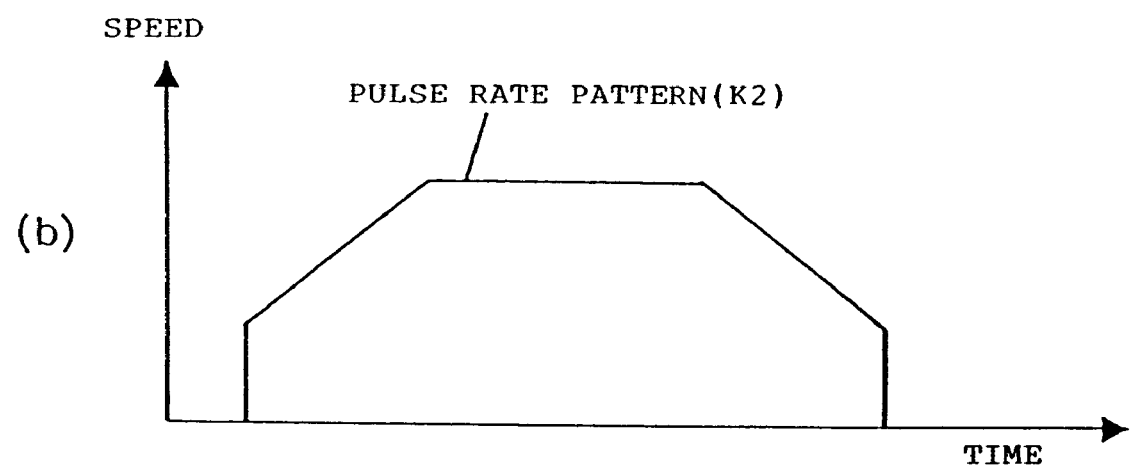
(c) 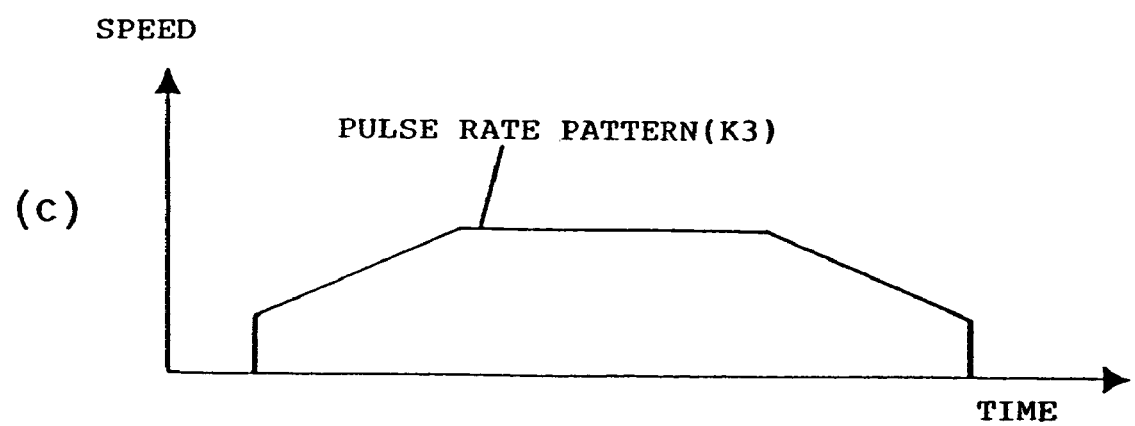

PRIOR ART

PRIOR ART

PRIOR ART

DISK DRIVE APPARATUS

CROSS-REFERENCE TO RELATED APPLICATION

This application is a Divisional of prior U.S. patent application Ser. No. 10/458,899 filed Jun. 11, 2003 now abandoned, which is a Divisional of U.S. patent application Ser. No. 09/836,932 filed Apr. 18, 2001 now U.S. Pat. No. 6,654,321, which in turn is a Divisional of U.S. patent application Ser. No. 09/031,281 filed Feb. 26, 1998 now U.S. Pat. No. 6,249,495, the disclosures of which are incorporated herein by reference.

BACKGROUND OF THE INVENTION

The present invention relates to a method for controlling stepping motors and a disk apparatus that uses a stepping motor.

In recent years, high speed accessing performance is required for disk apparatuses to feed the pick-up to a target position on the disk quickly. A disk apparatus that uses a stepping motor as a traverse motor for feeding the pick-up is already commercialized. Since the stepping motor is rotated in units of a constant basic step angle in response to the driving pulses, it is easy to open-control a strokes for feeding the pick-up and it needs no position detecting means. When using such a stepping motor for a disk apparatus, therefore, the pick-up feeding mechanism can be simplified.

However, disk apparatuses that use such a conventional stepping motor respectively have been confronted with various problems as described below. An object of the present invention is to solve such problems and provide a method for controlling stepping motors at high speeds and very accurately in an open-control that uses no detector such as a position sensor, as well as to provide a disk apparatus that uses the above-mentioned method for controlling stepping motors.

Next, various problems that will arise in disk apparatuses that use a conventional stepping motor respectively will be described in detail.

[Problems at Driving Operation of the Conventional Stepping Motors]

Hereunder, a conventional disk apparatus and a conventional method for controlling stepping motors will be explained with reference to the attached drawings. FIG. 54 is a schematic illustration for a configuration of the conventional disk apparatus. In FIG. 54, a lens 107b is held by springs 107c and 107d above a pick-up 107a. The rotational movement of a stepping motor 107f is transmitted to the pick-up 107a via a feed screw 107e. The pick-up 107a makes a linear motion in the radial direction of a disk 107j. The disk 107j stores information on its helically-formed tracks and the rotation speed of the disk 107j is controlled by a spindle motor 107l. Error signals from the pick-up 107a are transmitted to a servo means 107g. And, the servo means 107g outputs a signal for controlling the springs 107c and 107d to the pick-up 107a so that each error signal is cleared to 0. A system controller 107i, which is connected to the servo means 107g, an interface means 107k, and the spindle motor 107l, transmits a driving command signal for feeding the pick-up 107a to the stepping motor controlling means 107h as needed. By receiving the driving command signal, the stepping motor controlling means 107h controls the stepping motor 107f.

When in recording or playing back information in or from the conventional disk apparatus, the lens 107b keeps following up the helically-formed tracks on the disk 107j and the lens 107b changes its position gradually in the radial direction of the disk 107j. The servo means 107g detects each of such displacement values of the lens 107b. When the system controller 107i detects that the lens 107b has exceeded a specified displacement value, the system controller 107i transmits a driving command signal to the stepping motor controlling means 107h. By receiving the driving command signal, the stepping motor controlling means 107h rotates the stepping motor 107f step by step at fine pitches. The stepping motor controlling means 107h moves the pick-up 107a by a fine distance in the radial direction of the disk 107j to limit the displacement of the lens 107b within a low value. Then, the stepping motor 107f is kept at rest until the lens 107b exceeds the specified displacement value again.

As a means of moving the pick-up by rotating the stepping motor step by step at fine pitches, a controlling method referred to as micro-step driving operation is well known. The conventional micro-step driving method divides the basic step angle of the stepping motor into n angles (n: an integer of 2 or over) like an optical disk apparatus disclosed, for example, in Unexamined Published Japanese Patent Application Publication No. 7-272291 and changing the driving current step by step.

Next, the conventional stepping motor controlling method will be explained.

FIG. 55 is a schematic inner configuration of a general stepping motor. In FIG. 55, a numeral 106a indicates a current flowing in an A-phase coil and 106b indicates a current flowing in a B-phase coil. A rotator 106c has some pairs of N and S magnetic poles. The number of magnetic pole pairs differ among types of stepping motors. A point P on the rotator begins rotating when the current 106a flowing in the A-phase coil and the current 106b flowing in the B-phase coil are changed together. The point P stops when the balance between the magnetic force generated from those coils and the frictional load of rotation is stabilized. Positions 106X and 106Z indicate two points of some mechanical stability points existing on the rotator. Those two points are adjacent with each other. The rotation angle from the position 106X to the position 106Z is defined as the basic step angle of the stepping motor. The position 106Y indicates one of mechanical instability points existing between the positions 106X and 106Z. To rotate the stepping motor by a micro-step, the rotator 106c must be rested at a mechanical instability position in the range of the basic step angle, as shown with the position 106Y.

Next, the current flowing in each of the A-phase and B-phase coils of the stepping motor will be explained. FIG. 56 is a wave form chart indicating the driving current of the conventional stepping motor. The wave form chart shown in FIG. 56 indicates a wave form of the current in the controlling method referred to as a 1-2-phase exciting system that divides the basic step angle of the stepping motor into two angles and rotating the stepping motor in units of a ½ step angle. There is also another well-known controlling method, in which the basic step angle of the stepping motor is furthermore divided into n angles (n: an integer of 2 or over) and the stepping motor is rotated in units of a 1/n step angle. To make it easier to understand the explanation here, a method for controlling stepping motors with a driving current as shown in FIG. 56 will be picked up. The method divides the basic step angle into two angles, which is the least division number in the controlling methods, each of which divides the basic step angle of the stepping motor into n angles.

In FIG. 56, the wave form 105a is a driving current wave form representing the flow rate and direction of the current flowing in the A-phase coil of the stepping motor on the time axis. The wave form 105b is a driving current wave form representing the flow rate and direction of the current flowing in the B-phase coil of the stepping motor on the time axis. In the driving current wave forms 105a and 105b, the current flowing forward is represented by a positive value and the current flowing reversely is represented by a negative value. The current wave form, when the stepping motor is rotated forward, is changed from left to right in FIG. 56. The current wave form, when the stepping motor is rotated reversely, is changed from right to left in FIG. 56. If the current state is changed from 105X to 105Z in FIG. 56, it means that the state 105Y exists between those states. In the state 105Y, only the A-phase coil shown in FIG. 55 is excited and the B-phase coil is not excited. Thus, the stepping motor can stop at the position 106Y between the positions 106X and 106Z in FIG. 55. This means that the motor can stop at ½ of the basic step angle of the stepping motor. Since the basic step angle of the stepping motor is divided into n angles such way, the stepping motor can be rotated step by step at fine pitches. And, when using such a stepping motor for feeding the pick-up of a disk apparatus, the pick-up can be fed in micro steps in the radial direction of the disk in a recording/playback operation.

However, the conventional stepping motor controlling method and the conventional disk apparatus have the following problems.

One of the problems is that when a stepping motor is rotated by a fine step, the pick-up is accelerated significantly. In the case of the stepping motor driving current wave form shown in FIG. 56, when the stepping motor is rotated by a fine step, the state of the stepping motor driving current is changed in steps, for example, from 105X to 105Y in a moment. At this time, a large start-up torque is generated in the stepping motor and the pick-up is accelerated suddenly. Consequently, the lens of the pick-up is shaken, causing a light spot of the laser beam to be shifted from the target track on the disk. This results in an off-track error. When the off-track value is great, data cannot be recorded correctly when in recording and when in playing back, the error rate is raised.

There is another problem that arises when the stepping motor type and/or any pick-up feeding mechanism specification is changed after a stepping motor controlling method is designed. Since the stepping motor driving current wave form is fixed, the rotation value of the stepping motor cannot be adjusted. If any design is changed as mentioned above, the balance between the torque generated in the stepping motor and the frictional load of the pick-up feeding mechanism is lost. Consequently, the rotator of the stepping motor cannot be stopped accurately at a mechanical instability position between the basic step angles, so that a big stepping motor rotation angle error occurs. Such a rotation angle error results in an error of the pick-up feeding distance.

If the pick-up keeps following up the helically-formed tracks of the disk when in recording or playing back as explained above, the lens of the pick-up is displaced gradually in the radial direction of the disk. In order to suppress the displacement of the lens as less as possible, the stepping motor must be rotated in fine steps to move the whole pick-up in fine steps in the radial direction of the disk. When a big error occurs in the pick-up feeding distance, it becomes difficult to move the pick-up to cover the displaced distance of the lens. If the pick-up is moved by a distance differently from a displaced distance of the lens, the lens which follows up the track of the disk is also displaced significantly in the pick-up. And accordingly, the focus servo and tracking servo characteristics are degraded, causing a focus jump and/or an tracking-off error.

Furthermore, there will also arise another problem that the stepping motor itself generates heat and this results in a wasteful power consumption. This is because a current keeps flowing in the coils of the stepping motor even after the stepping motor is rested.

[Problems to Occur in the Conventional Stepping Motor During Operation]

In the case that a position detecting means, such as encoder, sensor or the like is not provided in a stepping motor, the stepping motor initial status, that is, the rest position of the stepping motor rotator is unknown before the stepping motor is excited.

In addition, when the stepping motor is in a step-out during rotation, the position of the stepping motor rotator becomes unknown. The step-out means a state of abnormal rotation of the rotator of a stepping motor, when the rotation goes out of synchronism with changes of the driving signal for the stepping motor.

When the position of the rotator of the stepping motor is unknown, the stepping motor is excited, then the initial position of the rotator of the stepping motor does not always come to a stability point of excitation. And, if the initial position and a stability point are not synchronized, the rotator of the stepping motor is not rotated smoothly and it might be moved suddenly to a stability point for the excitation.

In the case that the tracking servo of the disk apparatus is performed when the rotator of the stepping motor is moved suddenly to a stability point for the excitation, the pick-up and the magnetic head of the disk apparatus are also moved suddenly in the radial direction of the disk, so that they cannot follow up the tracks of the disk, causing an off-track in some cases. When the off-track value is great, data cannot be recorded accurately when in recording, and the error rate of the playback data is raised when in playing back.

Furthermore, in the case that the focus servo of the disk apparatus is performed when the rotator of the stepping motor is moved suddenly to a stability point for the excitation, then the pick-up of the disk apparatus is moved suddenly in the radial direction of the disk. Consequently, the lens of the pick-up is moved significantly, thereby causing the focus servo operation to be unstable and recording/playback of data to be disabled.

[Track Accessing Problems in Controlling of the Conventional Stepping Motor]

Next, the conventional disk apparatus will be explained with reference to the attached drawings. FIG. 57 is a block diagram for a configuration of the conventional disk apparatus. FIG. 58 is a wave form chart indicating the relationship with respect to the time among frequency change wave form (pulse rate pattern), generated torque, and necessary torque of the conventional driving pulse when in continuous rotation of the stepping motor in order to feed the pick-up 303 fast.

In FIG. 57, the disk 301 is a recording medium provided with helically-formed information tracks. The spindle motor 302 is provided to rotate the disk 1. The pick-up 303 is moved in the radial direction of the disk 301 due to the rotation of the stepping motor 307. The pick-up 303 is provided with a lens 304.

This lens 304 can be moved both vertically and horizontally by operating magnetically a focus actuator and a tracking actuator (both not illustrated) incorporated in the pick-up 303. The focus servo means 305 drives the focus actuator so that the lens is kept away by a fixed distance from the disk 301 according to the focus error signal, which is a displacement distance from the disk 301. The tracking servo means 306 drives the tracking actuator so that the lens 304 keeps following up a given track on the disk 301 according to the tracking error signal, which is a displacement distance from the track on the disk 301.

The stepping motor 307 moves the pick-up 303. The stepping motor driving means 308 applies a driving voltage to the stepping motor 307. The pick-up position detecting means 309 detects the current position of the pick-up 303 from the address information included in the data read by the pick-up 303. The pulse counting means 310 counts the number of pulses for driving the stepping motor 307 to move the pick-up 303 from the current position detected by the pick-up position detecting means 309 to a target address entered from external. The pulse rate pattern creating means 311 generates a frequency change (pulse rate pattern) of the pulses entered to the stepping motor driving means 308 according to the number of pulses counted by the pulse counting means 310. The feed screw 312 holds the pick-up 303 movably in the radial direction of the disk 301 and transmits a rotational force of the stepping motor 307 to the pick-up 303.

Next, the operation of the conventional disk apparatus formed as explained above for moving the pick-up fast will be explained.

The lens 304 is driven by an electromagnetic actuator (not illustrated) to read information from the disk 301 via the pick-up 303. This lens 304 is controlled by the focus servo means 305 so as to be kept focused on the disk 301. In addition, the lens 304 is also controlled by the tracking servo means 306 so as to keep following up the tracks on the disk 301. When accessing a given track, at first, the pulse counting means 310 counts the number of pulses for moving the pick-up 303 from the current position detected by the pick-up position detecting means 309 to the target track.

Next, the stepping motor driving means 308 drives the stepping motor 307 at a pulse rate as shown in (a) of FIG. 58 generated by the pulse rate pattern creating means 311 to move the pick-up 303 while the operation of the tracking servo means 306 stops. After the movement, the tracking servo means 306 is restarted to record/play back information. The conventional disk apparatus is formed such way. The pulse rate pattern shown in (a) of FIG. 58 is output as explained below from the pulse rate pattern creating means 311 being comprised of a microcomputer, etc.

The pulse rate for starting up the stepping motor 307 is a frequency that can start up the stepping motor 307 without causing any step-out. A step-out means a state of abnormal rotation of the rotator of a stepping motor 307, caused when the stepping motor goes out of step with the input pulse rate. When the stepping motor 307 is started up, the pulse rate is raised at a fixed change rate up to a specified frequency. After a fixed pulse rate is kept for a specified time, the pulse rate is lowered symmetrically to the pulse rate pattern when it was raised, to stop the pulse output.

There is another conventional stepping motor controlling method, which is well known as a micro-step driving method in which the basic angle of the stepping motor is divided into n angles (n: an integer of 2 or over) and the positioning resolution of the stepping motor is multiplied by n.

Next, the stepping motor driving means will be explained. The above-mentioned conventional micro-step driving method is adopted for the driving means.

FIG. 59 is a schematic illustration for an internal structure of a general stepping motor. In FIG. 59, 310a indicates a voltage applied to the A-phase coil and 310b indicates a voltage applied to the B-phase coil. The rotator 310c has a plurality of pairs of N and S magnetic poles. This number of magnetic poles differ among types of stepping motors. When the voltages 310a and 310b applied to the A-phase and B-phase coils are changed, the point P on the rotator begins a rotational motion. The point P stops at a point where the balance between the magnetic force generated from the coils and the frictional load of rotation is stabilized, that is, at a mechanical stability position.

In FIG. 59, positions 310X and 310Z indicates two points of some mechanical stability points existing on the rotator 310c. Those two points are adjacent with each other. The rotation angle from the position 310X to the position 310Z is defined as the basic step angle of the stepping motor. The position 310Y indicates one of mechanical instability points existing between the positions 310X and 310Z. To rotate the stepping motor by a micro-step, the rotator 310c must be rested at a mechanical instability position in the-range of the basic step angle as shown with the position 310Y.

Next, the voltage applied to each of the A-phase and B-phase coils of the stepping motor will be explained.

FIG. 60 is a wave form chart indicating the driving voltage of the conventional stepping motor. The wave form chart shown in FIG. 60 indicates a wave form of the voltage used in the controlling method referred to as a 1-2-phase exciting system that divides the basic step angle of the stepping motor into-two angles and rotating the stepping motor in units of a ½ step angle. There is also another well-known controlling method, in which the basic step angle of the stepping motor is furthermore divided into n angles (n: an integer of 2 or over) and the stepping motor is rotated in units of a 1/n step angle. To make it easier to understand the explanation here, a method for controlling stepping motors by dividing the basic step angle into two angles will be explained hereafter. This method is the least division number, in the controlling methods, each of which divides the basic step angle of the stepping motor into n angles.

In FIG. 60, the wave form 311a is a driving voltage wave form representing the voltage applied to the A-phase coil of the stepping motor on the time axis. The wave form 311b is a driving voltage wave form representing the voltage applied to the B-phase coil of the stepping motor on the time axis. In FIG. 60, however, when the stepping motor driving voltage applied to each of the A-phase and B-phase coils is in the state 311X, the point P shown in FIG. 59 is assumed to be at the position 310X. In the same way, when the voltage is in the state 311Y, the-point P is assumed to be positioned at 310Y and when the voltage is in the state 311Z, the point P is assumed to be positioned at 310Z.

The voltage wave form, when the stepping motor is rotated forward, is changed from left to right in FIG. 60. When the stepping motor is rotated reversely, the voltage wave form is changed from right to left in FIG. 60.

If the voltage state is changed from 311X to 311Z in FIG. 60, it means that the state 311Y exists between those states. In the state 311Y, only the A-phase coil shown in FIG. 59 is excited and the B-phase coil is not excited. Thus, the point P shown in FIG. 59 can be moved to the position 311Y between the positions 311X and 311Z in FIG. 59. This means that the motor can be moved to a position by ½ of the basic step angle of the stepping motor. Since the basic step angle of the stepping motor is divided into n angles such way, the stepping motor can be rotated step by step at fine pitches. And, when using such a stepping motor for feeding the pick-up of a disk apparatus, the pick-up can be fed in micro steps in the radial direction of the disk during a recording/playback operation or during accessing a given track.

The configurations of such the conventional stepping motor and the conventional disk apparatus have been confronted with the following problems when in accessing a given track, however.

Hereunder, one of such the conventional problems will be explained. A stepping motor as shown in (a) of FIG. 58 is driven at a pulse rate having a trapezoidal profile in shape. Since the pulse rate is raised at a fixed change rate in the initial stage of stepping motor driving, the acceleration torque of the stepping motor is fixed at that time. However, the torque characteristics of the stepping motor have a curve shown with a broken line in (b) of FIG. 58. Thus, as shown in (b) of FIG. 58, a surplus torque unnecessary for moving the pick-up exists in the initial stage of stepping motor driving. This surplus torque causes the stepping motor to vibrate during rotation. And, this vibration is transmitted to the pick-up via the feed screw, causing the controlling of the lens to be unstable. In the worst case, this vibration causes focus jumping and tracking-off errors. In addition, such a surplus torque causes a surplus current to flow in the coils and such a surplus current causes heat to be generated in the stepping motor. Those are the problems arising from the conventional stepping motor.

Next, the vibration caused by such a surplus torque in the above-mentioned conventional example will be explained in detail.

FIG. 61 is a wave form chart indicating time-series changes of the voltages applied to the A-phase and B-phase coils of the stepping motor, as well as the displacement of the rotation angle of the stepping motor. In (a) of FIG. 61, the wave forms 312a1, 312a2, and 312a3 indicate the voltages applied to the A-phase coil. In (b) of FIG. 61, the wave forms 312b1, 312b2, and 312b3 indicate the voltages applied to the B-phase coil. In (c) of FIG. 61, the wave form 312c1 indicates the rotation angle displacement of the stepping motor when the voltages of the wave forms 312a1 and 312b1 are applied to the A-phase and B-phase coils respectively. In the same way, the wave form 312c2 indicates the rotation angle displacement of the stepping motor when the voltages of the wave forms 312a2 and 312b2 are applied to the A-phase and B-phase coils respectively. The wave form 312c3 indicates the rotation angle displacement of the stepping motor when the voltages of the wave forms 312a3 and 312b3 are applied to the A-phase and B-phase coils respectively.

In (a) and (b) of FIG. 61, 312X, 312Z, and 312W indicate voltage-applied states in each of the coils of the stepping motor respectively. Each of (a) and (b) of FIG. 61 indicates a combination of voltages applied to each of the A-phase and B-phase coils in each of the voltage-applied states 312X, 312Z, and 312W.

As shown in (a) and (b) of FIG. 61, if the voltage applied to each of the A-phase and B-phase coils of the stepping motor is in the voltage-applied state 312X shown on the left end, the target rotation angle of the stepping motor is positioned as shown with the line 312X in (c) of FIG. 61. In the same way, if the voltage applied to each of the A-phase and B-phase coils of the stepping motor is in the voltage-applied state 312Z, the target rotation angle of the stepping motor is positioned as shown with the line 312Z in FIG. 61(c). And, if the voltage applied to each of the A-phase and B-phase coils of the stepping motor is in the voltage-applied state 312W shown on the left end, the target rotation angle of the stepping motor is positioned as shown with the line 312W in FIG. (c) of FIG. 61. In the voltage-applied state 312X, however, the rotation angle of the stepping motor is assumed to be stopped at 312X.

In (a) and (b) of FIG. 61, since each period in the voltage applied states 312X, 312Z, and 312W indicates a pulse cycle, the reciprocal number of this cycle is a pulse rate. When the stepping motor is driven, a difference is generated in the rotation matching with the target rotation angle of the stepping motor as shown in (a) and (b) of FIG. 61 due to the difference between the voltages applied to the A-phase and B-phase coils, that is, the difference between the generated torques. When the voltages applied to the A-phase and B-phase coils have the wave forms 312a1 and 312b1 respectively, the rotation angle of the stepping motor is vibrated significantly as shown in the wave form 312c1. This is because an excessive torque is generated with respect to the pulse rate, that is, the rotation speed of the stepping motor.

On the contrary, if the generated torque is too small, for example, when the voltages applied to the A-phase and B-phase coils have the wave forms 312a3 and 312b3 respectively, the rotation angle of the stepping motor is changed to the next voltage-applied state before the rotation angle is displaced to the target one, as shown in the wave form 312c3. Thus, the stepping motor rotation will not be synchronized with the input driving pulses. In the worst case, the stepping motor causes a step-out and it is stopped.

On the other hand, if an optimal torque is generated with respect to the pulse rate, for example, if the voltages applied to the A-phase and B-phase coils have the wave forms 312a2 and 312b2 respectively, the rotating angle of the stepping motor enters the next voltage-applied state as shown with the wave form 312c2 when the rotating angle is displaced almost to the target one. The stepping motor is thus rotated smoothly.

Next, another problem that will arise in the conventional art stepping motor when in accessing a given track will be explained.

If, when the stepping motor is driven in micro-steps as shown in FIG. 60, the positioning resolution of the stepping motor is multiplied by n, then a torque change occurs. And, as shown in FIG. 60, if both A-phase and B-phase coils are excited into the states 311X and 311Z respectively in the range of the basic step angle, a fixed voltage is applied to both A-phase and B-phase coils and the rotator is positioned at a mechanical stability point. If the A-phase and B-phase coils are excited into the state 311Y, however, a fixed voltage is applied only to the A-phase coil and the voltage of the B-phase coil thus becomes 0. And, the rotator is positioned at a mechanical instability point.

When the rotator is positioned at a mechanical stability point, which is in the range of the basic step angle, as explained above, comparatively a large torque is generated. If the rotator is positioned at a mechanical instability point, however, the torque becomes lower than that taken when the rotator is positioned in the range of the basic step angle. Such way, the generated torque differs between when the rotator is positioned in the range of the basic step angle and when it is positioned at a mechanical instability point outside the range of the basic step angle. Consequently, the vibration of the stepping motor is further increased during a movement of the pick-up. In the worst case, the stepping motor is in the loss of synchronism.

If the rotator moves the pick-up 303 (FIG. 57) to be at a mechanical instability position, only one phase is driven when the pick-up 303 stops. Thus, the torque is in low and the pick-up 303 cannot be stopped accurately.

[Problems in the Conventional Stepping Motor Driving Mechanism]

In recent years, as a mass volume of computer programs or data is expanded more and more in scale, the use of optical disks having a larger capacity respectively is widely spread as recording or supply media of software instead of conventional floppy disks. And, functions for high speed accessing of data on such optical disks are required for those disk apparatuses. In order to make accessing faster, the pick-up must be moved to a target position quickly on the optical disk. When the pick-up is accelerated/decelerated suddenly, however, problems that the rack teeth are disengaged from the thread groove of the feed screw or vibration is generated in the pick-up arise. Consequently, an accessing mechanism that can be slid stably when the pick-up is accelerated/decelerated suddenly is indispensable to make such accessing operations faster.

Next, problems that will arise in the conventional disk apparatus when the pick-up is accelerated/decelerated suddenly will be explained.

Hereunder, an embodiment of the conventional disk apparatus will be explained with reference to the attached drawings.

FIG. 62 is a perspective view of the first example of the conventional disk apparatus. In FIG. 62, a pick-up 202 provided with a lens reads/writes signals from/on a disk 201. The pick-up 202 is provided in the pick-up base 203. A traverse motor 204 moves the pick-up base 203 in the radial direction of the disk 201. A feed screw 205 is rotated by the rotation of the traverse motor 204. On the outer periphery of the feed screw 205 is formed a thread groove 215. A rack 208, fixed to the pick-up base 203, is engaged with the feed screw 205. In the rack 208 are provided a fixing portion 206 to be fixed to the pick-up base 203 and a nut portion 207 fit in the thread groove 215. On this nut portion 207 is formed teeth 223 fit in the thread groove 215. A rack-spring 224 is pressing the teeth 223 against the thread groove 215.

As shown in FIG. 62, the pick-up base 203 is guided by a guiding mechanism 211 slidably in the radial direction of the disk 201. The pick-up base 203 is provided with a guide hole 212 and the first guide shaft 209 fit in the guide hole 212 is guiding the pick-up base 203 slidably in the radial direction of the disk 201. On e pick-up base 203 is also formed a guide groove 213. The second guide shaft 210 is fit in the guide groove 213 an d used to limit the rotation of the pick-up base 203 around the guide shaft 209.

FIG. 63 is a side view (a) and a top view (b) of expanded portions in the neighborhood of both feed screw 205 and rack 208.

The fixing portion 206 and the nut portion 207 of the rack 208 are connected to a plate spring 214. Usually, the plate spring 214 is formed thinner than the nut portion 207. This is because when the movement of the pick-up base 203 is blocked by something, the plate spring 214 must be bent, so that the nut portion 207 can be released from the thread groove 215.

In the conventional disk apparatus formed as explained above, when the traverse motor 204 is rotated to accelerate/decelerate the pick-up base suddenly, the first problem that the nut portion 207 of the rack 208 is disengaged from the thread groove 215 of the feed screw 205 arises.

Furthermore, when the pick-up base 203 is accelerated/decelerated suddenly, the second problem that the pick-up base 203 is vibrated significantly arises.

Next, how the first problem will arise will be explained with reference to FIG. 63.

When the rotation of the feed screw 205 is accelerated/decelerated, the response of the pick-up base 203 to the rotation is delayed due to the inertia. Consequently, the inertia working on the pick-up base 203 is applied to the nut portion 207 via the surface of the thread groove 215. At this time, the direction of the force applied to the nut portion 207 can be resolved into 3 directional components that are orthogonal to each other; the axial direction of the feed screw 205, the radial direction of the feed screw 205 at a point where the thread groove 215 is in contact with the teeth 223 of the rack, and the tangential direction. Of those 3 directional components, especially the component of the tangential direction of the feed screw acts to shift the nut portion 207 from the thread groove 215. If this shifting force is great, the nut portion 207 is twisted and the teeth 223 go off the thread groove 215 easily. This component of the tangential direction of the feed screw 205 becomes significant when the rotation of the feed screw 205 is accelerated/decelerated suddenly or the feeding value of the feed screw per rotation is increased significantly to move the pick-up 202 fast. As a result, the teeth 223 go off the thread groove 215 easily.

In the conventional rack 208 as shown in FIG. 63, the nut portion 207 is supported only by a plate spring 214 whose rigidity is low. Thus, the nut portion 207 cannot secure a rigidity enough especially to cope with the component of the force working in the tangential direction of the feed screw 205. In the conventional disk apparatus in the status mentioned above, therefore, the nut portion 207 is deformed like being twisted.

The position (P202 position) to which the nut portion 207 is moved in FIG. 63 indicates a deformed example of the nut portion 207 and it is a position to which the nut portion 207 is deformed and moved when the feed screw 205 that has stopped is rotated and accelerated suddenly in the R202 direction.

In the structure of the conventional rack 208 shown in FIGS. 62 and 63, the rigidity of the plate spring 214 is insufficient such way to cope with the force applied from the thread groove 215 to the nut portion 207. The nut portion 207 is thus twisted significantly when the rotation of the feed screw 205 is accelerated/decelerated suddenly, so that the teeth 223 are not fit in the thread groove 215 properly. Furthermore, a problem that the teeth 223 are disengaged completely from the thread groove 215 arises.

Furthermore, since the pick-up base 203 is slidable in the radial direction of the disk 201 with a weak force, a gap is formed between the pick-up base 203 and the first guide shaft 209 of the guiding mechanism 211 and between the pick-up base 203 and the second guide shaft 210 respectively. The direction of the force applied to the nut portion 207 from the thread groove 215 has 3 directional components orthogonal to each other as explained above. In addition, since the center of the gravity of the pick-up 202 is not the same position where a force is applied to the nut portion 207, a problem that the pick-up base 203 is vibrated due to the gap of the guiding mechanism 211 arises if the head base 203 is slid at a sudden acceleration/deceleration.

In such the conventional general disk apparatus, a problem that the rack 208 mentioned above is disengaged from the feed screw 205 when in a high speed accessing, as well as a problem that the pick-up base 203 is vibrated arise respectively. In order to solve those problems, there have been proposed some countermeasures.

Next, some of the representative countermeasures for those problems will be explained.

FIG. 64 is a perspective view of the conventional disk apparatus in the second example for solving the above-mentioned problem that the rack is disengaged from the feed screw. This second example is disclosed, for example, in an unexamined Published Japanese Patent Application, publication No. 5-31479. In this prior art, the same configuration items as those of the disk apparatus in the first example shown in FIG. 62 and FIG. 63 will be given the same numerals, omitting redundant explanation. Hereunder, only the differences from the first example will be explained.

As shown in FIG. 64, at both ends of the feed screw 205 provided with the thread groove 215 is formed a ring-like groove 216. The nut portion 207a of the rack 208 is engaged helically with the thread groove of the feed screw 205. Thus, even when a force is applied to the rack 208a from the thread groove 215 of the feed screw 205, the rack 208a is neither deformed nor disengaged from the feed screw 205. Since a ring-like groove 216 is formed at both ends of the feed screw 205 respectively, when the nut portion 207a reaches the ring-like groove 216, the nut portion 207a is disengaged from the feed screw 205. Consequently, the nut portion 207a can be prevented from being caught in the thread groove 215. In such a structure, however, the frictional load in the helically engaged portion between the nut portion 207a and the feed screw 205 may be increased by variations of machining accuracy and temperature changes. In such a case, the disk apparatus in the second example will arise a problem that the disk cannot be accessed stably.

FIG. 65 is a perspective view of the conventional disk apparatus in the third example for solving the problem that the rack is disengaged from the feed screw. This third example is disclosed, for example, in an unexamined Published Japanese Patent Application, publication No. 5-325439. In this prior art, the same configuration items as those of the conventional disk apparatus in the first and second example shown in FIGS. 62 to 64 will be given the same numerals, avoiding redundant explanation. Hereunder, therefore, only the differences from the first and second examples will be explained.

In FIG. 65, the disk apparatus in the third example is provided with a stopper 217 and this stopper 217 is used to limit the movement of the nut portion 207 in the direction for disengaging the nut portion 207 from the feed screw 205. Since this stopper 217 is provided, the nut portion 207 can be prevented from being disengaged completely from the thread groove 215 even when the feed screw 205 is rotated at a sudden acceleration/deceleration and the nut portion 207 is deformed in the direction for disengaging the nut portion 207 from the thread groove 215. As a result, it is possible for the disk apparatus in the third example to obtain an effect of solving the above-mentioned problem.

However, since the nut portion 207 is deformed by a force received from the thread groove 215 within its movable rage, the force applied to the pick-up base 203 is changed by the deformation of the nut portion 207. And, since the force applied to the pick-up base 203 is changed such way, the pick-up 203 is vibrated. Thus, the problem that the pick-up base is vibrated cannot be solved yet here.

FIG. 66 is a perspective view of the conventional disk apparatus in the fourth example for solving the above-mentioned problem that the pick-up base is vibrated. This fourth example is disclosed, for example, in an unexamined Published Japanese Patent Application, Publication No. 8-279257. In this prior art, the same configuration items as those of the disk apparatus shown in FIG. 62 to FIG. 65 will be given the same numerals, avoiding redundant explanation. Hereunder, therefore, only the differences from the first to third example will be explained.

In FIG. 66, the pick-up base 203 is provided with a guide hole 212 and the first guide shaft 209 is inserted in this guide hole 212. Consequently, the pick-up 202, guided by the first guide shaft 209, can move in the radial direction of the disk 201. The pick-up base 203 is provided with a guide bearing 216 via a bearing spring 219. In the hole of this guide bearing 218 is inserted the second guide shaft 210. The rotational motion of the pick-up base 203 around the first guide shaft is thus limited. The bearing spring 219 is pressing the guide bearing 218 against the recording face of the disk 201 in the direction orthogonal to the radial direction of the disk. The guide bearing 218 is pressed against the second guide shaft 210 by this bearing spring 219, so that the vibration of the pick-up base 203 is reduced significantly when the disk is accessed fast. However, it is only in the direction horizontal to the recording face of the disk 201 and vertical to the moving direction of the pick-up base 203 that the bearing spring 219 can suppress the vibration. Consequently, the bearing spring 219 can obtain a less effect for the vibration of the pick-up base 203 in the direction vertical to the recording face of the disk 201. Because of such the configuration of the conventional disk apparatus, the pressing force of the bearing spring 219 must further be increased to suppress the vibration of the pick-up base 203. And, when the pressing force of the bearing spring 219 is increased such way, the frictional load between the second guide shaft 210 and the guide bearing 218 is also increased. The traverse motor 204 must thus be formed so as to output a larger torque.

SUMMARY OF THE INVENTION

An object of the present invention is to provide a method for controlling stepping motors, which can reduce the off-track value in feeding the pick-up of a disk apparatus to reduce the displacement of the lens, as well as to reduce the power consumption of the stepping motor when the stepping motor is driven by dividing the basic step angle into n angles (n: an integer of 2 or over), and provide a disk apparatus that uses such the stepping motor controlling method.

Another object of the present invention is to provide a method for controlling stepping motors, which can prevent the pick-up of a disk apparatus from moving suddenly in the radial direction of the disk while the focus servo or the tracking servo is working and obtain a stable servo operation, as well as a disk apparatus that uses such the stepping motor controlling method. According to the present invention, errors can be prevented when in recording and playing back data on and from the disk apparatus. In addition, the present invention enables the stepping motor to be formed so that the state of excitation is synchronized between the stepping motor driving means and the stepping motor when it is unknown where the stator of the stepping motor is at rest after the stepping motor is powered or steps out. Furthermore, the stepping motor is formed so that the state of excitation can be synchronized such way in the stepping motor before the focus servo or tracking servo of the disk apparatus is turned on.

Another object of the present invention is to provide an optical information recording and playing-back apparatus that can suppress the vibration and heat generation of the stepping motor and move the pick-up fast by controlling the torque generated in the stepping motor effectively when rotating the stepping motor fast continuously. Furthermore, the optical information recording and playing-back apparatus of the present invention can move the pick-up fast and stably even when the stepping motor is driven by dividing the basic step angle into n angles (n: an interger of 2 or over) to improve the positioning performance.

In the case of the configuration of the conventional disk apparatus, it is difficult to prevent the nut portion of the rack from being disengaged from the thread groove of the feed screw and furthermore it is difficult to suppress the vibration of the pick-up when the pick-up is accelerated/decelerated suddenly. Even when those problems are prevented, the frictional load for sliding the pick-up base in the guiding mechanism is increased and this makes it difficult to access the target track on the disk fast and stably.

Another object of the present invention is to provide a disk apparatus that can prevent the rack from being disengaged from the thread groove and suppress the vibration of the pick-up in fast traverse operations to enable fast and stable traverse operations.

Another object of the present invention is to avoid generation of useless states when changing over the rotation of the stepping motor from slow to fast so that the accelerating time for fast rotation of the stepping motor is made shorter than the conventional stepping motor controlling method.

The method of the present invention for controlling stepping motors divides the basic step angle of the stepping motor into n angles (n: an interger of 2 or over) to drive the stepping motor, and when the stepping motor is rotated, it enables the driving current of the stepping motor to be changed at a fixed inclination in proportion to the time.

In the case of the stepping controlling method of the present invention, when it is unknown where the rotator of the stepping motor is at rest, for example, just after the disk apparatus is powered or the stepping motor steps out, the stepping motor driving current pattern is changed by ¼ cycle or over so that the state of excitation is synchronized between the stepping motor driving means and the stepping motor.

The disk apparatus of the present invention is formed so that when it is unknown where the rotator of the stepping motor is at rest just after the disk apparatus is powered or when the stepping motor steps out, the focus servo means or the tracking servo means is turned on after the state of excitation is synchronized between the stepping motor driving means and the stepping motor.

The disk apparatus of the present invention comprises a means of changing the pulse rate of the stepping motor driving pulses; a means of measuring the acceleration of the pulse rate; and a means of changing the amplitude of the stepping motor driving voltage according to the pulse rate and the change rate of the pulse rate. The disk apparatus of the preset invention also includes a means of changing the change rate of the voltage applied to the coils of the stepping motor according to the pulse rate and the change rate of the pulse rate. Furthermore, the disk apparatus of the present invention includes a means of detecting the tracking speed of the lens provided above the pick-up according to the tracking error signal and a means of changing the amplitude of the stepping motor driving voltage according to the values of the detected vibrations of the lens and the pick-up, obtained by comparing the detected tracking speed of the lens with the pulse rate, which is a speed command for the stepping motor.

The disk apparatus of the present invention comprises a head for reading/writing signals from/on a disk; a pick-up base provided with the head; a traverse motor for moving the head in the radial direction of the disk; a feed screw rotated by the traverse motor and provided with a thread groove on its outer periphery; a rack provided with a fixing portion fixed to the pick-up base and a nut portion engaged with the thread groove; and a guiding mechanism for guiding the pick-up base movably in the radial direction of the disk, wherein the fixing portion of the rack is connected to the nut portion by an open-ended parallel spring displaceable in the radial direction of the feed screw.

According to the present invention, therefore, even when the head is accelerated/decelerated suddenly, the nut portion of the rack can be prevented from being disengaged from the feed screw, so that the head is moved fast.

The stepping motor controlling method of the present invention comprises a means of generating the first driving signal for rotating the stepping motor slowly; a means of generating the second-driving signal for rotating the stepping motor fast; and a means of controlling switching of signals between the first driving signal and the second driving signal, wherein the controlling means decides whether or not the rotator of the stepping motor is positioned near a mechanical stability point X of the stepping motor according to the voltage of the driving signal output from the first driving signal generating means or the status number owned by the first driving signal generating means when the rotation of the stepping motor is changed from slow to fast, and when the rotator of the stepping motor is positioned near a mechanical stability point X of the stepping motor, the controlling means outputs a command to the second driving signal generating means so that the second driving signal generating means outputs a driving signal for rotating the stepping motor to the next mechanical stability point Y of the above-mentioned mechanical stability point X in the rotation direction of the stepping motor, then the controlling means switches the signal generating means from the first driving signal generating means to the second driving signal generating means.

And accordingly, the driving signal, when switching the rotation of the stepping motor to fast using the stepping motor controlling method of the present invention, can move the rotator of the stepping motor to a mechanical stability point one more ahead than the conventional controlling method will do within the same time.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 16 is a wave form chart (a) when the stepping motor is rotated forward continuously starting at the basic step angle, and a wave form chart (b) when the stepping motor is rotated forward continuously starting at a mechanical instability point outside the range of the basic step angle.

FIG. 17 is a wave form chart (a) when the stepping motor is rotated forward continuously to the basic step angle, a wave form chart (b) when the stepping motor is rotated forward continuously to a mechanical instability point outside the range of the basic step angle.

FIG. 53 is a wave form chart indicating a driving pulse rate of the stepping motor in the thirtieth embodiment of the present invention.

It will be recognized that some or all of the Figures are schematic representations for purposes of illustration and do not necessarily depict the actual relative sizes or locations of the elements shown.

DETAILED DESCRIPTION OF THE INVENTION

Hereunder, some embodiments of a stepping motor control method and a disk apparatus of the present invention will be explained with reference to the attached drawings.

<<First Embodiment>>

Figure 1:
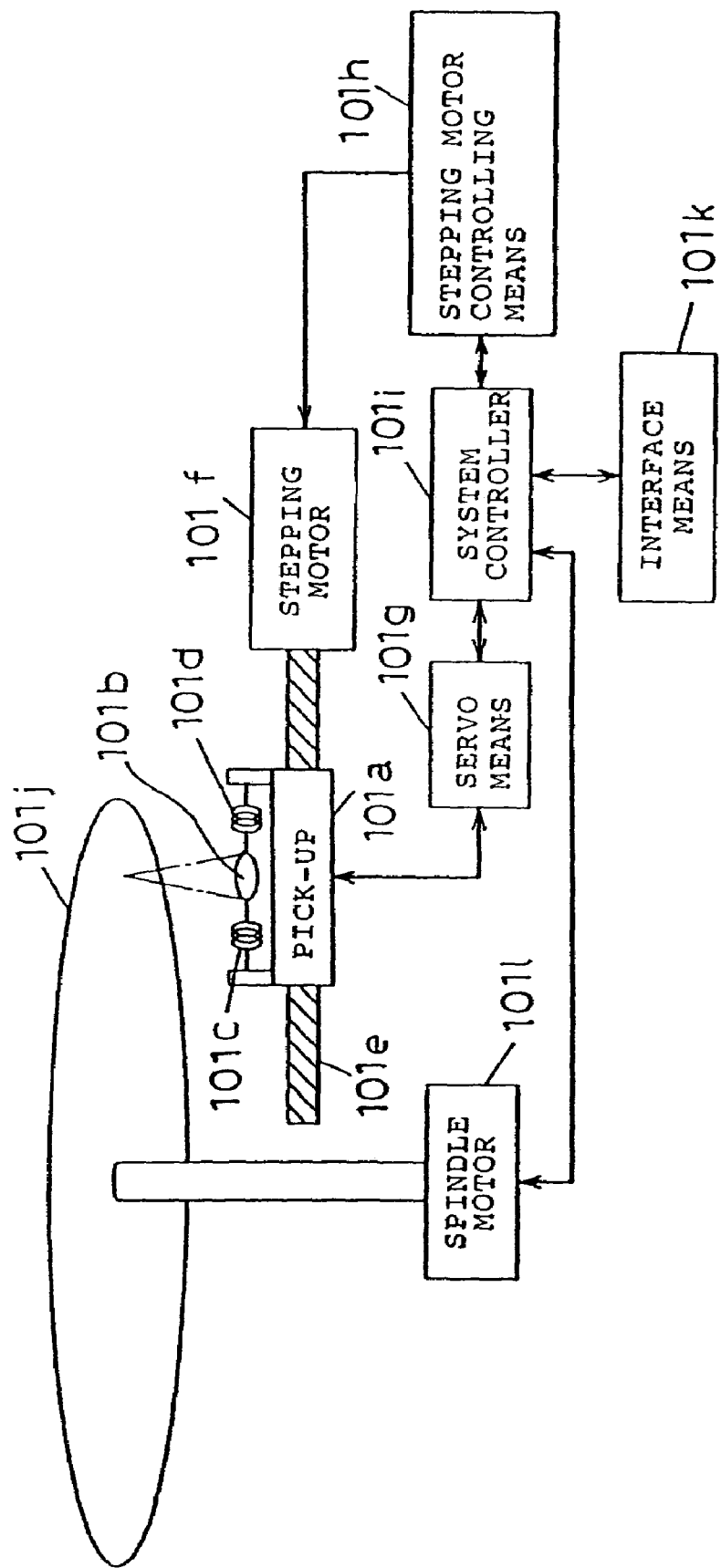
FIG. 1 is a configuration of a disk apparatus in the first embodiment of the present invention.
Figure 64:
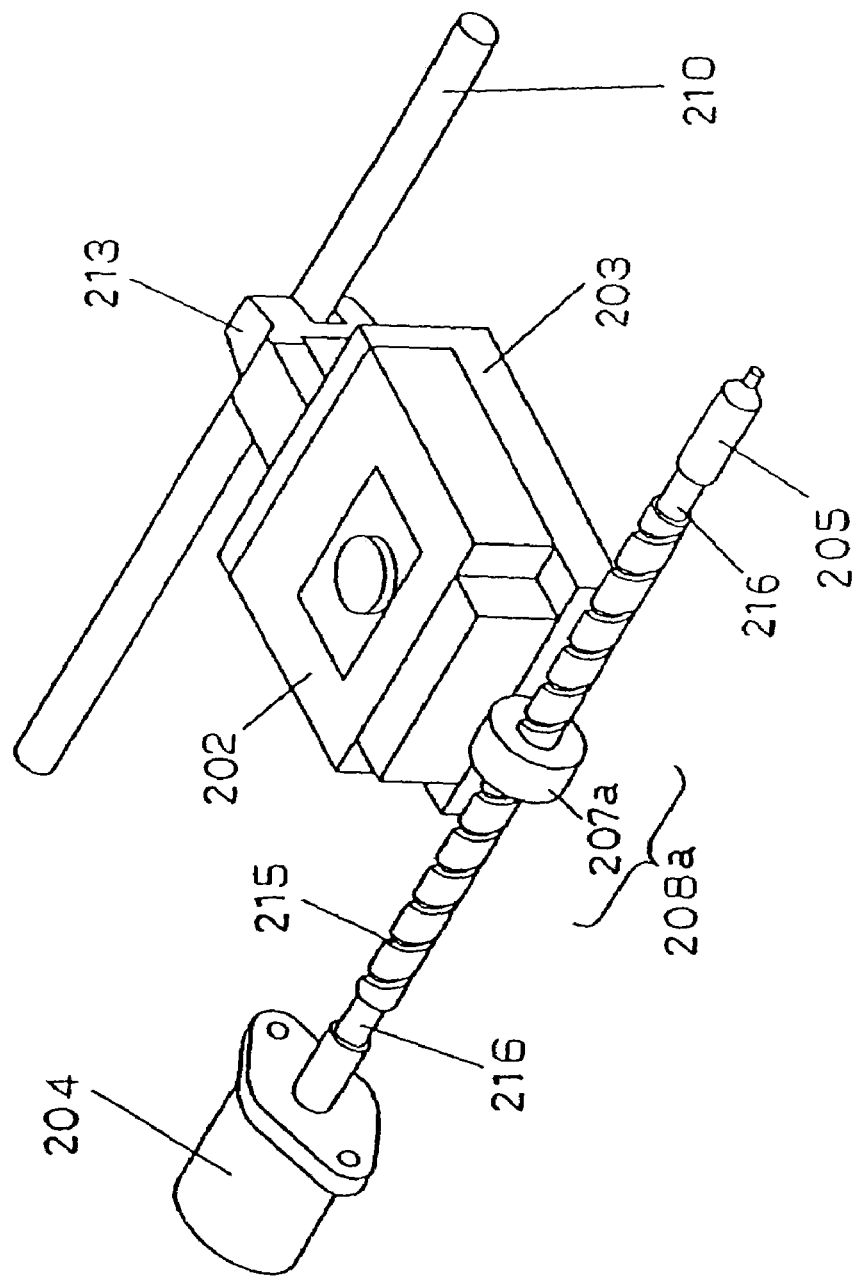
FIG. 64 is a perspective view of the conventional disk apparatus in the second embodiment.
Figure 65:
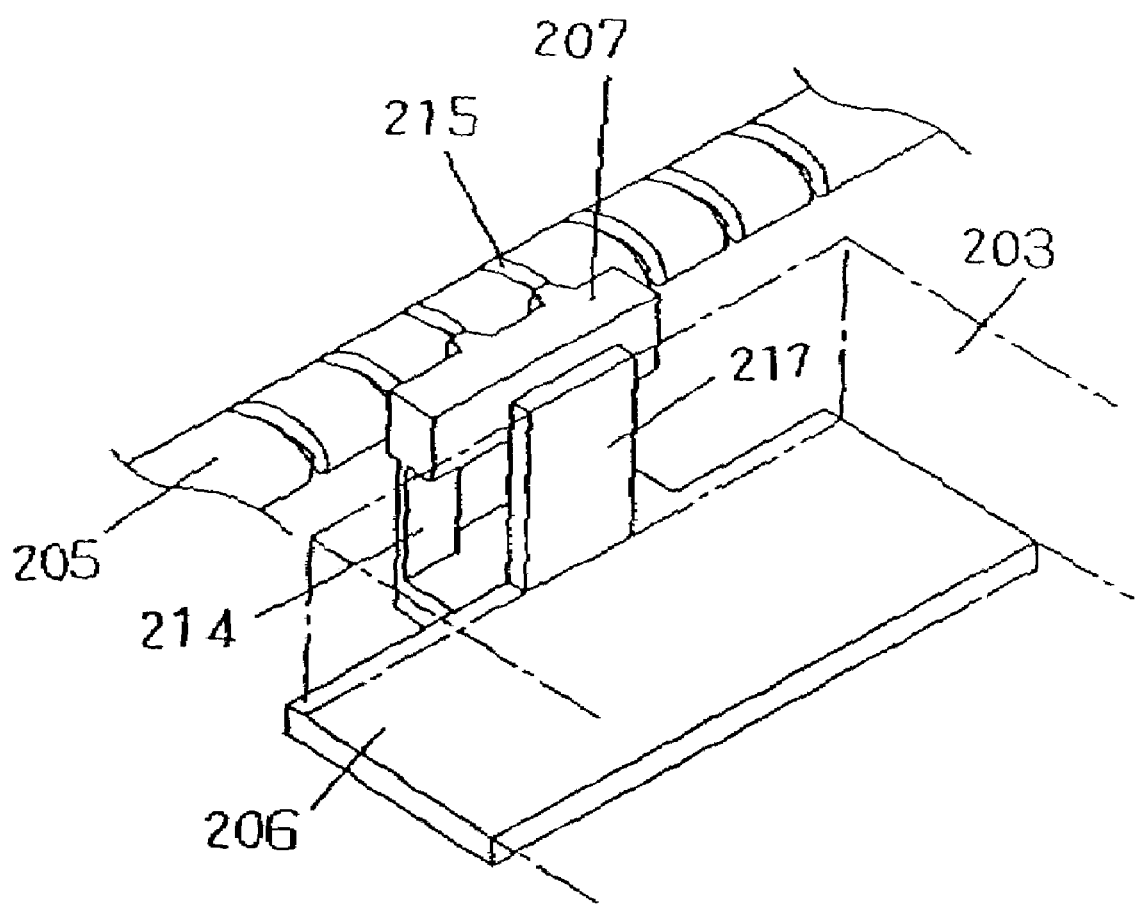
FIG. 65 is a perspective view of the conventional disk apparatus in the third embodiment.
Figure 66:
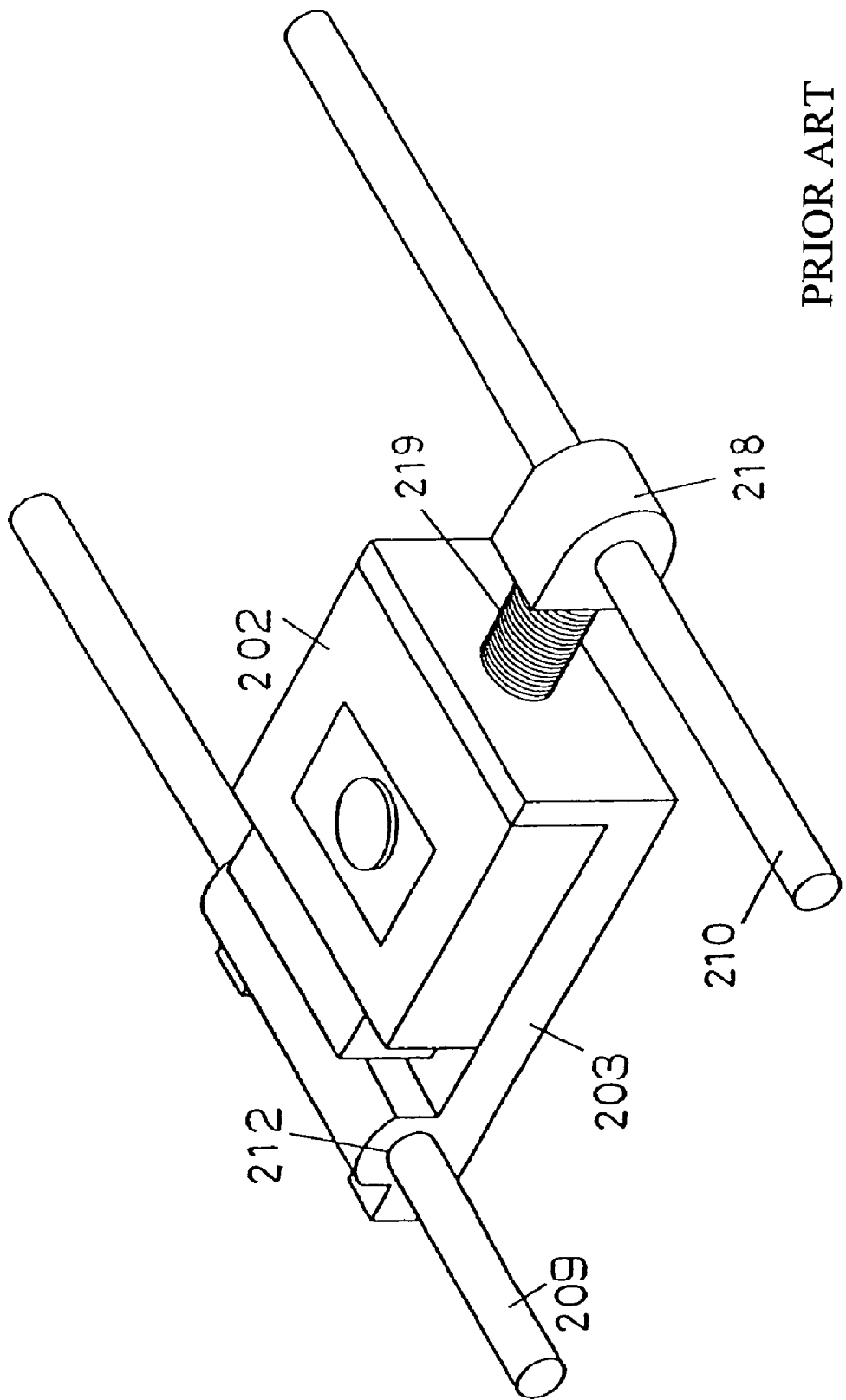
FIG. 66 is a perspective view of the conventional disk apparatus in the fourth embodiment.

FIG. 1 is a block diagram for a configuration of a disk apparatus in the first embodiment of the present invention. In the disk apparatus shown in the first embodiment of the present invention, all the configuration items except for the stepping motor controlling means 101h are the same as those of the configuration of the conventional disk apparatus shown in FIG. 64. At first, the disk apparatus shown in the first example of the present invention will be explained with reference to FIG. 1.

In FIG. 1, a lens 101b is provided above a pick-up 101a, and this lens 101b is held by two springs 101c and 101d. The rotational motion of the stepping motor 101f is transmitted to the pick-up 101a via a feed screw 101e. The pick-up 101a makes a linear movement in the radial direction of a disk 101j due to the screw motion of the feed screw 101e. The disk 101j stores information on its helically-formed tracks. The rotation speed of the disk 101j is controlled by a spindle motor 101l. Error signals from the pick-up 101a are transmitted to a servo means 101g. The servo means 101g transmits output signals for controlling the springs 101c and 101d to the pick-up 101a so that each error signal is cleared to 0. A system controller 101i is connected to the servo means 101g, the interface means 101k, and the spindle motor 101l. The system controller 101i transmits driving command signals for moving the pick-up 101a to the stepping motor controlling means 101h. The stepping motor controlling means 101h controls the stepping motor 101f according to the commands received from the system controller 101i.

When in recording/playing back information on/from the disk apparatus in the first embodiment, the lens 101b begins its displacement gradually in the radial direction of the disk 101j as it keeps following up the helically-formed tracks on the disk 101j. The displacement distance of the lens 101b is detected by the servo means 101g, and the system controller 101i, when deciding that the lens 101b has exceeded a specified displacement distance, transmits a driving command signal to the stepping motor controlling means 101h. Receiving this driving command signal, the stepping motor controlling means 101h makes the stepping motor 101f rotate step by step minutely to move the pick-up 101a in the radial direction of the disk 101j so as to control the displacement distance of the lens minutely.

Figure 2:
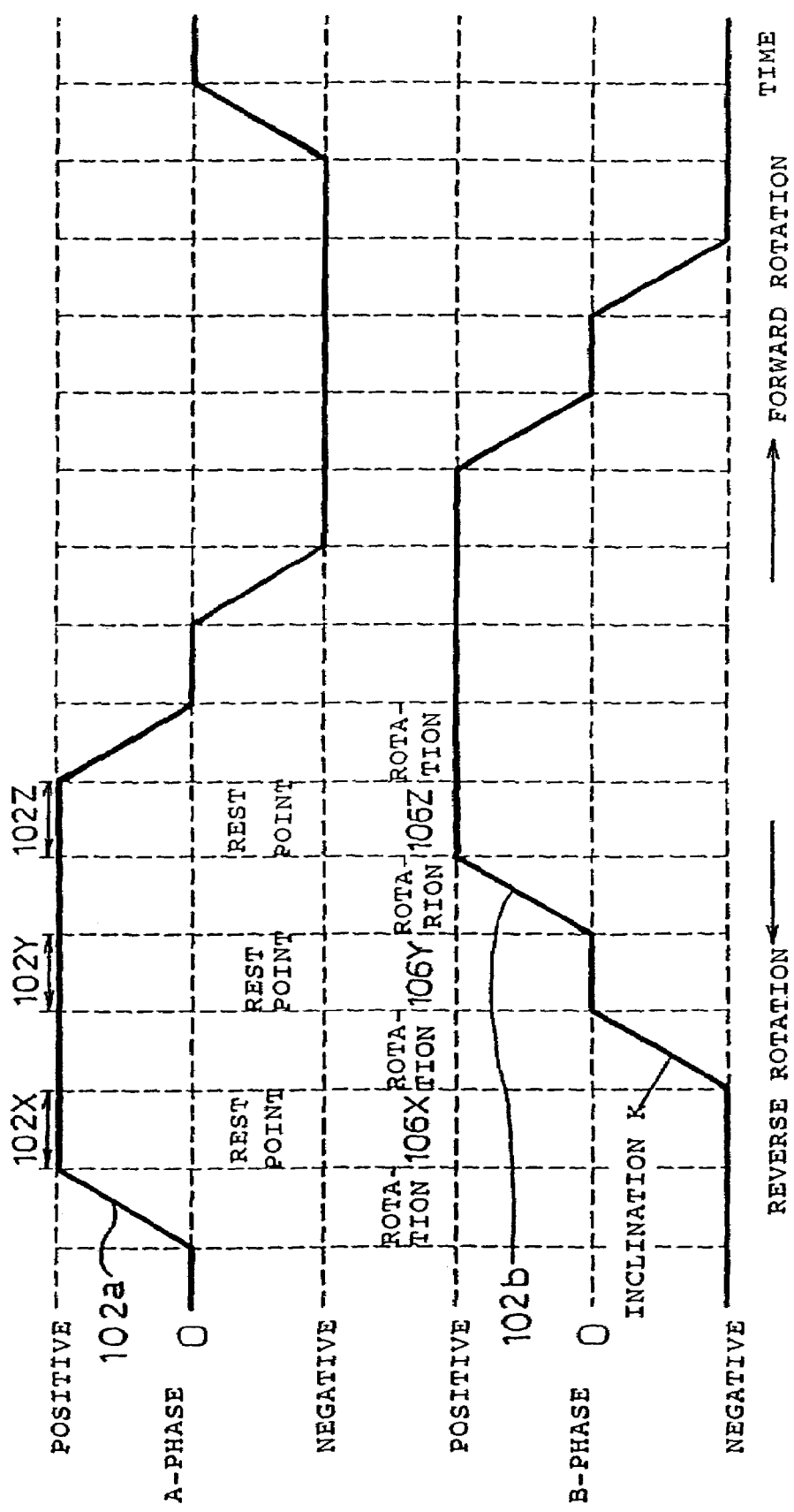
FIG. 2 is a wave form chart indicating a stepping motor driving current in the first embodiment of the present invention.

FIG. 2 is a wave form chart indicating a driving current of the stepping motor in the first embodiment of the present invention. In FIG. 2, a wave form 102a is a driving current wave form representing the flow rate and direction of the current applied to an A-phase coil of the stepping motor on the time axis. A wave form 102b is a driving current wave form representing the flow rate and direction of the current applied to a B-phase coil of the stepping motor on the time axis. In the wave forms 102a and 102b, the forward current flow is represented by a positive value and the reverse current flow is represented by a negative value. The driving current wave form, when the stepping motor is rotated forward, changes from left to right as in FIG. 2. When the stepping motor is rotated in the reverse direction, the driving current wave form changes from right to left in FIG. 2.

Hereunder, the operation of the stepping motor driven with the stepping motor driving current represented as shown above will be explained with reference to FIG. 2 and FIG. 55.

Figure 55:
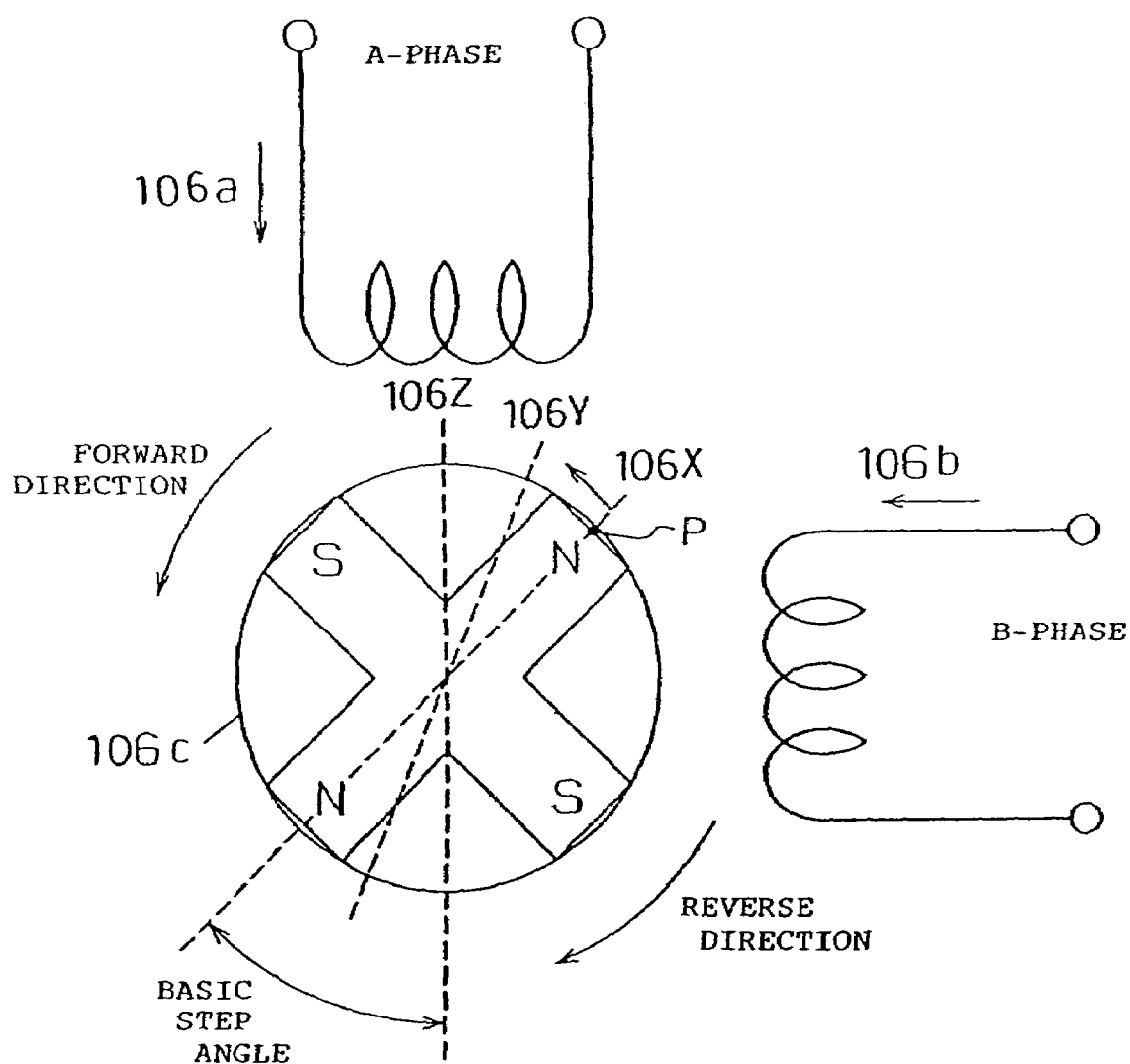
FIG. 55 is a configuration of the conventional stepping motor.
Figure 56:
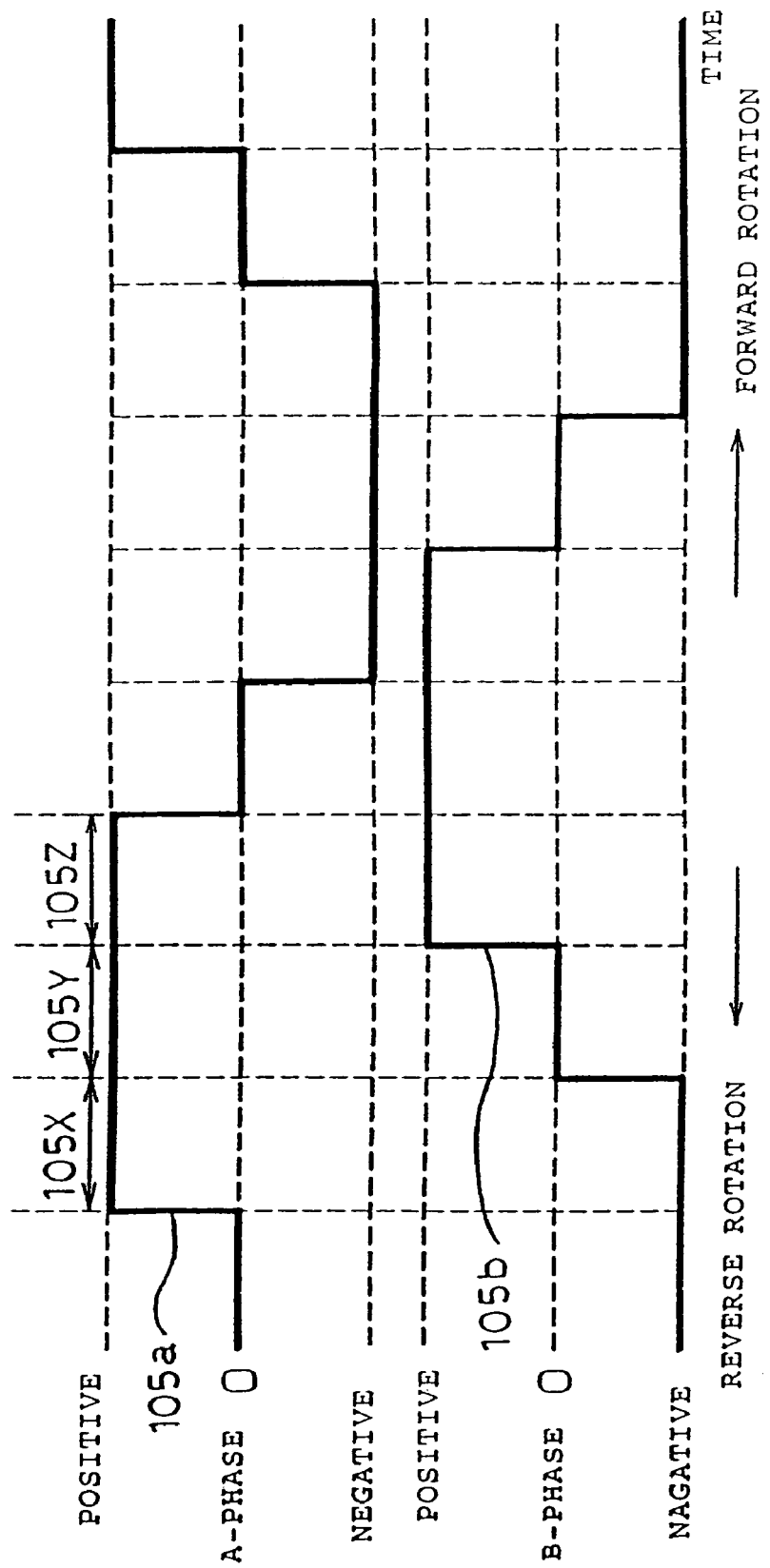
FIG. 56 is a wave form chart for a driving current of the conventional stepping motor.

In FIG. 2, when the state of the stepping motor driving current changes from 102X to 102Y, the B-phase driving current 102b is changed gradually at an inclination K in proportional to the time and reaches the current volume of the state Y. While the stepping motor is rotated, the driving current is changed gradually at an inclination K in proportion to the time, not to be changed in a moment in right angle steps. This is why the change of the start-up torque generated in the stepping motor can be suppressed within a low value. Unlike conventional stepping motors, no large and abrupt start-up torque is generated in the stepping motor at this time, so the position of the point P on the rotator 106c of the stepping motor shown in FIG. 55 is changed smoothly from 106X to 106Y.

As shown in the first embodiment of the present invention, because the driving current of the stepping motor is changed from the before-rotation state to the after-rotation state at an inclination K in proportion to the time, the change of the start-up torque to be generated in the stepping motor can be suppressed low.

When the driving current of the stepping motor is changed at an inclination K in proportion to the time, a large inclination K is taken for the driving current up to the current volume with which the stepping motor begins rotating actually and a small inclination K is taken when the stepping motor begins rotation. Consequently, the acceleration of the stepping motor at the start-up time can further be suppressed low.

Hereunder, explanation will be made for a disk apparatus for which the stepping motor controlling method in the above-mentioned first embodiment is used.

When using the stepping motor controlling method in the above-mentioned first embodiment for the stepping motor controlling means 101*h* of the disk apparatus of the present invention shown in FIG. 1, preferably, the inclination K of the driving current shown in FIG. 2 should be variable. In FIG. 1, an analog circuit is used to create the stepping motor controlling means 101*h* in the first embodiment. In order to reduce the manufacturing cost, however, a digital circuit or such a digital means as microcomputer software or LSI-incorporated firmware may be used to create the stepping motor controlling means.

When a digital means is used, the wave form of the stepping motor driving current is changed in steps on the resolution level due to quantization. However, it is possible even for a digital means to obtain the same effect as that of the present invention unless otherwise the resolution is so rough to accelerate the stepping motor rapidly. In addition, a command signal for changing the inclination K of the driving current is also applied to the system controller 101*i*.

Hereunder, explanation will be made for a case in which the recording speed or the playback speed of the disk is increased in a multiple of M (M: an interger of 2 or above) in the above-mentioned configuration. When the rotation speed of the disk is increased in a multiple of M, the lens following up the track of the disk when in recording or playing back is also displaced in the radial direction of the disk at a speed in a multiple of M. If the inclination K of the stepping motor driving current is fixed with respect to such a rotation speed of the disk, the pick-up feed speed becomes slower than the displacement speed of the lens, so the pick-up may not be able to follow up the displacement speed of the lens. The feed speed of the pick-up is proportional to the inclination K of the stepping motor driving current. When the inclination K of the stepping motor driving current is variable, therefore, the system controller 101*i* changes the inclination K of the pulse counting means 310 according to the rotation speed of the disk, so that the pick-up can follow up the displacement speed of the lens.

In the above-mentioned first embodiment of the present invention, in which the basic step angle of the stepping motor is divided into n angles (n: an integer of 2 or above) to control the stepping motor, the driving current of the stepping motor is changed at an inclination K in proportion to the time between the before-rotation state and the after-rotation state. Consequently, the acceleration of the stepping motor at the start-up time can be controlled low.

When the stepping motor controlling method in the first embodiment is used for feeding the pick-up of a disk, no acceleration is applied so much for the pick-up fed by a stepping motor. Thus, the lens shakes less and the off-track frequency can be reduced significantly. Furthermore, when the inclination K of the pulse counting means 310 is variable, the inclination K can be changed according to the rotation speed of the disk so that the pick-up follows up the displacement speed of the lens.

<<Second Embodiment>>

Figure 3:
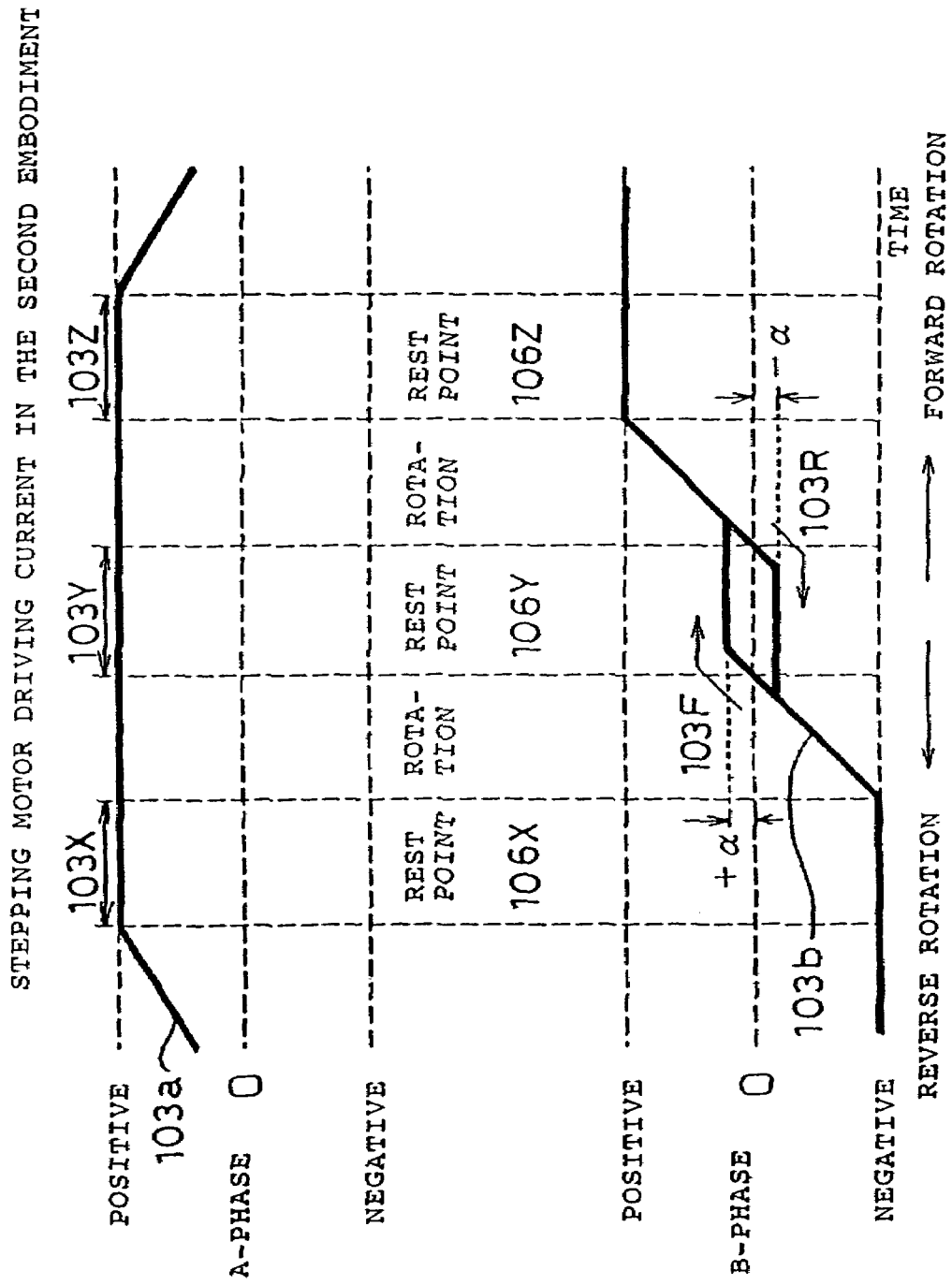
FIG. 3 is a wave form chart indicating a stepping motor driving current in the second embodiment of the present invention.

Hereunder, the second embodiment of the present invention will be explained with reference to the attached drawings. FIG. 3 is a wave form chart indicating the driving current of the stepping motor in the second embodiment of the present invention. In FIG. 3, the wave form 103*a* is a driving current wave form representing the flow rate and direction of the current applied to the A-phase coil of the stepping motor on the time axis. A wave form 103*b* is a driving current wave form representing the flow rate and direction of the current applied to the B-phase coil of the stepping motor on the time axis. In the wave forms 103*a* and 103*b*, the forward flowing current is represented by a positive value and the reverse flowing current is represented by a negative value. In FIG. 3, the arrow 103F indicates a wave form to appear when the stepping motor is rotated forward, and the driving current wave form is changed from left to right in FIG. 3. The arrow 103R indicates the current wave form to appear when the stepping motor is rotated reversely, and the driving current wave form is changed from right to left in FIG. 3.

Hereunder, the operation of the stepping motor with a pulse counting means 310 as represented above will be explained with reference to FIGS. 3 and 55. In FIG. 3, when the stepping motor is rotated forward, the driving current state is changed from 103X to 103Y, then the B-phase driving current 103*b* is changed gradually in proportion to the time-and reaches the current volume in the state 103Y in accordance with the driving current shown with an arrow 103F. As shown in FIG. 3, the driving current is not changed in steps in a moment when the stepping motor in the second embodiment is rotated, but the driving current is changed gradually in proportion to the time, just like in the aforementioned first embodiment. With this, the start-up torque to be generated in the stepping motor used in the disk in the second embodiment can be suppressed low.

If the frictional load applied to the stepping motor is large with respect of the stepping motor start-up torque, however, the position of the point P of the rotator 106*c* gives in to the frictional load and stops before it reaches the position 106Y. Thus, it becomes impossible to control the rotational angle of the stepping motor accurately in FIG. 55. To avoid this problem, therefore, in FIG. 3, the B-phase driving current is flown by a current volume α in the positive direction more than the current in the first embodiment just like the current wave form shown with an arrow 103F. The rotational angle of the stepping motor in the second embodiment can thus be adjusted. And, when the current volume α is adjusted, the position P of the rotator 106*c* in FIG. 55 can be stopped at the position 106Y accurately.

When the stepping motor is rotated in the reverse direction, the driving current state in FIG. 3 is changed from 103Z to 103Y, then the current volume reaches the state 103Y in accordance with the driving current shown with an arrow 103R which is different from the driving current shown by an arrow 103F for the above-mentioned forward rotation of the stepping motor. The driving current shown with an arrow 103R can adjust the rotational angle of the stepping motor when the current flowing in the coil is increased by a current volume α in the negative direction.

Hereunder, explanation will be made for a disk apparatus for which the stepping motor controlling method in the above-mentioned second embodiment is used.

When the stepping motor controlling method in the second embodiment is used for the stepping motor controlling means 101*h* of the disk apparatus in the first embodiment shown in FIG. 1, the disk apparatus in the second embodiment is formed so as to change the current volume a used for the adjustment shown in FIG. 3. In FIG. 1, the stepping motor controlling means 101*h* is formed just like the means explained in the first embodiment. The system controller 101*i* in the second embodiment is formed with additional items so that it can output a command signal for changing the value of the current volume α.

In the case of the disk apparatus formed in the second embodiment as explained above, for example, when the type of the stepping motor is changed and/or when any mechanical specification of the disk apparatus are changed, the relationship between the torque and frictional load of the stepping motor may be changed from design values. When the disk apparatus is formed so as to be able to change the current volume α to cope with such specification changes, however, the current volume a can be adjusted so that the position of the point P on the rotator 106c shown in FIG. 55 can rest at the position 106Y.

Consequently, in the disk apparatus in the second embodiment, the rotation volume of the stepping motor, that is, the feed distance of the pick-up, can be adjusted later so as to be fixed even after any specification is changed in the configuration of the disk apparatus.

As shown in the above-mentioned second embodiment of the present invention, when the stepping motor is stopped at a mechanical instability point outside the range of the basic stepping angle, the rotational angle of the stepping motor can be controlled accurately by changing the direction and volume of the driving current according to the rotational direction until the mechanical instability point is reached. When this controlling method is used for a disk apparatus, the feed distance of the pick-up can be adjusted even after any specification change in the disk apparatus. In addition, the disk apparatus in the second embodiment can prevent the lens from excessive displacement to occur in the pick-up, and accordingly it can also prevent the characteristics of the focus servo and the tracking servo from degradation.

<<Third Embodiment>>

Hereunder, the third embodiment of the present invention will be explained with reference to FIG. 4.

Figure 4:
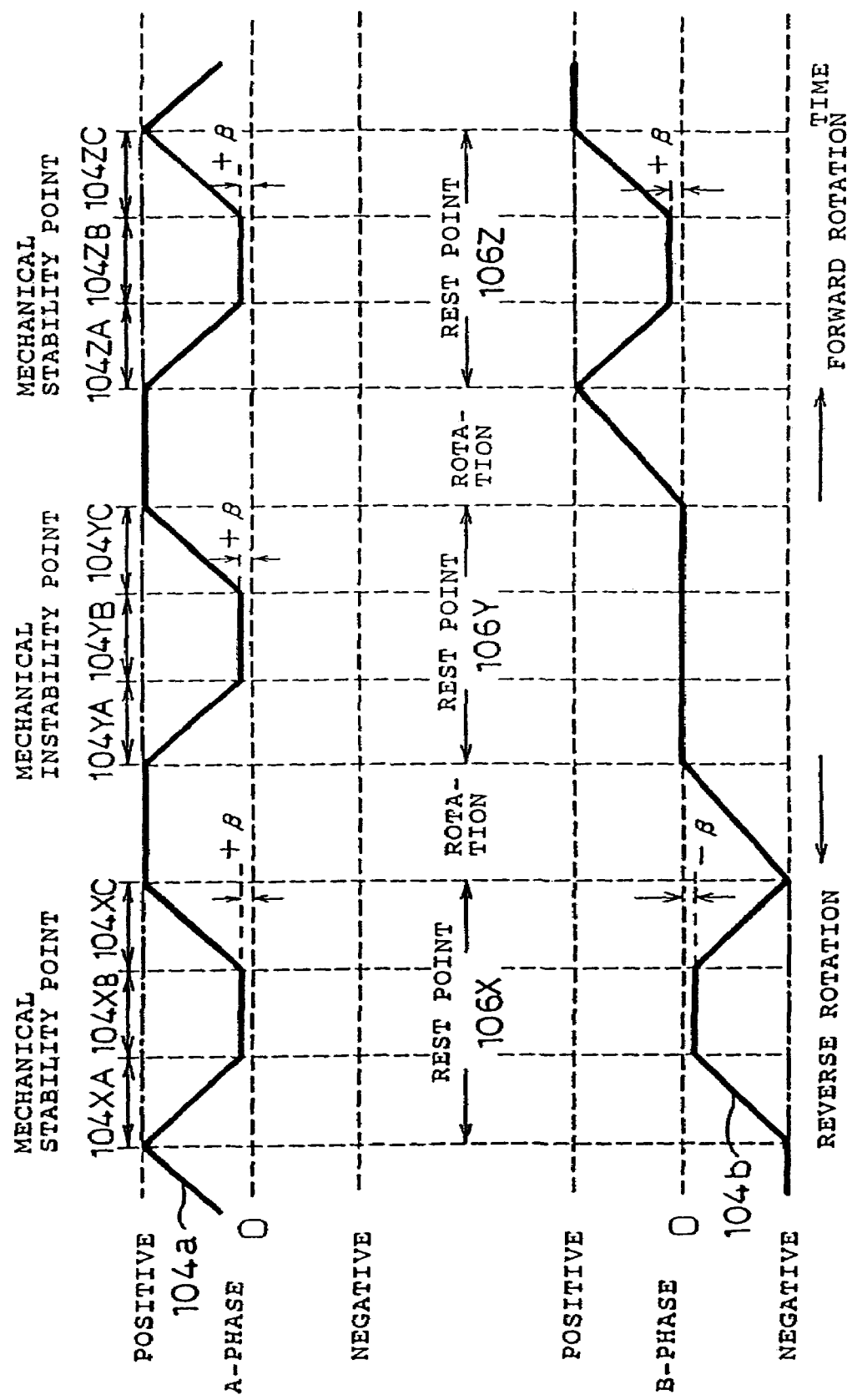
FIG. 4 is a wave form chart indicating a stepping motor driving current in the third embodiment of the present invention.

FIG. 4 is a wave form indicating a driving current of the stepping motor in the third embodiment of the present invention. In FIG. 4, the solid line indicates the wave form of the driving current in the third embodiment and the alternative long and short dash line indicates the wave form of the driving current in the first embodiment for comparison. The wave form 104a is a driving current wave form representing the volume and direction of the current flowing in the A-phase coil of the stepping motor on the time axis. The wave form 104b is a driving current wave form representing the volume and direction of the current flowing in the B-phase coil of the stepping motor on the time axis. The forward flowing driving currents (104a and 104b) are represented by positive values and the reverse flowing driving currents (104s and 104b) are represented by negative values. The current wave form to appear when the stepping motor is rotated forward is changed from left to right in FIG. 4. The current wave form to appear when the stepping motor is rotated reversely is changed from right to left in FIG. 4.

Hereunder, explanation will be made for how the stepping motor rests at a basic step angle position, that is, at a mechanical stability point, due to the driving current of the stepping motor formed as explained above in the third embodiment.

In FIG. 4, when the driving current state of the stepping motor is changed from 104YC to 104ZA, the B-phase driving current 104b is increased gradually from 0 to a positive value in proportion to the time. At this time, the point P of the rotator 106c shown in FIG. 55 is rotated from the position 106Y to the position 106Z. And, after the rotator 106c reaches the target position 106Z, both A-phase driving current 104a and B-phase driving current 104b are reduced gradually to 0 at a rate as shown in the state 104ZA. Then, the A-phase driving current 104a and the B-phase driving current 104b enter the hold state (104ZB) leaving only the current volume β respectively. After this, when the stepping motor is rotated forward again, both A-phase and B-phase driving currents 104a and 104b are increased gradually at the same rate as shown in the state 104ZC. After this, the A-phase driving current 104a enters the next state.

In the states 104ZA and 104ZC, the rotator rests due to the balance of the generated torque between A-phase and B-phase coils of the stepping motor. Consequently, when the current volume flowing in only one of the coils is reduced, the balance of the torque between the coils is lost and the rotor begins moving. Thus, the current volumes flowing in both A-phase and B-phase coils are reduced or increased at the same rate. And, the rotator keeps at rest as is.

Next, explanation will be made for the operation of the rotator for being rested at a mechanical instability point outside the range of the basic step angle with reference to FIGS. 4 and 55.

If, when the stepping motor is rotated forward, the driving current state is changed from 104XC to 104YA in FIG. 4, then the B-phase driving current 104b is changed gradually from a negative value to 0 in proportion to the time. At this time, the point P of the rotator 106c shown in FIG. 55 is rotated from the position 106X to the position 106Y. After the rotator stops at the target position 106Y, the A-phase driving current 104a is reduced gradually to 0 in proportion to the time as shown in the state 104YA in FIG. 4. Then, the A-phase driving current 104a enters the rest state 104YB leaving only the current volume β. After this, when the rotator is rotated forward again, the A-phase driving current 104 is increased gradually in proportion to the time as shown in the state 104YC. Then, the B-phase driving current 104b is increased with a positive value toward the state 104ZA. In the states 104YA and 104YC, the current volumes in both coils are reduced or increased respectively in proportion to the time, so that the torque of the stepping motor is changed gradually with respect to the time. Because no sharp change of torque is applied to the rotator, the rotator keeps resting as-is due to the frictional force. In the state 104YB shown in FIG. 4, the current volume flowing in the coils of the stepping motor is left only by β. This is because the position 106Y in FIG. 55 is a mechanical instability point outside the range of the basic step angle of the stepping motor. So, if the current volume flowing in each coil is reduced to 0 completely, the rotator 106c stops only with the mechanical frictional force. If any vibration is applied to the rotator in this state, the rotator 106c is shifted to a position 106X or 106z, which is a mechanical stability point. If such a phenomenon occurs in the disk apparatus, the pick-up is shifted by vibration, causing the characteristics of the focus servo and the tracking servo to be degraded. To avoid such a trouble, the current volume flowing in each coil is not reduced to 0 completely in the third embodiment; only a current volume of β is left when the rotator is stopped, so that the rotator can rest in a state of vibration free.

Next, explanation will be made for a case in which the stepping motor controlling method in the above-mentioned third embodiment is used for a disk apparatus.

When the stepping motor controlling method in the third embodiment is used for the stepping motor controlling means 101h in the disk apparatus in the first embodiment of the present invention shown in FIG. 1, the disk apparatus should preferably be formed so that the current volume β used for making the rotator rest as shown in FIG. 4 is variable. The disk apparatus in the third embodiment 3 is formed so as to use the stepping motor controlling means shown in FIG. 1 and output command signals for changing the current volume β value to the system controller 101i.

For example, when the type of the stepping motor used for the disk apparatus is changed and/or when any mechanical specification of the disk apparatus is changed, the relationship between the torque and the frictional load of the stepping motor may differ from the design ones. The disk apparatus in the third embodiment can cope with such specification changes by changing the current volume β, so the current volume β can be adjusted after any specification change so that the rotator can keeps resting with the necessary minimum current volume.

As shown in FIG. 4, in the states 104XB and 104ZB, the rotator of the stepping motor is positioned at a basic step angle position, that is, at mechanical stability points shown as positions 106X and 106Z in FIG. 55. Thus, the rotator is positioned at a more stable rest point dynamically than being positioned at a position 106Y, which is a mechanical instability point, and accordingly, it is not easily shifted from the position. When the disk apparatus is formed so as to change the current volume β, therefore, the current volume for keeping the rest state of the rotator at positions 106X and 106Z, which are both mechanical stability points, can be reduced more than the current volume for keeping the rest state of the rotator at the position 106Y, which is a mechanical instability point. This is why the power consumption and calorific value of the stepping motor in the rest state can be further suppressed.

In the third embodiment, as explained above, after the rotator reaches the target position, the current volume flowing in each coil of the stepping motor is reduced gradually in proportion to the time without moving the rotator and only the residual current volume β is used to keep the rotator at rest. As a result, the power consumption of the stepping motor in the rest state can be reduced significantly, preventing heat generation of the stepping motor in the third embodiment.

Furthermore, because the current volume β can be changed in the stepping motor controlling method in the third embodiment, the stepping motor can be kept at rest with the necessary minimum power consumption even after any mechanical specification of the disk apparatus is changed.

Furthermore, according to whether the rest point of the stepping motor is at a mechanical stability point or at an instability point, the stepping motor can be kept at rest at each stop point with the necessary minimum power consumption in the stepping motor controlling method in the third embodiment.

<<Fourth Embodiment>>

Hereunder, the fourth embodiment of the present invention will be explained with reference to the attached drawings.

In the disk apparatus shown in FIG. 1, if vibration is generated inside or outside the disk apparatus, the lens 101b is shaken and an error signal is transmitted to the servo means 101g. The error signal indicates a larger amplitude than that of normal operations that generate no vibration. This error signal is a tracking error signal or a focusing error signal. The system controller 101i, when detecting a larger amplitude error, detects the vibration generated in the disk apparatus. Detecting such vibration, the system controller 101i transmits a command signal for increasing the current volume of the rest state to the stepping motor controlling means 101h. The stepping motor controlling means 101h then increases the current volume β more than the normal current volume to make the stepping motor rest at the current position as explained in FIG. 4 in the third embodiment.

When the vibration stops, a small amplitude error signal is transmitted to the servo means 101g. Unless the amplitude of the error signal is increased for a fixed time, the system controller 101i decides that the vibration is already stopped, then transmits a command signal for returning the current volume β to the normal one to the stepping motor controlling means 101h. Receiving the command signal, the stepping motor controlling means 101h reduces the current volume β to return the current of the resting state to the normal volume.

Since vibration is detected according to the error signal from the servo means 101g and the current volume needed for making the stepping motor rest is increased over the normal one such way in the fourth embodiment, the resting position of the stepping motor, that is, the resting position of the pick-up, can be prevented from being shifted from the resting position, due to vibration. Consequently, the pick-up is never shifted from its due position even when vibration is generated in the disk apparatus in the fourth embodiment. Thus, the disk apparatus in the fourth embodiment can be prevented from focus-off and tracking-off errors. Furthermore, since the current volume is returned to the normal one after vibration stops in the disk apparatus in the fourth embodiment, only the necessary minimum power consumption is needed to keep the stepping motor at rest while coping with the vibration.

Although an example of recording/playing back information on/from the helically-formed tracks on a disk is explained in the fourth embodiment of the present invention, the present invention may also be applied for a case of recording/playing back information on/from the concentric circle tracks of a disk. When recording/playing back information on/from such a concentric circle track, the lens moves to adjacent tracks one after another to be displaced above the pick-up. Consequently, the pick-up must also be moved, and the present invention can also apply to a disk being comprised of concentric circle tracks.

Although the driving current of the stepping motor is changed in the fourth embodiment of the present invention, it is also possible to obtain the same effect by changing the voltage between terminals of each coil of the stepping motor.

Although explanation is made in the fourth embodiment of the present invention for an example of the 1-2 phase excitation in which the basic step angle of the stepping motor is divided into two angles so that the motor is rotated in units of a ½ step angle, it is also possible to obtain the same effect by applying the present invention to a stepping motor controlling system that divides the basic step angle of the stepping motor further into n angles (n: an interger of 2 or over) so that the motor is rotated in units of a 1/n step angle.

As explained above, in the stepping motor controlling method that divides the basic step angle of the stepping motor into n angles (n: an interger of 2 or over) to drive the stepping motor, when the above-mentioned stepping motor is rotated by a 1/n step angle, the driving current of the stepping motor is changed at an inclination K in proportion to the time between the before-rotation state and the after-rotation state. Changing the inclination K such way makes it possible to suppress the start-up torque to be generated in the stepping motor to a small change. When such the stepping motor controlling method of the present invention is used for feeding the pick-up fed by a stepping motor in a disk apparatus, therefore, no large acceleration is applied to the pick-up. As a result, shaking of the lens can be suppressed low, reducing the off-track frequency significantly.

<<Fifth Embodiment>>

Hereunder, the fifth embodiment of the stepping motor driving method and the disk apparatus of the present invention will be explained with reference to the attached drawings.

Figure 5:
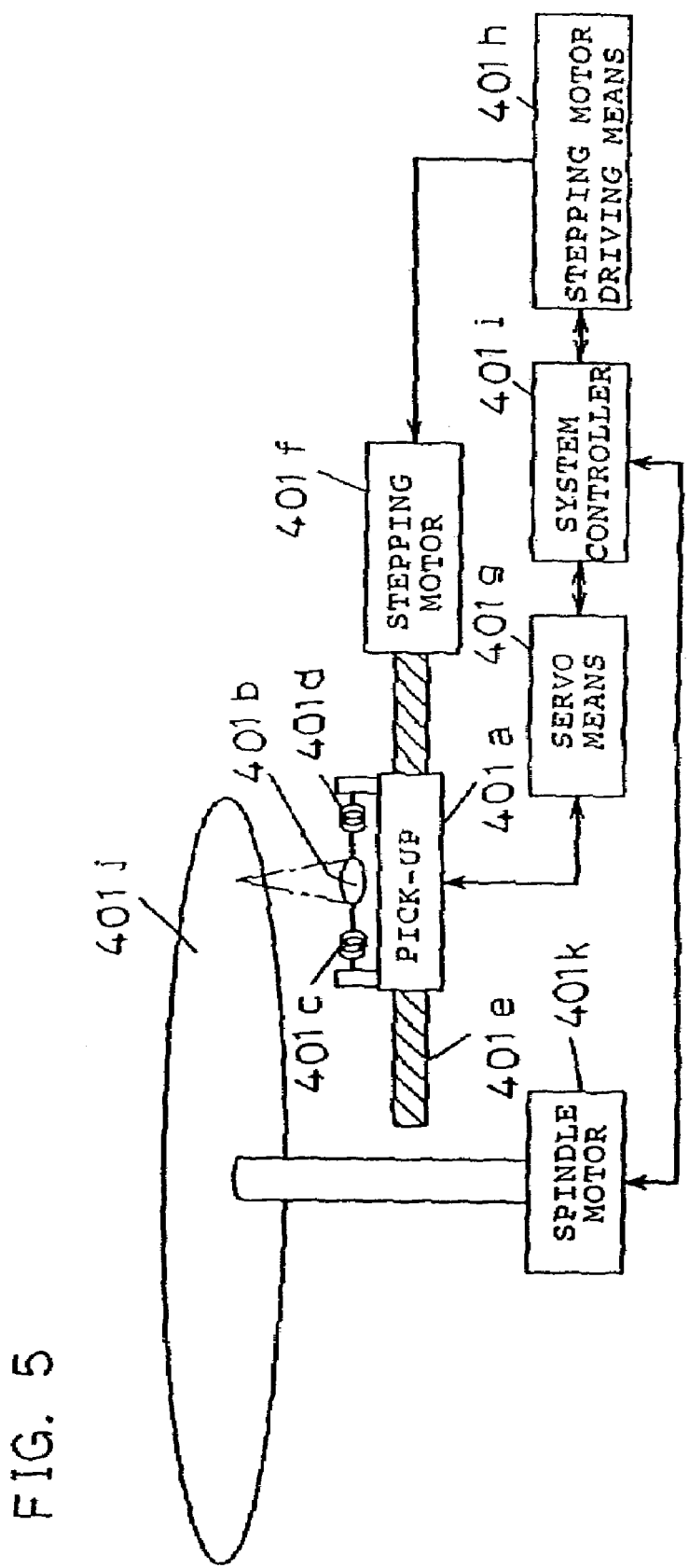
FIG. 5 is a block diagram for a configuration of the disk apparatus in the fifth embodiment of the present invention.

FIG. 5 is a block diagram for a configuration of the disk apparatus in the fifth embodiment, and in the sixth embodiment of the present invention, to be explained later. Hereunder, the fifth embodiment of the present invention will be explained first with reference to the attached drawings.

In FIG. 5, a lens 401b is provided above a pick-up 401a and the lens 401b is held by springs 401c and 401d. The rotational motion of the stepping motor 401f is transmitted to the pick-up 401a via a feed screw 401e. The pick-up 401a makes a linear motion in the radial direction of the disk 401j. The disk 401j stores information on its helically-formed or concentric circle-formed tracks, and the rotation speed of the disk is controlled by a spindle motor 401k. Error signals from the pick-up 401a are transmitted to a servo means 401g, and the servo means 401g outputs signals for controlling the springs 401c and 401d to the pick-up 401a so as to minimize the size of error signals.

The system controller 401i in the fifth embodiment is connected to the servo means 401g and the spindle motor 401k and transmits driving command signals for feeding the pick-up 401a to the stepping motor-controlling means 401h as needed. Receiving the command from the system controller 401i, the stepping motor controlling means 401h drives the stepping motor 401f.

Figure 6:
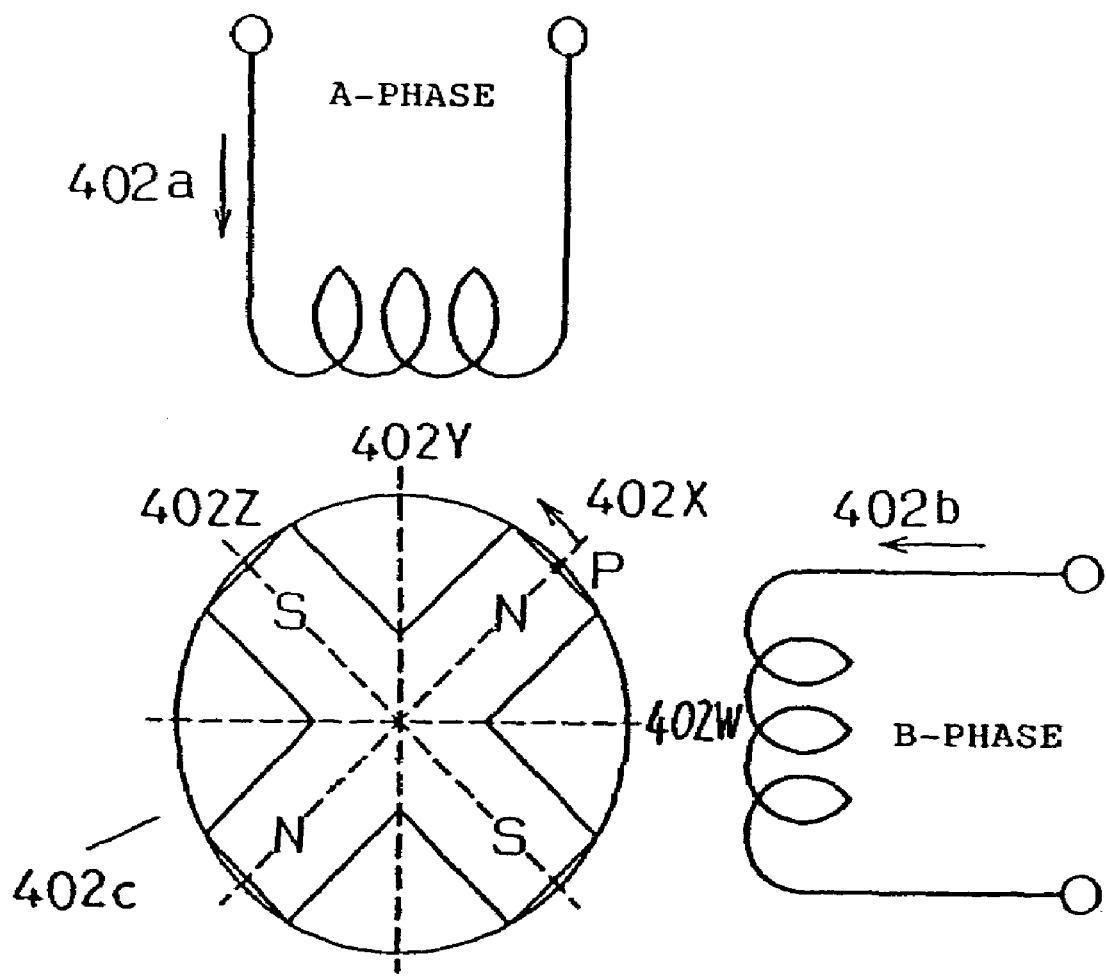
FIG. 6 is a configuration of a stepping motor.

FIG. 6 is a schematic inner configuration of a general stepping motor.

In FIG. 6, an arrow 402a indicates a current flowing in the A-phase coil and an arrow 402b indicates a current flowing in the B-phase coil. The rotator 402c has a plurality of pairs of magnetic poles N and S. The point P on the rotator begins a rotational motion when the current 402a flowing in the A-phase coil and the current 402b flowing in the B-phase coil are changed together and stops when the balance between the magnetic force generated from the coils and the frictional load of rotation is stabilized.

Positions 402W, 402X, 402Y, and 402Z show consecutive excitation stability points of some excitation stability points of the stepping motor. The number of magnetic pole pairs and the number of excitation stability points vary with types of stepping motors.

Figure 7:
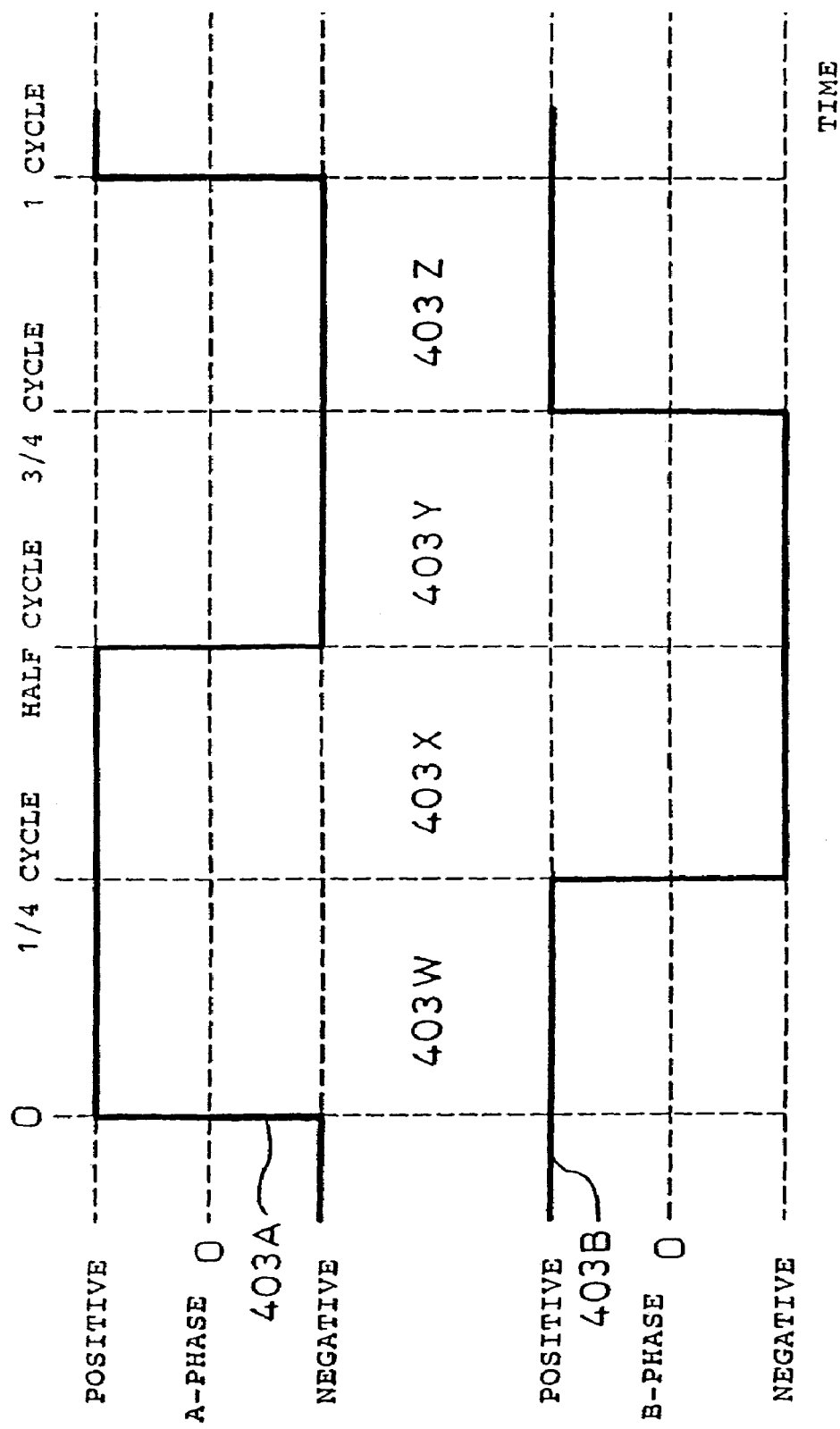
FIG. 7 is an illustration of the driving current pattern 1 of a stepping motor driving means.

FIG. 7 is a wave form chart representing a driving current pattern of the stepping motor driving means 401h. The driving current pattern shown in FIG. 7 is driving current pattern of a general stepping motor. Which is a so-called 2-phase excitation type one.

In FIG. 7, the wave form 403A is a driving current wave form representing the volume and direction of the current flowing in the A-phase coil of the stepping motor 401f on the time axis. The wave form 403B is a driving current wave form representing the volume and direction of the current flowing in the B-phase coil of the stepping motor 401f on the time axis. In the A-phase coil driving current wave form 403A and the B-phase coil driving current wave form 403B, the current flowing forward in each coil is represented by a positive value and the current flowing reversely in each coil is represented by a negative value.

When the current state is 403W in FIG. 7, the point P on the rotator of the stepping motor 401f shown in FIG. 6 is moved to a stability point, which is the position 402W. In the same way, each of the current states 403X, 403Y, and 403Z in FIG. 7 correspond to each of the states in which the point P is moved to the positions 402X, 402Y, and 402Z in FIG. 6 respectively.

Hereunder, explanation will be made for the operations of the disk apparatus and the stepping motor 401f according to the stepping motor driving current patterns in the above-mentioned configuration with reference to FIGS. 5 to 7.

The stepping motor driving means 401h in FIG. 5 is provided with neither encoder nor sensor used for detecting the position of the stepping motor 401f. Thus, for example, just after the main power supply of a disk apparatus is initialized (turned on immediately after it is turned off), the controlling means 401h cannot know the position at which the stepping motor 401f stops. In other words, in the initial status in which the stepping motor 401f is not excited yet, it is unknown where the position P on the rotator of the stepping motor stops in FIG. 6.

In the stepping motor controlling method in the fifth embodiment of the present invention, the state of excitation can be synchronized between the stepping motor driving means 401h and the stepping motor 401f as shown in FIG. 5 by changing the driving current pattern of the stepping motor driving means by ¼ cycle or over even when the state of excitation of the stepping motor, that is, the position of the rotator of the stepping motor, is unknown. Hereunder, this principle will be explained.

In FIG. 6, it is assumed that the initial position of the point P on the rotator of the stepping motor is at any of the positions 402W, 402X, 402Y, and 402Z. Now, it is assumed here that the stepping motor driving means 401h excites the current state 403X in FIG. 7. With respect to this excitation, when the initial position of the point P on the rotator of the stepping motor in FIG. 6 is arranged at the positions 402W, 402X, 402Y, and 402Z respectively, the result will be as shown below.

If the initial position of the point P on the rotator of the stepping motor is arranged at the position 402X in FIG. 6, the state of excitation is synchronized between the stepping motor driving means 401h and the position of the stepping motor rotator, that is, the stepping motor from the beginning.

If the initial position of the point P on the rotator of the stepping motor is arranged at the position at 402W in FIG. 6, the point P on the rotator in FIG. 6 is rotated from the position 402W to the position 402X when the stepping motor driving means excites the current state 403X in the driving current pattern shown in FIG. 7. If the initial position of the point P on the rotator of the stepping motor is arranged at the position 402Y in FIG. 6, the point P on the rotator in FIG. 6 is rotated from the position 402Y to the position 402X when the stepping motor driving means excites the current state. 403X in the driving current pattern shown in FIG. 7. As a result, whether the initial position of the point P is arranged at position 402W or at the position 402Y, the state of excitation is synchronized between the stepping motor driving means 401h and the position of the stepping motor rotator, that is, the stepping motor.

If the initial position of the point P on the rotator of the stepping motor is arranged at the position 402Z in FIG. 6, both A-phase and B-phase coils shown in FIG. 6 are excited to the same polarity magnetically after the current state of excitation by the stepping motor driving means. Thus, the point P on the rotator remains at the same position (402Z).

However, it is when the driving current pattern shown in FIG. 7 is in the current state 403Z that the point P on the rotator stops at the position 402Z in the normal excitation state. Consequently, when the point P on the rotator stops at the position 402Z while the stepping motor driving means is in the current state 403X, the state of excitation is not synchronized between the stepping motor driving means and the stepping motor.

This is why the current state of the stepping motor driving means is changed from 403X to 403Y so that both A-phase and B-phase coils shown in FIG. 6 are excited to the reverse polarity magnetically. The point P on the rotator is thus moved from the position 402Z to the position 402Y.

Consequently, the point P on the rotator is moved to the position 402Y with respect to the current state 403Y, and the state of excitation is synchronized between the stepping motor driving means and the stepping motor. The change of the current state from 403X to 403Y in FIG. 7 is equal to a change of ¼ cycle for the driving current pattern of the stepping motor driving means.

When the position of the rotator of the stepping motor 401f is unknown in FIG. 5 such way, the driving current pattern of the stepping motor driving means 401h is changed by ¼ cycle or over, so that the state of excitation can be synchronized between the stepping motor driving means 401h and the stepping motor 401f.

After the state of excitation is synchronized between the stepping motor driving means 401h and the stepping motor 401f, the stepping motor 401f can be controlled in an open loop.

Figure 8:
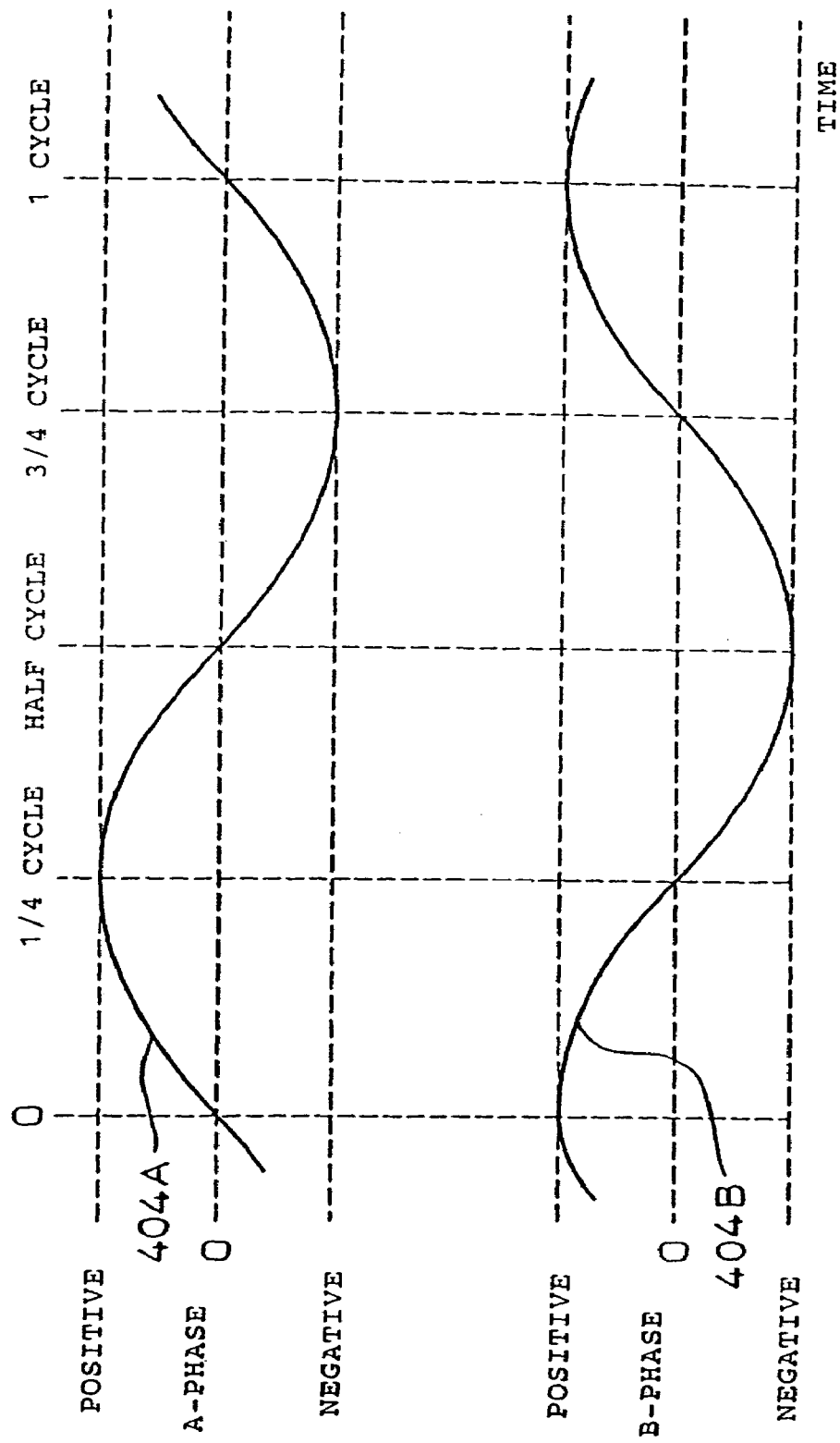
FIG. 8 is an illustration of the driving current pattern 2 of the stepping motor driving means.

In FIG. 7, the driving current pattern of a general 2-phase excitation type stepping motor is used for simplifying the explanation of the fifth embodiment of the present invention. In addition to such the 2-phase excitation system, however, the fifth embodiment may also apply to the ½-phase excitation system, as well as the sine wave driving system as shown in FIG. 8 or other various types of stepping motor excitation systems, each of which drives a stepping motor in 1/N steps (N: an interger of 2 or over) in a stairstep-like driving current pattern that models the sine wave. When the position of the rotator of the stepping motor is unknown, the state of excitation can be synchronized between the stepping motor driving means and the stepping motor by changing the driving current pattern of the stepping motor driving means by ¼ cycle or over.

<<Sixth Embodiment>>

Hereunder, the sixth embodiment of the present invention will be explained with reference to the attached drawings.

As explained in the aforementioned fifth embodiment, when the position of the rotator of the stepping motor is unknown, the current state 403X is excited as the initial excitation, for example, then the point P on the rotator is rotated from the position 402Y to the position 402X. This is possible only when the initial position of the point P on the rotator of the stepping motor is at the position 402Y in FIG. 6. As a result, the state of excitation is synchronized between the stepping motor driving means and the stepping motor.

When the state of excitation is synchronized between the stepping motor driving means and the stepping motor such way, the rotator of the stepping motor is moved to an excitation stability point, so that the stepping motor will be rotated suddenly sometimes.

If the stepping motor 401f is rotated suddenly in FIG. 5, the pick-up 401a is also moved suddenly in the radial direction of the disk 401j.

The lens 401b of the pick-up 401a is thus accelerated so much and the lens 401b is shaken. This causes the laser beam point to go off the track on the disk 401j, resulting in an off-track error. If the off-track distance is large at this time, data cannot be recorded correctly when in recording and when in playback, a data error is caused.

If the stepping motor 401j is rotated suddenly in the case shown in FIG. 5, the lens 401b of the pick-up 401a is shaken to cause a large displacement. The focus servo operation thus becomes unstable and the laser beam cannot be focused on the data face of the disk, causing recording/playback of data to be disabled.

In the case of the stepping motor driving method described in the sixth embodiment of the present invention, after the state of excitation is synchronized between the stepping motor driving means and the stepping motor, a servo operation is started under the control of the stepping motor.

In the disk apparatus described in the sixth embodiment of the present invention shown in FIG. 5, the state of excitation is synchronized between the stepping motor driving means 401h and the stepping motor 401f before the servo means 401g begins a focus servo operation or a tracking servo operation. Consequently, sudden movement of the pick-up 401a in the radial direction of the disk 401j can be prevented during the focus servo or tracking servo operation. In the disk apparatus in the sixth embodiment, therefore, the servo operation is stabilized, preventing errors when in recording and playing back of data.

<<Seventh Embodiment>>

Figure 9:
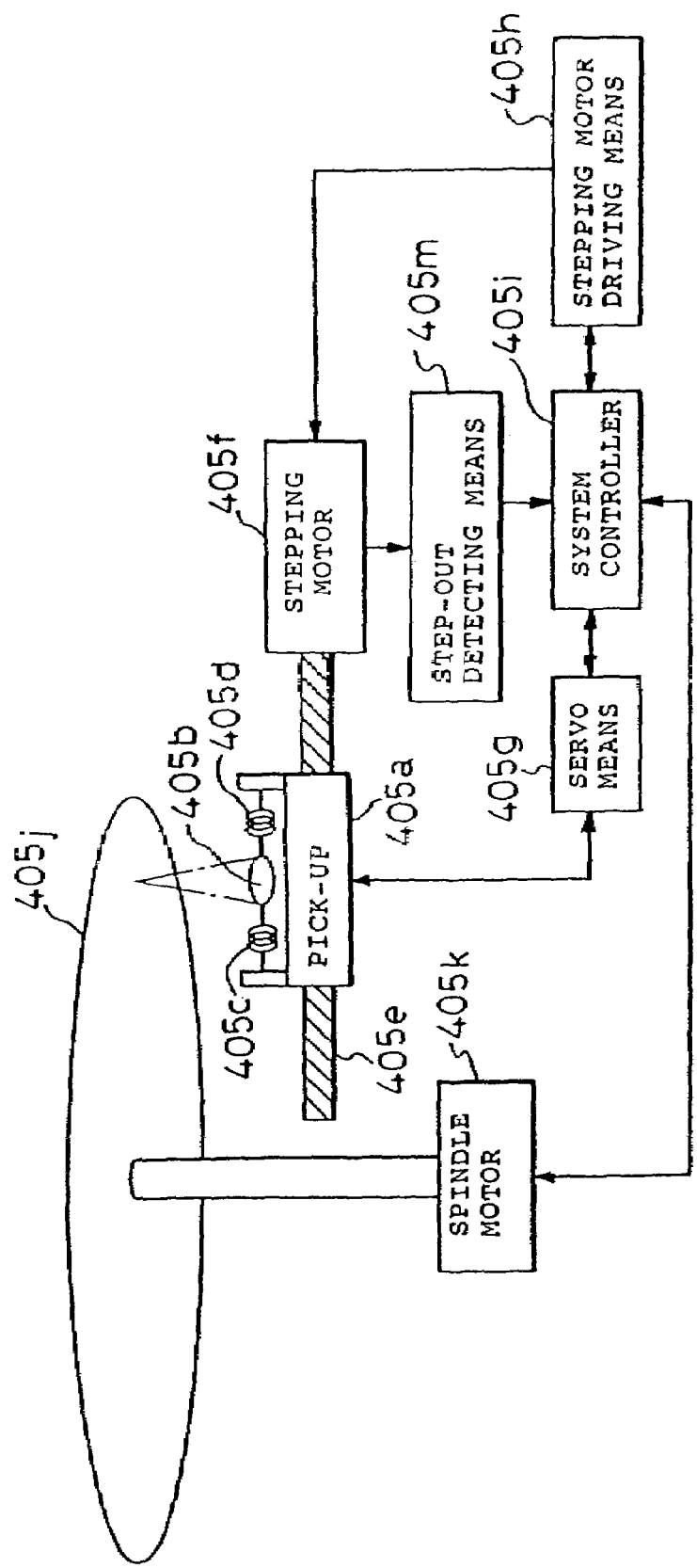
FIG. 9 is a configuration of the disk apparatus in the seventh and eighth embodiments of the present invention.

FIG. 9 is a block diagram for a configuration of the disk apparatus in the seventh embodiment of the present invention. The disk apparatus in the seventh embodiment is the same as that in the above-mentioned fifth embodiment except that it is additionally provided with a stepping motor step-out detecting means 405m.

Hereunder, the seventh embodiment of the present invention will be explained with reference to the attached drawings.

In FIG. 9, a lens 405b is provided above a pick-up 405a. The lens 405b is held by springs 405c and 405d. The rotational motion of the stepping motor 405f is transmitted to the pick-up 405a via a feed screw 405e. The pick-up 405a makes a linear motion according to the rotation of the feed screw in the radial direction of the disk 405j.

The disk 405j stores information on its helically or concentric circle-formed tracks and the rotation speed of the disk 405j is controlled by a spindle motor 405k. Error signals from the pick-up 405a are transmitted to a servo means 405g. The servo means 405g outputs signals for controlling the springs 405c and 405d to the pick-up 405a so as to minimize the size of each error signal.

The system controller 405i in the seventh embodiment is connected to the servo means 405g, the spindle motor 405k, and the step-out detecting means 405m respectively. The system controller 405i also outputs driving command signals for feeding the pick-up 405a to the stepping motor controlling means 405h as needed. Receiving such a command, the stepping motor controlling means 405h drives the stepping motor.

Hereunder, the operation of the disk apparatus formed such way in the seventh embodiment will be explained with reference to FIGS. 6, 7, and 9.

The step-out detecting means 405m of the stepping motor shown in FIG. 9 detects the step-out of the stepping motor 405j by checking the current volume flowing in each coil and the voltage between terminals of each coil of the stepping motor 405f. When the stepping motor 405j steps out, the current volume flowing in each coil and the voltage between terminals of each coil of the stepping motor 405j become larger than the values of those taken before the step-out occurs. The step-out of the stepping motor can thus be detected by comparing the values of the current volume and the voltages of the coils between those taken before and after the stepping motor 405j is in the step-out.

If the step-out detecting means 405m detects a step-out of the stepping motor 405j, the state of excitation may not be synchronized between the stepping motor driving means 405h and the stepping motor 405f. The disk apparatus shown in FIG. 9 is provided with neither encoder nor sensor used for detecting the position of the stepping motor 405f. When the step-out means 405m detects a step-out of the stepping motor 405f, therefore, it is still unknown where the stepping motor 405f is positioned.

This is why it is assumed at first that the initial position of the point P on the rotator of the stepping motor is arranged at any of the positions 402W, 402X, 402Y, and 402Z shown in FIG. 6 when a step-out is detected in the stepping motor 405f. It is then assumed that the stepping motor driving means has excited the current state 403X in FIG. 7. And, if the initial position of the point P on the rotator of the stepping motor shown in FIG. 6 is arranged at the positions 402W, 402X, 402Y, and 402Z respectively with respect to this excitation, the result will be as shown below.

If the initial position of the point P on the rotator of the stepping motor shown in FIG. 6 is arranged at the position 402X in FIG. 6, the state of excitation is synchronized between the stepping motor driving means 405h and the position of the stepping motor rotator, that is, the stepping motor 405f, from the beginning in FIG. 9.

If the initial position of the point P on the rotator of the stepping motor shown in FIG. 6 is arranged at the position 402W or 402Y in FIG. 6, the point P on the rotator shown in FIG. 6 is rotated from the position 402W to the position 402X or from the position 402Y to the position 402X due to the excitation of the driving current pattern, performed by the stepping motor driving means 405h in FIG. 7. Consequently, whether the initial position of the point P is arranged at the position 402W or at the position 402Y, the state of excitation is synchronized between the stepping motor driving means 405h shown in FIG. 9 and the stepping motor 405j.

If the initial position of the point P on the rotator of the stepping motor shown in FIG. 6 is arranged at the position 402Z, both A-phase and B-phase coils shown in FIG. 6 are excited to the same polarity magnetically due to the excitation of the current state 403X, performed by the stepping motor driving means 405h. So, the point P on the rotator remains at the position 402Z. However, it is only when the driving current pattern shown in FIG. 7 is in the current state 403Z that the point P on the rotator stops at the position 402Z normally. While the point P on the rotator stops at the position 402Z with respect to the current state 403X of the stepping motor driving means 405h, the state of excitation is not synchronized between the stepping motor driving means 405h and the stepping motor 405f.

This is why the state of excitation is changed from 403X to 403Y for the stepping motor driving means 405h, so that both A-phase and B-phase coils shown in FIG. 6 are excited to the reverse polarity magnetically and the point P on the rotator is moved from the position 402Z to the position 402Y. As a result, the point on the rotator is moved to the point 402Y with respect to the current state 403Y, and the state of excitation is synchronized between the stepping motor driving means 405h and the stepping motor 405f. As shown in FIG. 7, the change of the current state of the driving current pattern from 403X to 403Y is equal to a change of 4/1 cycle of the driving current pattern of the stepping motor driving means 405h.

While a step-out is detected in the stepping motor 405f and the position of the rotator of the stepping motor driving means 405f is unknown such way, the driving current pattern of the stepping motor driving means 405h is changed by ¼ cycle or over. Consequently, the state of excitation is synchronized between the stepping motor driving means 405h and the stepping motor 405f, so that the stepping motor is restored from the step out.

<<Eighth Embodiment>>

Hereunder, the disk apparatus in the eighth embodiment of the present invention will be explained with reference to the attached drawings. The configuration of the disk apparatus described in the eighth embodiment of the present invention is almost the same as that in the above-mentioned seventh embodiment shown in FIG. 9 except it is additionally provided with a stepping motor step-out detecting means 405m. Since the configuration of the disk apparatus shown in FIG. 9 is explained already in the seventh embodiment, it is not explained here.

When the stepping motor 405f shown in FIG. 9 steps out, the stepping motor 405f cannot follow up accurately, the driving current pattern which is output from the stepping motor driving means 405h, for of the stepping motor 405f. The stepping motor 405f will thus make an irregular rotational motion and stop suddenly.

At this time, the pick-up 405a is moved irregularly in the radial direction of the disk 405j, so the lens is shaken, causing the focus servo and the tracking servo of the servo means 405g to go off.

In the case that the focus servo or the tracking servo of the disk apparatus go off, the data recording/playback processing is stopped. Thus, the disk apparatus restarts and stabilize the servo operation immediately to restart the data recording/playback processing.

As explained in the seventh embodiment, when the stepping motor 405f steps out and the position of the rotator of the stepping motor 405f is unknown, then the current state 403X in FIG. 7 is excited to restore the stepping motor from the step-out and the point P on the rotator in FIG. 6 is rotated from the position 402Y to the position 402X due to the excitation of the current state 403X, performed by the stepping motor driving means 405h if the point P on the rotator of the stepping motor shown in FIG. 6 is arranged at the position 402Y. As a result, the state of excitation is synchronized between the stepping motor driving means 405h and the stepping motor 405f. When the state of excitation is synchronized between the stepping motor driving means 405h and the stepping motor 405f, the rotator is moved to an excitation stability point, then the rotation of the stepping motor 405f may be started suddenly.

If the focus servo and the tracking servo of the disk apparatus go off due to a step-out of the stepping motor, the servo operation may go off again after the state of excitation is synchronized between the stepping motor driving means 405h and the stepping motor 405f even when the servo operation is restarted and stabilized immediately. Such a servo operation should thus preferably be avoided. Because, the data recording/playback processing in the disk apparatus is stopped twice; when the stepping motor steps out and when the stepping motor is restored from the step-out.

To avoid such the trouble in the eighth embodiment of the present invention, if the step-out detecting means 405m detects a step-out of the stepping motor 405f and the servo operation of the servo means 405g is turned off in the disk apparatus shown in FIG. 9, the servo means 405g does not restart the servo operation immediately, but the state of excitation is synchronized between the stepping motor driving means 405h and the stepping motor 405f before the stepping motor is restored from the step-out. After this, the disk apparatus in the eighth embodiment allows the servo means 405g to restart the servo operation.

As explained above, in the disk apparatus defined in the eighth embodiment, the stepping motor is restored from the step-out at first, then the servo means restarts the servo operation. So, the pick-up is prevented from sudden movement in the radial direction of the disk after the servo operation is restarted.

Consequently, data recording/playback processing in the disk apparatus in the eighth embodiment is stopped only when the stepping motor steps out, and the recording/playback processing is not stopped when the stepping motor is restored from a step-out. The stop frequency of data recording/playback processing executed in the eighth embodiment can thus be reduced to only once.

In the fifth, sixth, seventh, and eighth embodiments explained above, an optical pick-up used in a disk apparatus is taken as an example of a controlling object driven by a stepping motor. The present invention does not limit the pick-up only to those in the above-mentioned embodiments. The stepping motor controlling method and the disk apparatus of the present invention are also effective for any disk apparatus whose magnetic head is driven by a stepping motor.

In the fifth to eighth embodiments of the present invention as explained above, when it is unknown where the rotator of the stepping motor is positioned just after the power supply is turned on or the stepping motor steps out, the driving current pattern of the stepping motor driving means is changed by ¼ cycle or over to synchronize the state of excitation between the stepping motor driving means and the stepping motor.

Furthermore, in the sixth and eighth embodiments, after the state of excitation is synchronized between the stepping motor driving means and the stepping motor, the focus servo means or the tracking servo means executes a servo operation. With the processings executed in the order as explained above, it is possible to prevent the servo-off to be caused by sudden rotation of the stepping motor due to the synchronization of the state of excitation between the stepping motor driving means and the stepping motor during data recording/playback processing in the disk apparatus, so that errors can be prevented when in a recording/playback processing in the disk apparatus.

<<Ninth Embodiment>>

Figure 10:
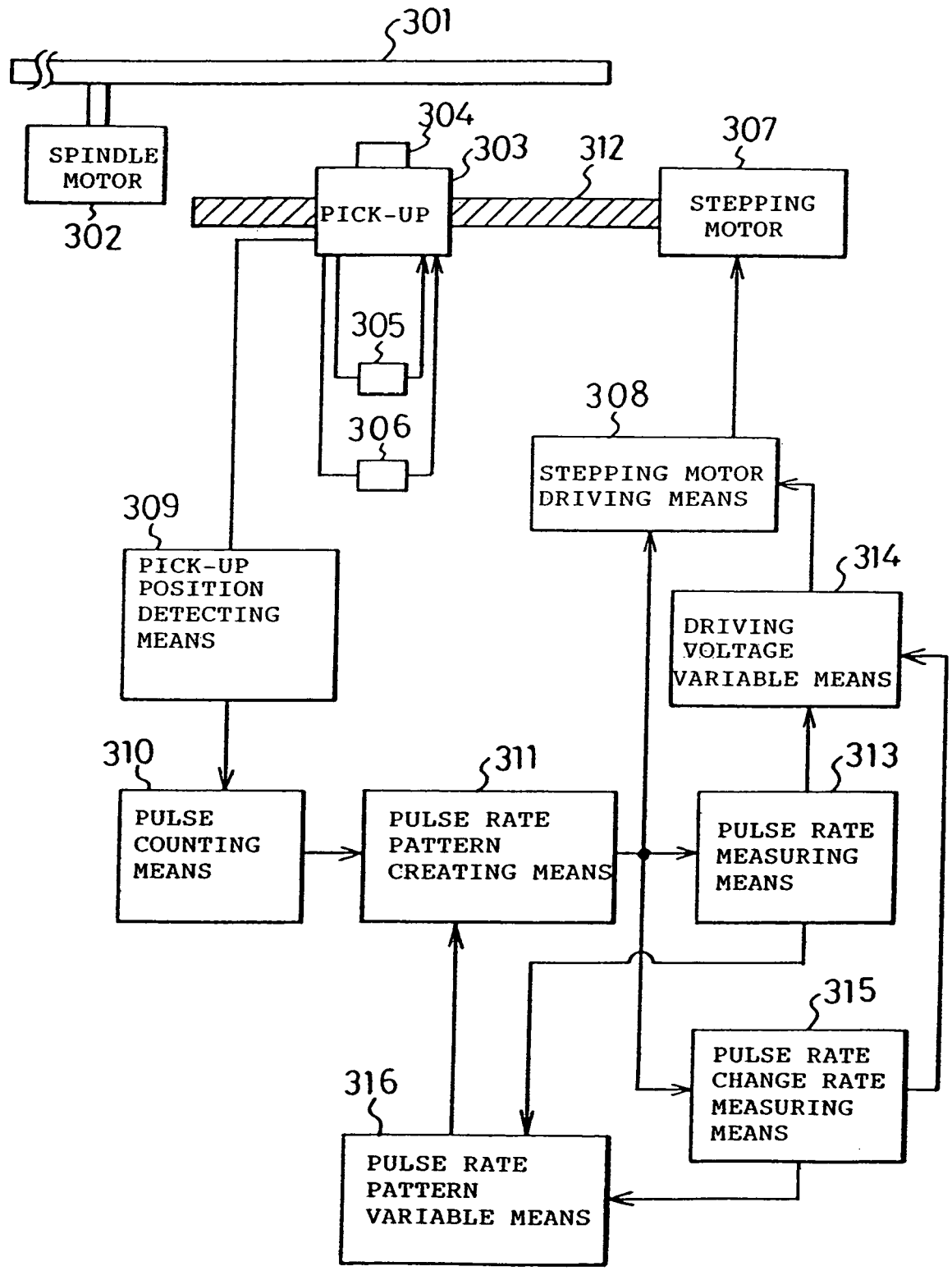
FIG. 10 is a block diagram for a configuration of the disk apparatus in the ninth embodiment of the present invention.
Figure 11:
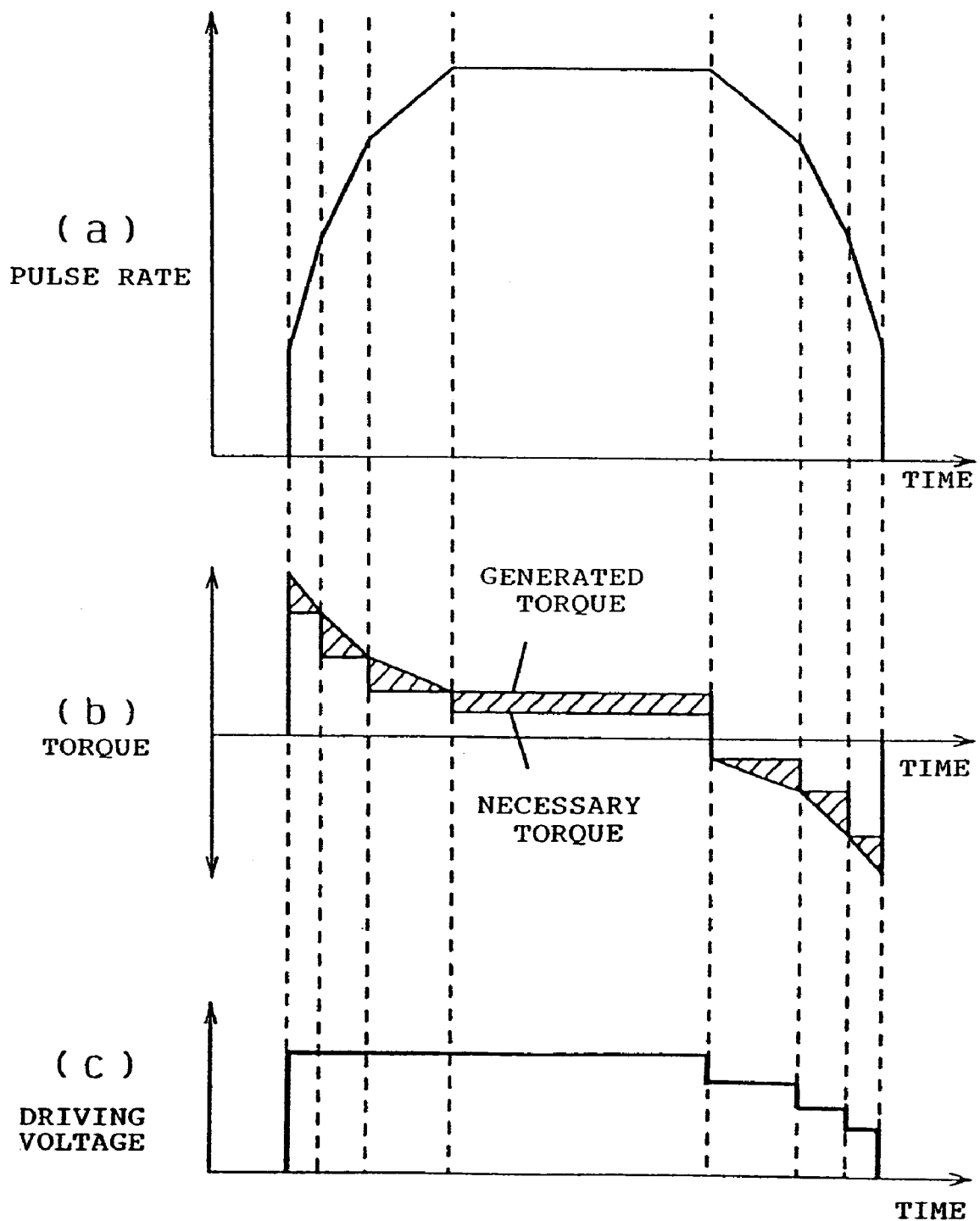
FIG. 11 is a wave form chart (a) indicating a stepping motor driving pulse rate in the ninth embodiment of the present invention, a wave form chart (b) indicating a torque generated in the stepping motor in the ninth embodiment, and a wave form chart (c) indicating a stepping motor driving voltage in the ninth embodiment.
Figure 57:
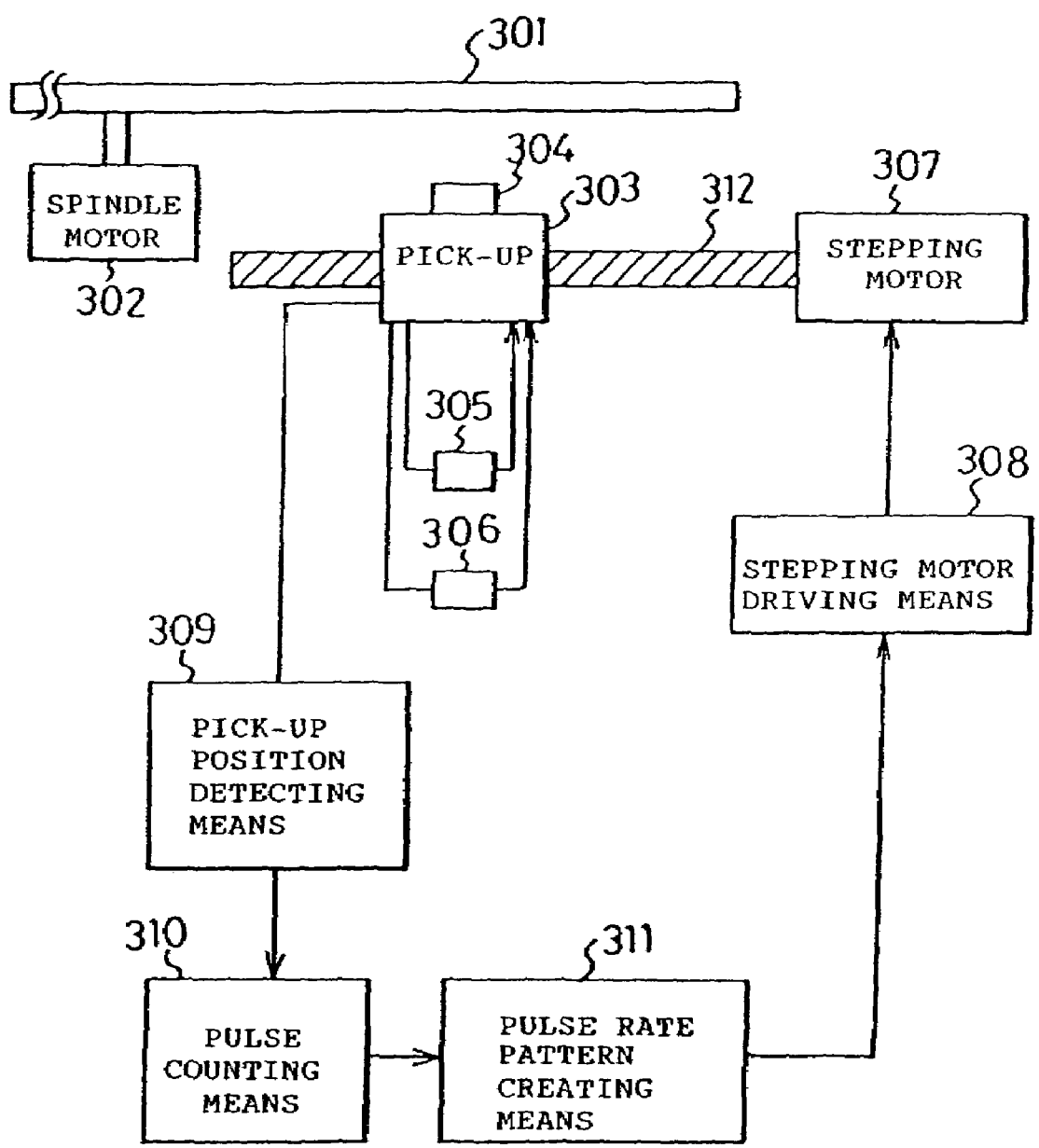
FIG. 57 is a block diagram for a configuration of a conventional optical information recording and playing-back apparatus.
Figure 58:
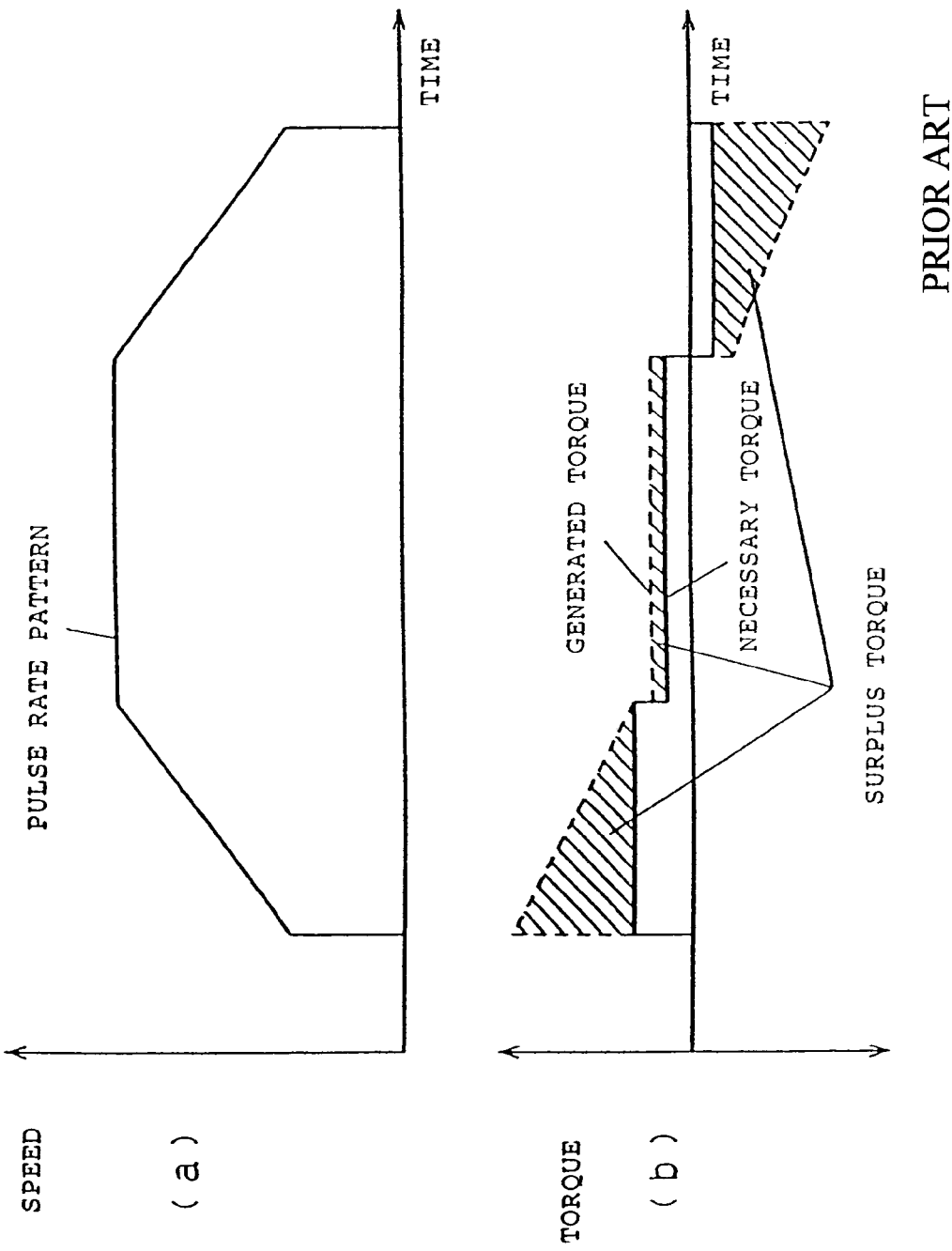
FIG. 58 is a wave form chart (a) indicating a driving pulse rate of the conventional stepping motor, is a wave form chart (b) indicating a torque generated in the conventional stepping motor.

Hereunder, the ninth embodiment of the present invention will be explained with reference to the attached drawings. The same configuration items as those of the conventional example shown in FIG. 57 will be given the same numerals. FIG. 10 is a block diagram of a configuration of the disk apparatus in the ninth embodiment of the present invention. FIG. 11 is a chart indicating the time relationship among the pulse rate, the generation torque, the necessary torque, and the driving voltage in the ninth embodiment.

In FIG. 10, the disk 301 has a helically-formed information tracks and the spindle motor 302 is a driving source for rotating the disk 301. The pick-up 303 is moved by the stepping motor 307 in the radial direction of the disk 301. A lens 304 is provided in the pick-up 303. The focus servo means 305 drives the focus actuator to be explained later so that the lens 304 is kept away by a certain distance from the disk 301 according to the focus error signal (not illustrated) indicating a displacement from the disk 301. The focus actuator is comprised of an electromagnetic circuit (not illustrated) and used to move the lens 304 vertically to the recording face of the disk 301.

The tracking servo means 306 drives a tracking actuator to be explained later so that the lens 304 follows up a given track on the disk 301 according to the tracking error signal for indicating a displacement from a track (not illustrated) on the disk 301. The tracking actuator is comprised of an electromagnetic circuit (not illustrated) and used for moving the lens 304 horizontally on the recording face of the disk 301.

The stepping motor 307 for moving the pick-up 303 is driven and controlled by the stepping motor driving means 308. The pick-up position detecting means 309 detects the current position of the pick-up 303 from the address information included in the data read from the pick-up 303. The pulse counting means 310 counts the number of stepping motor driving pulses for moving the pick-up 303 from the current position of the pick-up 303 detected by the pick-up position detecting means 309 to a target address entered from external. The pulse rate pattern creating means 311 creates a pulse rate pattern of the pulses entered to the stepping motor driving means 308 according to the number of pulses counted by the pulse counting means 310. The pulse rate measuring means 313 is comprised of a timer used to measure the pulse rate created by the pulse rate pattern creating means 311, and other items. The pulse rate change rate measuring means 315 is comprised of a timer for measuring the change rate of the pulse rate created by the pulse rate creating means 311, and other items. The driving voltage variable means 314 changes the driving voltage of the stepping motor driving means 308 according to the values measured by the pulse rate measuring means 313 and by the pulse rate change rate measuring means 315. The pulse rate pattern variable means 316 changes the pulse rate change rate from the pulse rate pattern creating means 311 according to the values measured by the pulse rate measuring means 313 and by the pulse rate change rate measuring means 315. The feed screw 312 holds the pick-up 303 movably in the radial direction of the disk 301 and transmits the torque of the stepping motor 307 to the pick-up 303.

Next, the operation of the disk apparatus formed as explained above in the ninth embodiment of the present invention will be explained.

The lens 304 used to read information from the disk 301 via the pick-up 303 is controlled by the electromagnetic actuator so that it can be kept focused on the disk 301 using the focus servo means 305 and it can follow up the target track of the disk 301 using the tracking servo means 306.

In order to access a given track, the current position of the pick-up 303 is recognized at first. In order to detect the current position of the pick-up 303, address information is read from the disk 301 via the pick-up 303. The pick-up position detecting means 309 then detects the current position of the pick-up 303 from the address information. The pulse counting means 310 counts the number of pulses necessary for moving from the detected current pick-up position to a target track.

Next, the operation of the tracking servo means 306 is stopped, then the pulse rate pattern creating means 311 being comprised of a microcomputer, etc. outputs data by changing the pulse rate change rate as shown in (a) of FIG. 11. The driving voltage of the stepping motor driving means 308 is changed as shown in (c) of FIG. 11, so that the stepping motor 307 is driven to move the pick-up 303. After the pick-up 303 is moved, the tracking servo means 306 is started again to record/play back information.

In FIG. 11, (a) indicates a pulse rate, (b) indicates a torque generated in the stepping motor 307 and a necessary torque for driving the stepping motor 307 at a pulse rate (a). (c) indicates an amplitude of the driving voltage. The output of the pulse rate shown in (a) is started with a frequency with which the stepping motor 307 can be started up.

The frequency (pulse rate) output from the pulse rate pattern creating means 311 and the change rate of the frequency (pulse rate change rate) are measured by the pulse rate measuring means 313 and the pulse rate change rate measuring means 315 respectively. The results are entered to the pulse rate pattern variable means 316. The pulse rate pattern variable means 316 is constructed by a microcomputer, etc. and used to store the relationship between a pulse rate and a pulse rate change rate that can suppress generation of a surplus torque found beforehand from the motor torque characteristics and the mechanical friction load in its memory, etc. According to this relationship, the pulse rate change rate of the pulse rate pattern creating means 311 is changed over. As a result, the pulse rate output means 311 outputs the pulse rate as shown in (a) of FIG. 11. In addition, the results of the pulse rate measuring means 313 and the pulse rate change rate measuring means 315 are also entered to the driving voltage amplitude variable means 314. The driving voltage amplitude variable means 314 is constructed by a microcomputer, a transistor, a resistor, etc. and used to control the voltage amplitude to be applied to each coil of the stepping motor 307 of the stepping motor driving means 308 as shown in (c) of FIG. 11.

With the configuration as shown above, the pulse rate change rate is changed as shown in (a) of FIG. 11, so that the stepping motor 307 can be accelerated with the maximum torque and the surplus torque is suppressed to suppress vibration. When in decelerating, the driving voltage is lowered to minimize the surplus torque of the stepping motor as shown in (c) of FIG. 11. Thus, the optimized driving force is transmitted to the pick-up 303 via the feed screw 31, enabling the pick-up 303 to be moved fast.

<<Tenth Embodiment>>

Figure 12:
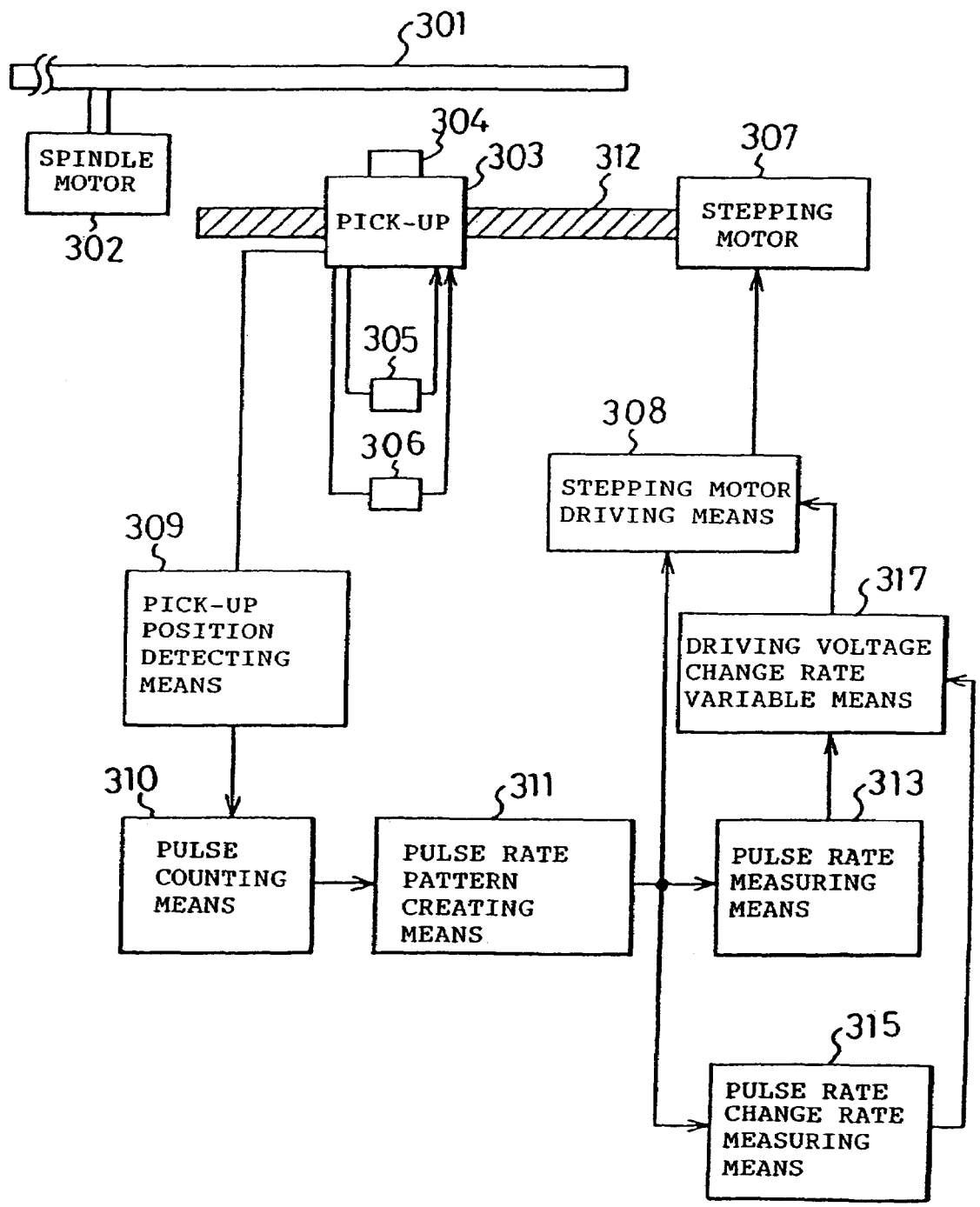
FIG. 12 is a block diagram for a configuration of the disk apparatus in the tenth embodiment of the present invention.

Hereunder, the tenth embodiment of the present invention will be explained with reference to the attached drawings. In the tenth embodiment, the same configuration items as the conventional disk apparatus shown in FIG. 57 will be given the same numerals. FIG. 12 is a block diagram for a configuration of the disk apparatus in the tenth embodiment of the present invention. In this embodiment, only the differences from the conventional disk apparatus shown in FIG. 57 will be explained.

In FIG. 12, the pulse rate measuring means 313 measures the pulse rate of the pulse rate pattern creating means 311. The pulse rate change rate measuring means 315 measures the pulse rate change rate of the pulse rate pattern creating means 311. The driving voltage change rate variable means 317 changes the driving voltage change rate of the stepping motor driving mean 308 according to the measured values of the pulse rate measuring means 313 and the pulse rate change rate measuring means 315.

Figure 13:
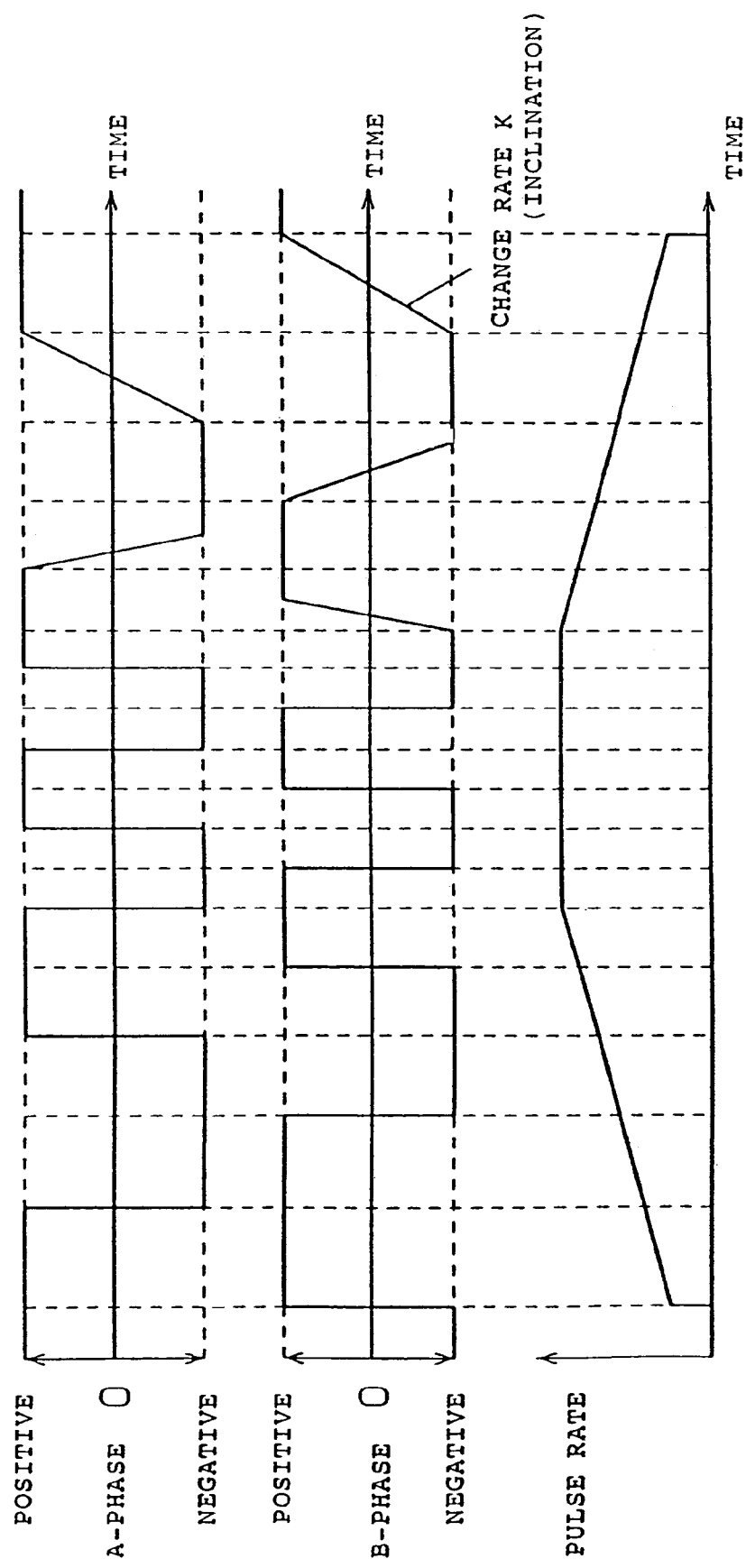
FIG. 13 is a wave form chart indicating the voltages flowing in coils of the stepping motor in the tenth embodiment of the present invention.

FIG. 13 is a wave form chart indicating the voltages applied to the A-phase and B-phase coils of the stepping motor 308 in the tenth embodiment of the present invention on the time axis.

Next, the operation of the disk apparatus formed as explained above in the tenth embodiment of the present invention will be explained with reference to FIG. 13. Although the driving voltage amplitude of the stepping motor 307 is changed according to the measured values of the pulse rate measuring means 313 and the pulse rate change rate measuring means 315 in the above-mentioned ninth embodiment, the driving voltage change rate (K) of the stepping motor 307 is changed in this tenth embodiment. In addition, the driving voltage of the stepping motor 307 is not changed in steps in a moment, but it is changed gradually in proportion to the time by reducing the change rate (K) where the stepping motor 307 is rotated slowly without any torque as shown in FIG. 13. Consequently, the change of the start-up torque generated in the stepping motor 307 is suppressed low to suppress the vibration of the stepping motor 307. In addition, when a torque is needed, for example, when the stepping motor is accelerated and the pick-up is moved fast, the change rate of the driving voltage of the stepping motor 307 is increased to generate a large start-up torque by changing the driving voltage in a moment. With this configuration, the disk apparatus in the tenth embodiment can move the pick-up 303 fast and stably.

<<Eleventh Embodiment>>

Figure 14:
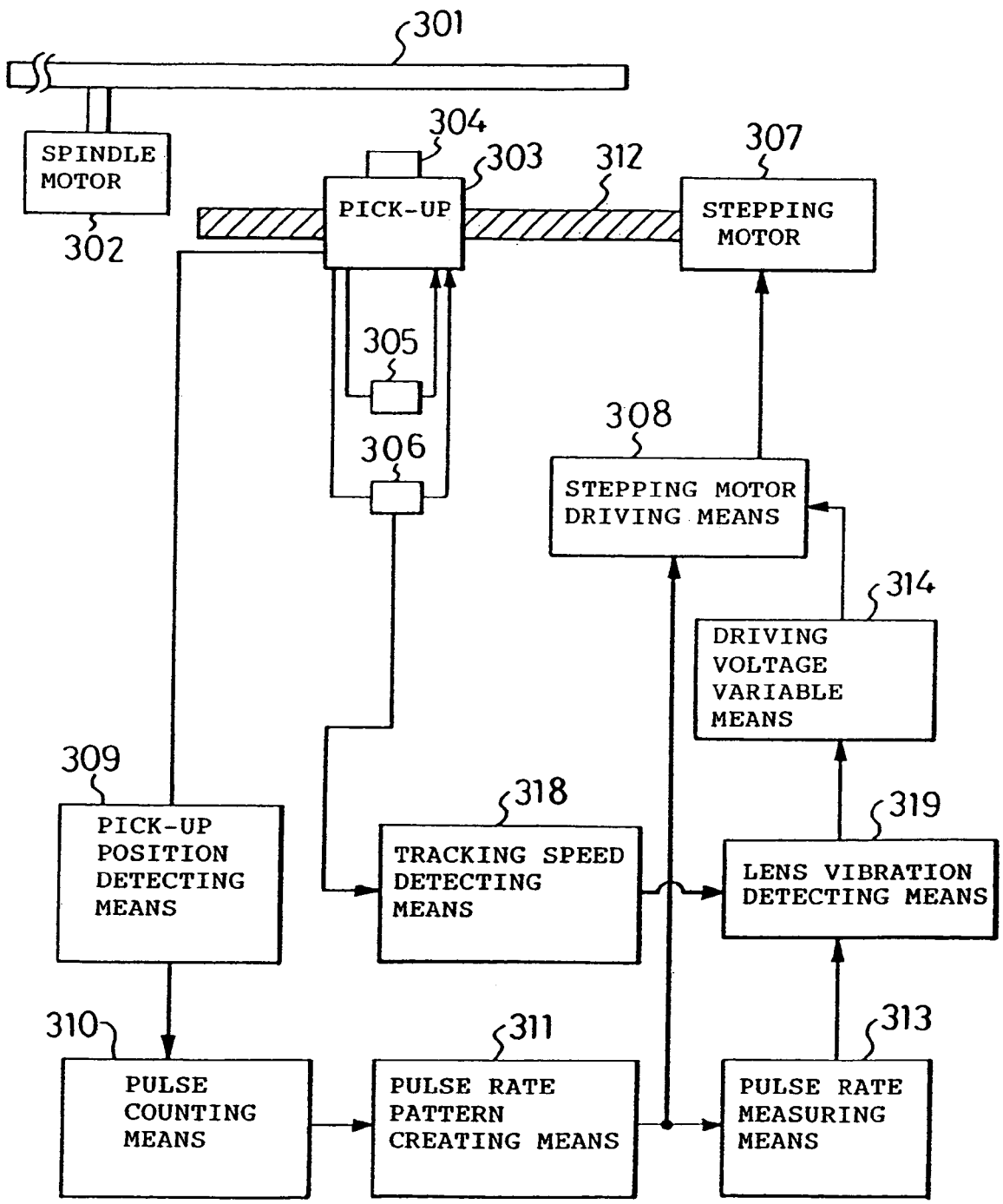
FIG. 14 is a block diagram for a configuration of the disk apparatus in the eleventh embodiment of the present invention.

Hereunder, the eleventh embodiment of the present invention will be explained with reference to the attached drawings. The same configuration items as those of the conventional example shown in FIG. 55 will be given the same numerals. FIG. 14 is a block diagram for a configuration of the disk apparatus in the eleventh embodiment of the present invention In this embodiment, only the differences from the conventional apparatus one will be explained.

In FIG. 14, the pulse rate measuring means 313 measures the pulse rate of the pulse rate pattern creating means 311. The tracking speed detecting means 318 measures the speed with which the lens 304 crosses the tracks, using a timer, etc. according to the tracking error signal indicating a displacement value from the tracking of the lens 304, output from the pick-up 303. The lens vibration detecting means 319 subtracts the output of the pulse rate measuring means 313 from the output of the tracking speed detecting means 318 to detect the vibration value of the lens 304 with respect to the pick-up 303. The driving voltage variable means 314 changes the driving voltage amplitude of the stepping motor driving means 308 according to the detected value of the lens vibration detecting means 319.

Next, the operation of the disk apparatus formed as explained above in the eleventh embodiment of the present invention will be explained with reference to FIG. 14.

Although the driving voltage amplitude of the stepping motor 307 is changed according to the pulse rate and the pulse rate change rate in the above-mentioned ninth embodiment, the driving voltage amplitude of the stepping motor 307 is changed according to the vibration of the lens, detected by the lens vibration detecting means 319 in this eleventh embodiment. In other words, when driving the stepping motor 307 to move the pick-up 303, the pick-up 303 generates vibration almost corresponding to the torque characteristics and the mechanical load characteristics of the stepping motor. Consequently, the vibration is also transmitted to the lens 304 in the pick-up 303, so the lens 304 is shaken in the movement together with the pick-up.

Consequently, the tracking speed detecting means 318 subtracts the pulse rate (that is, the target speed of the stepping motor 307) detected by the pulse rate measuring means 313 from the moving speed of the lens 304 to obtain the vibration value of the lens 304. When a detected vibration value is positive (track speed>pulse rate), the pick-up 303 is moved forward too much with respect to the pulse rate. In other words, it means that the torque is excessive. Consequently, when the driving voltage amplitude of the stepping motor 307 is lowered, the torque is reduced and the surplus torque is suppressed. When a detected amplitude value is negative (track speed<pulse rate), the pick-up 303 is delayed with respect to the pulse rate. This means that the torque is insufficient. In this case, therefore, the torque generation is increased to prevent shortage of torque. With such a configuration given to the disk apparatus in this eleventh embodiment, the stepping motor 307 can generate the optimized torque and transmit a proper driving force to the pick-up 303 via the feed screw 312 to move the pick-up 303 stably even when the mechanical friction load, etc. are changed.

<<Twelfth Embodiment>>

Figure 15:
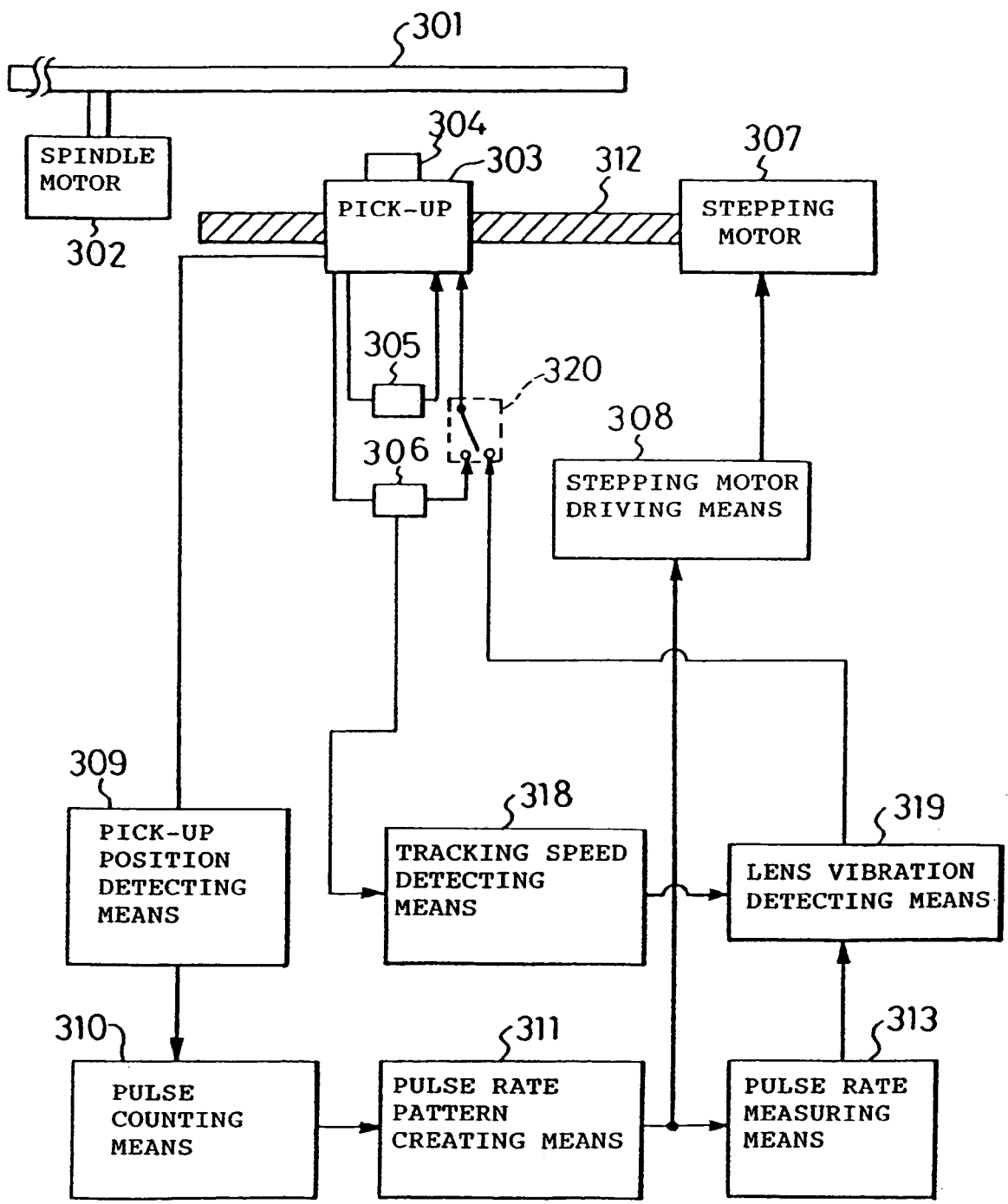
FIG. 15 is a block diagram of the disk apparatus in the twelfth embodiment of the present invention.

Hereunder, the twelfth embodiment of the present invention will be explained with reference to the attached drawings. The same configuration items as those of the conventional example shown in FIG. 57 and those of the eleventh embodiment will-be given the same numerals. FIG. 15 is a block diagram for a configuration of the disk apparatus in the twelfth embodiment of the present invention. In this embodiment, only the differences from the eleventh embodiment will be explained.

In the twelfth embodiment shown in FIG. 15, a switching means 320 being comprised of a transistor, etc. is provided. In the pick-up 303 is incorporated a tracking actuator (not illustrated). The lens 304 is moved by the tracking actuator.

To one end of the switching means 320 is connected the input portion of the tracking actuator and the other end of the switching means 320 is formed so as to be switched between the output of the tracking servo means 306 and the output of the lens vibration detecting means 319.

Next, the operation of the disk apparatus formed as explained above in the twelfth embodiment of the present invention will be explained with reference to FIG. 15. Although the tracking servo means 306 is opened when the stepping motor 307 is driven to move the pick-up 303 in the conventional example shown in FIG. 57 and in the twelfth embodiment, the measured value from the lens vibration detecting means 319 is entered to the tracking actuator in the twelfth embodiment. When the stepping motor 307 is driven to move the pick-up 303, the pick-up 303 generates vibration corresponding to the torque and mechanical load characteristics of the stepping motor. This vibration is also transmitted to the lens 304 in the pick-up 303, so that the lens 304 is shaken in the movement together with the pick-up 303.

Consequently, the vibration value of the lens 304 is obtained by subtracting the pulse rate detected by the pulse rate measuring means 313 (that is, the target speed of the stepping motor 307) from the moving speed of the lens 304, detected by the tracking speed detecting means 318. Since the stepping motor 307 is rotated synchronously with the pulse rate, the pulse rate can be regarded to be equal to the moving speed of the pick-up 303. Thus, the vibration value detected by the lens vibration detecting means 319 can be taken as a relative speed of the lens 304 with respect to the pick-up 303. The vibration value detected by the lens vibration detecting means 319 is returned to the tracking actuator in the pick-up 303 using the switching means 320 so that the vibration value becomes 0.

According to such the configuration, the vibration of the lens 304 with respect to the pick-up 303 can be suppressed even while the pick-up 303 is moving. And, the lens 304 is controlled so as to be positioned in the center of the movable range of the pick-up 303. The disk apparatus in the twelfth embodiment can thus suppress the displacement of the lens 304 to 0 after the pick-up 303 is moved. So, the error from the target track is reduced significantly after the pick-up 303 is moved. As a result, the disk apparatus in the twelfth embodiment can shorten the time to move the residual distance and accordingly improve the access performance.

<<Thirteenth Embodiment>>

Hereunder, the thirteenth embodiment of the present invention will be explained with reference to the attached drawings. FIGS. 16 and 17 are wave form charts indicating the voltages applied to the A-phase and B-phase coils of the stepping motor and the torque generated in the stepping motor while the pick-up is moving on the time axis respectively. In FIGS. 16 and 17, the solid line indicates the thirteenth embodiment and the dotted line indicates the conventional example respectively.

Figure 59:
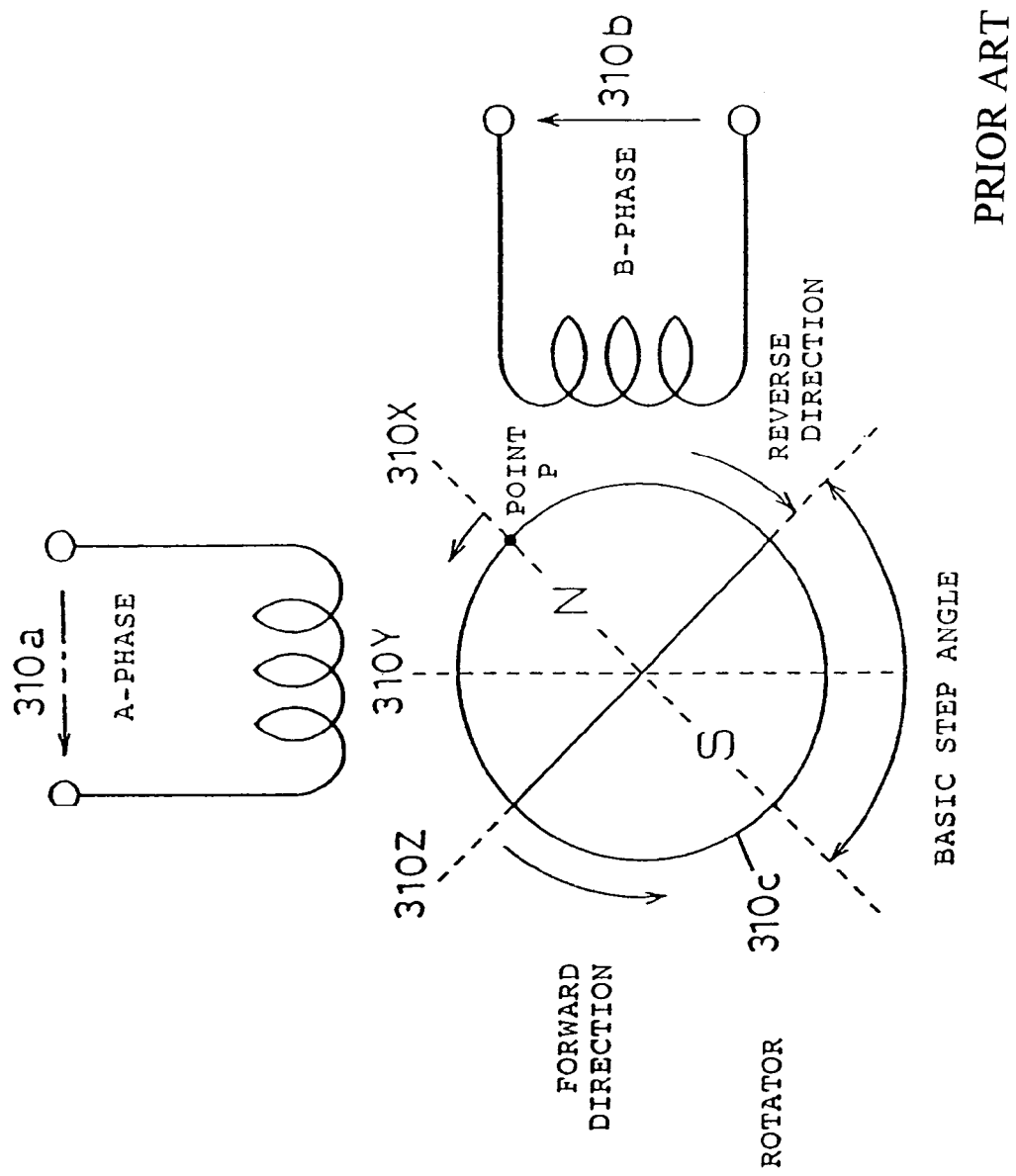
FIG. 59 is a configuration of a stepping motor.
Figure 60:
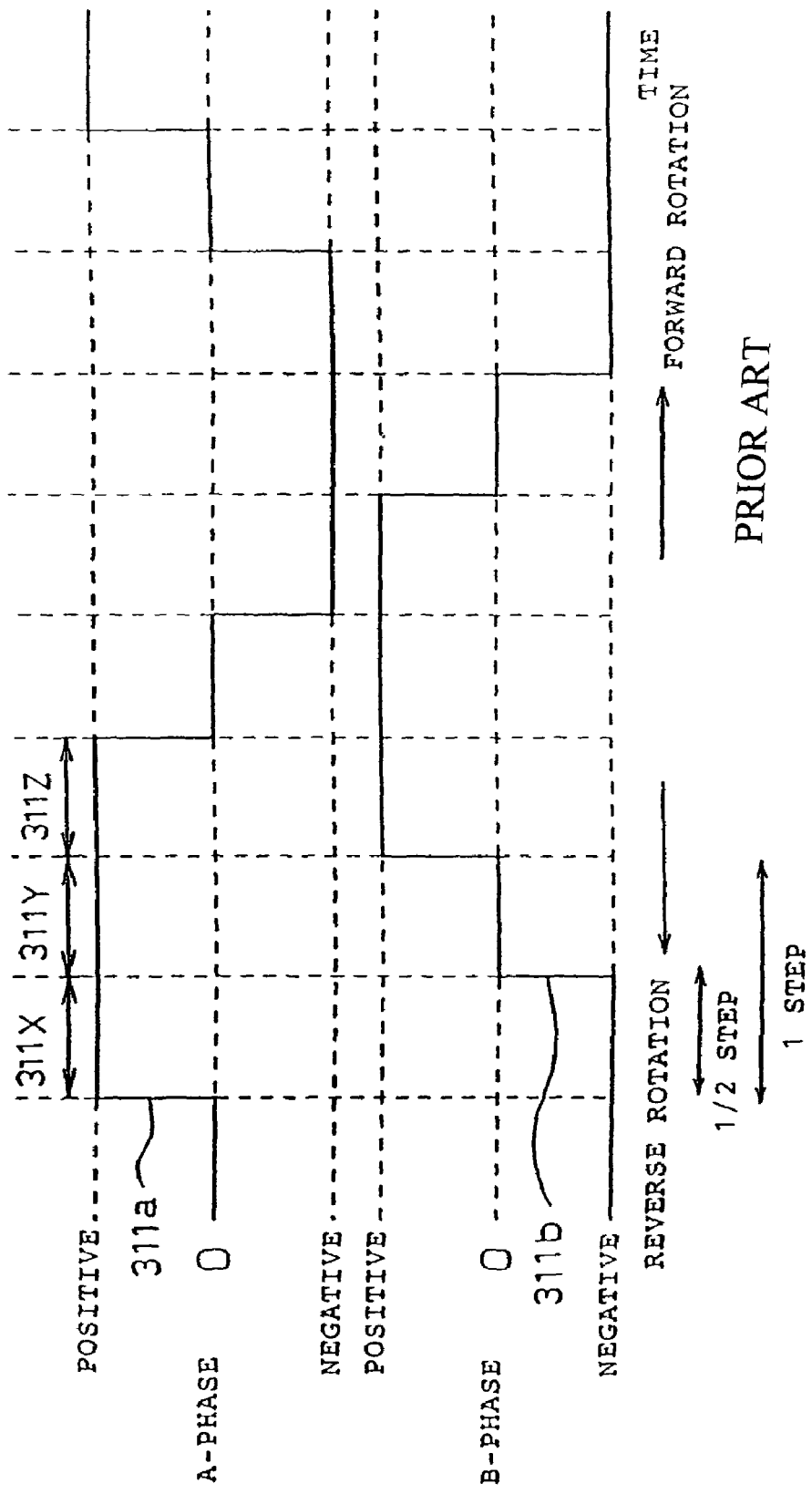
FIG. 60 is a wave form chart indicating a voltage flowing in the coils of a conventional 1-2-phase excitation type stepping motor.
Figure 61:
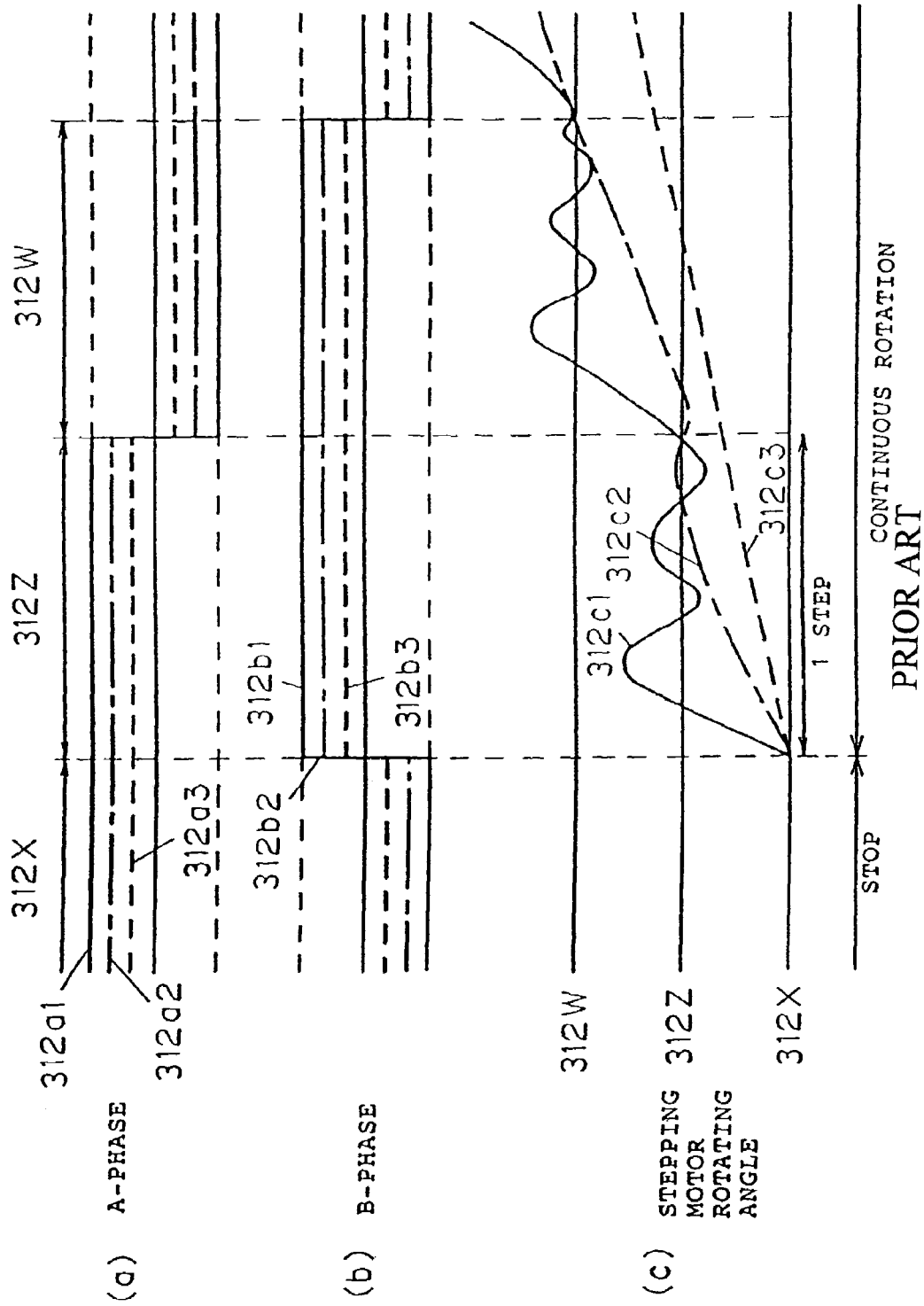
FIG. 61 is a wave form chart indicating a voltage flowing in the coils of the conventional stepping motor and a rotation angle displacement of the stepping motor.
Figure 62:
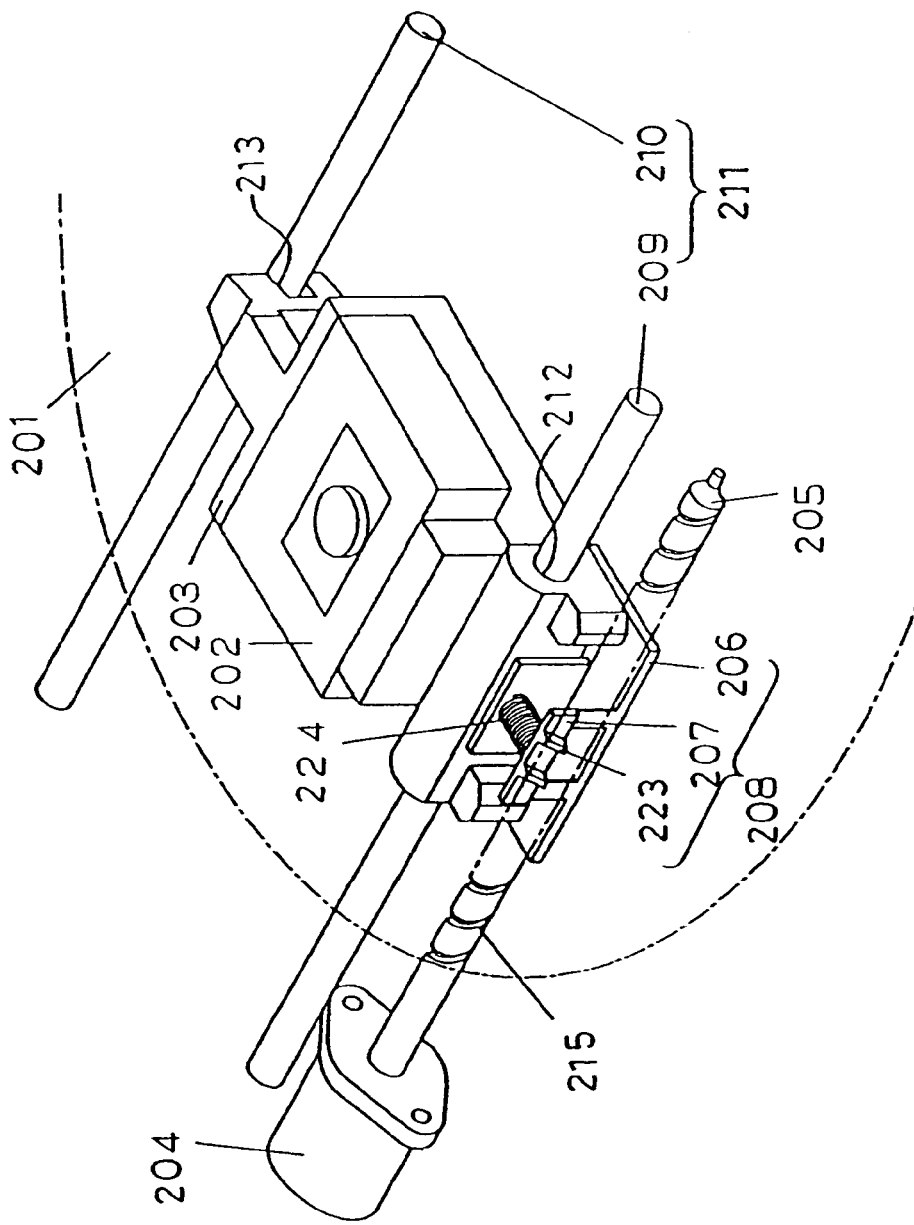
FIG. 62 is a perspective view of the conventional disk apparatus in the first embodiment.
Figure 63:
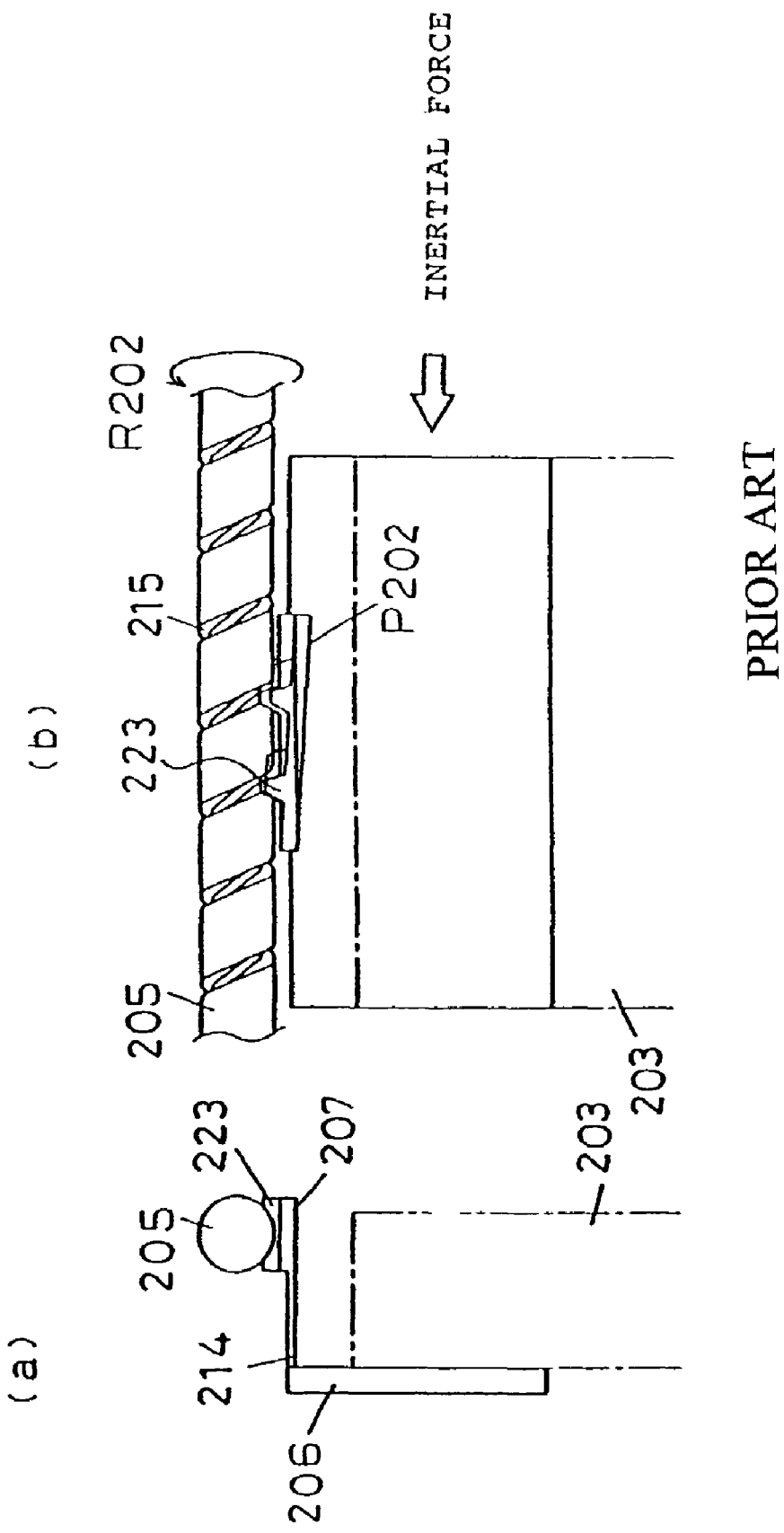
FIG. 63 is expanded side views (a) of a feed screw and a rack of the conventional disk apparatus in the first embodiment, expanded top views (b) of the feed screw and the rack in the conventional disk apparatus in the first embodiment.

(a) of FIG. 16 is a wave form chart when the rotator that has been stopped in the range of the basic step angle (in FIG. 59, the point P is arranged at the position 310X) is rotated forward. In (a) of FIG. 16, the wave forms 307$a1$, 307$b1$, and 307$c1$ indicate the voltage applied to the A-phase coil, the voltage applied to the B-phase coil, and the torque generated in the stepping motor respectively. In FIG. 16, it is assumed that a torque is generated so that when the stepping motor driving voltage applied to each of the A-phase and B-phase coils is in the stepping motor 307X state, the point P shown in FIG. 59 is arranged at the position 310X. In the same way, when the voltage is in the stepping motor 307Y state, a torque is generated so that the point P is arranged at the position 310Y and when the voltage is in the stepping motor 307Z state, a torque is generated so that the point P is arranged at the position 310Z.

(b) of FIG. 16 is a wave form chart indicating a continuous forward rotation of the rotator after a stop at a mechanical instability point outside the range of the basic step angle (in FIG. 59, the point P is arranged at the position 310Y). In (b) of FIG. 16, the wave forms 307$a2$, 307$b2$, and 307$c2$ indicate the voltage applied to the A-phase coil, the voltage applied to the B-phase coil, and the torque generated in the stepping motor respectively.

(a) of FIG. 17 is a wave form chart indicating forward continuous rotation of the stepping motor so as to be stopped at a basic step angle position (in FIG. 59, the point is arranged at the position 310). In (a) of FIG. 17, the wave forms 307$a3$, 307$b3$, and 307$c3$ indicate the voltage applied to the A-phase coil, the voltage applied to the B-phase coil, and the torque generated in the stepping motor respectively.

(b) of FIG. 17 is a wave form chart indicating continuous forward rotation of-the stepping motor so as to be stopped at a mechanical instability point outside the range of the basic step angle (in FIG. 59, the point P is arranged at the position 310Y). In (b) of FIG. 17, the wave forms 307$a4$, 307$b4$, and 307$c4$ indicate the voltage applied to the A-phase coil, the voltage applied to the B-phase coil, and the torque generated in the stepping motor respectively.

Next, the operation of the stepping motor will be explained with reference to (a) and (b) of FIG. 16, as well as FIG. 59. The operation is performed just after continuous rotation is started with the stepping motor driving voltage explained above.

When the stepping motor is rotated to move the rotator forward continuously while the point P stops at position 310X in FIG. 59, the conventional system performs an operation as shown with the dotted line in (a) of FIG. 16.

When a fixed voltage is applied only to the A-phase coil and no voltage (0) is applied to the B-phase coil, the point P on the rotator is rotated to the position 310Y (mechanical instability point). Then, a fixed voltage is applied to both A-phase and B-phase coils, so that the point P on the rotator is rotated to the position 310Z (basic step angle position). Hereunder, as shown with the dotted line in (a) of FIG. 16, a voltage is applied sequentially to the A-phase and B-phase coils to rotate the stepping motor to move the point P continuously.

When the rotator is driven as explained above, a voltage is applied to either the A-phase coil or the B-phase coil at a mechanical instability point and the torque is generated less than when a fixed voltage is applied to both A-phase and B-phase coils. Thus, the motor is vibrated by the change of generated torque.

On the other hand, in the thirteenth embodiment, when the rotator is rotated forward continuously from a basic step angle position 310X (FIG. 59) as shown with a solid line in (a) of FIG. 16(*a*), the driving voltage is applied to both A-phase and B-phase coils so that the rotator is rotated forward to a basic step angle position 310Z (FIG. 59) next to the basic step angle position 310X (FIG. 59). After this, since only the driving voltage applied to basic step angle positions is applied sequentially to both A-phase and B-phase coils, a fixed voltage is kept applied to both A-phase and B-phase coils during continuous rotation. Thus, the stepping motor can be driven without any torque change.

Figure 49:
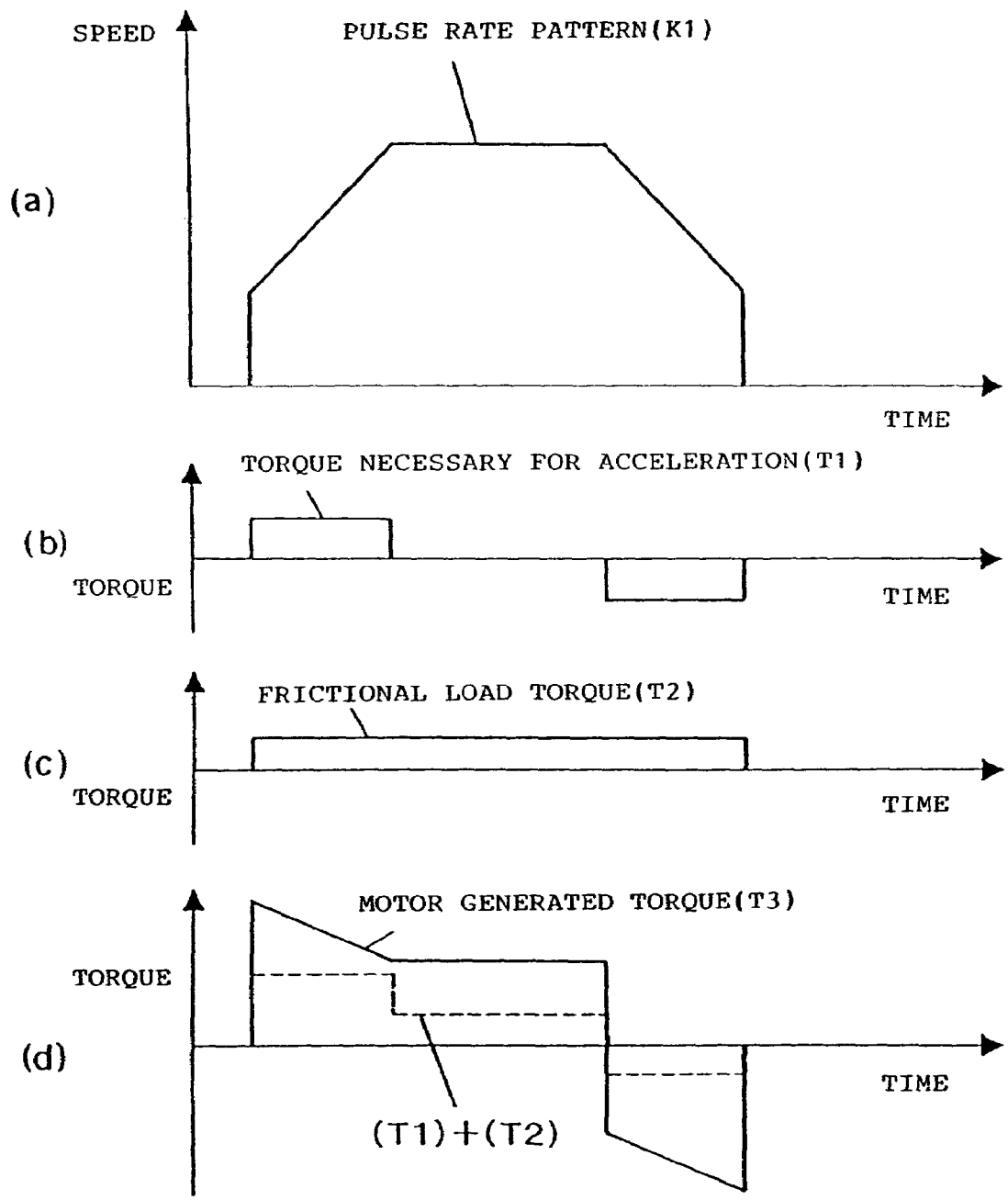
FIG. 49 is a wave form chart for a driving pulse rate of and torques generated in the stepping motor in the twenty-ninth embodiment of the present invention.

When the stepping motor is started to move the rotator forward continuously while the point P stops at the position 310Y (mechanical instability position) in FIG. 49, the driving voltage applied to the basic step angle position 310Z (FIG. 59) closest to the position 310Y (FIG. 59), which is a mechanical instability point in the forward direction as shown with a solid line in (b) of FIG. 16, is applied to both A-phase and B-phase coils. After this, only the driving voltage applied to basic step angle positions is applied sequentially to both A-phase and B-phase coils. Consequently, a fixed voltage is kept applied to both A-phase and B-phase coils during continuous rotation, so that the stepping motor can be driven without any torque change.

Next, the operation for ending continuous rotation of the rotator (to stop the stepping motor) will be explained with reference to (a) and (b) of FIG. 17, as well as FIG. 59. While in continuous feeding of the rotator, however, only the driving voltage applied to basic step angle positions is applied to both A-phase and B-phase coils.

When the point P is to be stopped at the position 310Z (a basic step angle position) while the rotator shown in FIG. 59 is rotated forward, the driving voltage applied to the last basic step angle position 310X as shown in (a) of FIG. 17 is applied to both A-phase and B-phase coils. As a result, continuous driving of the stepping motor is ended without any torque change.

In the case that the point P is to be stopped at the position 310Y (a mechanical instability position) when the rotator 310*c* shown in FIG. 59 is rotated forward, the conventional system generates a torque change when the rotator is driven to the last mechanical instability position 310Y (FIG. 59) as shown with a dotted line in (b) of FIG. 17. In the thirteenth embodiment, however, the driving voltage applied to a mechanical instability point outside the range of the basic step angle is applied to the A-phase coil only for driving the rotator to the last mechanical instability position 310Y (FIG. 59) as shown with a solid line in (b) of FIG. 17 and the driving voltage strength is increased for a fixed time more than the driving voltage applied to basic step angle positions. The disk apparatus in the thirteenth embodiment can thus prevent torque generation when it stops and improve the accuracy to move the rotator to a mechanical instability position 310Y.

As explained above, the disk apparatus in the ninth to thirteenth embodiments can move the pick-up in the optimal state by measuring the pulse rate and the pulse rate change rate, then by changing the pulse rate change rate and the stepping motor driving voltage according to the measured values.

In addition, when in acceleration, the disk apparatus drives the stepping motor with the maximum torque and changes the pulse rate change rate to suppress surplus torque generation. Consequently, the disk apparatus in the ninth to thirteenth embodiments allows data on a disk to be accessed fast and stably while vibration is suppressed.

<<Fourteenth Embodiment>>

Hereunder, the fourteenth embodiment of the present invention will be explained with reference to the attached drawings.

In the fourteenth embodiment, the same configuration items as those of the conventional disk apparatus shown in FIGS. 62 to 66 will be given the same numerals, omitting redundant explanation. Thus, only the differences from the conventional disk apparatus will be explained here.

Figure 18:
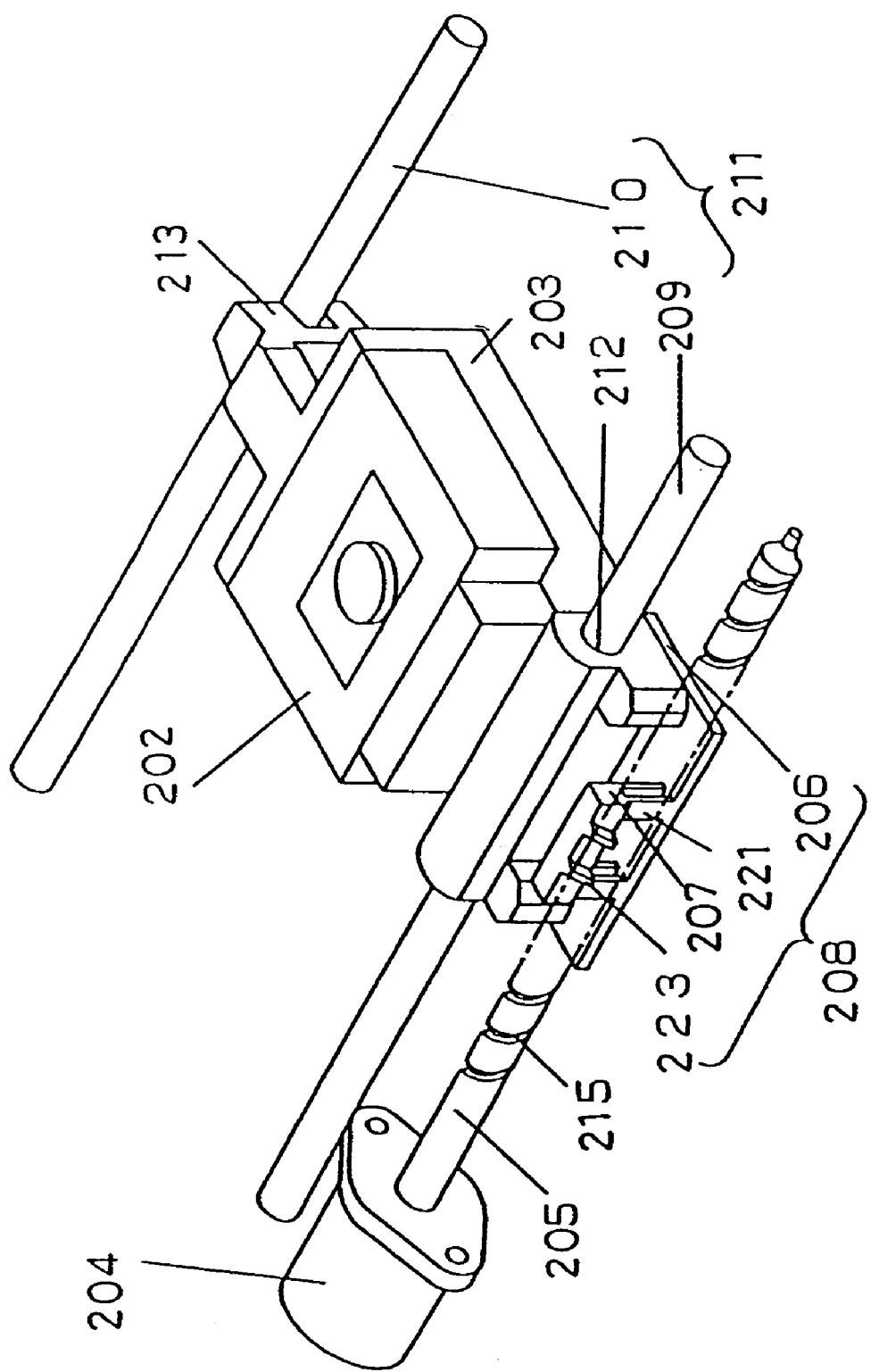
FIG. 18 is a perspective view of the disk apparatus in the fourteenth embodiment of the present invention.
Figure 19:
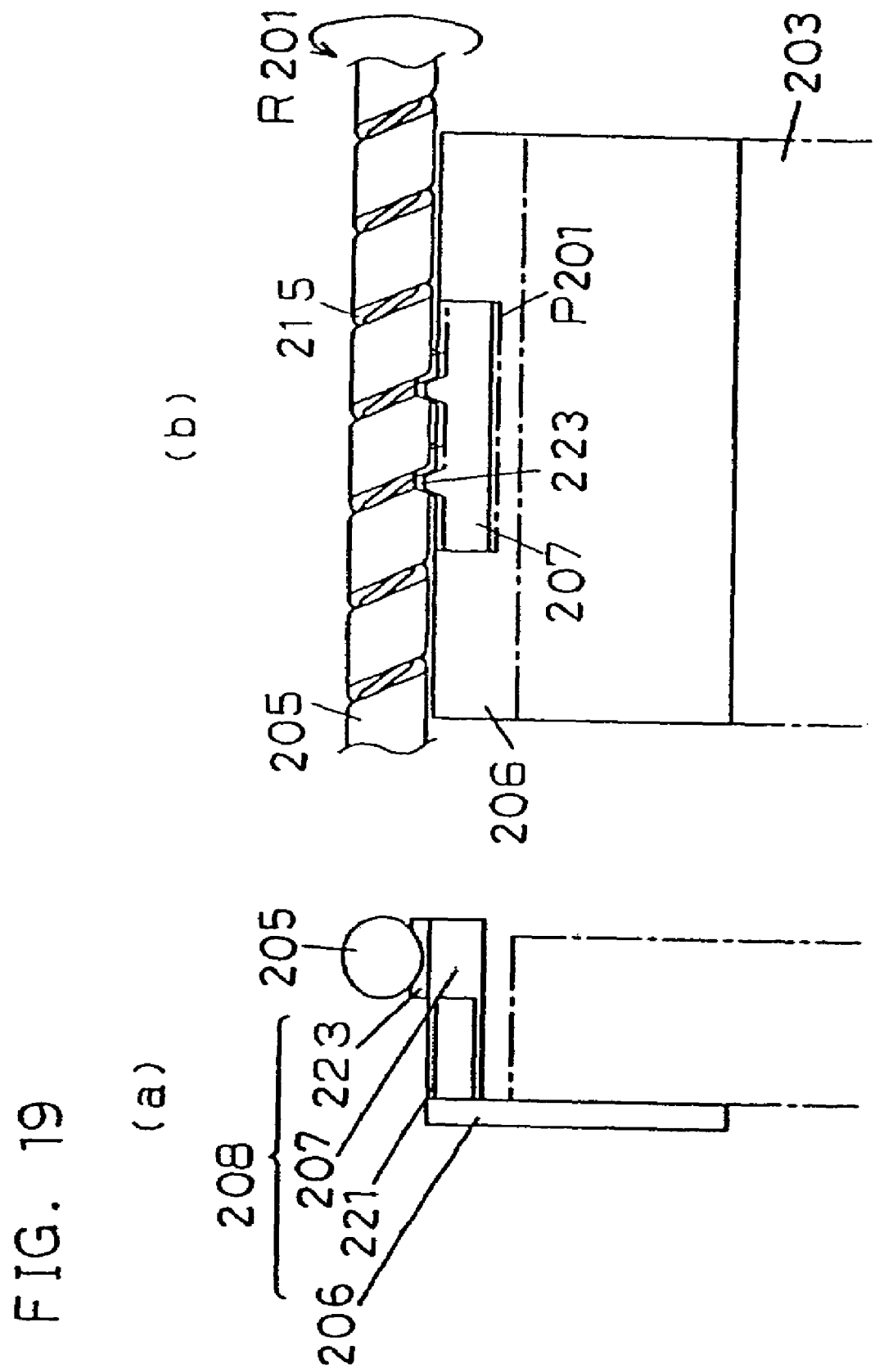
FIG. 19 is an expanded side view (a) of a feed screw and a rack in the fourteenth embodiment of the present invention, and expanded top views (b) of the feed screw and the rack in the fourteenth embodiment.

FIG. 18 is a perspective view of a portion of the disk apparatus near the pick-up in the fourteenth embodiment of the present invention. As shown in FIG. 18, the disk apparatus in the fourteenth embodiment is provided with an cautilever parallel spring 221 connecting a fixing portion of the rack 208 to a nut 207. FIG. 19 is an expanded side view and an expanded front view of a portion near the rack 208 and the feed screw 205 shown in FIG. 18.

In the fourteenth embodiment, the cautilever parallel spring 221 connects the fixing portion of the rack 208 to the nut 207. Consequently, the nut 207 is given a high rigidity in both tangent line and rotary shaft directions of the feed screw 205 at a point where a thread groove 215 is in contact with the teeth 223 with respect to the force applied from the thread groove 215 to the nut 207. In addition, at the point where the thread groove 215 comes in contact with the teeth 223, the nut 207 is moved in parallel to the feed screw while it is fit in the feed screw 205 without being twisted in the radial direction of the feed screw 205. The position P201 in (b) of FIG. 19 indicates a position to which the nut is moved in parallel to the feed screw 205 when rotation of the feed screw 205 is started fast suddenly in the direction of R201.

The nut portion 207 in the fourteenth embodiment is given a high rigidity against twisting such way. The nut portion 207 is thus less deformed than the rack 208 in the conventional disk apparatus shown in FIG. 62, so that the teeth 223 are not disengaged from the thread groove easily. Furthermore, when the movement of the pick-up base 203 is blocked by anything, it is prevented that the teeth 223 are disengaged from the thread groove 215 and the teeth 223 bite into the thread groove 215, which will cause the teeth 223 to be damaged. Furthermore, the nut portion 207 is kept fit in the feed screw 215 and moved in parallel to the feed screw, so the engagement of the thread groove 215 with the teeth 223 is not changed suddenly. The strength and direction of the force applied from the teeth 223 to the pick-up base 203 is thus not changed suddenly. In the fourteenth embodiment, therefore, the pick-up base 203 is not vibrated so much.

The disk apparatus in the fourteenth embodiment can be provided with an elastic member (not illustrated) such as a coil spring between the nut portion 207 and the pick-up base 203, so that the nut portion 207 is pressed against the feed screw 205 forcibly. In this case, since the rigidity of the open-sided parallel spring in the radial direction of the feed screw 205 is low, even an elastic body with a weak force can press the nut portion 207 against the feed screw 205. The nut portion 207 can thus be fit to the feed screw 215 surely without increasing the frictional load.

The disk apparatus in the fourteenth embodiment of the present invention comprises a pick-up used for reading/writing signals from/on a disk; a pick-up base on which the pick-up is mounted; a traverse motor for moving the pick-up in the radial direction of the disk; a feed screw rotated by the traverse motor and provided with a thread groove on its outer periphery; a rack having a fitting portion fixed to the pick-up base and a nut portion fit in the thread groove; and a guiding mechanism for guiding the pick-up base movably in the radial direction of the disk. And, in this disk apparatus, the fixing portion of the rack is connected to the nut portion by the open-sided parallel spring displaceable in the radial direction of the feed screw.

Consequently, according to the disk apparatus in the fourteenth embodiment, the nut portion of the rack can be prevented from being released from the screw even when the pick-up is accelerated and decelerated suddenly. The pick-up can thus be moved fast.

<<Fifteenth Embodiment>>

Figure 20:
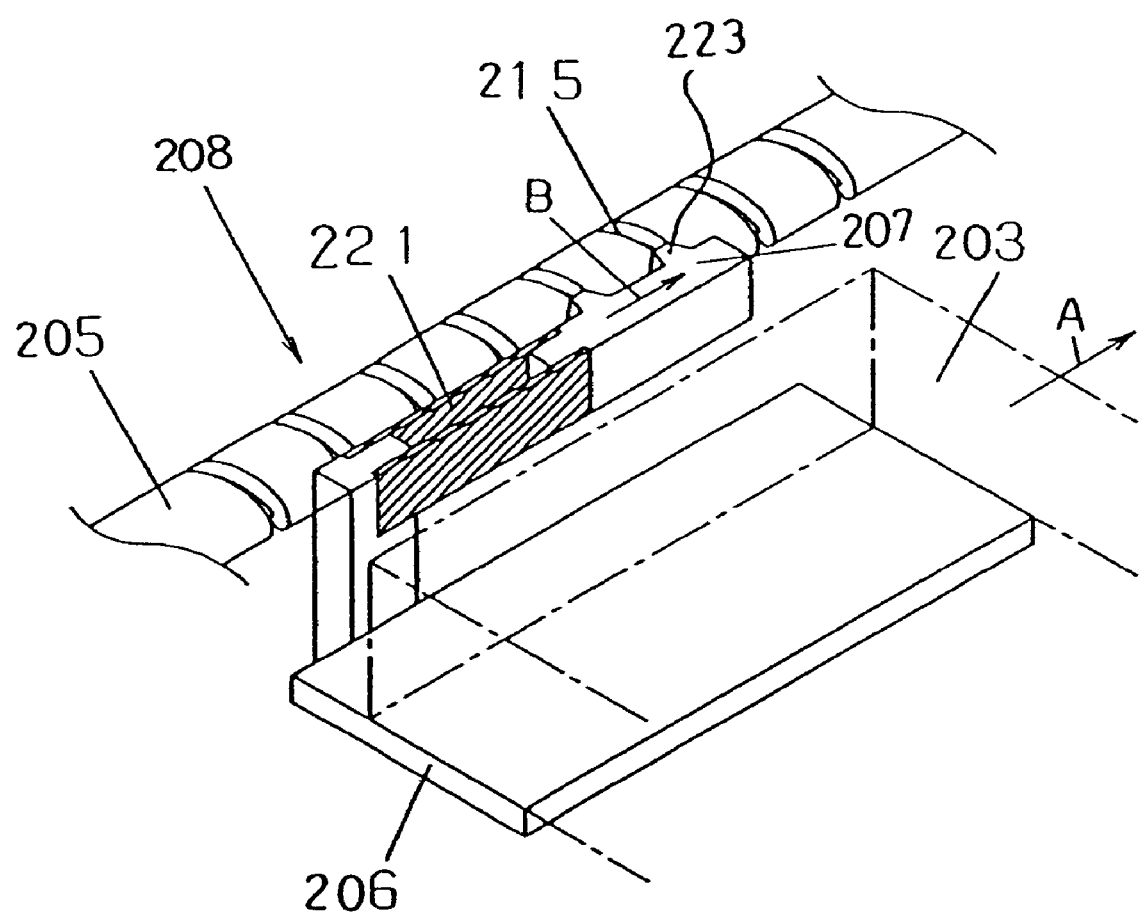
FIG. 20 is perspective views of the feed screw and the rack in the sixteenth embodiment of the present invention.

FIG. 20 is a perspective view of the rack 208 of the disk apparatus in the fifteenth embodiment of the present invention. The cantilever parallel spring 221 connects the fixing portion 206 of the rack 208 to the nut portion 207. In the disk apparatus in the fifteenth embodiment, the free end of the open-sided parallel spring 221 is extended in the direction of the rotary shaft of the feed screw 205. With such a configuration, the sliding direction (shown by the arrow A in FIG. 20) of the pick-up base 203 is aligned to the buckling direction (shown by the arrow B in FIG. 20) of the cantilever parallel spring 221. Generally, the buckling direction of a plate has a high rigidity, so the rigidity of the rack 208 can be improved in the sliding direction of the pick-up base 203. The nut portion 207 can thus be prevented from being deformed more effectively when the feed screw 215 is accelerated and decelerated suddenly.

In the disk apparatus in the fifteenth embodiment of the present invention, the free end of the open-sided parallel spring provided in the rack is extended in the direction of the rotary shaft of the feed screw.

According to the disk apparatus in the fifteenth embodiment, therefore, the sliding direction of the pick-up is aligned to the buckling direction of the plate spring. Since the plate spring has a high rigidity in the buckling direction, the rack can also secure a high. rigidity in the sliding direction of the pick-up. The pick-up can thus be moved fast.

<<Sixteenth Embodiment>>

Figure 21:
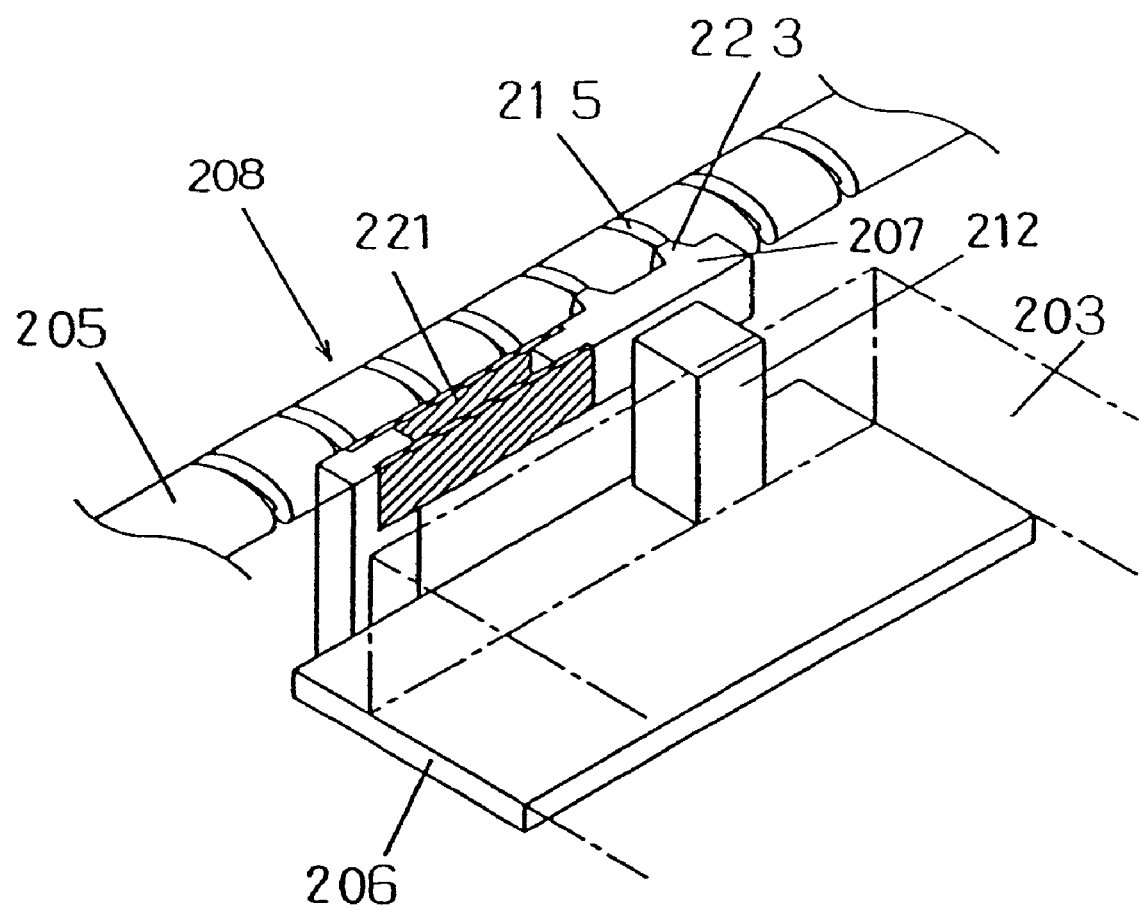
FIG. 21 is perspective views of the feed screw and the rack in the sixteenth embodiment of the present invention.

FIG. 21 is a perspective view of a rack 208 of the disk apparatus in the sixteenth embodiment of the present invention. In the disk apparatus in the sixteenth embodiment, a stopper 212 is provided to limit the moving distance of the nut portion 207 in the movable direction. In FIG. 19, the nut portion 207 is moved to the position shown with an alternate long and short dash line (position P201) when in sliding. The moving direction of the nut portion 207 is limited only in the vertical direction to the rotary shaft of the feed screw 215 when in sudden acceleration and deceleration. Thus, the stopper 212 does not need a large area for holding the rear of the nut portion 207, so that the stopper 212 can prevent the nut portion 207 from going off the thread groove 215 easily.

The disk apparatus in the sixteenth embodiment of the present invention is provided with a stopper for limiting the moving distance of the nut portion of the rack in the movable direction.

According to the sixteenth embodiment of the present invention, therefore, the nut portion can be prevented surely from going off the feed screw.

<<Seventeenth Embodiment>>

Figure 22:
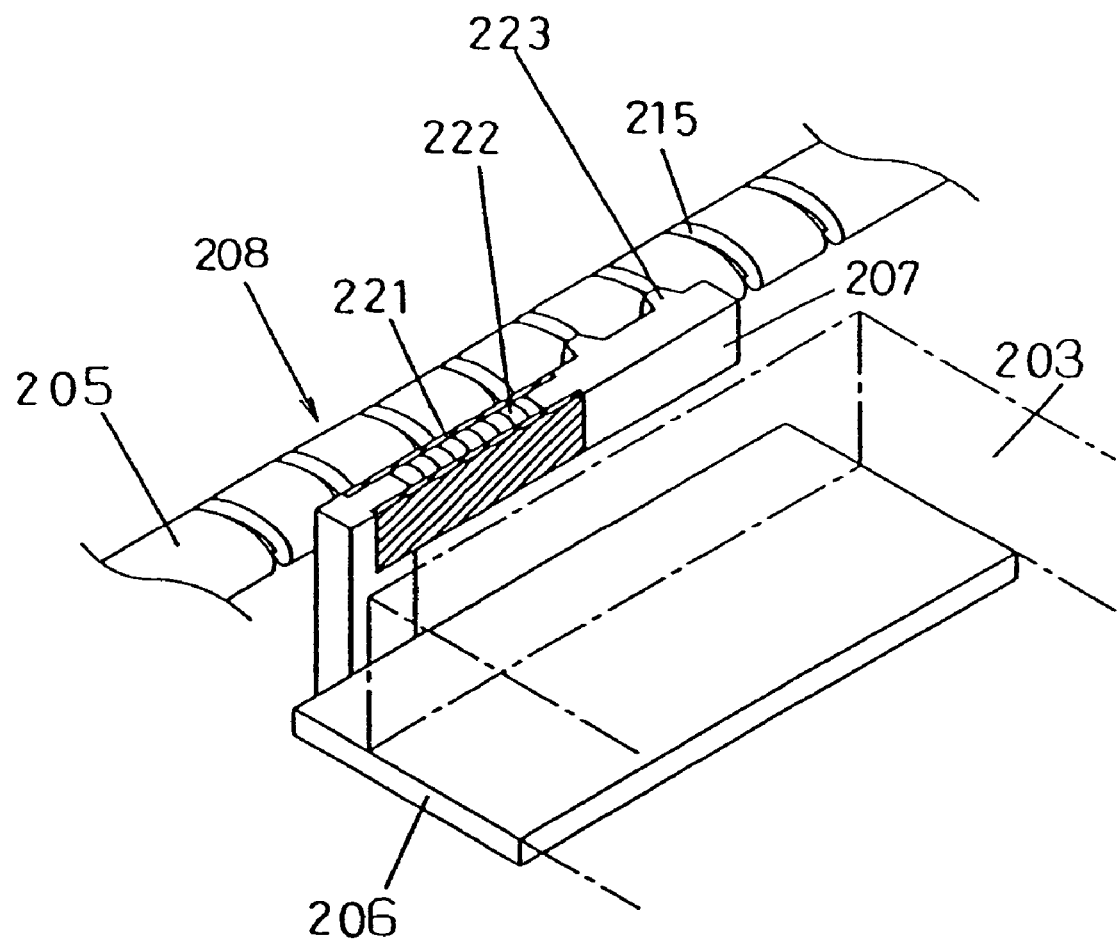
FIG. 22 is perspective views of the feed screw and the rack in the seventeenth embodiment of the present invention.

FIG. 22 is a perspective view of a rack 208 of the disk apparatus in the seventeenth embodiment. In the disk apparatus in the seventeenth embodiment, an adhesive member 222 is filled in the gap of the cantilever parallel spring 221. The adhesive member 222 provides the open-sided parallel spring 221 with damping characteristics. Consequently, the nut portion 207 can suppress the vibration in the radial direction of the feed screw 215. In the disk apparatus in the seventeenth embodiment, therefore, the nut portion 207 can be fit to the feed screw 215 more closely, preventing generation of the vibration in the pick-up base 203.

In the disk apparatus in the seventeenth embodiment, the open-sided parallel spring provided in the rack is consisting of at least two plate springs and an adhesive member is filled in the gap between the plate springs.

According to the seventeenth embodiment of the present invention, therefore, the nut portion is prevented from vibration and the head is prevented from vibration to be caused by a vibration-like force applied from the feed screw to the nut portion.

<<Eighteenth Embodiment>>

Figure 23:
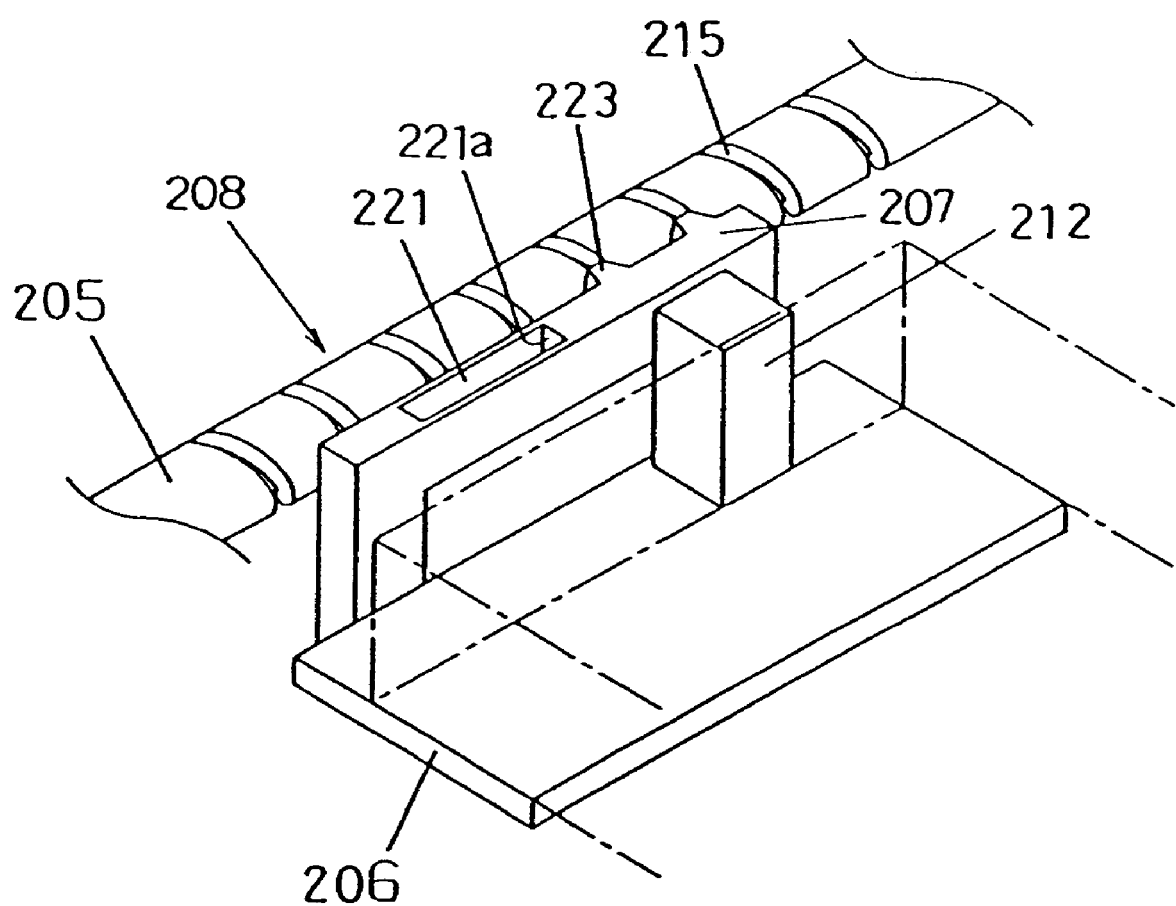
FIG. 23 is perspective views of the feed screw and the rack in the eighteenth embodiment of the present invention.

FIG. 23 is a perspective view of a rack 208 of the disk apparatus in the eighteenth embodiment of the present invention.

The rack 208 in the eighteenth embodiment is formed entirely with a resin material including the fixing portion 206, the nut portion 207, the cantilever parallel spring 221, and the stopper 217. Consequently, the rack 208 in the eighteenth embodiment can be formed unitarily, so that the manufacturing cost is reduced significantly. In the eighteenth embodiment, the shape of the recess 221a of the cantilever parallel spring is not always rectangular. A corner-rounded square such as an ellipse may also obtain the same effect.

In the disk apparatus described in the eighteenth embodiment of the present invention, the rack fixing portion, the nut portion, and the cantilever parallel spring are unitarily formed with resin.

According to the eighteenth embodiment of the present invention, therefore, the manufacturing cost of the rack can be reduced significantly and the disk apparatus that enables the head to move fast can be manufactured less expensively.

<<Nineteenth Embodiment>>

Figure 24:
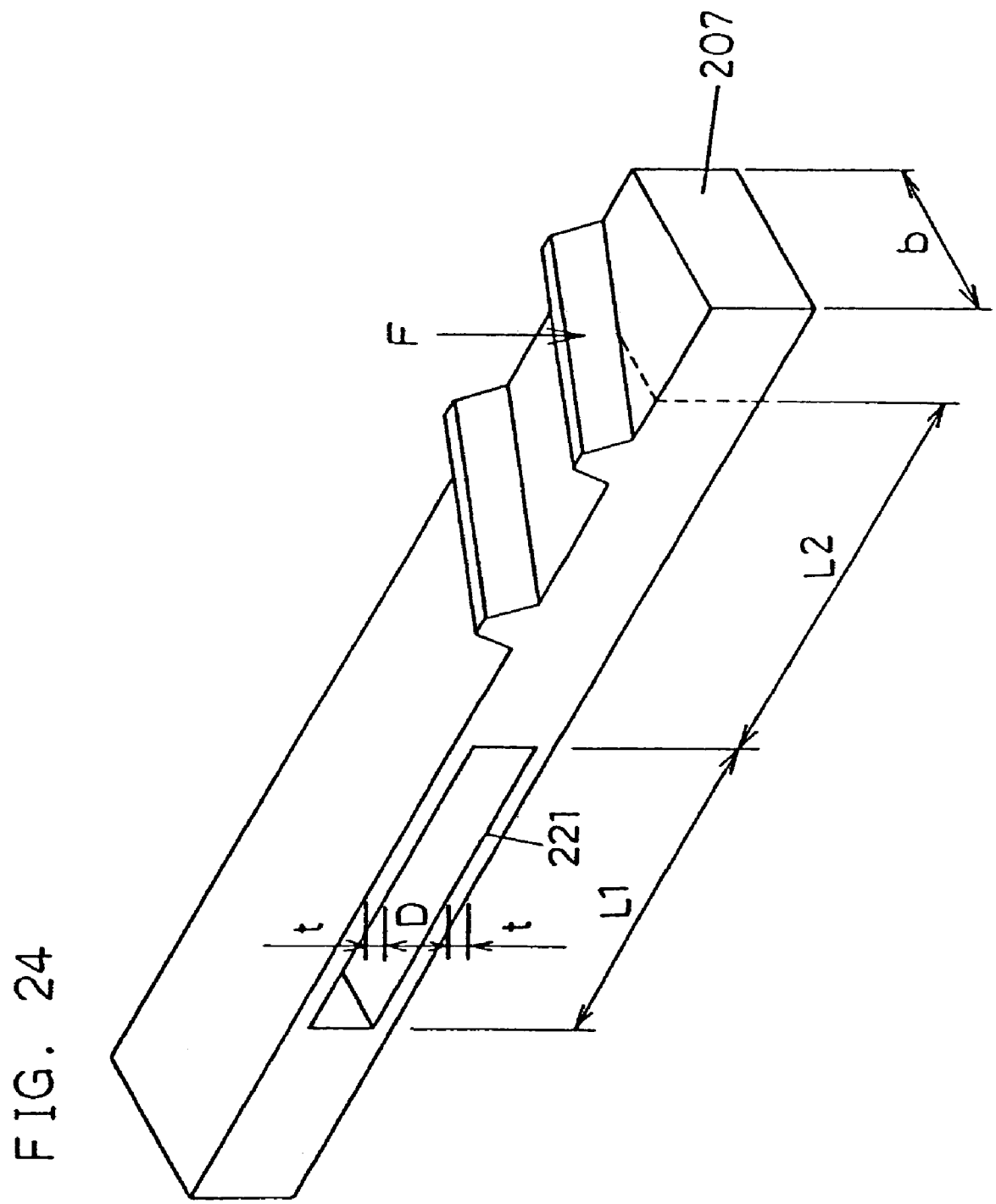
FIG. 24 is an illustration of the dimensional relationship between an open-ended parallel spring of the rack and a nut portion in the nineteenth embodiment of the present invention.

FIG. 24 is a perspective view of a nut portion 207 provided in the rack of the disk apparatus of the present invention. FIG. 24 indicates the relationship between dimensions of each portion in the eighteenth embodiment shown in FIG. 23. In FIG. 24, an arrow F indicates a force applied to a cantilever parallel spring in the movable direction from the thread groove 215. L1 indicates a length of the cantilever parallel spring 221 and L2 indicates a length between the end closer to the nut portion 207 of the cantilever parallel spring 221 and the contact position between the nut portion 207 and the thread groove 215. D indicates a gap diameter between two plate springs forming the open-ended parallel spring 221, t indicates a thickness of the plate spring forming the open-ended parallel spring 221, and b indicates a width of the plate spring of the cantilever parallel spring 221.

The deformation of the cantilever parallel spring 221, when a force is applied to the nut portion 207, includes both constituent D of the "displacement by parallel movement" and constituent C of the "displacement by bending". The ratio A between constituent D of the "displacement by parallel movement" and constituent C of the "displacement by bending" is represented by the following equation 1.

$$A = \frac{2}{3} \times \left(2 + 3 \times \left(\frac{L2}{L1}\right)\right) \times \frac{t^2}{D \times (D + 2t)} \leq 1.0 \quad (1)$$

Next, the source of this equation 1 will be explained. In Chapter 7 of the Appendix of "Actual Design/2nd Version" edited by Yotaro Hatamura and published by Nikkan Kogyo Shinbun-sha, the following equation 2 is described as an equation for representing the ratio B between the constituent C of the "displacement by bending" and the constituent D of the "displacement by parallel movement".

$$B = \frac{2}{3} \times \left(2 + 3 \times \left(\frac{L2}{L1}\right)\right) \times \left(\frac{t}{D}\right)^2 \quad (2)$$

The constituent C of the "displacement by bending" in the equation 2 is found by the following equation 3.

$$C = \frac{F \times L1^2 \times (3 \times L2 + 2 \times L1)}{3 \times E \times b \times t \times D^2} \quad (3)$$

The constituent D of the "displacement by parallel movement" is found with the following equation 4.

$$D = \frac{1}{2} \times \frac{F \times L1^3}{E \times b \times t^3} \quad (4)$$

In the equations 2 and 3, F indicates a strength of the force applied from 215 to the nut portion 207. E indicates a vertical elasticity coefficient of the material of the cantilever parallel spring 221. In the equation 3, the thickness t of the plate spring is assumed to be very thin. Actually, however, as shown in the eighteenth embodiment, when the rack 208 is formed entirely with resin, a certain thickness t must be given to the plate spring to secure a necessary rigidity. Consequently, this cannot be ignored in the equation. Taking this in consideration, the constituent C of the "displacement by bending" is computed strictly in the following equation 5.

$$C = \frac{F \times L1^2 \times (3 \times L2 + 2 \times L1)}{3 \times E \times b \times t \times D \times (D + 2 \times t)} \quad (5)$$

The equation 1 is obtained from the equations 4 and 5.

If the constituent C of the "displacement by bending" is larger than the constituent D of the "displacement by parallel movement", the use of the cantilever parallel spring 221 will become less effective, and the characteristics of the rack will become just equal to the conventional rack provided with plate springs. More concretely, the teeth 223 are apt to go off the thread groove 215. Especially, in a configuration as shown in the fifteenth embodiment, of the teeth 223 of the nut portion 207 fit in the thread groove 215, only the portion closer to the cantilever parallel spring 221 is worn out in the thread groove 215, degrading the life of the rack 208 quickly. To avoid such a problem, the constituent C of the "displacement by bending" should be smaller at least than the constituent D of the "displacement by parallel movement". The equation 1 indicates a condition on which the rate A between the "displacement by bending" and the "displacement by parallel movement" becomes 1.0 or under. Naturally, the smaller the constituent C of the "displacement by bending"is with respect to the constituent D of the "displacement by parallel movement", the better it is. Ideally, the constituent C of the "displacement by bending" should be controlled to 0.1 or under with respect to the constituent D of the "displacement by parallel movement".

In the nineteenth embodiment, the L2 size is assumed to be the length between the end of the cantilever parallel spring 221, closer to the nut portion 207 and the position where the teeth of the nut portion farther from the cantilever parallel spring 221 come in contact with the thread groove 215. As understood clearly from the equation 1, the larger the L2 value is, the larger the rate of "displacement by bending" becomes. Thus, the worst case of the L2 value-is taken into consideration to decide the L2 value. In addition, the relationship among sizes in the nineteenth embodiment may be assumed not only for the fifteenth embodiment, but also for other embodiments.

In the case of the disk apparatus in the nineteenth embodiment of the present invention, when it is assumed that the length of the cantilever parallel spring provided in the rack is L1, the length between the end of the cantilever parallel spring 221, closer to the nut portion 207 and the position where the teeth of the nut portion farther from the cantilever parallel spring 221 comes in contact with the thread groove is L2, the distance between the two plate springs forming the cantilever parallel spring is D, and the thickness of the plate spring is t, the rate A between the "constituent of displacement by bending" and the "constituent of displacement by parallel movement" is represented in the equation 6 as shown below.

$$A = \frac{2}{3} \times \left(2 + 3 \times \left(\frac{L2}{L1}\right)\right) \times \frac{t^2}{D \times (D + 2t)} \leq 1.0 \quad (6)$$

According to the disk apparatus in the nineteenth embodiment of the present invention, therefore, the deformation of the cantilever parallel spring of the rack can be controlled to be less. The disk apparatus in the nineteenth embodiment can thus prevent the nut portion from being off the feed screw when the head is accelerated/decelerated suddenly.

<<Twentieth Embodiment>>

Figure 25:
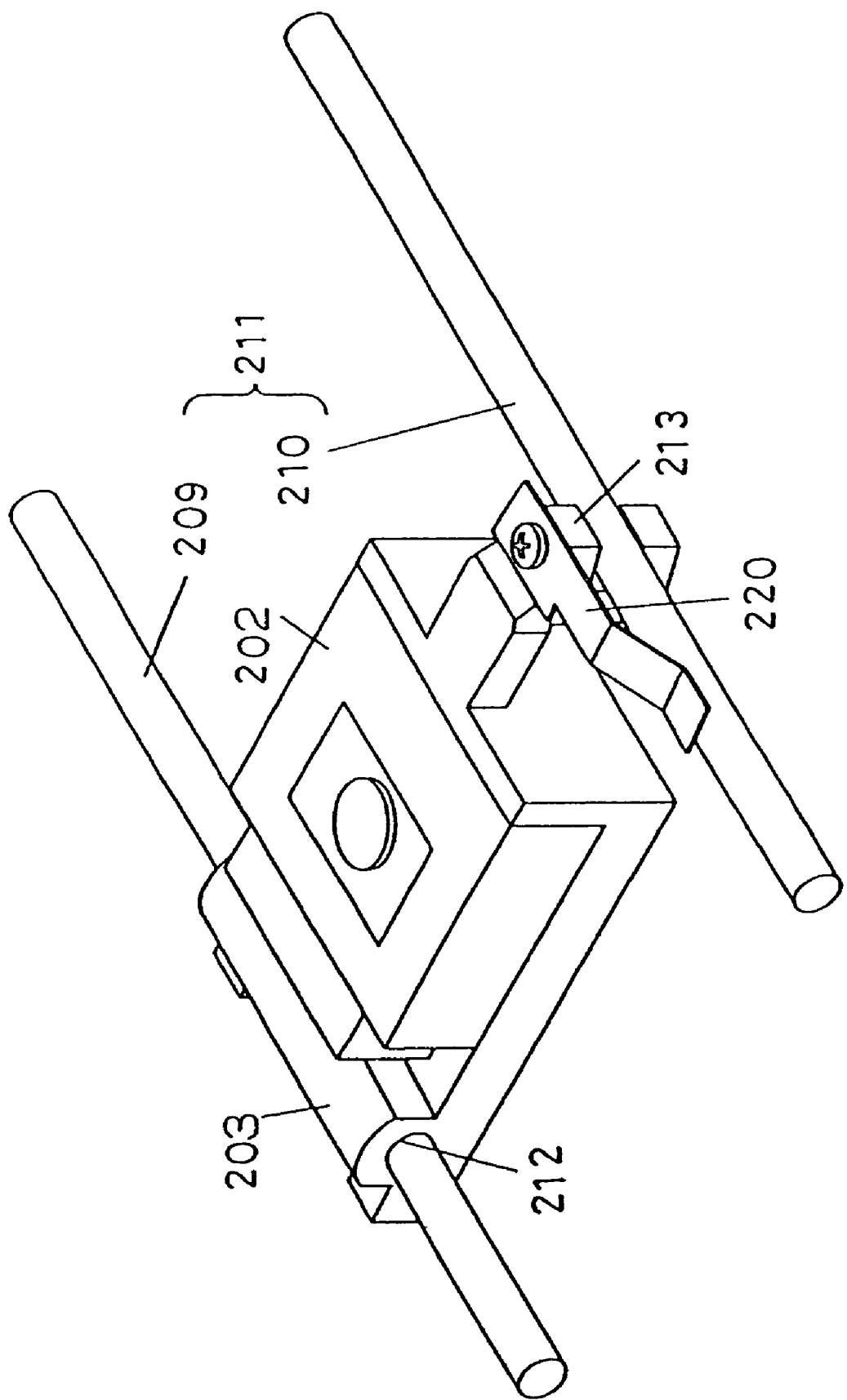
FIG. 25 is a perspective view of the disk apparatus in the twentieth embodiment of the present invention.

FIG. 25 is a perspective view of a portion of the disk near the pick-up in the twentieth embodiment of the present invention.

As shown in FIG. 25, a shaft holder 220 is provided on the pick-up base 203 of the disk apparatus in the twentieth embodiment. One end of the shaft holder 220 is fixed to the pick-up base 203 and the other end presses the second guide shaft 210 that slides in the guiding groove 213. The position where the shaft holder 220 presses the second guide shaft 210 is a position separated on one side from the guiding groove 213 in the axial direction of the second guide shaft 210.

Since such a shaft holder. 220 is provided, a force is applied to the pick-up base 203 so that the pick-up base is twisted around the guide groove 213. Consequently, the pick-up base 203 in the disk apparatus described in the twentieth embodiment is inclined to provide a play between the guide hole 212 and the guide shaft 209 or to eliminate the play from between the guide groove 213 and the guide shaft 210.

The vibration generated in the pick-up base 203 when the pick-up base 203 is accelerated/decelerated suddenly can be suppressed effectively.

The contact status between the pick-up base 203 and the guide mechanism 211 is changed by the following relationship when the shaft holder 220 is provided; the relationship between the guide hole 212 and the guide groove 213, the diameter of the guide hole 212 and the diameter of the guide shaft 209, the length of the narrow contact portion of the guide groove 213 and the diameter of the guide shaft 210, or the relationship between the pick-up 202 and the pick-up base 203.

Figure 26:
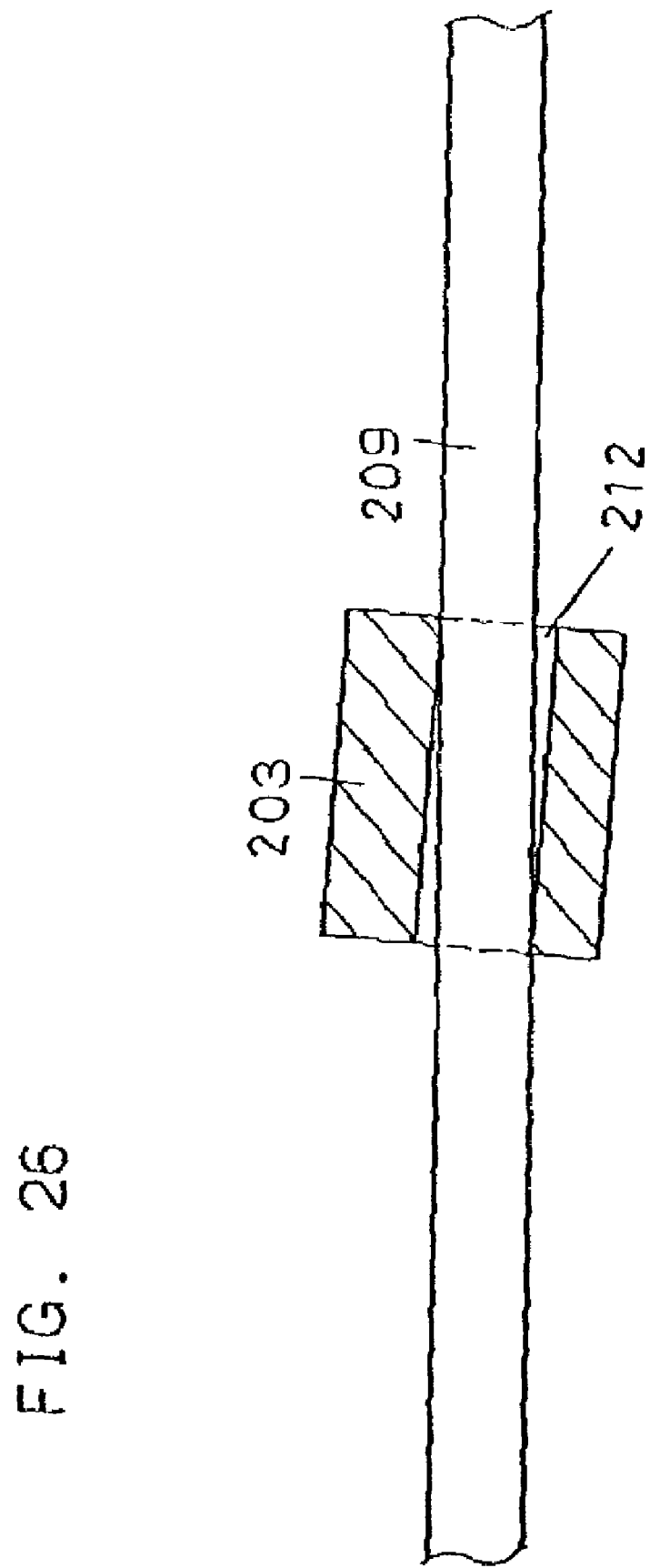
FIG. 26 is a cross sectional side view of the contact status between a pick-up base and a guiding mechanism in the twentieth embodiment of the present invention.
Figure 27:
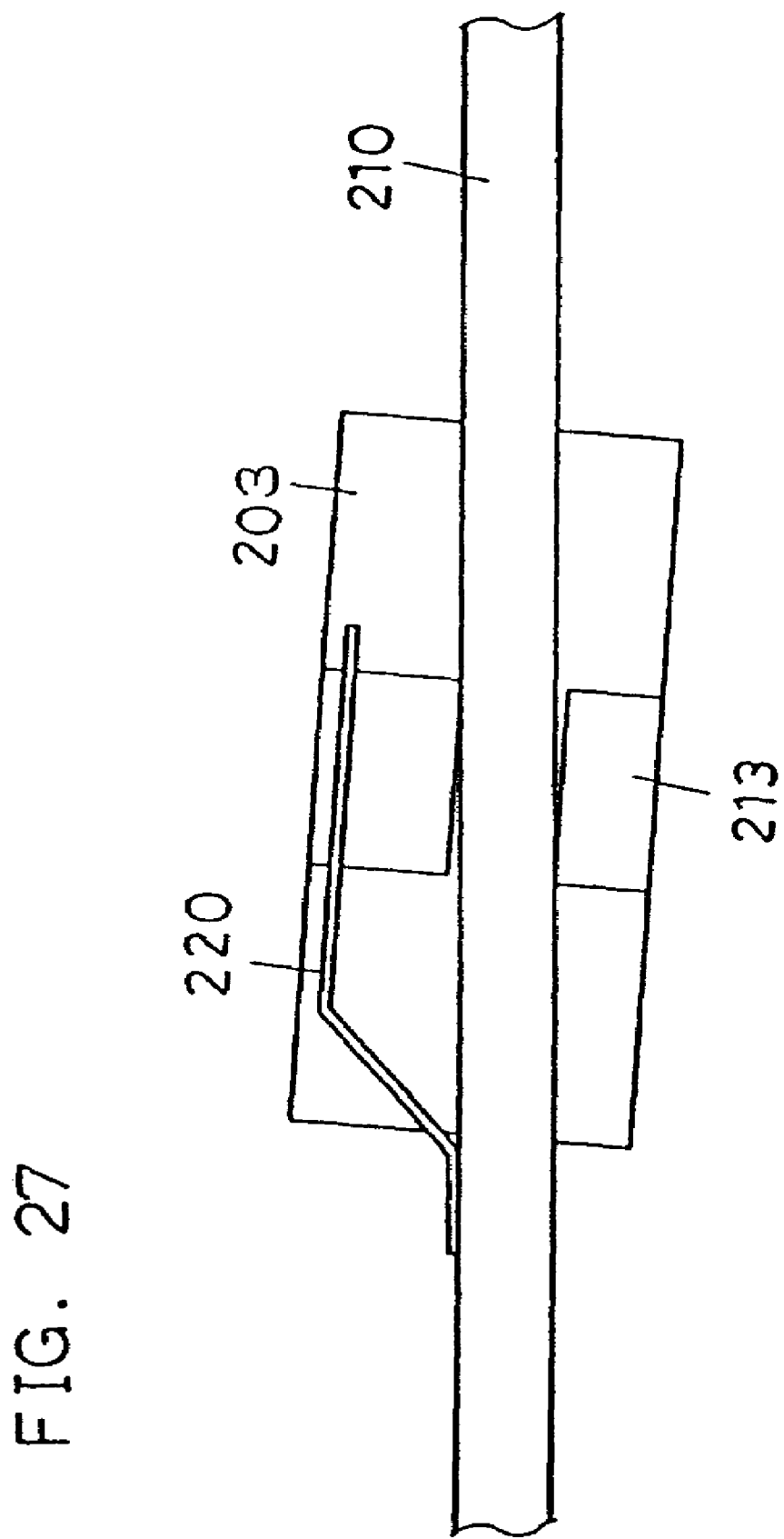
FIG. 27 is a side view of the contact status between the pick-up base and the guiding mechanism in the twentieth embodiment of the present invention.

FIGS. 26 and 27 indicate how the pick-up base 203 is in contact with the guide mechanism 211 when the shaft holder 220 is provided. FIG. 26 is a cross sectional view of the pick-up base 203 when it is seen from the direction of the guide groove 213. As shown in FIG. 26, the first guide shaft 209 is inclined to the guide hole 212 to come in compact with each other. The first guide shaft 209 is in contact with the guide hole 212 with no excessive play.

FIG. 27 is a side cross sectional view of the pick-up base 203 when it is seen from the direction of the guide groove 213. As shown in FIG. 27, the second guide shaft 210 is inclined to the guide groove 213 to come in contact with each other. The second guide shaft 210 is always in contact with the guide groove without an excessive play.

The shaft holder 220 in the twentieth embodiment presses a position separated from the guide groove on one side in the radial direction of the second guide shaft 210. As a result, the second shaft 210 receives a rotary moment around the guide groove 213 due to the pressure of the shaft holder 220. And, the pick-up base 213 is inclined to the second guide shaft 210 due to the rotary moment. Consequently, the further the position where the shaft holder 220 presses the second guide shaft 210 is separated from the guide groove 213, the more effectively the shaft holder 220 can press the pick-up base 203 against the guide mechanism 211 with a less force.

In the disk apparatus in the twentieth embodiment shown in FIG. 25, the shaft holder 220 is consisting of a plate spring. However, the shaft holder 220 is not limited only to such a plate spring. It may be another elastic material such as a coil spring to obtain the same effect.

The disk apparatus in the twentieth embodiment of the present invention comprises a pick-up for reading and writing signals from and on disk; a pick-up base provided with the pick-up; the first guide shaft fit in a guide hole provided in the pick-up base and used to guide the pick-up base slidably in the radial direction of the disk; the second guide shaft fit in a guide groove provided in the pick-up base and used to limit the rotation of the pick-up base around the guide shaft; and a shaft holder fixed to the pick-up base at one end to be pressed against the second guide shaft at a position where the other end is separated from the guide groove on one side in the radial directions of the second guide shaft, and forcing the pick-up base in the direction where the inside face of the guide groove is in contact with the second guide shaft.

According to the twentieth embodiment of the present invention, therefore, the guide hole of the pick-up base or the gap between the guide groove and the guide shaft can be eliminated without increasing the frictional load of rotation. According to the twentieth embodiment, vibration of the pick-up base can thus be suppressed even when the pick-up base is accelerated/decelerated suddenly, and accordingly, it is possible to realize a disk apparatus whose pick-up can be moved fast.

<<Twenty-first Embodiment>>

Figure 28:
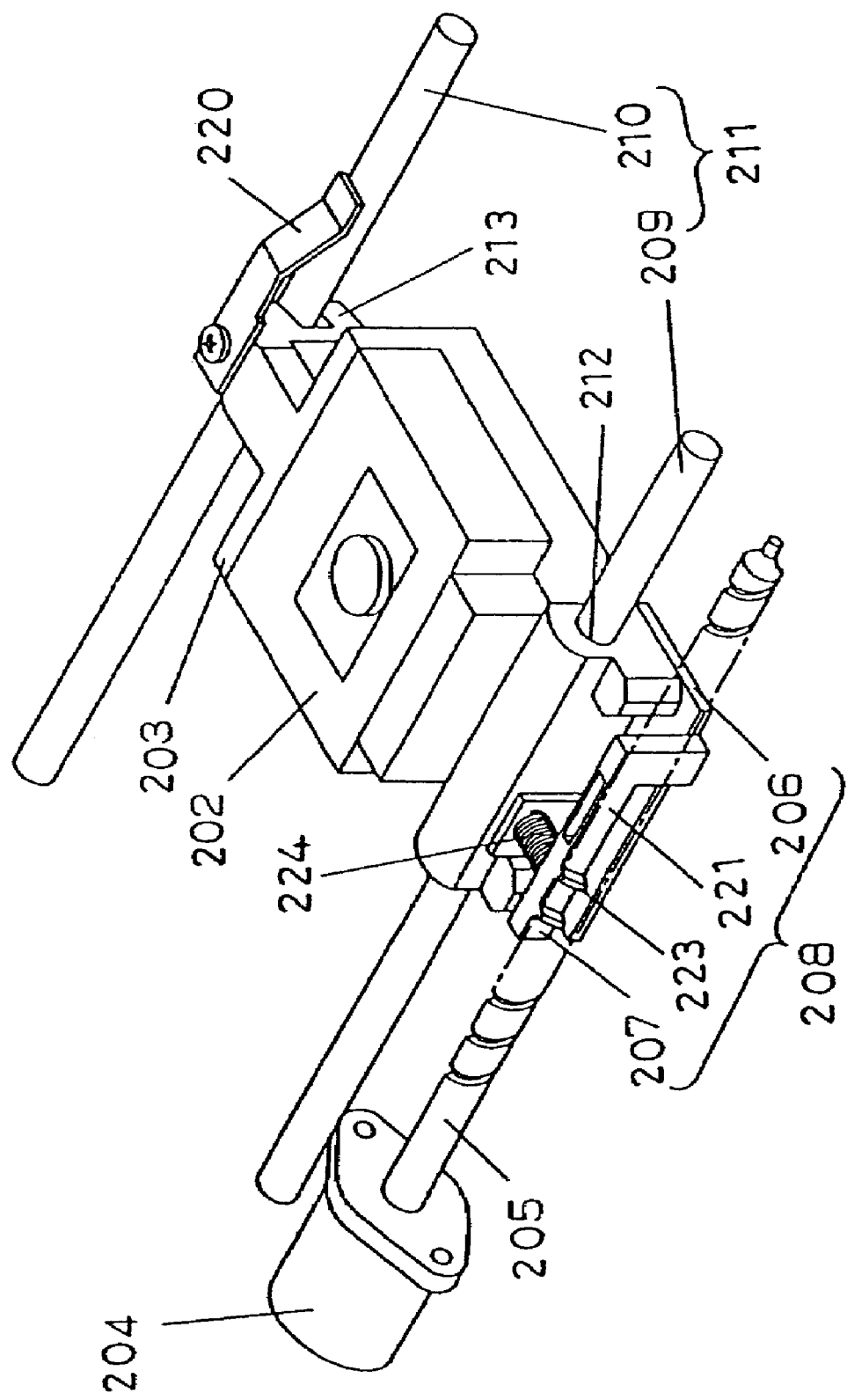
FIG. 28 is a perspective view of the disk apparatus in the twentieth embodiment of the present invention.

FIG. 28 is a perspective view of a portion of the disk apparatus, close to the pick-up of the disk apparatus in the twenty-first embodiment of the present invention.

As shown in FIG. 28, the cantilever parallel spring 221 of the rack 208 in the disk apparatus in the twenty-first embodiment can be moved in parallel to the recording face of the disk and in the radial direction of the feed screw 205. On the other hand, the shaft holder 220 presses the second guide shaft 210 vertically to the recording face of the disk.

In the twenty-first embodiment, the movable direction of the cantilever parallel spring 221 of the rack 208 is decided to become orthogonal to the pressing direction of the shaft holder 220 such way, so that the excessive play between the pick-up base 203 and the guide mechanism 211 can be eliminated in every direction. Thus, even when the pick-up base 203 is accelerated/decelerated suddenly for movement, the vibration in the pick-up base 203 can be reduced significantly. The disk apparatus in the twenty-first embodiment can thus record/play back information stably.

There is another embodiment for obtaining the same effect as that in the twenty-first embodiment; the movable direction of the cantilever parallel spring 221 of the rack 208 in the twenty-first embodiment shown in FIG. 28 is decided as another direction, for example, the movable direction of the cantilever parallel spring 221 is decided to be vertical to the recording face of the disk and the pressing direction of the shaft holder 220 is decided to be parallel to the recording face of the disk.

The disk apparatus in the twenty-first embodiment of the present invention comprises a pick-up for reading/writing signals on/from a disk; a pick-up base provided with the pick-up; a traverse motor for moving the pick-up in the radial direction of the disk; a feed screw rotated by the traverse motor and provided with a thread groove on its outer periphery; a rack provided with a fixing portion fixed to the pick-up base, a nut portion fit in the thread groove, and an cantilever parallel spring for connecting the fixing portion to the nut portion; the first guide shaft for guiding the pick-up slidably in the radial direction of the disk; the second guide shaft fit in the guide groove provided in the pick-up base and used for limiting the rotation of the pick-up base around the first guide shaft; and a shaft holder fixed to the pick-up base at one end and being pressed against the second guide shaft at a position where the other end is separated from the guide groove on one side in the radial direction of the second guide shaft, and forcing the pick-up in the direction where the inside face of the guide groove is in contact with the second guide shaft. In the disk apparatus in the twenty-first embodiment, the displaceable direction of the cantilever parallel spring is orthogonal to the direction in which the shaft holder is pressed against the second guide shaft.

According to the disk apparatus in the twenty-first embodiment of the present invention, therefore, the nut portion of the rack is never off the feed screw and the force applied to the pick-up base from the nut portion is suppressed by the cantilever parallel spring and the shaft holder of the rack in every direction. And accordingly, vibration of the pick-up can be suppressed and the pick-up can be moved fast even when the pick-up is accelerated/decelerated suddenly.

Since each of the disk apparatuses in the fourteenth to twenty-first embodiments of the present invention is formed as explained above, the nut portion of the rack is not disengaged from the feed screw and vibration of the pick-up base can be reduced significantly even when the pick-up base is accelerated/decelerated suddenly. In addition, in each of the above-mentioned configurations, because the sliding load between the nut portion and the feed screw, as well as between the pick-up base and the guide shaft is not increased so much, it is no need to increase the torque of the traverse motor.

In each of the disk apparatuses described in the fourteenth to twenty-first embodiments of the present invention, the pick-up base can be moved fast for stable and fast accessing without increasing the manufacturing cost. Thus, the disk apparatus is very effective in industrial fields.

<<Twenty-second Embodiment>>

Next, the disk apparatus in the twenty-second embodiment of the present invention will be explained.

In recent years, high speed accessing performance is required for disk apparatuses to feed the pick-up to a target position on the disk quickly, and a disk apparatus that uses a stepping motor as a means of moving the pick-up is already commercialized. Generally, two operations are needed to move the pick-up in a disk apparatus; playback operation and access operation. When in a playback operation, the pick-up follows up helically-formed tracks on the disk, so the stepping motor must be rotated slowly to move the pick-up gradually. When in an access operation, the pick-up is moved to a target position in a moment, so the stepping motor must be rotated fast. In such a disk apparatus that uses a stepping motor for moving the pick-up, the stepping motor is rotated in two ways; high speed and low speed. Thus, the rotation must be changed over between those two speeds.

[General Stepping Motor Controlling Method]

Figure 29:
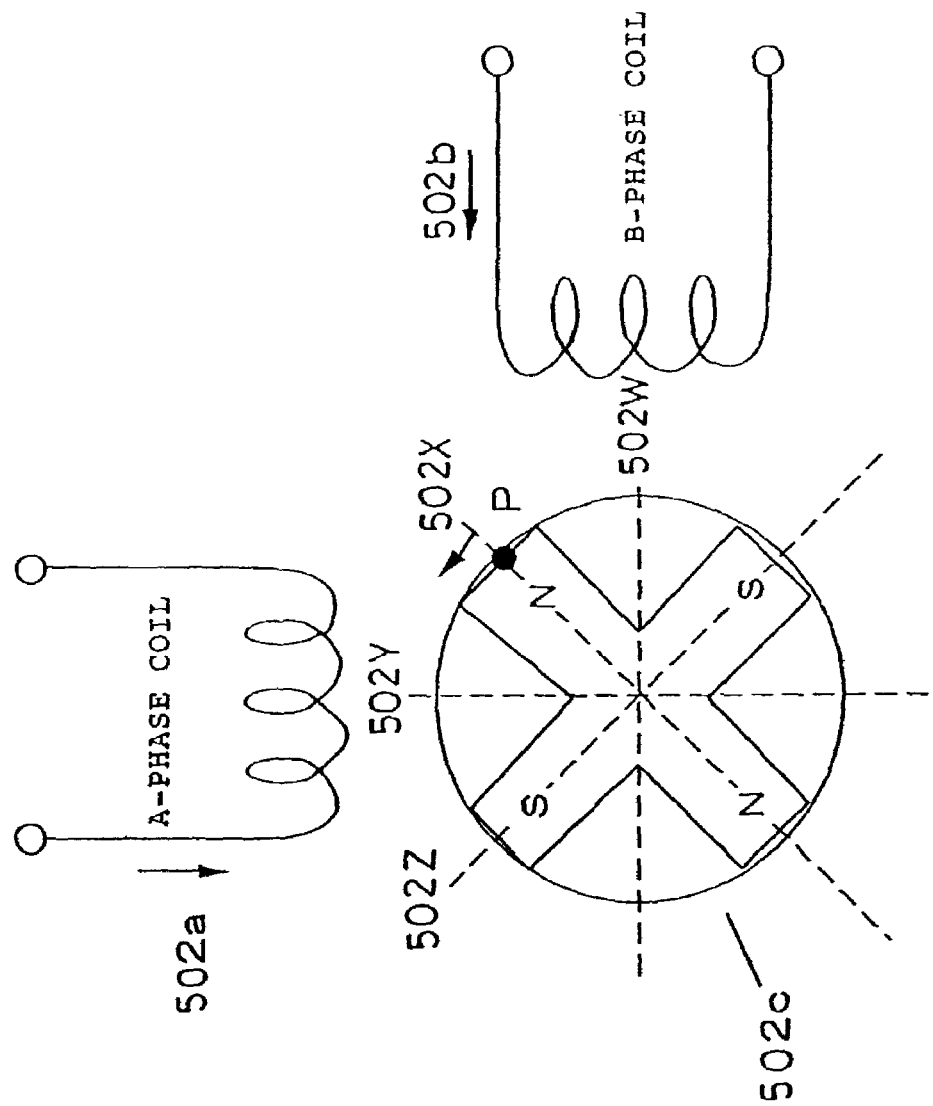
FIG. 29 is a configuration of a general stepping motor.
Figure 30:
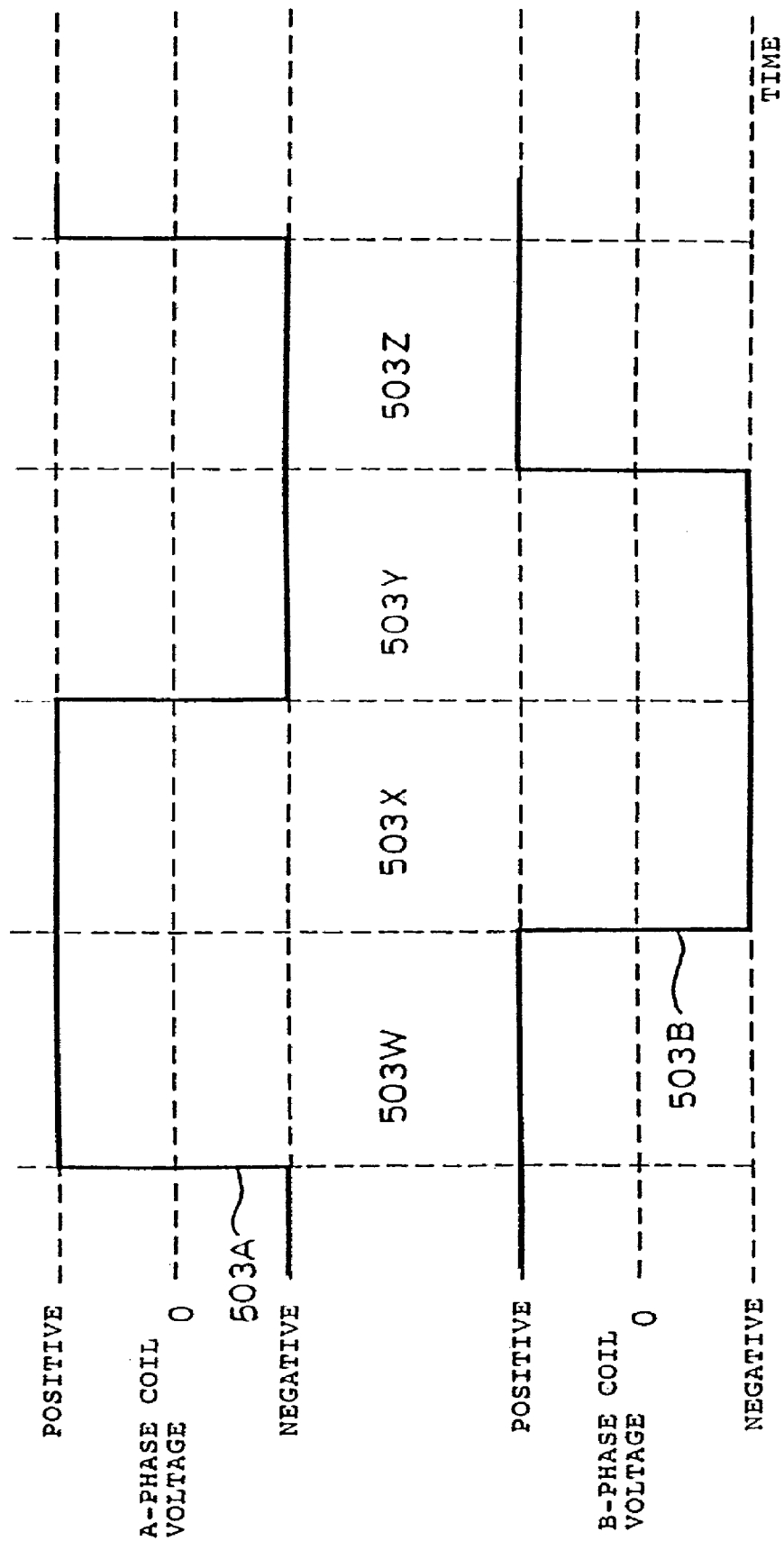
FIG. 30 is a wave form chart for the conventional driving signal pattern 1 (for fast rotation).
Figure 31:
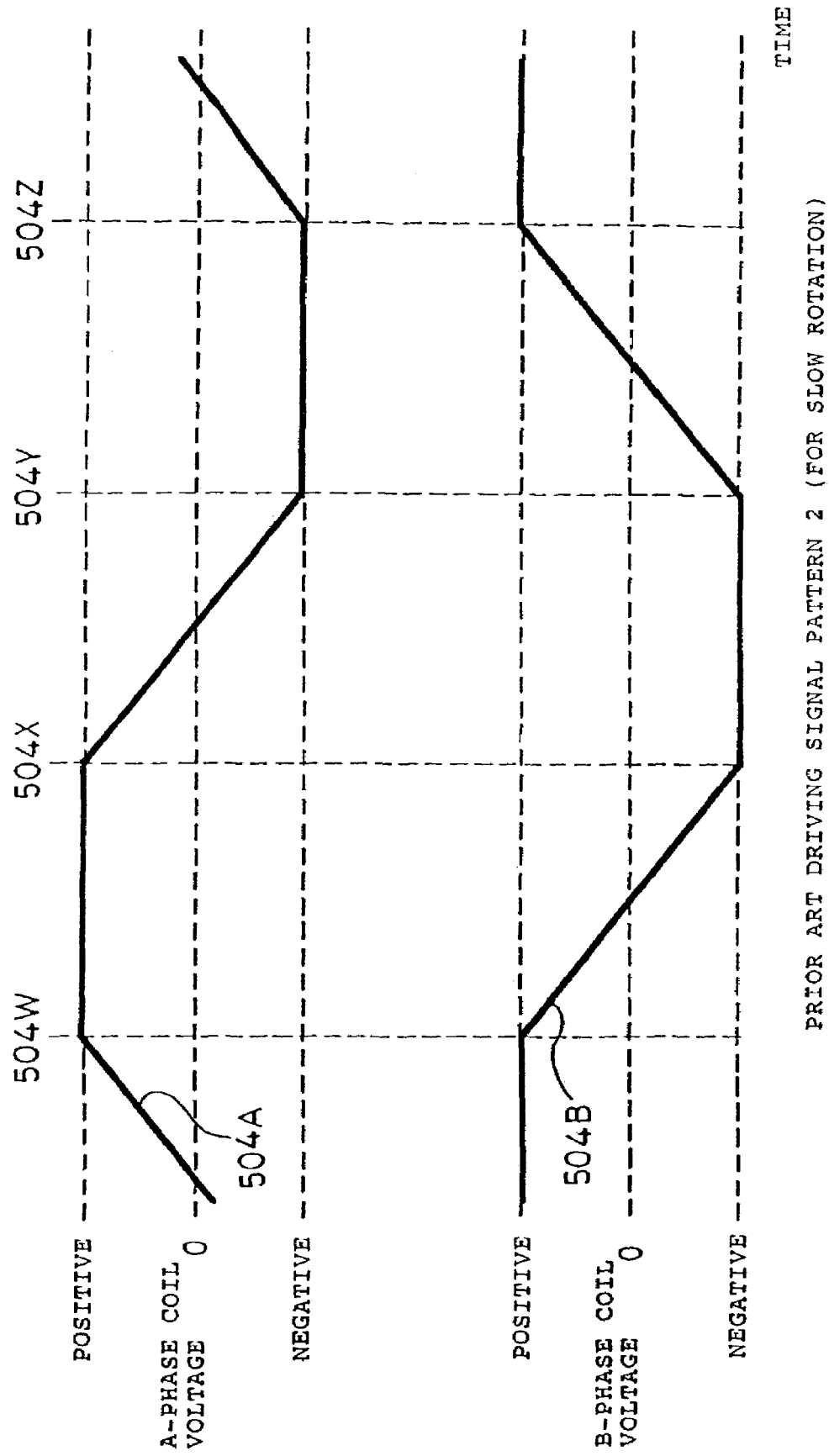
FIG. 31 is a wave form chart for the conventional driving signal pattern 2 (for slow rotation).

Hereunder, a general stepping motor controlling method will be explained with reference to FIGS. 29, 30, and 31 showing a simplified inside configuration of a general stepping motor.

FIG. 29 is a simplified inside configuration of a general stepping motor. In FIG. 29, the arrow 502a indicates the direction of a current flowing in the A-phase coil and the arrow 502b indicates the direction of a current flowing in the B-phase coil.

In FIG. 29, a rotator 502c has a plurality of pairs of N and S poles. The point P on the rotator begins rotating when the current 502a flowing in the A-phase coil and the current 502b flowing in the B-phase coil are changed together and stops at a position where the balance between the magnetic force generated from the coils and the frictional load of rotation is stabilized. A stepping motor has some mechanical stability positions. Positions 502W, 502X, 502Y, and 502Z represent continuous four mechanical stability positions of those mechanical stability positions of the stepping motor. The number of pairs of magnetic poles and the number of mechanical stability points differ among types of stepping motors.

FIG. 30 is a wave form chart indicating the driving signal pattern 1 of the general stepping motor. FIG. 30 is the driving signal pattern of a so-called 2-phase excitation type general stepping motor. This driving signal pattern is used in many cases for rotating a stepping motor fast.

In FIG. 30, the wave form 503A represents the voltage wave form of the A-phase coil of the stepping motor. The wave form 403B indicates the voltage wave form of the B-phase coil. In such a 2-phase excitation type stepping motor, the voltage of each coil is repeated cyclically among 4 states (503W, 503X, 503Y, and 503Z). In the state 503W, the point P shown in FIG. 29 is moved to the position 502W. In the same way, in the states 503X, 503Y, and 503Z shown in FIG. 30, the point shown in FIG. 29 is moved to the positions 502X, 502Y, and 502Z respectively.

FIG. 31 is a wave form chart indicating the driving signal pattern 2 of the general stepping motor. This driving signal pattern 2 is applied to the 2-phase excitation type stepping motor as a method for changing driving signals at a fixed inclination to the time, as shown in FIG. 31. The driving signal pattern 2 is suitable for rotating a stepping motor slowly. In FIG. 31, the wave form 504A indicates the voltage of the A-phase coil of a stepping motor and the wave form 504B indicates the voltage of the B-phase coil. In the state 504W shown in FIG. 31, the point P shown in FIG. 29 is moved to the position 502W. In the same way, in the states 504X, 504Y, and 504Z shown in FIG. 31, the point P shown in FIG. 29 is moved to the positions 502X, 502Y, and 502Z respectively.

Figure 32:
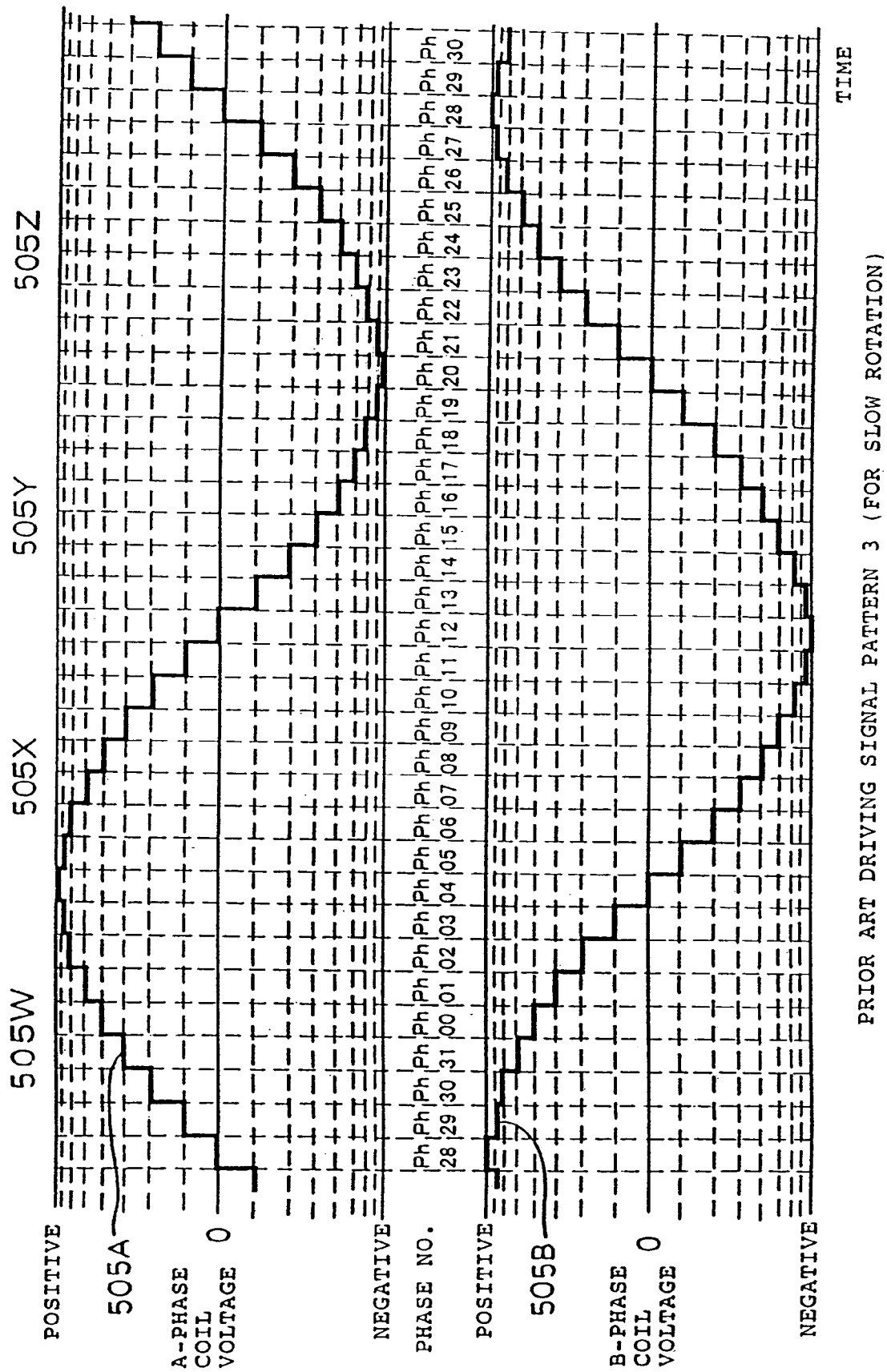
FIG. 32 is a wave form chart for the conventional driving signal pattern 3 (for slow rotation).

FIG. 32 is a wave form chart indicating the driving signal pattern 3 of the general stepping motor. The driving signal pattern of FIG. 32 is a so-called micro-step excitation method stepping motor and this driving signal pattern is often used for rotating a stepping motor step by step very slowly at fine pitches. In FIG. 32, the wave form 505A indicates the voltage wave form of the A-phase coil of a stepping motor and the wave form 505B indicates the voltage wave form of the B-phase coil of the stepping motor. Since a micro-step excitation method has many excitation states, the inner state of the stepping motor is controlled using, for example, phase numbers (Ph00, Ph01, . . . ) as shown in FIG. 32. In FIG. 32, 32 phases given with phase numbers within Ph00 to Ph31 are used. The driving signal pattern can be changed cyclically by increasing/reducing the phase number one by one. In addition, to find voltage wave forms 505A and 505B of the coils with respect to phase numbers, a table of trigonometric function constants is provided in a storing means such as ROM and RAM in advance and a voltage is decided with reference to the voltage value corresponding to each phase number in the table. In the state 505W (phase number Ph00) shown in FIG. 32, the point P shown in FIG. 29 is moved to the position 502W. In the same way, in the states 505X (phase number Ph08), 505Y (phase number Ph16), and 505Z (phase number Ph24) shown in FIG. 32, the point P shown in FIG. 29 is moved to the positions 502X, 502Y, and 502Z respectively.

[Problems in Changing Operation for Driving Signal Patterns]

The above-mentioned stepping motor controlling method is confronted with the following problems, however For example, when an accessing operation is performed during a playback operation in a disk apparatus, the driving signal pattern 2 or 3 for slow operation shown in FIG. 31 or FIG. 32 must be changed to the driving signal pattern 1 for fast rotation shown in FIG. 30.

Figure 33:
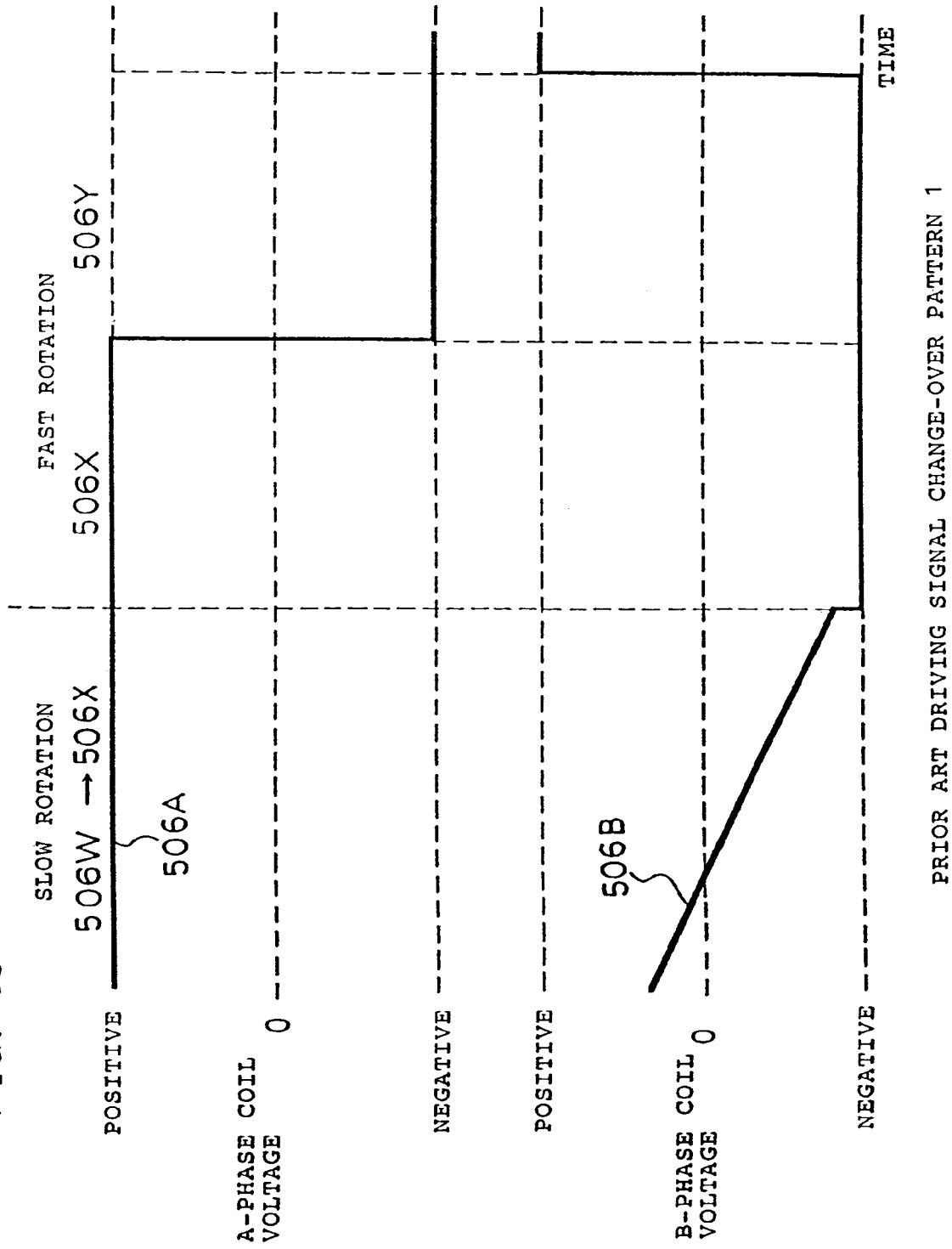
FIG. 33 is a wave form chart for the conventional driving signal change-over pattern 1.

Next, such a change-over problem will be explained with reference to FIG. 33. FIG. 33 is a wave form chart indicating the general driving signal pattern 1. FIG. 33 indicates how the driving pattern 2 for slow rotation shown in FIG. 31 is changed to the driving signal pattern 1 for fast rotation shown in FIG. 30. In FIG. 33, the wave form 506A indicates the voltage wave form of the A-phase of a stepping motor and the wave form 506B indicates the voltage wave form of the B-phase coil. In the slow rotation part shown in FIG. 33, the state is being changed from 506W to 506X. This state corresponds to the slow rotation of the point P shown-in FIG. 29 from the position 502W to the position 502X.

When the rotation speed is changed from slow to fast during an operation by the conventional method, the state 506X pattern shown in FIG. 33 is output as the first driving signal for the fast rotation. However, the point P shown in FIG. 29 is already moved close to the position 502X slowly just before the speed change. Thus, almost no rotation is made with respect to the 506X driving signal shown in FIG. 33, which moves the point P to the position 502X. Consequently, the first state 506X driving signal pattern after the change to fast rotation is redundant and less effective for accelerating the rotation of the stepping motor. When the conventional driving signal changing method is used to change the driving signal, therefore, the accelerating time for fast rotation of the stepping motor becomes long.

As mentioned above, in the case of the conventional driving signal changing method, as the first state in the driving signal for fast rotation after a speed change is output a signal pattern for moving the rotator to the nearest mechanical stability position in the rotating direction of the stepping motor. Consequently, when the rotator is moved up to a position near a mechanical stability point during a slow rotation, a driving signal pattern is output to move the rotator to the same mechanical stability position in fast rotation. Thus, an unnecessary state is generated during a driving signal change, and the use of this driving signal changing method for a disk apparatus causes the access operation to be delayed.

[Problems in Changing method of Driving Signal Pattern in Micro-Step Excitation System]

Next, problems to arise from the conventional changing method in the micro-step excitation system will be explained with reference to FIG. 34.

Figure 34:
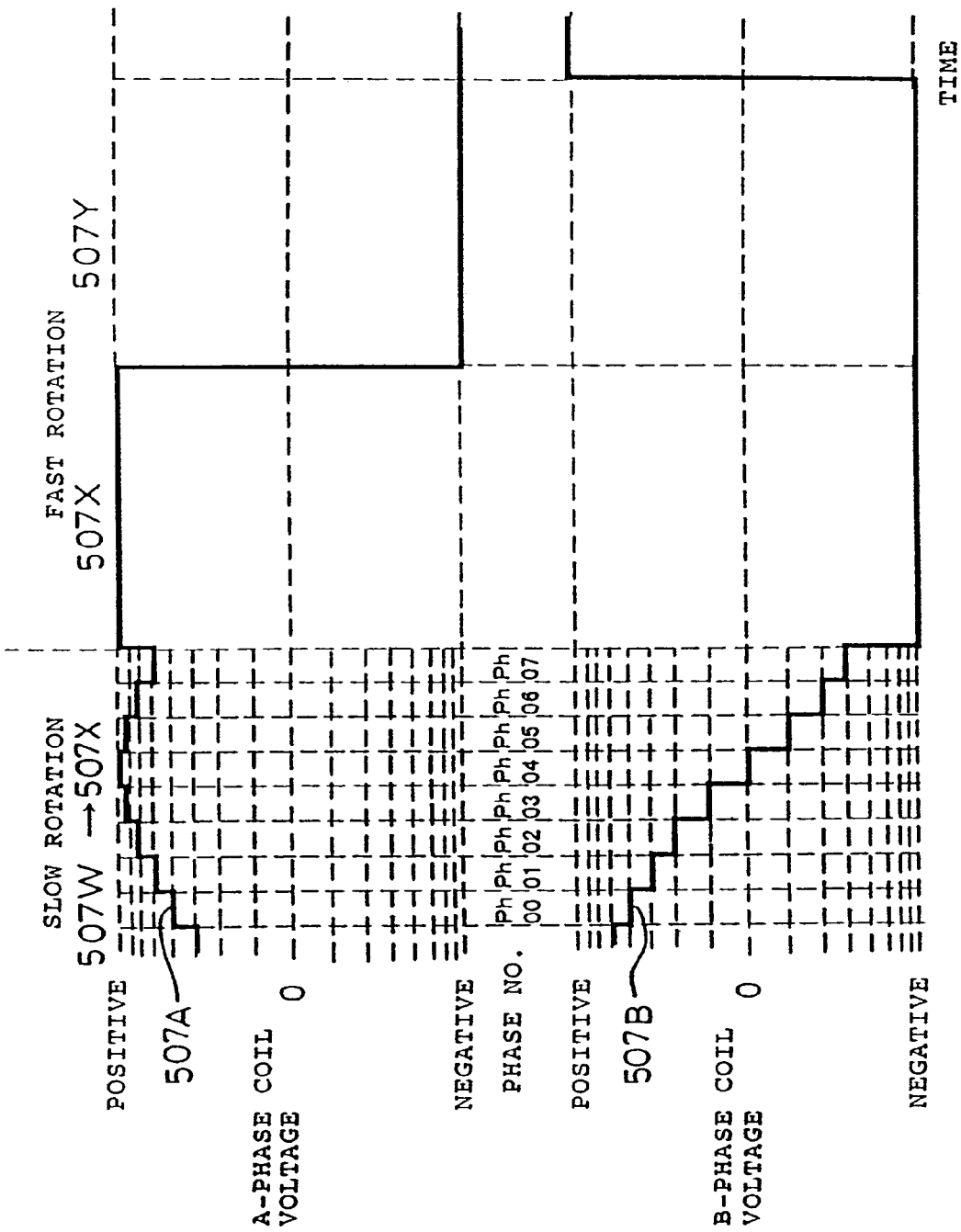
FIG. 34 is a wave form chart for the conventional driving signal change-over pattern 2.

FIG. 34 is a wave form chart indicating the conventional driving signal change pattern 2. FIG. 34 indicates a changing condition from the conventional driving signal pattern 3 for slow rotation shown in FIG. 32 to the conventional driving signal pattern 1 for fast rotation shown in FIG. 30. In FIG. 34, the wave form 507A indicates the voltage wave form of the A-phase of the stepping motor and the wave form 507B indicates the voltage wave form of the B-phase coil. The slow rotation part in FIG. 34 indicates that the state is being changed from 507W to 507X. This means that the state is changed from Ph00 to Ph07. This operation corresponds to an operation in which the point P shown in FIG. 29 is being rotated slowly from the position 502W to the position 502X. When the rotation speed is changed from slow to fast during an operation by the conventional method here, the state 507X pattern shown in FIG. 34 is output as the first driving signal for the fast rotation. However, the point P shown in FIG. 29 is already moved to Ph07, that is, a position near 502X with a slow rotation just before the signal change. Thus, almost no rotation is made with respect to the 507X driving signal shown in FIG. 34, used to move to the position 502X. The first state 507X driving signal pattern, after the change to fast rotation, is only a change from Ph07 to Ph08. So, it is redundant and less effective for accelerating the rotation of the stepping motor. The accelerating time thus becomes long for the fast rotation of the stepping motor.

Under such the circumstances, it is an object of the disk apparatus in the twenty-second embodiment of the present invention to solve the above-mentioned problems in the conventional apparatus and shorten the accelerating time for fast rotation of the stepping motor more significantly than the conventional method without generating any redundant state when the rotation speed of the stepping motor is changed from slow to fast.

In order to solve the above-mentioned problems, the stepping motor controlling method in the twenty-second embodiment comprises a means of generating the first driving signal for slow rotation of the stepping motor; a means of generating the second driving signal for fast rotation of the stepping motor; and a means of controlling switching between the first and second driving signal generating means. When changing the rotation speed of the stepping motor from slow to fast, the controlling means decides whether or not the rotator of the stepping motor exists near a mechanical stability position of the stepping motor according to the voltage value of the driving signal output from the first driving signal generating means or the state number owned by the first driving signal generating means. And, the controlling means outputs a command to the second driving signal generating means when the rotator exists near a mechanical stability position. After the second driving signal means outputs a driving signal for rotating the stepping motor to the next mechanical stability position in the rotating direction of the stepping motor, the controlling means changes the signal generating means from the first driving signal generating means to the second driving signal generating means.

Consequently, the driving signal used to change the rotation speed to fast using the stepping motor controlling method in the twenty-second embodiment of the present invention can move the rotator of the stepping motor to the mechanical stability position one more ahead than the conventional method within the same time.

Figure 35:
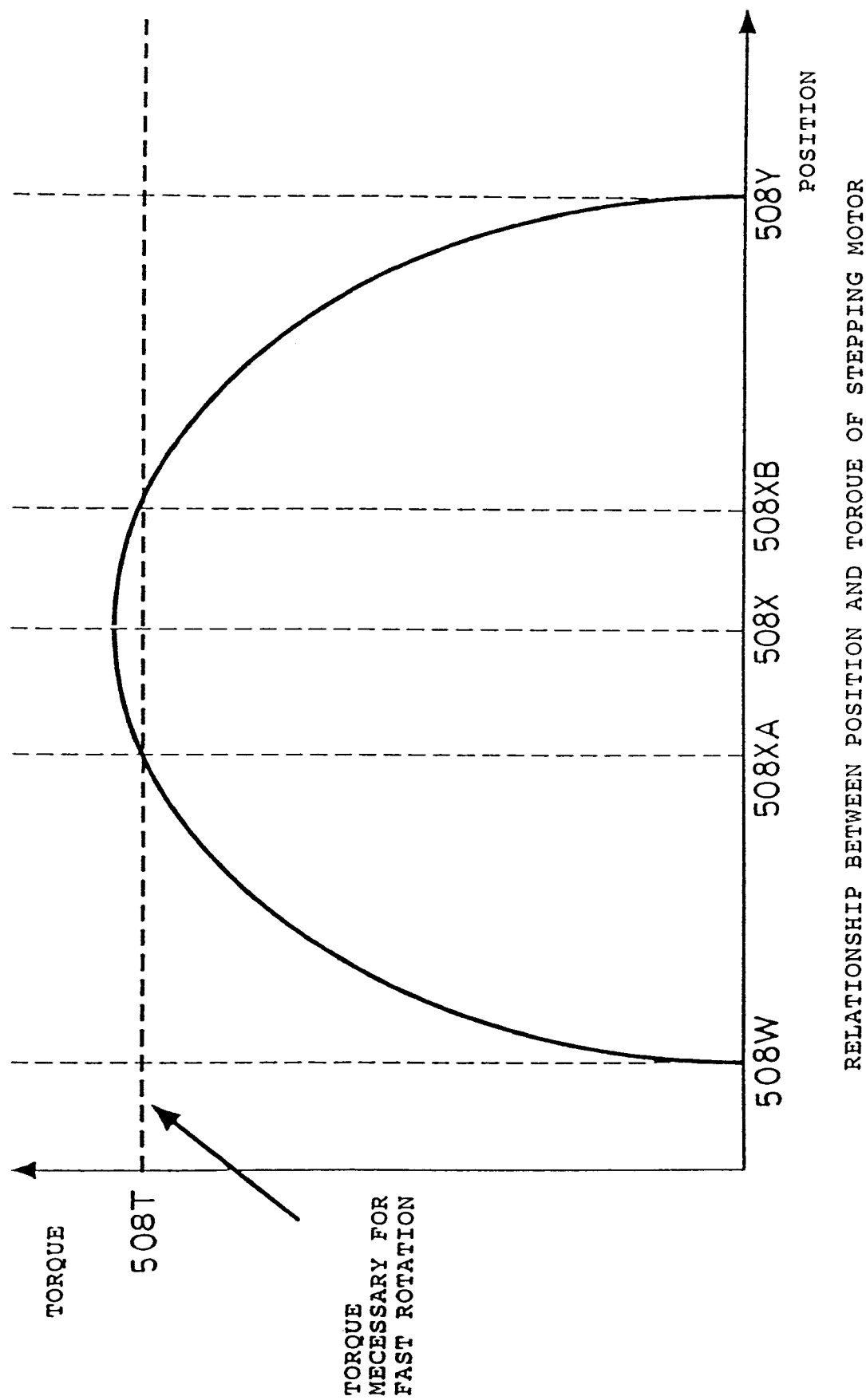
FIG. 35 is a characteristic chart for the relationship between the position and the torque of the stepping motor.

Hereunder, the principle of the above-mentioned operation will be explained with reference to FIG. 35. FIG. 35 is a characteristic chart indicating the relationship between position and torque of a stepping motor. In FIG. 35, the horizontal axis indicates the position of point P shown in FIG. 29. The position 508X in FIG. 35 indicates that the point P in FIG. 29 exists at the position 502X. In the same way, the positions 508W and 508Y on the horizontal axis in FIG. 25 indicate that the point P shown in FIG. 29 will exist at positions 502W and 502Y respectively.

The vertical axis in FIG. 35 indicates a torque generated in the stepping motor when each coil of the stepping motor is excited by the driving signal of the state 503Y shown in FIG. 30.

The torque in the forward direction on the vertical axis in FIG. 35 indicates the size of the torque for moving the rotator on the horizontal axis to the right. Thus, when the rotator exists at the position 508X in FIG. 35, the rotator can be moved to the position 508Y with the largest torque received. This means that when the point P shown in FIG. 29 exists at the position 502X, it receives the largest torque and accordingly, the point P can be moved to the position 502Y. In other words, the torque of the stepping motor with respect to a fixed driving signal is decided by the position of the rotator.

To move the pick-up, etc. by rotating the stepping motor fast at this time, the torque must be over a certain strength. When a torque over a value needed for a fast rotation can be generated, the rotator of the stepping motor can be moved from the position 508X to the position 508Y shown in FIG. 35. This necessary torque strength is shown with a dotted line in FIG. 35. When the torque generated in a stepping motor is compared with the torque needed for the fast rotation in FIG. 35, it is found that a torque can be generated over the fast rotation torque even when the rotator goes off the position 508X slightly. In other words, within the range between the positions 508XA and 508XB shown in FIG. 35, the rotator can be moved fast to the position 508Y.

In the case of the stepping motor controlling method in the twenty-second embodiment of the present invention, the position to which the rotator reaches slowly is decided just before the stepping motor is rotated fast. Then, if the rotator reaches a position near a mechanical stability position, that is, within the positions 508X to 508Y shown in FIG. 35, no driving signal is output to move the rotator to the first mechanical stability position 508X, but a driving signal is output to move the rotator to the next mechanical stability position 508Y as the first driving signal for fast rotation. Consequently, the accelerating time for rotating the stepping motor fast can be shortened more significantly than the conventional method.

Hereunder, the twenty-third and twenty-fourth embodiments will be explained with reference to the attached drawings. Those embodiments explain the stepping motor controlling method in the twenty-second embodiment of the present invention more in detail.

<<Twenty-third Embodiment>>

Figure 36:
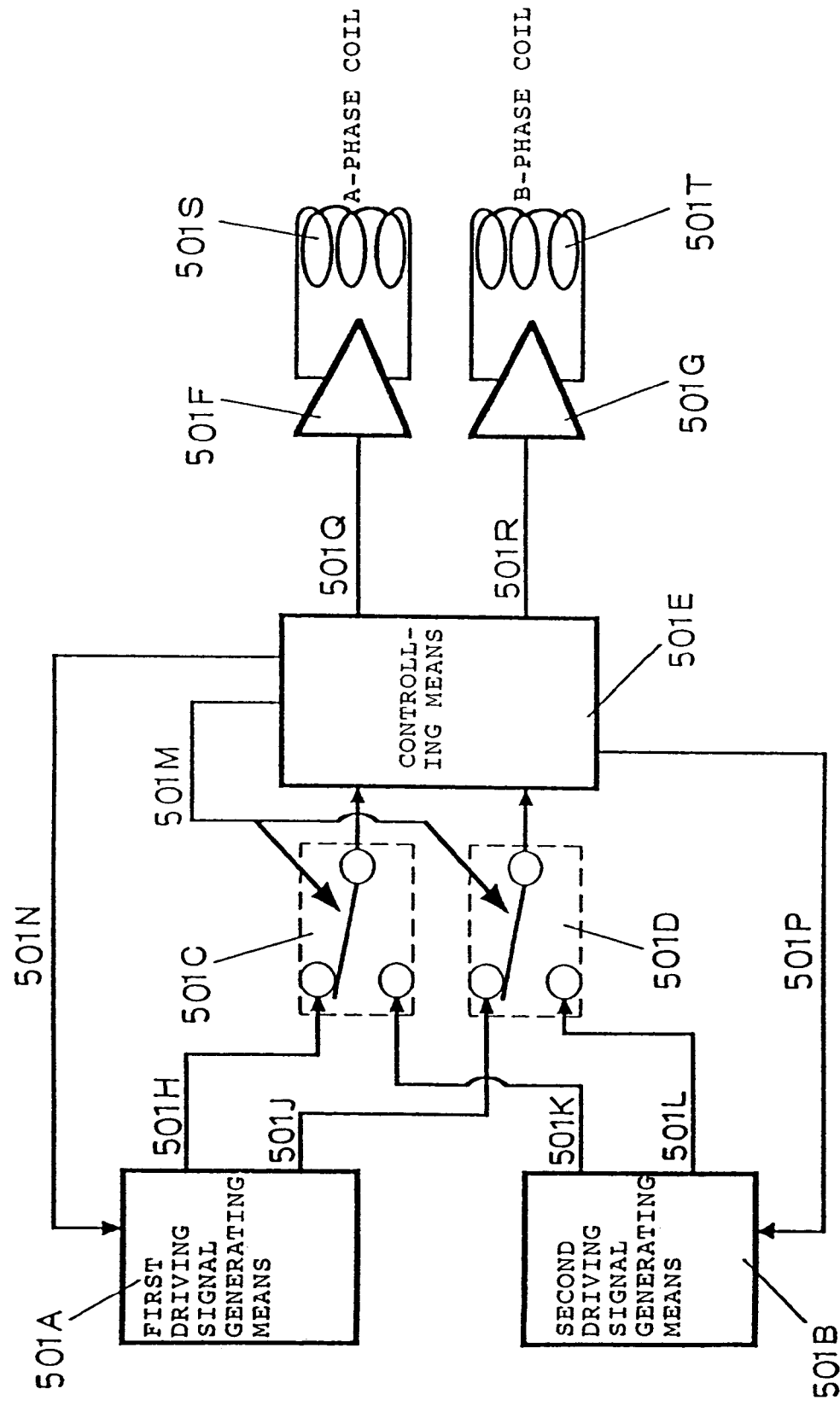
FIG. 36 is a stepping motor control circuit diagram in the twenty-third embodiment.

FIG. 36 is a block diagram for a control circuit of a stepping motor to which the stepping motor controlling method in the twenty-third embodiment of the present invention is applied. Hereunder, the stepping motor controlling method in the twenty-third embodiment will be explained with reference to FIG. 36.

In FIG. 36, the first driving signal generating means 501A generates driving signals for rotating the stepping motor as shown in FIG. 31 slowly. The first driving signal generating means 501A outputs the driving signals 501H and 501J for driving the A-phase coil and the B-phase coil of the stepping motor respectively. The second driving signal generating means 501B generates driving signals for rotating the stepping motor as shown in FIG. 30 fast. The second driving signal generating means 501B outputs driving signals 501K and 501L for driving the A-phase coil and the B-phase coil of the stepping motor respectively. The driving signals 501H and 501K are connected to the first switch 501C and the driving signals 501J and 501L are connected to the second switch 501D respectively.

The controlling means 501E outputs a command signal 501N to change the status of the first driving signal generating means 501A. The controlling mans 501E outputs a command signal 501P to change the status of the second driving signal generating means 501B. The controlling means 501E also outputs a change-over signal 501M to change over both the first switch 501C and the second switch 501D at the same time. Consequently, the controlling means 501E selects the driving signal from either the first driving signal generating means 501A or the second driving signal generating means 501B to output the driving signals 501Q and 501R. The driving signals 501Q and 501R are entered to the first exciting means 501F and the second exciting means 501G respectively. The first exciting means 501F and the second exciting means 501G amplify the driving signals 501Q and 501R to excite the A-phase and B-phase coils (501S) and (501T) of the stepping motor.

Figure 37:
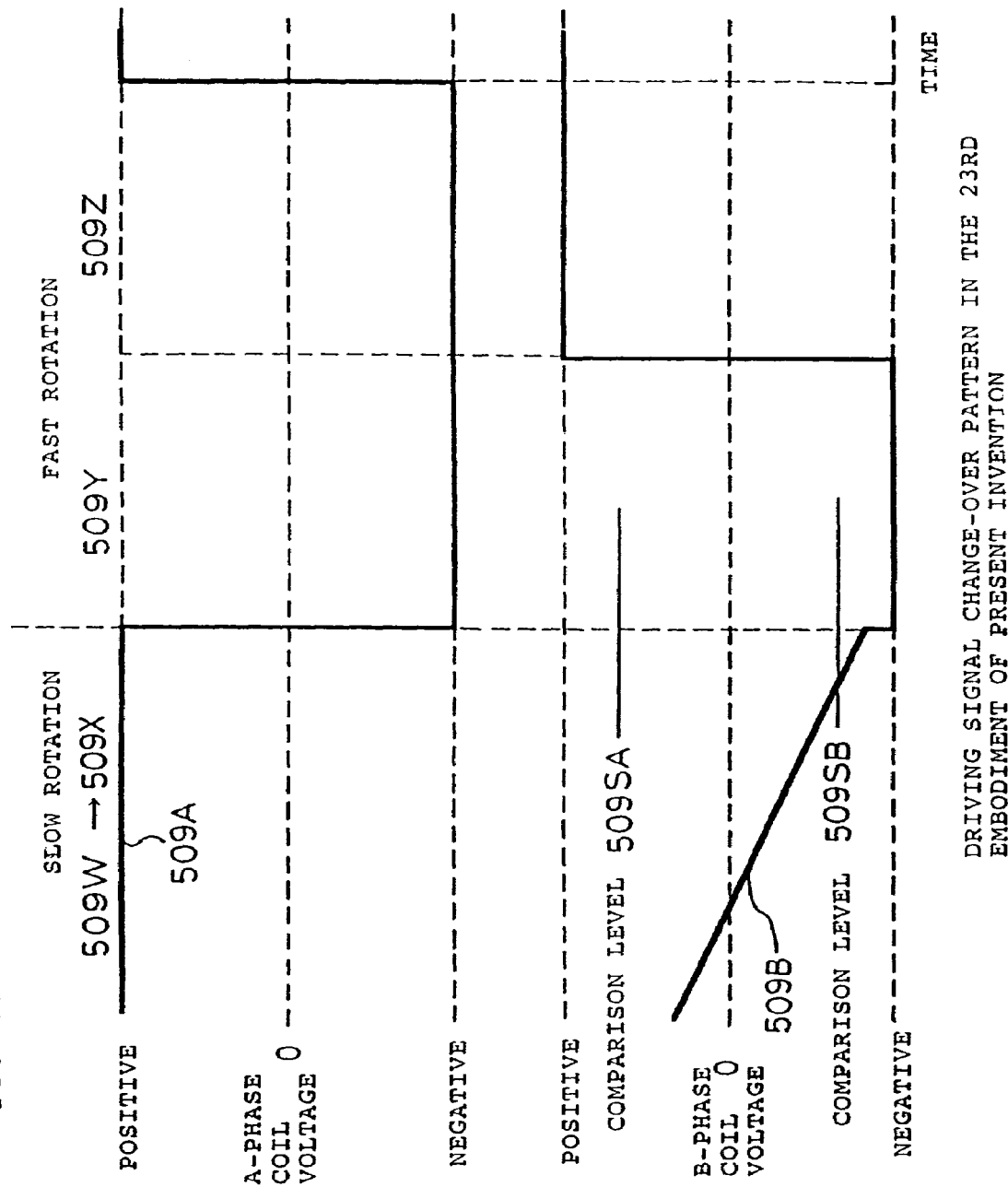
FIG. 37 is a wave form chart for a driving signal change-over pattern in the twenty-third embodiment of the present invention.

FIG. 37 is a wave form chart indicating a driving signal change-over pattern in the twenty-third embodiment of the present invention. In FIG. 37, the wave form 509A indicates the voltage wave form of the A-phase coil of the stepping motor and the wave form 509B indicates the voltage wave form of the B-phase coil of the stepping motor. The driving signal change-over pattern shown in FIG. 37 indicates that the stepping motor is controlled to be changed from slow to fast.

The slow rotation portion indicates a state change of the driving signal pattern 2 shown in FIG. 31 from 504W to 504X, corresponding to the state change from 509W to 509X shown in FIG. 37. This slow rotation portion corresponds to a slow movement of the point P shown in FIG. 29 from the position 502W to the position 502X.

The fast rotation portion indicates the states 503Y and 503Z of the driving signal pattern 1 shown in FIG. 30, corresponding to the states 509Y and 509Z shown in FIG. 37. This fast rotation portion corresponds to a movement of the point P shown in FIG. 29 to the position 502Y, then to the position 502Z.

Next, the operation of the disk apparatus in the twenty-third embodiment of the present invention will be explained with reference to FIGS. 29, 35, 36, and 37.

In FIG. 36, the controlling means 501E controls the first switch 501C and the second switch 501D using the change-over signal 501M. The controlling means 501E selects the driving signals 501H and 501J output from the first driving signal generating means 501A to rotate the stepping motor slowly. When the rotation speed of the stepping motor must be changed from slow to fast in such a case, the controlling means 501E compares the comparison level held in the controlling means 501E itself with the voltage of the driving signal 501H or 501J, whichever is being changed. This comparison level is used as a comparing value to decide whether or not the rotator is within the positions 508XA to 508XB shown in FIG. 35. This comparing value can be decided by the mechanical sliding load with respect to the torque of the stepping motor in the designing stage.

According to the result of the comparison, the controlling means 501E outputs a command signal 501P to decide the status-of the second driving signal generating means 501B. At the same time, the controlling means 501E changes over the first switch 501C and the second switch 501D using the change-over signal 501M to select the driving signals 501K and 501L output from the second driving signal generating means 501B.

The above-mentioned selecting operation will be explained more in detail with reference to FIG. 37.

FIG. 37 indicates that the B-phase coil voltage wave form 509B is being changed during a slow rotation, but not enters the state 509X yet completely when the rotation speed is changed to fast. In other words, in FIG. 29, the point P is being rotated slowly from the position 502W to the position 502X, and not reaches the position 502X yet.

In the conventional driving signal change-over pattern, the state.506X pattern is output as the first driving signal in a fast rotation as shown in FIG. 33. In other words, in a slow rotation just before it is changed to a fast rotation, unless the point P reaches the position 502X shown in FIG. 29, the point P is rotated to the position 502x shown in FIG. 29 completely with the first driving signal after the rotation speed is changed to fast, then the point P is rotated to the position 502Y.

On the contrary, in the twenty-third embodiment of the present invention, comparison levels 509SA and 509SB as shown in FIG. 37 are provided. The comparison levels are used to compare the voltage of each coil whose voltage is changed during a slow rotation with 509SA or 509SB to decide whether or not the point P shown in FIG. 29 is between the positions 508XA and 508XB shown in FIG. 35. If the voltage of a coil is changed from negative to positive during a slow rotation, the coil voltage is compared with the comparison level 509SA. If the coil voltage is greater than 509SA, the point shown in FIG. 29 exists between positions 508XA and 508XB shown in FIG. 35. If the coil voltage is changed from positive to negative during a slow rotation, the coil voltage is compared with the comparison level 509SB. And, if the coil voltage is lower than the 509SB, the point shown in FIG. 29 exists between positions 508XA and 508XB shown in FIG. 35.

If the point P shown in FIG. 29 exists between the positions 508XA and 508XB shown in FIG. 35, it is possible to generate a torque necessary for a fast rotation of the rotator to the next position 508Y. In other words, the driving signal needed in the conventional method to rotate the point P shown in FIG. 29 to the position 502X completely can be eliminated in this embodiment. Consequently, in the stepping motor controlling method in the twenty-third embodiment, the first driving signal in a fast rotation is not the driving signal for moving the point P to the position 502X, but it is the driving signal for moving the point P to the position 502Y.

In the case shown in FIG. 37, because the B-phase coil voltage wave form 509B is smaller than that of the comparison level 509SB when the rotation speed is changed, the state 509Y can be used for the first driving signal in a fast rotation. And, to generate the driving signal of this state 509Y, the controlling means 501E shown in FIG. 36 issues a command signal 501P to decide the status of the second driving signal generating means 501B.

When the controlling method in the twenty-third embodiment shown in FIG. 37 is compared with the conventional controlling method shown in FIG. 33 taking the above-mentioned into consideration, the controlling method shown in FIG. 37 can make the point P advance one position ahead within the same time. Consequently, the stepping motor controlling method in the twenty-third embodiment can accelerate the stepping motor quickly more than the conventional controlling method.

According to the twenty-third embodiment of the present invention, therefore, when the driving signal of the stepping motor is changed from slow to fast, the driving signal voltage is compared with the comparison level, so that the position of the stepping motor rotator is decided and the fast rotation driving signal can be issued one more state ahead than the conventional controlling method. The stepping motor controlling method in the twenty-third embodiment can thus accelerate the stepping motor more quickly than the conventional controlling method.

<<Twenty-fourth Embodiment>>

Figure 38:
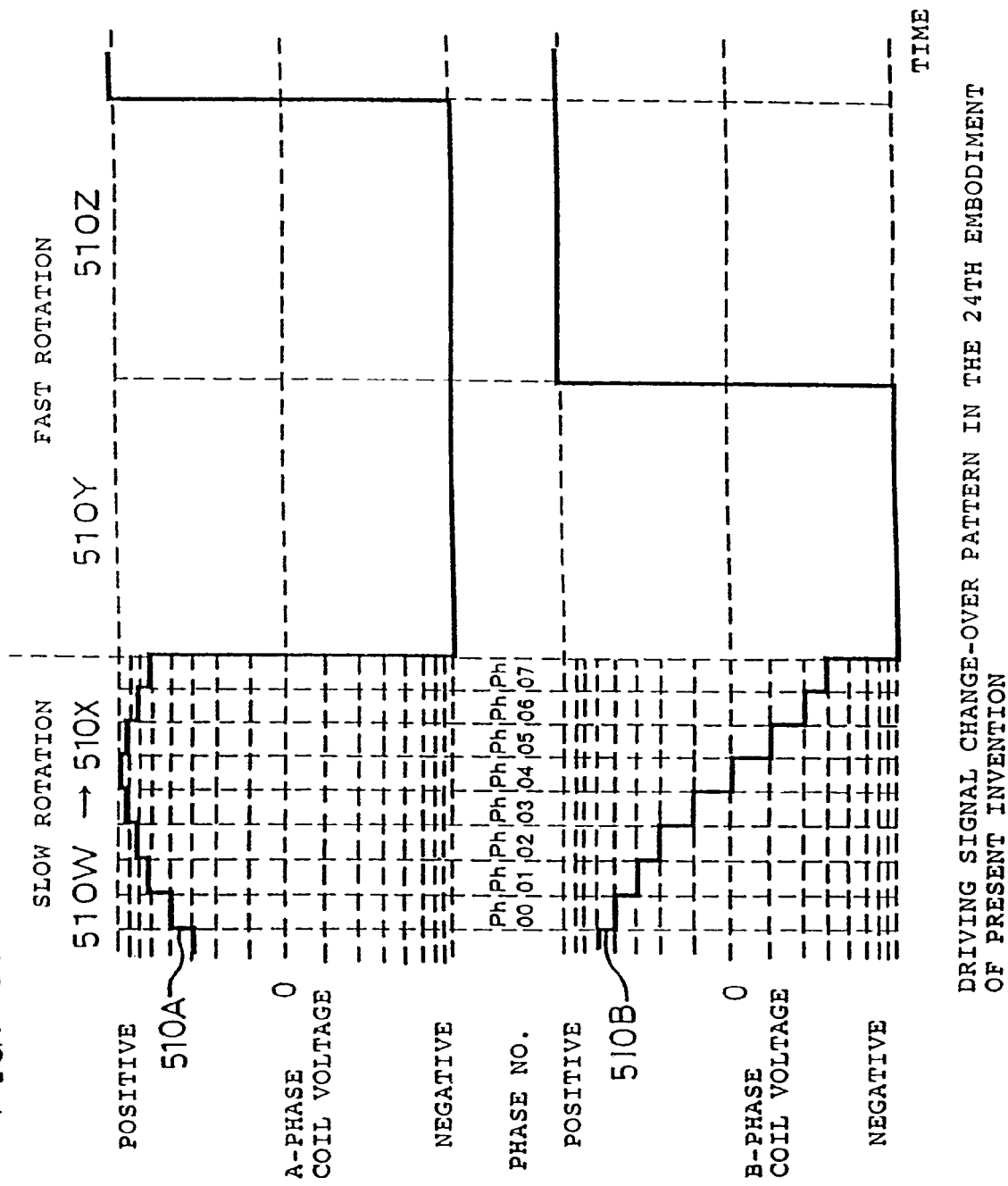
FIG. 38 is a wave form chart for the driving signal change-over pattern in the twenty-fourth embodiment of the present invention.

FIG. 38 is a wave form chart indicating a driving signal change-over pattern in the stepping motor controlling method defined in the twenty-fourth embodiment of the present invention.

In FIG. 38, the wave form 510A indicates the voltage wave form of the A-phase coil of the stepping motor and the wave form 510B indicates the voltage wave form of the B-phase coil of the stepping motor. The driving signal change-over pattern shown in FIG. 38 indicates a change of the stepping motor control from slow rotation to fast rotation. The slow rotation part indicates a change of the conventional driving signal pattern shown in FIG. 32 from the state 505W (phase number Ph00) to the state 505X (phase number Ph08), corresponding to the change from the state 510W to the state 510X in FIG. 38. This slow rotation part corresponds to the slow movement of the point P shown in FIG. 29 from the position 502W to the position 502X. The fast rotation part indicates the states 503Y and 503Z of the conventional driving signal pattern 1 shown in FIG. 30, corresponding to the states 510Y and 510Z shown in FIG. 38. This fast rotation part corresponds the movement of the point P shown in FIG. 29 to the position 502Y, then to the position 502Z.

Next, the operation of the stepping motor in the twenty-fourth embodiment of the present invention as explained above will be explained with reference to FIGS. 29, 32, 35, 36, and 38.

In FIG. 36, the controlling means 501E controls the first switch 501C and the second switch 501D using the change-over signal 501M to select the driving signals 501H and 501J output from the first driving signal generating means 501A to rotate the stepping motor slowly in the twenty-fourth embodiment.

If the rotation speed of the stepping motor must be changed from slow to fast in such a case, the controlling means E decides whether or not the phase number of the first driving signal generating means 501A is near a mechanical stability position. This phase number can be used to know the inside status of the first driving signal generating means 501A using the command signal 501N.

For example, the state 505X (phase number Ph08) indicates in FIG. 32 that the point P shown in FIG. 29 is at the mechanical stability position 502X. The phase numbers Ph07 and Ph09 which are positioned one phase number before and after the phase number Ph08 shown in FIG. 32, indicate that the point P shown in FIG. 29 is positioned near a mechanical stability position 502X. In other words, it can be decided by the phase number whether or not the rotator of the stepping motor exists within the positions 508XA to 508XB shown in FIG. 35. This is also true for other mechanical stability positions. The phase numbers Ph15 and Ph17, which are one phase number before and after the state 505Y (phase number Ph16) shown in FIG. 32, indicate that the point P exists near a mechanical stability position.

The correspondence between the range within positions 508XA to 508XB shown in FIG. 35 and the range of phase numbers shown in FIG. 32 can be decided by the micro-step resolution and the mechanical sliding load with respect to the stepping motor torque in the designing stage.

According to the comparison between phase numbers, the controlling means 501E outputs a command signal 501P to decide the status of the second driving signal generating means 501B and changes over the first switch 501C and the second switch 501D using the change-over signal 501M to select the driving signals 501K and 501L output from the second driving signal generating means 501B.

Although the B-phase coil voltage wave form 510B is being changed during a slow rotation in FIG. 38, the point P is not rotated to the state 510X (Ph08) completely yet when the rotation speed is changed from slow to fast. In other words, the point P shown in FIG. 29 is being changed from the position 502W to the position 502X slowly and not reach the position 502X completely yet In the conventional driving signal change pattern, the state 507X driving signal is output as the first driving signal in a fast rotation as shown in FIG. 34. In other words, in a slow rotation just before being changed to a fast rotation, unless the point P shown in FIG. 29 reaches the position 502X completely, the point P is rotated to the position 502X completely with the first driving signal for a fast rotation, then rotated to the next position 502Y.

On the contrary, in the twenty-fourth embodiment of the present invention, if the rotation speed is changed from slow to fast before the point P reaches the state 510X (phase number Ph08) in a slow rotation as shown in FIG. 38, phase numbers are compared to know whether or not Ph07 or Ph09, which is before or after the phase number Ph08, is already reached. With this, it can be decided whether or not the point P shown in FIG. 29 exists between the positions 508XA and 508XB shown in FIG. 35.

In the case shown in FIG. 38, when the rotation speed is changed, the point P shown in FIG. 29 already reaches Ph07, so the state 510Y can be used as the first driving signal for a fast rotation. To generate this state 510Y driving signal, the controlling means 501E shown in FIG. 36 decides the status of the second driving signal generating means 501B using the command signal 501P.

When the controlling method in the twenty-fourth embodiment shown in FIG. 38 is compared with the conventional controlling method shown in FIG. 34 taking the above-mentioned into consideration, the controlling method shown in FIG. 38 can make the point P advance one position ahead within the same time. Consequently, the stepping motor controlling method in the twenty-fourth embodiment can accelerate the stepping motor more quickly than the conventional controlling method.

According to the twenty-fourth embodiment of the present invention, therefore, when the driving signal of the stepping motor is changed from slow to fast, the phase numbers of the driving signal generating means are compared to decide the position of the stepping motor rotator, so that the fast rotation driving signal can be started one more state ahead than the conventional controlling method. Thus, the stepping motor controlling method in the twenty-fourth embodiment can accelerate the stepping motor more quickly than the conventional controlling method.

The stepping motor controlling methods in the twenty-third and twenty-fourth embodiments may also be formed with software instead of a circuit as shown in FIG. 36. If such the software is used, the exciting means 501F and 501G, the A-phase coil (501S), and the B-phase coil (501T) shown in FIG. 36 are formed with a circuit respectively, but other items may be formed with the software incorporated in an arithmetic operation LSI such as a microcomputer and a DSP (Digital signal processor) respectively.

As explained in the twenty-third and twenty-fourth embodiments, the controlling means 501E executes processings to form driving signal patterns, compare/compute driving signals, decide phase numbers, and change over driving signal patterns to output the voltage value of each driving signal, which becomes the final computation result, to the exciting means 501F and 501G as a digital signal. The exciting means 501F and 501G converts the voltage values of those digital signals to analog signals via a PWM converter and a D/A converter, then amplifies the analog signals to excite object coils.

In the twenty-second to twenty-fourth embodiments of the present invention, therefore, it is decided whether or not the rotator of the stepping motor is positioned near a mechanical stability position of the stepping motor according to the voltage value of the driving signal in a slow rotation or the state number owned by the driving signal generating means when the control of the stepping motor is changed from slow to fast rotation. When the rotator of the stepping motor is positioned near a mechanical stability position, the controlling means 501E outputs a driving signal for rotating the stepping motor to the next mechanical stability position of the above-mentioned mechanical stability position in the rotating direction of the stepping motor.

According to the controlling method in the twenty-second to twenty-fourth embodiments, therefore, the driving signal, after the rotation of the stepping motor is changed from slow to fast, can move the rotator of the stepping motor to a mechanical stability position one more ahead than the conventional controlling method within the same time. As a result, the controlling method in the twenty-second to twenty-fourth embodiments can accelerate the stepping motor more quickly than the conventional controlling method.

When any of the stepping motor controlling methods defined in the twenty-second to twenty-fourth embodiments of the present invention is used for a disk apparatus, it is possible to obtain an effect that the disk apparatus access time can be shortened significantly.

<<Twenty-fifth Embodiment>>

In recent years, high speed accessing performance is required for disk apparatuses to feed the pick-up to a target position on the disk quickly. A disk apparatus that uses a stepping motor as a traverse motor for feeding the pick-up is already commercialized. Since the stepping motor is rotated in units of a fixed step angle with respect to the driving pulses, it is easy to open-control the feeding distance of the pick-up and it needs no position detecting means. When using such a stepping motor for a disk apparatus, therefore, the pick-up feeding mechanism can be simplified. In addition, since the stepping motor is rotated synchronously with the frequency (pulse rate) of the driving pulses, it is easy to control the rotation speed of the stepping motor.

Figure 39:
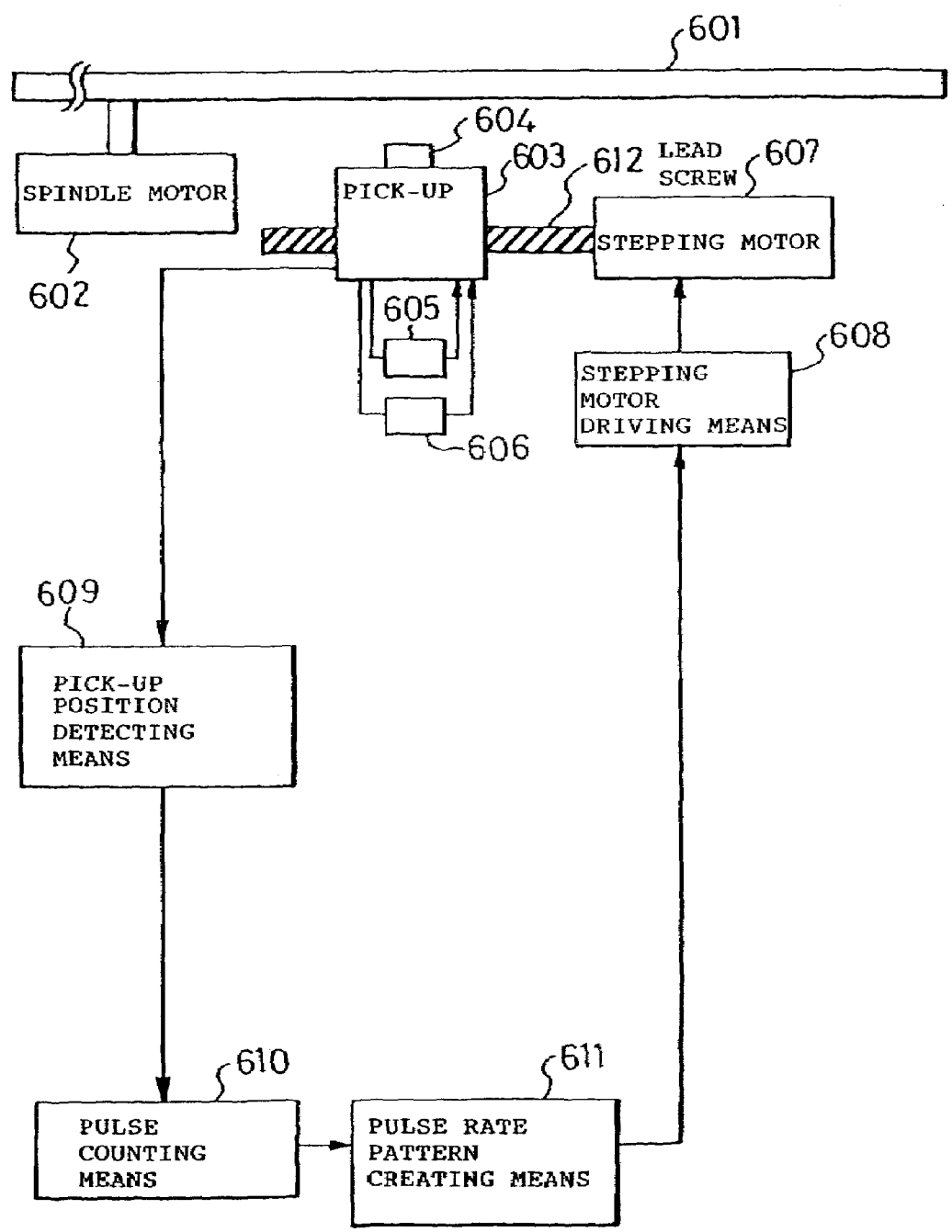
FIG. 39 is a block diagram for a configuration of a conventional disk apparatus.
Figure 40:
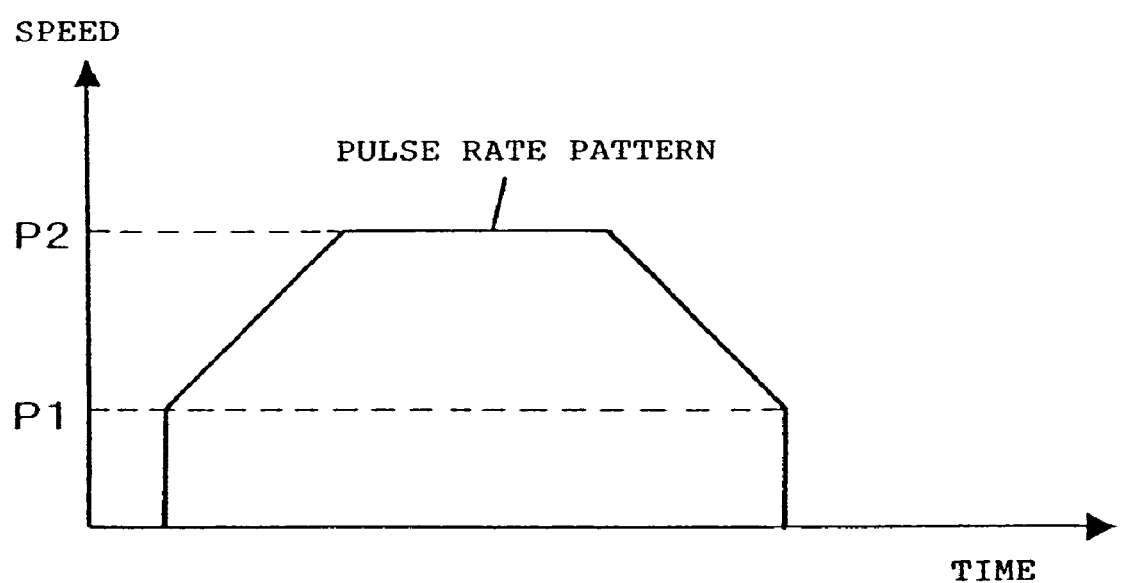
FIG. 40 is a wave form chart indicating a driving pulse rate of a conventional stepping motor.

Hereunder, a conventional disk apparatus will be explained with reference to the attached drawings. FIG. 39 is a block diagram for a configuration of the conventional disk apparatus. FIG. 40 is a wave form chart indicating a frequency change (pulse rate pattern) of the driving pulses in the prior art.

In FIG. 39, a disk 601 having a helically-formed information tracks is rotated by a spindle motor 602. On/from the disk 601 is recorded/played back information via a pick-up 603. The pick-up 603 is provided with a lens 604. This lens 604 is provided movably by a focus actuator and a tracking actuator (both not illustrated) incorporated in the pick-up 603 magnetically in both vertical and horizontal directions. A focus servo means 605 drives the focus actuator according to the focus error signal indicating a displacement value of the lens 604 from the disk 601 so that the lens 604 is kept away by a fixed distance from the disk 601. The tracking servo means 606 drives the tracking actuator so that the lens 604 follows up a given information track on the disk 601 according to the tracking error signal indicating a displacement value of the lens 604 from the center of the tracks on the disk 601. The spindle motor 607 moves the pick-up 603 in the radial direction of the disk 601. The stepping motor driving means 608 applies a driving voltage to the, stepping motor 607. The pick-up position detecting means 609 detects the current position of the pick-up 603 from the address information included in the data read by the pick-up 603. The pulse counting means 610 counts the number of pulses for driving the stepping motor necessary to move the pick-up 603 from the current position of the pick-up 603 detected by the pick-up position detecting means 609 to a target address entered from an external device. The pulse rate pattern creating means 611 creates a frequency change (pulse rate) pattern of the input pulses, entered to the stepping motor driving means 608, according to the number of pulses counted by the pulse counting means 610. A feed screw 612 holds the pick-up 603 movably in the radial direction of the disk 601 and transmits the torque of the stepping motor 607 to the pick-up 603.

Next, the operation for moving the pick-up 603 fast in a general disk apparatus formed as explained above will be explained.

The lens 604 is controlled by the focus servo means 605 and the tracking servo means 606 so that it can read information from the disk 601 via the pick-up 603. The focus servo means 605 controls the lens 604 so that the lens 604 can be kept focused on the disk 601. In addition, the tracking servo means 606 is controlled by an electromagnetic actuator (not illustrated) so that the lens 604 can keep following up the target track on the disk 601.

To access a given track, the pulse counting means 610 counts the number of pulses necessary to move the pick-up 603 from the current position detected by the pick-up position detecting means 609 to a target position. Then, the tracking servo means 606 is stopped and the pulse rate pattern creating means 611 creates a pulse rate as shown in FIG. 40 and outputs the pulse rate to the stepping motor driving means 608. The pulse rate shown in FIG. 40 is a general driving signal pattern for driving the stepping motor 607. The stepping motor driven by the stepping motor driving means 608 at this pulse rate moves the pick-up 603. After the pick-up 603 reaches a specified position, the tracking servo means 606 is started again to record information.

The pulse rate shown in FIG. 40 is output from the pulse rate pattern creating means 611 being composed of a microcomputer, etc. Next, the pulse rate created by the pulse rate pattern creating means 611 will be explained.

As shown in the pulse rate in FIG. 40, an output is started at a speed that the stepping motor 607 can start up without stepping it out. (Such a speed is referred to as a self-starting frequency, which is indicated with the level P1 in FIG. 40). A step-out mentioned here means the status of abnormal rotation of the stepping motor, caused when the stepping motor 607 go out of step with the entered pulse rate.

After this, the pulse rate is raised at a fixed pulse rate change rate until a desired speed (frequency indicated with P2 in FIG. 40) is reached. After the stepping motor is rotated at the frequency speed indicated with P2 for a specified time, the pulse rate is lowered so as to become symmetrical to the pattern of the pulse rate when it was raised, then the output of pulses is stopped.

In the above-mentioned configuration, however, the frictional load of the mechanism for generating and transmitting a driving force is changed from the initial design value due to a great change of the ambient temperature and degradation of the mechanism parts with time. Consequently, problems arise; for example, the pick-up cannot be moved and it takes more time to move the pick-up to a target position on the disk arise. These problems can be solved by detecting the step-out of the stepping motor using a rotation detecting means being comprised of, for example, an encoder, and when a step-out is detected, the generated torque is controlled by a means of changing the motor driving voltage and so on. The above-mentioned problems can also be solved by driving the stepping motor at a slow pulse rate. However, the means for detecting step-out is expensive. And in the case that the pulse rate is lowered, another problem that the accessing performance is degraded arises.

In addition to the pick-up traverse mechanism, the disk apparatus defined in the twenty-fifth embodiment of the present invention is provided with a means of detecting the step-out of the stepping motor without using any special detector; a means of changing the driving voltage and the driving pulse rate of the stepping motor according to the detection result of the step-out detecting means; and a means of changing the driving pulse rate. With such a configuration, the disk apparatus can move the pick-up fast and stably even when the frictional load of any mechanism is changed.

[Configuration of the Disk apparatus in the Twenty-fifth Embodiment]

Hereunder, a configuration of the twenty-fifth embodiment of the present invention will be explained more in detail with reference to the attached drawings.

Figure 41:
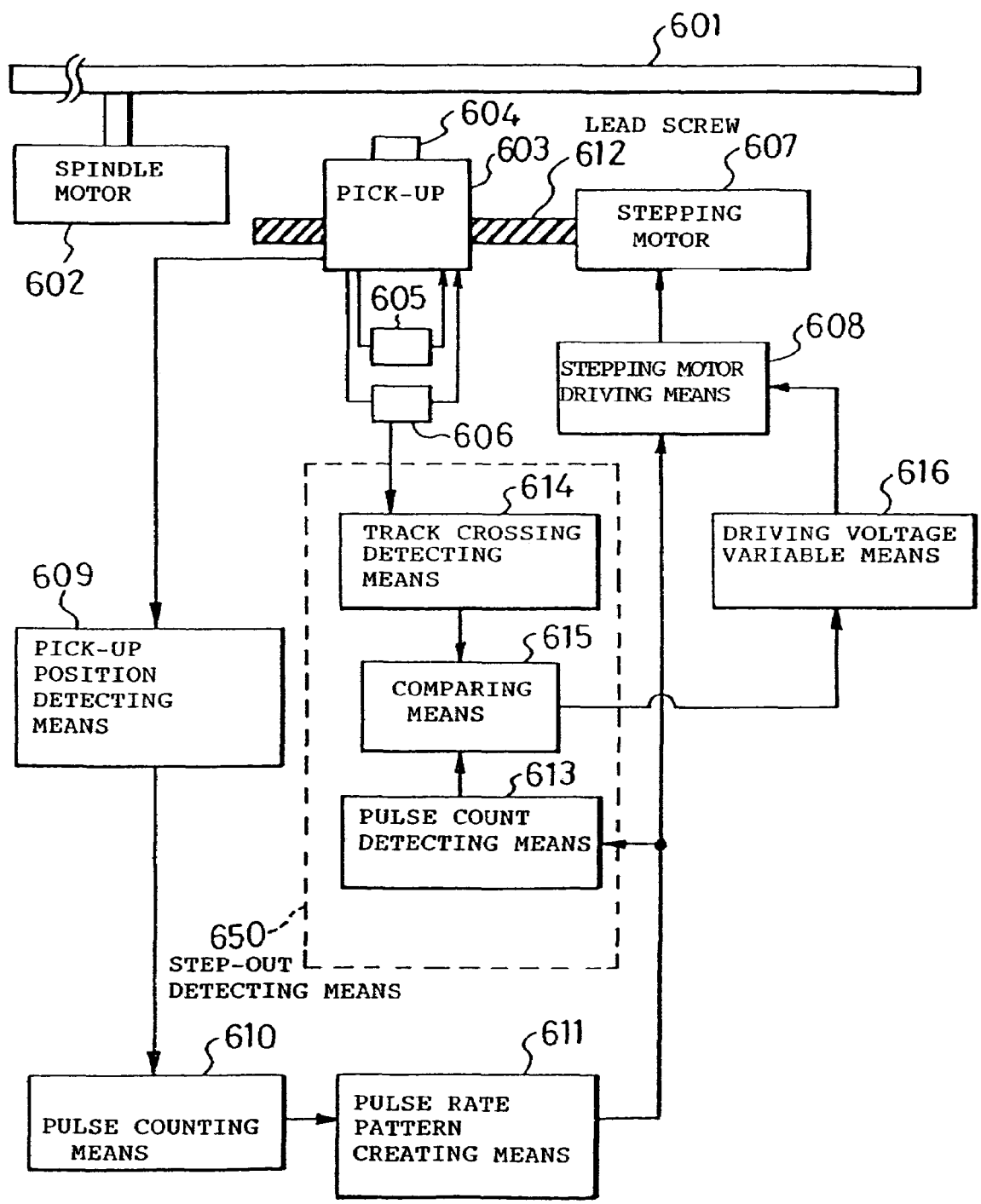
FIG. 41 is a block diagram for a configuration of the disk apparatus in the twenty-fifth embodiment of the present invention.
Figure 42:
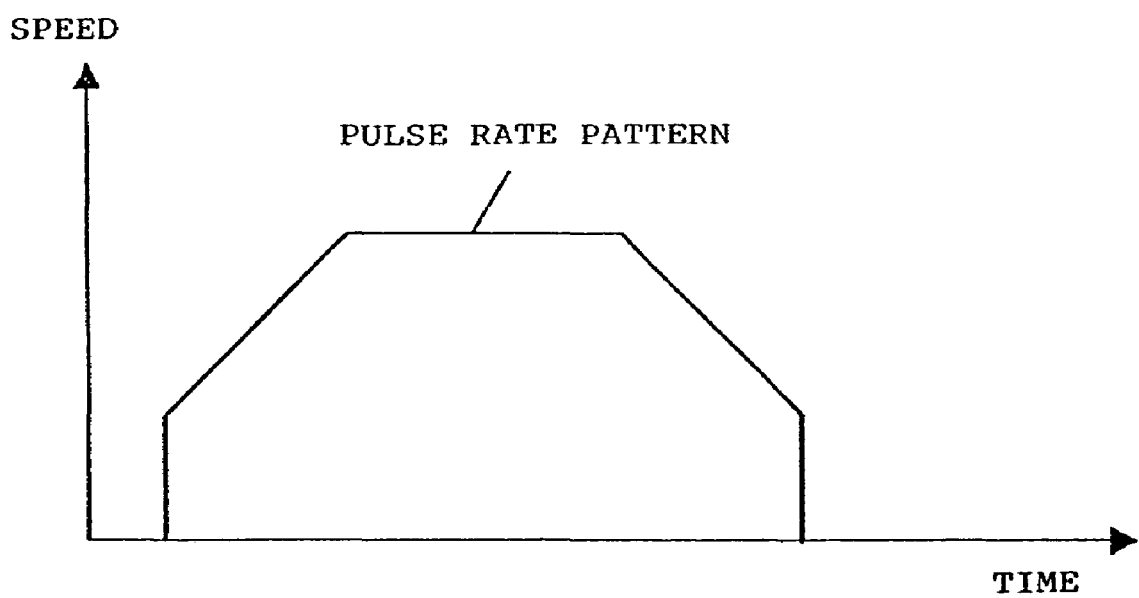
FIG. 42 is a wave form chart indicating a driving pulse rate of the stepping motor in the twenty-fifth embodiment of the present invention.

FIG. 41 is a block diagram for the configuration of the disk apparatus defined in the twenty-fifth embodiment of the present invention. FIG. 42 is a wave form chart indicating a pulse rate pattern used in the twenty-fifth embodiment.

In FIG. 41, the disk 601 having helically-formed tracks is rotated by the spindle motor 602. Information is recorded/played back on/from the information tracks of the disk 601 via the pick-up 603. The pick-up 603 is provided with a lens 604. This lens 604 is provided movably by the focus actuator and the tracking actuator (not illustrated) incorporated in the pick-up 603 both in the vertical and horizontal directions magnetically. The focus servo means 605 drives the focus actuator so that the lens 604 is kept away from the disk 601 by a fixed distance according to the focus error signal indicating a displacement value from the disk 601.

The tracking servo means 606 drives the tracking actuator so that the lens 604 follows up a given information track on the disk 601 according to the tracking error signal indicating a displacement value of the lens 601 from the center of the tracks on the disk 601. The stepping motor 607 moves the pick-up 603 in the radial direction of the disk 601. The stepping motor driving means 608 applies a driving voltage to the stepping motor 607. The pick-up position detecting means 609 detects the current position of the pick-up 603 from the address information included in the data read by the pick-up 603. The pulse counting means 610 counts the number of pulses for driving the stepping motor 607, which is needed to move the pick-up 603 from the current position of the pick-up 603 detected by the pick-up position detecting means 609 to a target address entered from external. The pulse rate pattern creating means 611 creates a frequency change (pulse rate) pattern of the input pulses, entered to the stepping motor driving means 608, according to the number of pulses counted by the pulse counting means 610.

The driving pulse count detecting means 613 is comprised of a digital circuit or a CPU, etc. and used for detecting the number of driving pulses output from the pulse rate pattern creating means 611. Receiving signals from the tracking servo means 606, the track crossing detecting means 614 detects the number of tracks crossed by the pick-up 303.

The comparing means 615 converts the output of the driving pulse count detecting means 613 to the number of tracks according to the resolution of the stepping motor 607 and compares this converted value with the number of tracks crossed by the pick-up 303, output from the track crossing detecting means 614 The comparing means 615, when it is over the specified value, decides the difference to be a step-out and outputs,a step-out detection signal. The driving voltage variable means 616 divides the driving voltage of the stepping motor 607 into n steps (n: an interger of 2 or over) according to the step-out detection signal output from the comparing means 615. The feed screw 612 holds the pick-up 603 movably in the radial direction of the disk 601 and transmits the torque of the stepping motor 607 to the pick-up 603.

[Operation of the Disk Apparatus in the Twenty-fifth Embodiment]

Hereunder, the operation of the disk apparatus defined as explained above in the twenty-fifth embodiment of the present invention will be explained.

The lens 604 is controlled by the focus servo means 605 and the tracking servo means 606 to read information from the disk 601 via the pick-up 603. The focus servo means 605 controls the lens 605 so that the lens 604 can be kept focused on the disk 601. The tracking servo means 606 is controlled by an electromagnetic actuator (not illustrated) so that the lens 604 can keep following up the target track of the disk 601. While the lens 604 follows up the information track of the disk 601, however, the step-out detecting means 650 being comprised of the track crossing detecting means 614, the driving pulse count detecting means 613, and the comparing means 615 is stopped.

After this, to access a given track, the current position of the pick-up is detected first. To detect the current position, the data including the address information is read from the disk 601 via the pick-up 603. The pick-up position detecting means 609 detects the current position of the pick-up 603 from the address information. The pulse counting means 610 then counts the number of pulses necessary for moving the pick-up from the detected current position to a target track.

After this, the tracking servo means 606 is stopped, then a pulse rateas shown in FIG. 42 is created by the pulse rate pattern creating means 611 being comprised of a microcomputer, etc. This pulse rate is output to the stepping motor driving means 608. The stepping motor driving means 608 drives the stepping motor 607 at the received pulse rate to move the pick-up 603. After the pick-up 603 reaches a target position, the tracking servo means 606 is started again to record/play back information.

While the pick-up 603 is moved, the driving pulse count detecting means 613 counts up according to the output of the pulse rate pattern creating means 611. Furthermore, the track crossing detecting means 614 counts the number of tracks crossed by the lens 604 according to the movement of the pick-up 603. When the stepping motor 607 is rotated synchronously with the pulse output from the pulse rate pattern creating means 611, the rotating distance of the stepping motor 607 corresponds to the moving distance of the pick-up 603. Consequently, the output of the driving pulse count detecting means 613 corresponds to the moving distance of the pick-up 603 and the track cross detecting means 614 outputs a value corresponding to the moving distance of the pick-up 604. The difference between the moving distance of the pick-up 603 and the moving distance of the lens 604 is within the movable range of the lens 604 with respect to the pick-up 603.

Next, a case that the stepping motor 607 is desynchronized (stepped out) will be explained. In such a desynchronizing, the driving pulse count detecting means 613 counts up according to the output of the pulse rate pattern creating means 611. However, because the pick-up 603 is not moved by a specified distance yet at such a time, the track crossing detecting means 614 cannot count up the number of tracks crossed by the pick-up 603 any longer. The difference between the output of the driving pulse count detecting means 613 and the output of the track crossing detecting means 614 thus becomes a great value. This output difference is measured by the comparing means 615 and when the difference is great, it is decided that the stepping motor is stepped out. When the comparing means 615 decides the stepping motor to be stepped out, the comparing means 615 outputs a step-out detection signal to the driving voltage variable means 616. Receiving the step-out detection signal, the driving voltage variable means 616 raises the voltage for driving the stepping motor 607. Consequently, the torque generated in the stepping motor 607 is increased and the stepping motor 607 is restored from the step-out caused by a change of the driving load.

Since the disk apparatus defined in the twenty-fifth embodiment is formed as explained above, if the driving load is changed by an ambient temperature change, degradation of any mechanism part with time, etc., the step-out of the stepping motor is detected, so that the driving voltage of the stepping motor 607 is controlled properly. The disk apparatus defined in the twenty-fifth embodiment can thus transmit the optimal driving force to the pick-up 603 and move the pick-up. 603 fast.

<<Twenty-sixth Embodiment>>

Figure 43:
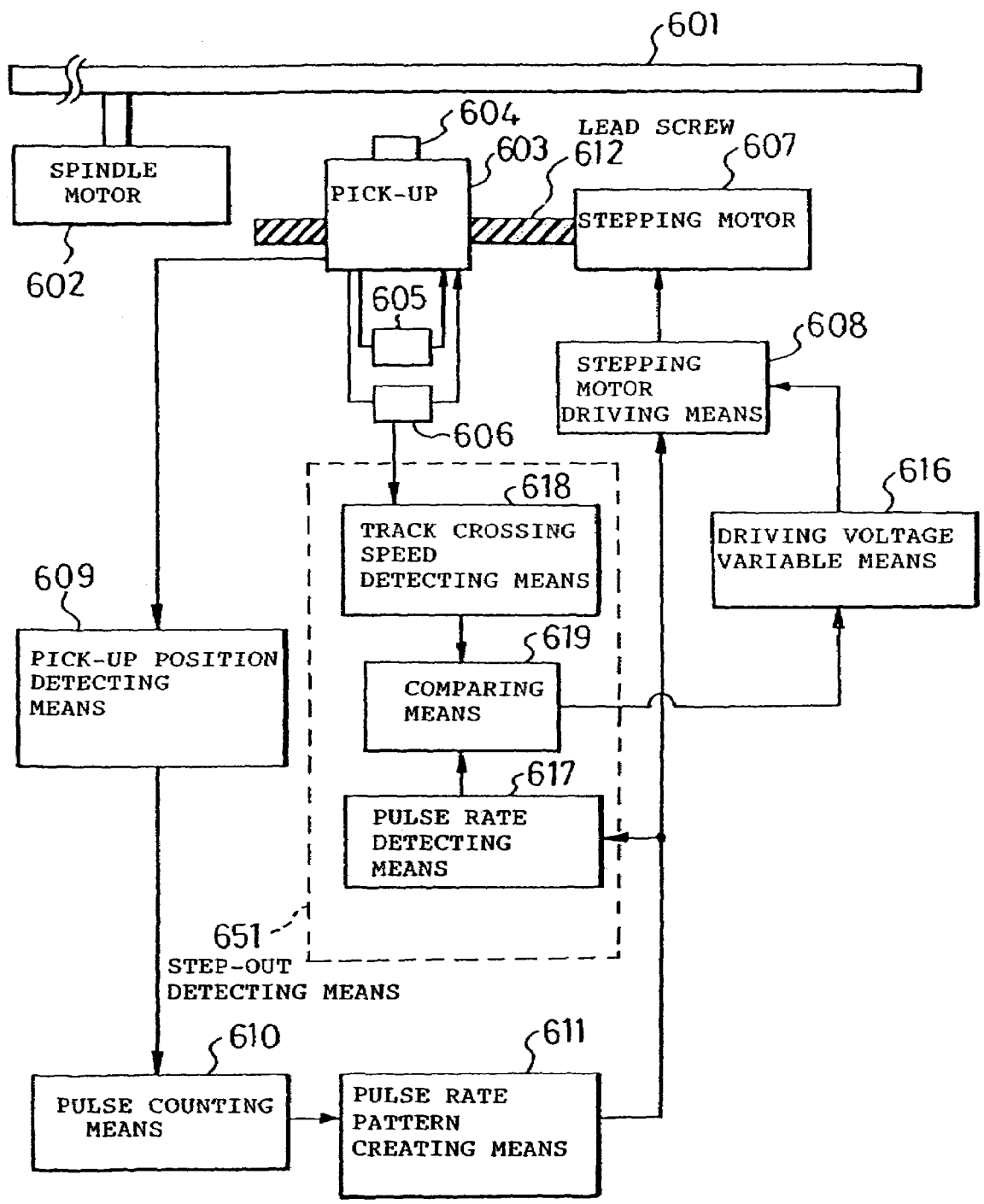
FIG. 43 is a block diagram for a configuration of the disk apparatus in the twenty-sixth embodiment of the present invention.

Hereunder, the disk apparatus defined in the twenty-sixth embodiment of the present invention will be explained with reference to the attached drawings. FIG. 43 is a block diagram for a configuration of the disk apparatus in the twenty-sixth embodiment. In FIG. 43, the same configuration items as those in the twenty-fifth embodiment will be given the same numerals, omitting redundant explanation.

In FIG. 43, the pulse rate detecting means 617 is being comprised of a digital circuit or a CPU, etc. and used to detect the frequency (pulse rate) of the driving pulses output from the pulse rate pattern creating means 611. The track crossing speed detecting means 618 receives signals from the tracking servo means 606 and detects a relative speed of the lens 604 with respect to the tracks according to the number of tracks crossed by the pick-up 603 and the time required for the crossing. The comparing means 619 converts the output of the pulse rate detecting means 617 to a value of the same unit as that of the track crossing speed according to the resolution of the stepping motor 607 and compares this converted value with the output of the track crossing speed detecting means 618. The comparing means 619, when the difference between the above-mentioned converted value and the output of the track crossing speed detecting means 618 reaches a specified value, regards the state to be a step-out and outputs a step-out detection signal.

The step-out detecting means 651 is comprised of the pulse rate detecting means 617, the track crossing speed detecting means 618, and the comparing means 619. The driving voltage variable means 616 divides the driving voltage of the stepping motor 607 into n steps (n: an interger of 2 or over) according to the step-out detection signal from the comparing means 619.

[Operation of the Disk Apparatus in the Twenty-sixth Embodiment]

Hereunder, the operation of the disk apparatus in the twenty-sixth embodiment of the present invention will be explained.

The lens 604 is controlled by the focus servo means 605 and the tracking servo means 606 to read information from the disk 601 via the pick-up 603. The focus servo means 605 controls the lens 605 so that the lens 604 can be kept focused on the disk 601. The tracking servo means 606 is controlled by an electromagnetic actuator (not illustrated) so that the lens 604 can keep following up the target track of the disk 601. While the lens 604 follows up the information track of the disk 601, however, the step-out detecting means 651 being comprised of the track crossing speed detecting means 618, the pulse rate detecting means 617, and the step-out detecting means 651 is stopped.

After this, to access a given track, the current position of the pick-up is detected first. To detect the current position, the data including the address information is read from the disk 601 via the pick-up 603. The 609 detects the current position of the pick-up 603 from the address information. The pulse counting means 610 then counts the number of pulses necessary for moving the pick-up from the detected current position to a target track.

After this, the tracking servo means 606 is stopped, then a pulse rate as shown in FIG. 42 is created by the pulse rate pattern creating means 611 being comprised of a microcomputer, etc. This pulse rate is output to the stepping motor driving means 608. The stepping motor driving means 608 drives the stepping motor 607 at the received pulse rate to move the pick-up 603. After the pick-up 603 reaches a target position, the tracking servo means 606 is started again to record/play back information.

While the pick-up 603 is moving, the pulse rate detecting means 617 detects the speed in the pulse rate shown, for example, in FIG. 42, output from the pulse rate pattern creating means 611. Furthermore, the track crossing speed detecting means 618 counts the number of tracks crossed by the pick-up 603 according to the movement of the pick-up 603 to detect the speed of the pick-up 603. When the stepping motor 607 is rotated synchronously with the pulse output from the pulse rate pattern creating means 611, the rotation speed of the stepping motor 607 corresponds to the moving speed of the pick-up 603. Consequently, the output of the pulse rate detecting means 617 corresponds to the moving speed of the pick-up 603. The output of the track crossing speed detecting means 618 indicates the moving speed of the lens 604. This is why the difference between the moving speed of the pick-up 603 and the moving speed of the lens 604 is controlled within a fixed value.

Next, a case that the stepping motor 607 is desynchronized (stepped out) will be explained.

The pulse rate detecting means 617-detects the speed in the pulse pattern shown in FIG. 42 according to the output of the pulse rate pattern creating means 611. If desynchronizing (step-out) occurs, however, the track crossing speed detecting means 618 detects that the speed of the lens 604 is reduced almost to 0. Because, the pick-up 603 stops and there is no track to be crossed by the lens 604. As a result, the difference between the output of the pulse rate detecting means 617 and the output of the track crossing speed detecting means 618 is increased greatly, the comparing means 619 detects a step-out and outputs a step-out detection signal to the comparing means 619. Receiving the step-out detection signal, the comparing means 619 raises the voltage for driving the stepping motor 607. The torque generated in the stepping motor 607 is thus increased to restore the stepping motor 607 from the step-out caused by a change of the driving load.

Since the disk apparatus in the twenty-sixth embodiment is formed such way, it is possible to detect a step-out to occur in the stepping motor when a driving load change is caused by an ambient temperature change, degradation of mechanism parts with time, etc., so that the driving voltage of the stepping motor 607 is controlled properly. And accordingly, the disk apparatus in the twenty-sixth embodiment can transmit the optimal driving force to the pick-up 603 to move the pick-up 603 fast.

<<Twenty-seventh Embodiment>>

Figure 44:
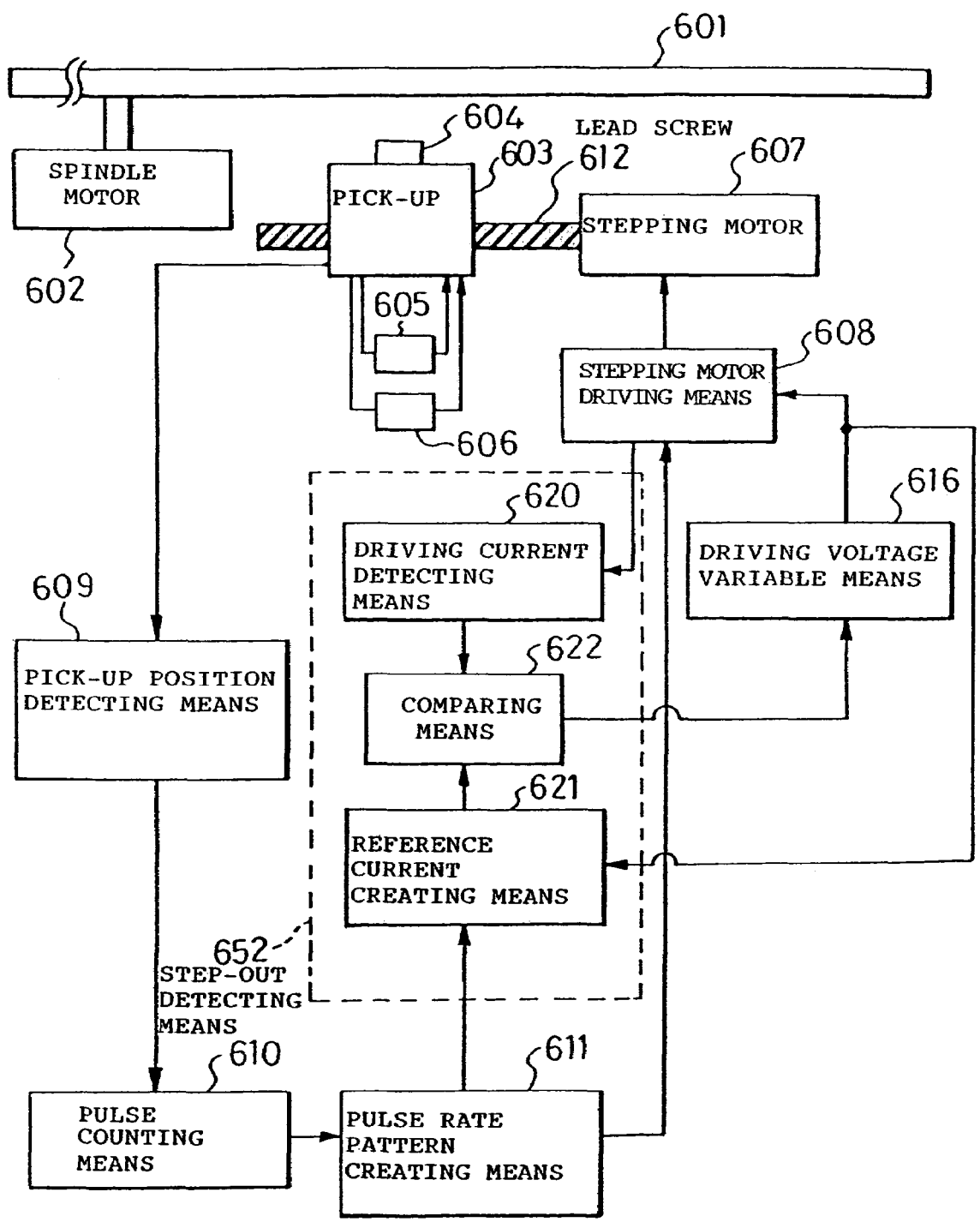
FIG. 44 is a block diagram for a configuration of the disk apparatus in the twenty-sixth embodiment of the present invention.
Figure 45:
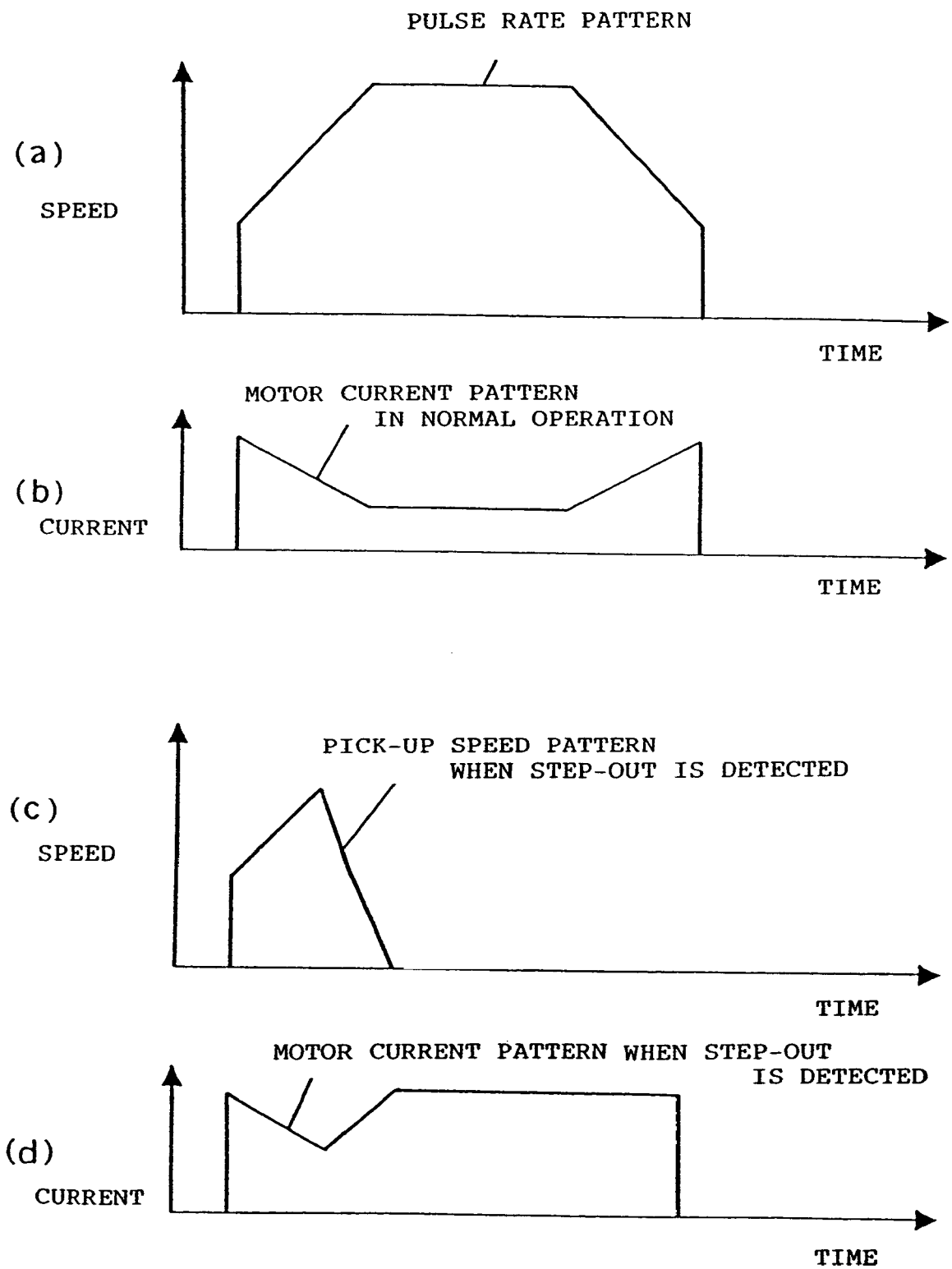
FIG. 45 is a wave form chart for the driving pulse rate of the stepping motor and the current flowing in the stepping motor in the twenty-seventh embodiment of the present invention.

Next, the disk apparatus in the twenty-seventh embodiment of the present invention will be explained with reference to the attached drawings. FIG. 44 is a block diagram for a configuration of the disk apparatus in the twenty-seventh embodiment of the present invention. In FIG. 44, the same configuration items as those in the twenty-fifth embodiment will be given the same numerals, omitting redundant explanation. FIG. 45 indicates a pulse pattern (a) to be entered to the stepping motor 607, current patterns (b) and (d) flowing in the stepping motor 607, and a rotation speed (c) pattern of the stepping motor 607 in the twenty-seventh embodiment In FIG. 44, the driving current detecting means 620 detects the current volume supplied from the stepping motor driving means 608 to the stepping motor 607. The reference current creating means 621 outputs a signal representing the reference current volume according to the frequency of the pulses output from the pulse rate pattern creating means 611 and the voltage supplied from the driving voltage variable means 616 to the stepping motor 607. The comparing means 622 compares the output value of the driving current detecting means 620 with the output value of the reference current creating means 621 and when the difference absolute value exceeds a specified value, the comparing means 622 regards it as a step-out and outputs a step-out detection signal to the driving voltage variable means 616. The driving voltage variable means 616 divides the driving voltage of the stepping motor 607 into n steps (n: an interger of 2 or over) according to the step-out detection signal from the comparing means 622 provided in the step-out detecting means 652. The step-out detecting means 652 is composed of the driving current detecting means 620, the reference current creating means 621, and the comparing means 622.

[Operation of the Disk Apparatus in the Twenty-seventh Embodiment]

Next, the operation of the disk apparatus formed as explained above in the twenty-seventh embodiment of the present invention will be explained.

The lens 604 is controlled by the focus servo means 605 and the tracking servo means 606 to read information from the disk 601 via the pick-up 603. The focus servo means 605 controls the lens 604 so that the lens 604 can be kept focused on the disk 601. The tracking servo means 606 controls the lens 604-using an electromagnetic actuator so that the lens 604 can keep following up the tracks on the disk 601. While the lens 604 follows up the tracks on the disk 601, however, the step-out detecting means 652 being comprised of the driving current detecting means 620, the reference current creating means 621, and the comparing means 622 stops.

After this, the current position of the pick-up 603 is detected to access a given track. For this accessing, the data including the address information is read from the disk via the pick-up 603. The pick-up position detecting means 609 uses the address information to detect the current position of the pick-up 603. The pulse counting means 610 counts the number of pulses necessary for moving the pick-up 603 from the detected current position to a target track.

Then, while the tracking servo means 606 stops, the pulse rate pattern creating means 611 being composed of a microcomputer, etc. creates a pulse rate as shown in (a) of FIG. 45 and outputs the pulse rate to the stepping motor driving means 608. The stepping motor driving means 608 uses the received pulse rate to drive the stepping motor 607 to move the pick-up 603.

When the pick-up 603 reaches the target track, the disk apparatus restarts the tracking servo means 606 again to record/play back information.

(b) of FIG. 45 indicates a current volume flowing in the stepping motor 607 on the time axis (horizontal axis) while the pick-up in the traverse mechanism in the twenty-seventh embodiment is moving. The current pattern of the stepping motor 607 shown in (b) of FIG. 45 is for a case in which the stepping motor does not step out.

When V1 is defined as a driving voltage applied to the stepping motor 607 by the driving voltage variable means 616, Ea is defined as a counter electromotive voltage generated in the stepping motor 607 and decided by the rotation speed, and R is defined as a resistance value of the stepping motor 607, then the current I represented as $(V1-Ea)/R$ is flown in the stepping motor 607.

In the disk apparatus defined in the twenty-seventh embodiment, the reference current creating means 621 has a table or an expression defining the relationship among the resistance value, the rotation speed, and the counter electromotive voltage of the stepping motor 607 beforehand. The reference current creating means 621 counts the reference current according to the output value of the driving voltage variable means 616 and the pulse rate output from the pulse rate pattern creating means 611 and outputs the counted value.

When the stepping motor 607 is rotating synchronously with the pulses output from the pulse rate pattern creating means 611, both the detected value of the driving current detecting means 620 and the output of the reference current creating means 621 become (V1−Ea)/R, and this difference is kept within a fixed value.

Next, a case that the stepping motor 607 is desynchronizing (stepped out) will be explained.

The stepping motor 607 slows down below an instructed value (pulse rate) output from the pulse rate pattern creating means 611 as shown in (c) of FIG. 45 when a step-out occurs. Because of this, a counter electromotive voltage Ea' generated in the stepping motor 607 takes the relations of Ea'<Ea. Thus, a motor current as shown in (d) of FIG. 45 is flown in the stepping motor 607. Consequently, the comparing means 622 detects the step-out and outputs a step-out detection signal. The driving voltage variable means 616, when a step-out detection signal is output, increases the voltage for driving the stepping motor 607 and the torque generated in the stepping motor 607 to eliminate the step-out error caused by a change of the driving load.

Because the disk apparatus is formed such way in the twenty-seventh embodiment, it is possible to detect a step-out to occur in the stepping motor and to control the driving voltage of the stepping motor 607 properly even when a driving load change is caused by an ambient temperature change, degradation of mechanism parts with time, etc. And accordingly, the disk apparatus in the twenty-sixth embodiment of the present invention can transmit the optimal driving force to the pick-up 603 to move the pick-up 603 fast.

<<Twenty-eighth Embodiment>>

Figure 46:
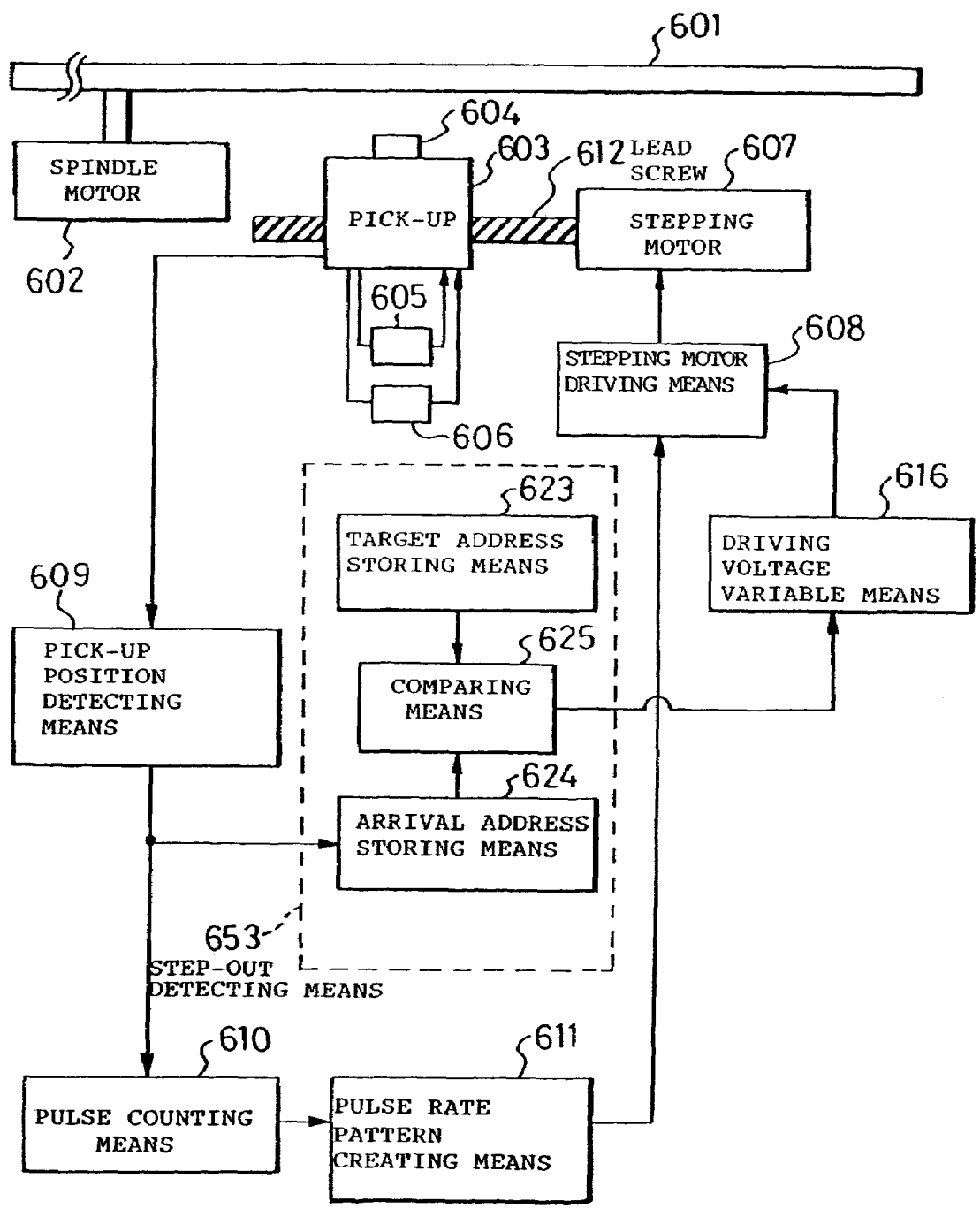
FIG. 46 is a block diagram for a configuration of the disk apparatus in the twenty-eighth embodiment of the present invention.
Figure 47:
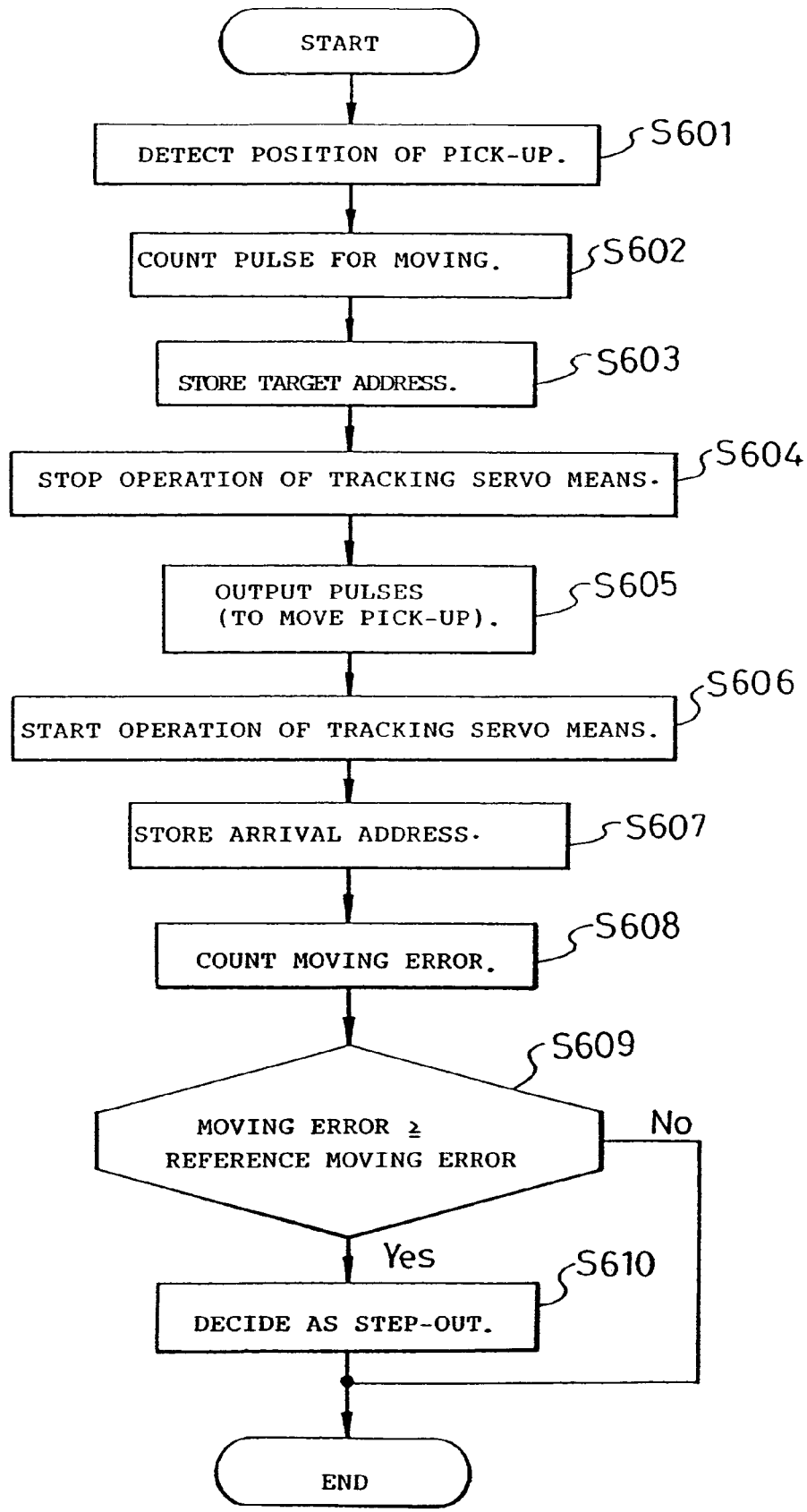
FIG. 47 is a flow chart for the step-out detection in the twenty-eighth embodiment of the present invention.

Hereunder, the disk apparatus in the twenty-eighth embodiment of the present invention will be explained with reference to the attached drawings. FIG. 46 is a block diagram for a configuration of the disk apparatus defined in the twenty-eighth embodiment. FIG. 47 is a flow chart for a step-out detecting operation in the disk apparatus in the twenty-eighth embodiment. In FIG. 46, the same configuration items as those in the above-mentioned twenty-fifth embodiment will be given the same numerals, omitting redundant explanation.

In FIG. 46, the target address storing means 623 stores a target address entered from external. The arrival address storing means 624 stores the new address of the pick-up 607 after the pick-up 607 is moved to a target track. The new address is output from the pick-up position detecting means 609. The comparing means 625 compares the output value of the target address storing means 623 with the output value of the arrival address storing means 624. When the difference exceeds a specified value, the comparing means 625 regards it as a step-out and outputs a step-out detection signal. The step-out detecting means 653 is comprised of the target address storing means 623, the arrival address storing means 624, and the comparing means 625.

The driving voltage variable means 616 divides the driving voltage of the stepping motor 607 into n steps (n: an interger of 2 or over) according to the step-out detection signal from the comparing means 625 provided in the step-up detecting means 653.

When the stepping motor 607 steps out as explained above, the stepping motor 607 cannot keep the synchronous rotation with the input pulses. Thus, the stepping motor 607 stops. Then, the pick-up 603 also stops before it reaches a target position. On the contrary, when the stepping motor 607 does not step out, the pick-up 603 reaches the target position, so the difference of the lens 604 from the target position after the pick-up 603 is moved is kept within the movable range of the lens 604 with respect to the pick-up 603.

This is why the target address is compared with the arrival address to detect the step-out of the stepping motor 607 in the disk apparatus in the twenty-eighth embodiment.

[Step-out Detection in the Twenty-eight Embodiment]

Next, how a step-out of the stepping motor 607 will be detected in the disk apparatus in the twenty-eighth embodiment of the present invention will be explained.

The lens 604 is controlled by both the focus servo means 605 and the tracking servo means 606 to read information from the disk 601 via the pick-up 603. The focus servo means 605 controls the lens 604 so that the lens 604 can be kept focused on the disk 601. The tracking servo means 606 controls the lens 604 so that the lens 604 can keep following up the target track on the disk 601 using an electromagnetic actuator.

Next, the flow chart shown in FIG. 47 indicating a step-out detecting operation in the disk apparatus defined in the twenty-eighth embodiment will be explained.

In order to access a given track, the current position of the pick-up 603 is detected at first. For this detection, the data including the address information is read from the disk 601 via the pick-up 603. Then, the pick-up position detecting means 609 detects the current position of the pick-up 603 from the address information (step S601).

The pulse counting 610 counts the number of pulses necessary for moving the pick-up 603 from the detected current position to a target address (step S602). The target address is stored in the target address storing means 623 (step S603).

After this, the tracking servo means 606 is stopped (step S604). Then, the pulse rate pattern creating means 611 being comprised of a microcomputer, etc. creates a pulse rate as shown in FIG. 42 and outputs the pulse rate to the stepping motor driving means 608. The stepping motor driving means 608 then drives the stepping motor 607 at this pulse rate to move the pick-up 603 (step S605).

The disk apparatus in the twenty-eighth embodiment generates the specified number of pulses to move the pick-up 603 by a specified distance, then restarts the tracking servo means 606 to make the lens 604 follow up the target track of the disk 601 (step S606).

The arrival address of the pick-up 603 is read and stored in the arrival address storing means 624 (step S607).

The comparing means 625 counts the difference of the moving distance of the pick-up 603 from the values stored in the target address storing means 623 and arrival address storing means 624 (step S608). The comparing means 625 then compares the obtained difference of- the moving distance with the reference moving difference, which is a movable distance of the lens 604. Only when the difference of the moving distance exceeds the reference value, the comparing means 625 decides it as a step-out (step S609) and outputs a step-out detection signal to the driving voltage variable means 616 (step S610).

Receiving the step-out detection signal, the driving voltage variable means 616 increases the voltage for driving the stepping motor 607. Thus, the torque generated in the stepping motor 607 is increased to restore the stepping motor 607 from the step-out caused by a change of the driving load.

Since the disk apparatus defined in the twenty-eighth embodiment is formed as explained above, if the driving load is changed by an ambient temperature change, degradation of any mechanism part with time, etc., the step-out of the stepping motor is detected, so that the driving voltage of the stepping motor 607 is controlled properly. The disk apparatus defined in the twenty-eighth embodiment can thus transmit the optimal driving force to the pick-up 603 and move the pick-up 603 fast.

<<Twenty-ninth Embodiment>>

Figure 48:
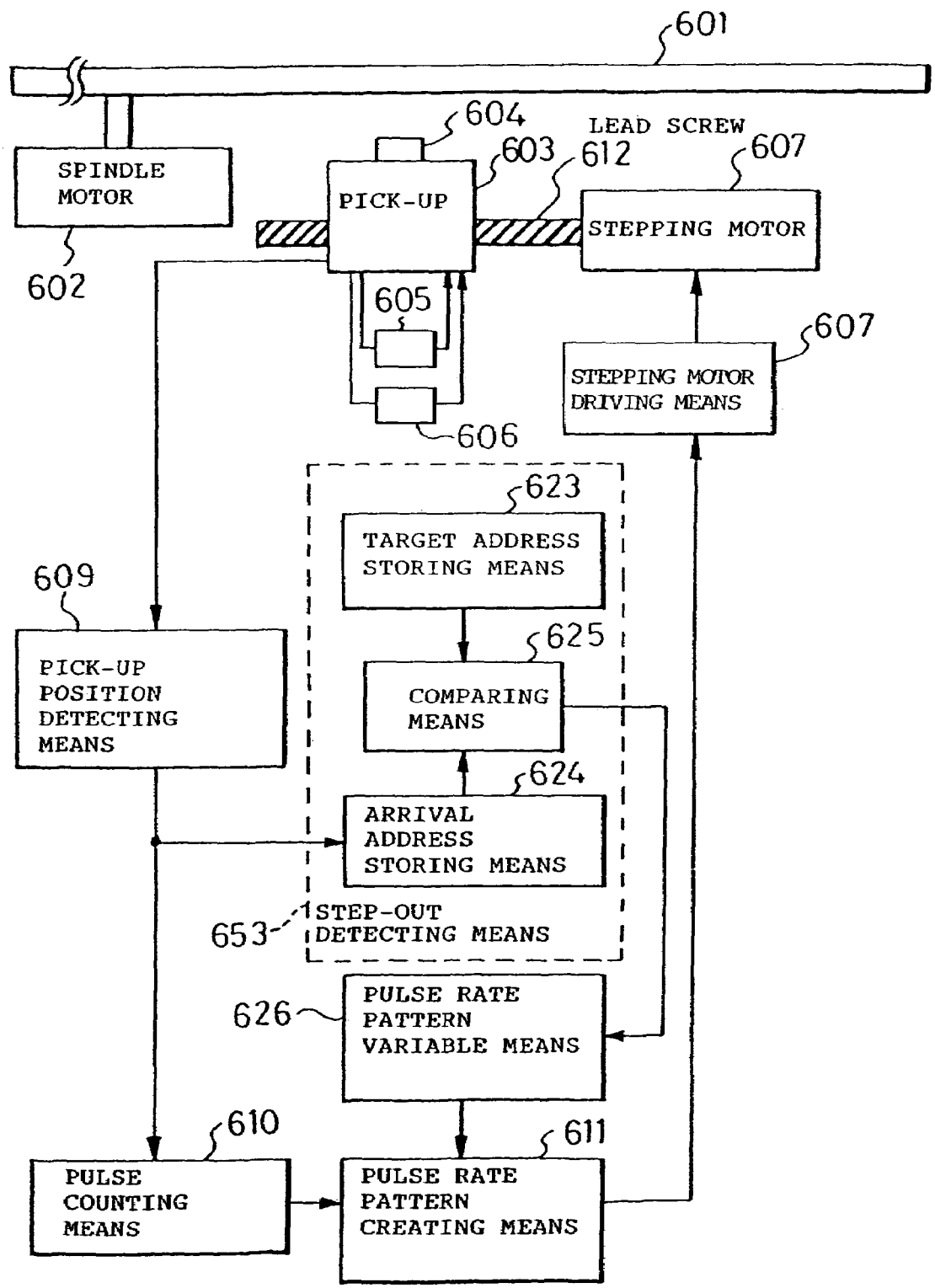
FIG. 48 is a block diagram for a configuration of the disk apparatus in the twenty-ninth embodiment of the present invention.

Hereunder, the disk apparatus in the twenty-ninth embodiment of the present invention will be explained with reference to the attached drawings. FIG. 48 is a block diagram for a configuration of the disk apparatus in the twenty-ninth embodiment. In FIG. 48, the same configuration items as those in the above-mentioned twenty-eighth embodiment will be given the same numerals, omitting redundant explanation. Only the differences from the disk apparatus in the twenty-eighth embodiment will thus be explained here.

In FIG. 48, the pulse rate pattern variable means 626 divides the pulse rate pattern from the pulse rate pattern creating means 611 into m steps (m: an interger of 2 or over) according to the step-out detection signal from the 625.

Hereunder, the disk apparatus formed such way in the twenty-ninth embodiment of the present invention will be explained. In the disk apparatus defined in the twenty-ninth embodiment, there is only a difference from the above-mentioned twenty-eighth embodiment; when a step-out is detected, the speed and acceleration of the pulse rate output from the pulse rate pattern creating means 611 are lowered, not increasing the driving voltage of the stepping motor 607.

FIG. 49 indicates the relationship between pulse rate pattern and torque of the stepping motor 607 before a step-out is detected in the twenty-ninth embodiment.

When the stepping motor 607 is driven at the pulse rate pattern K1 shown in (a) of FIG. 49, the torque T1 shown in (b) of FIG. 49 is needed to accelerate and decelerate the stepping motor 607. Furthermore, while the stepping motor 607 is driven by a frictional load, a fixed torque T2 as shown in (c) of FIG. 49 is needed.

When the stepping motor 607 is driven at a fixed voltage, the torque T3 generated in the stepping motor 607 is lowered as the rotation speed of the stepping motor 607 is raised, as shown in (d) of FIG. 49. When the frictional load is changed, the torque T3 generated in the stepping motor 607 becomes less than the total of the torque T1 needed for acceleration and the frictional load torque T2, then a torque shortage occurs, which causes the stepping motor 607 to step out.

Figure 50:
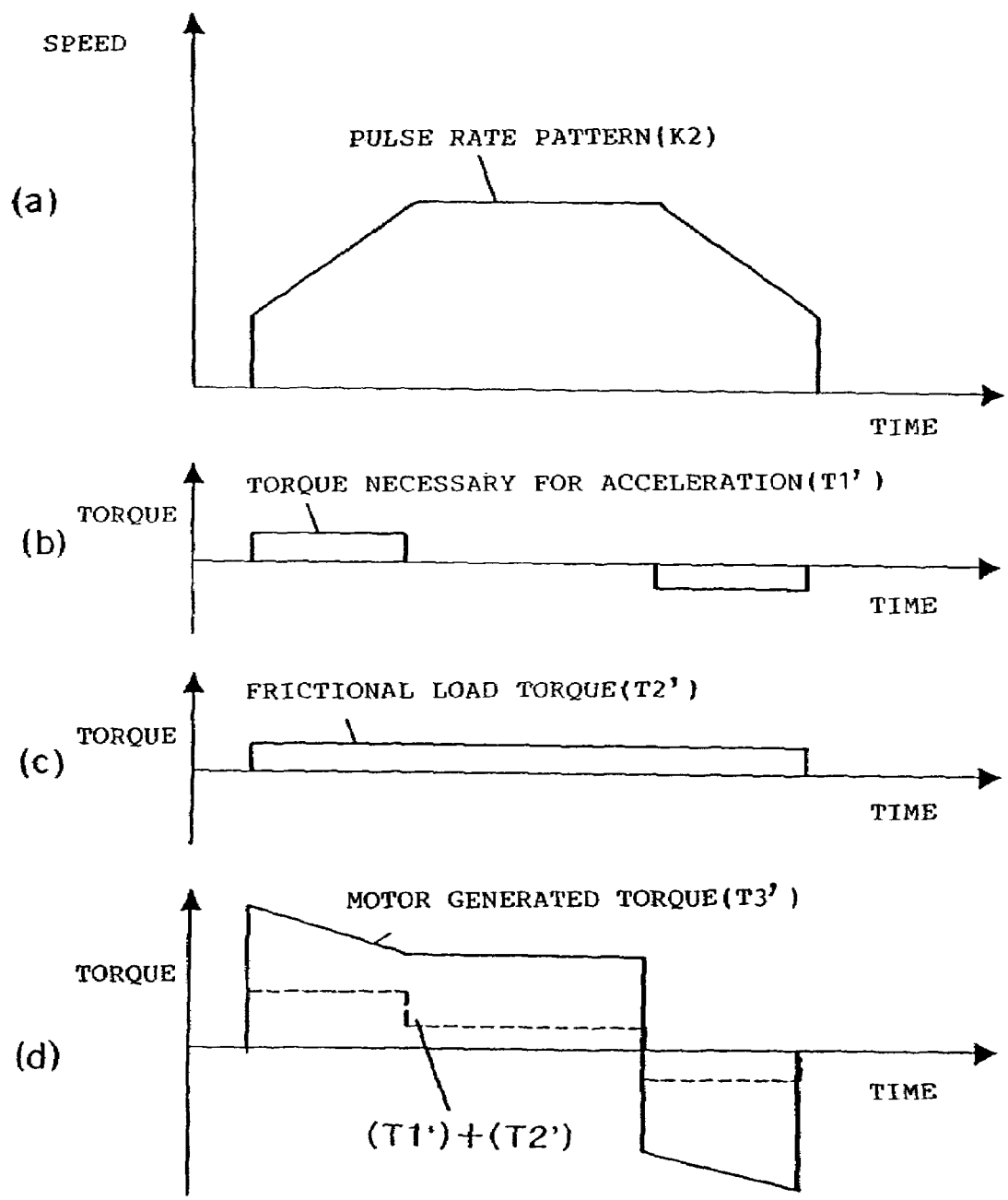
FIG. 50 is a wave form chart for the driving pulse rate of and the torques generated in the stepping motor in the twenty-ninth embodiment of the present invention.

FIG. 50 indicates the relationship between the pulse pattern K2 and the torque after a step-out is detected in the twenty-ninth embodiment.

When a step-out is detected, the speed and acceleration of the pulse rate pattern output from the pulse rate pattern creating means 611 are lowered below the pulse rate pattern K1 shown in (a) of FIG. 49, just like the pulse rate pattern K2 shown in (a) of FIG. 50. When the acceleration is lowered such way, the torque T1' needed to accelerate the pick-up movement can also be lowered. In addition, when the maximum speed is lowered, the torque T3' generated by the stepping motor is increased significantly as shown in (d) of FIG. 50. In this generated torque T3', therefore, the margin of the total of the torque T1' needed for acceleration and the frictional load torque T2' is increased. This is why the disk apparatus in the twenty-ninth embodiment can prevent step-out.

Although the step-out detecting means 653 shown in the above-mentioned twenty-eighth embodiment is used for detecting the step-out in the twenty-ninth embodiment, the present invention is not-limited only to this configuration. For example, any of the step-out detecting means 650, 651, and 652 used in the twenty-fifth to twenty-seventh embodiments may be used to obtain the same effect as that in the twenty-ninth embodiment.

Since the disk apparatus defined in the twenty-ninth embodiment is formed as explained above, if the driving load is changed by an ambient temperature change, degradation of any mechanism part with time, etc., the step-out of the stepping motor is detected, so that the driving voltage of the stepping motor 607 is controlled properly. The disk apparatus defined in the twenty-ninth embodiment can thus transmit the optimal driving force to the pick-up 603 and move the pick-up 603 to the target position certainly.

<<Thirtieth Embodiment>>

Next, the disk apparatus in the thirtieth embodiment of the present invention will be explained with reference to the attached drawings In the twenty-fifth to twenty-eighth embodiments of the present invention, each time a step-out is detected, the driving voltage of the stepping motor 607 is raised to increase the torque generation in the stepping motor 607 to cope with the change of the frictional load of rotation. In such a configuration, however, when the driving voltage is raised, the temperature in the stepping motor 607 also rises significantly. Furthermore, in the disk apparatus in the twenty-ninth embodiment, each time a step-out is detected, the speed and acceleration in the pulse rate of the stepping motor 607 are lowered to lower the necessary torque for rotation to cope with changes of the frictional load. In this configuration, as the pulse rate is lowered, the moving of the pick-up 603 is delayed significantly.

The disk apparatus in the thirtieth embodiment is provided to solve such the problems.

Figure 51:
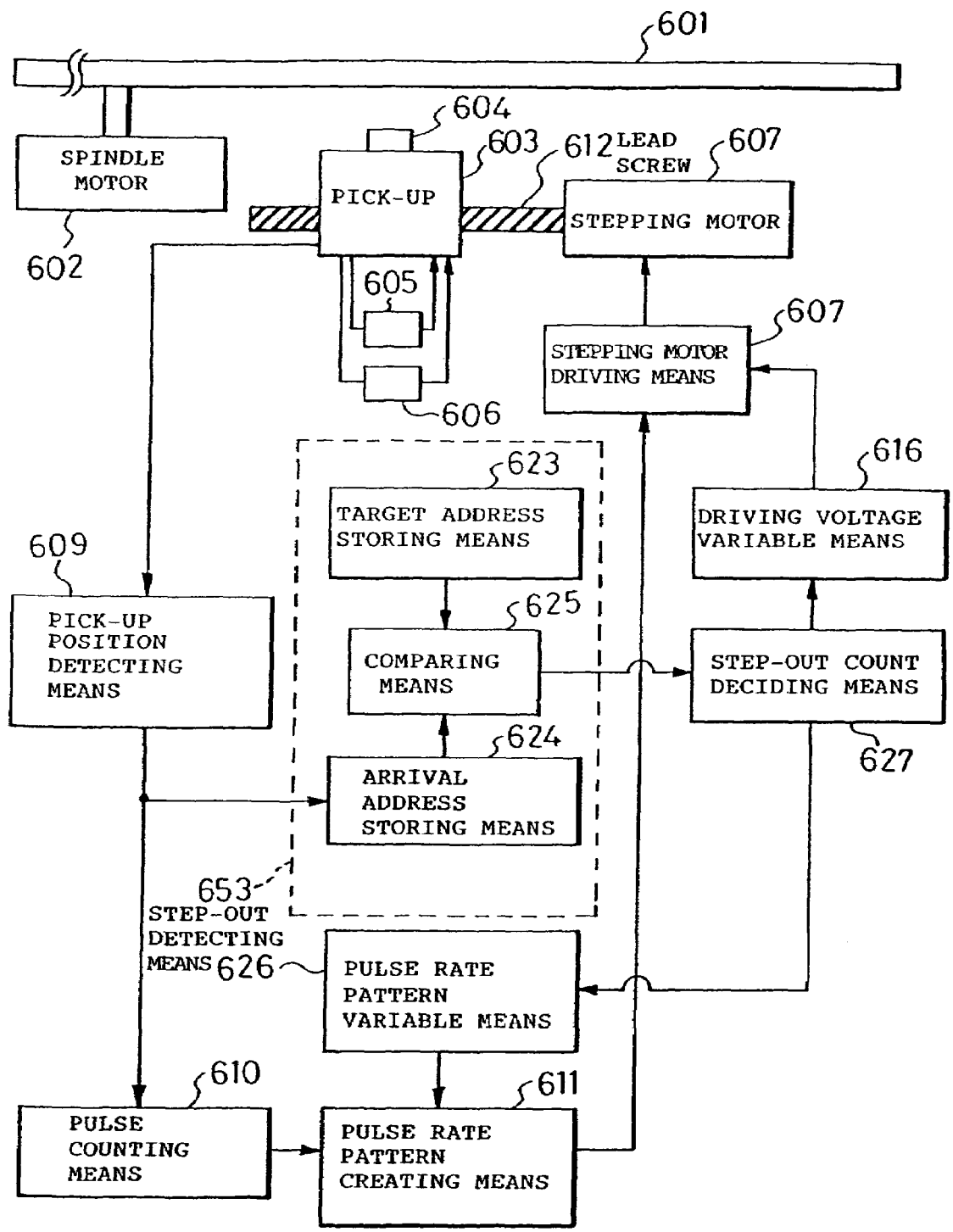
FIG. 51 is a block diagram for a configuration of the disk apparatus in the thirtieth embodiment of the present invention.

Hereunder, the thirtieth embodiment of the present invention will be explained with reference to the attached drawings. FIG. 51 is a block diagram for a configuration of the disk apparatus in the thirtieth embodiment of the present invention. In FIG. 51, the same configuration items as those in the above-mentioned twenty-eighth embodiment will be given the same numerals, omitting redundant explanation.

Hereunder, only the differences from the disk apparatus in the twenty-eighth embodiment will be explained.

In FIG. 51, the step-out count deciding means 627 counts the number of step-out times according to the step-out detection signal output from the comparing means 625 provided in the step-out detecting means 653. The comparing means 625 is provided with a step-out count storing means (not illustrated) and used to store the number of step-out times in the step-out count storing means. The step-out count deciding means 627 controls the driving voltage variable means 616 and the pulse rate pattern variable means 626 according to the step-out detection signal and the output from the step-out count storing means.

In the disk apparatus defined in the thirtieth embodiment, the driving voltage variable means 616 and the pulse rate pattern variable means 626 are controlled by the step-out count deciding means 627, not by the output from the comparing means 625.

Figure 52:
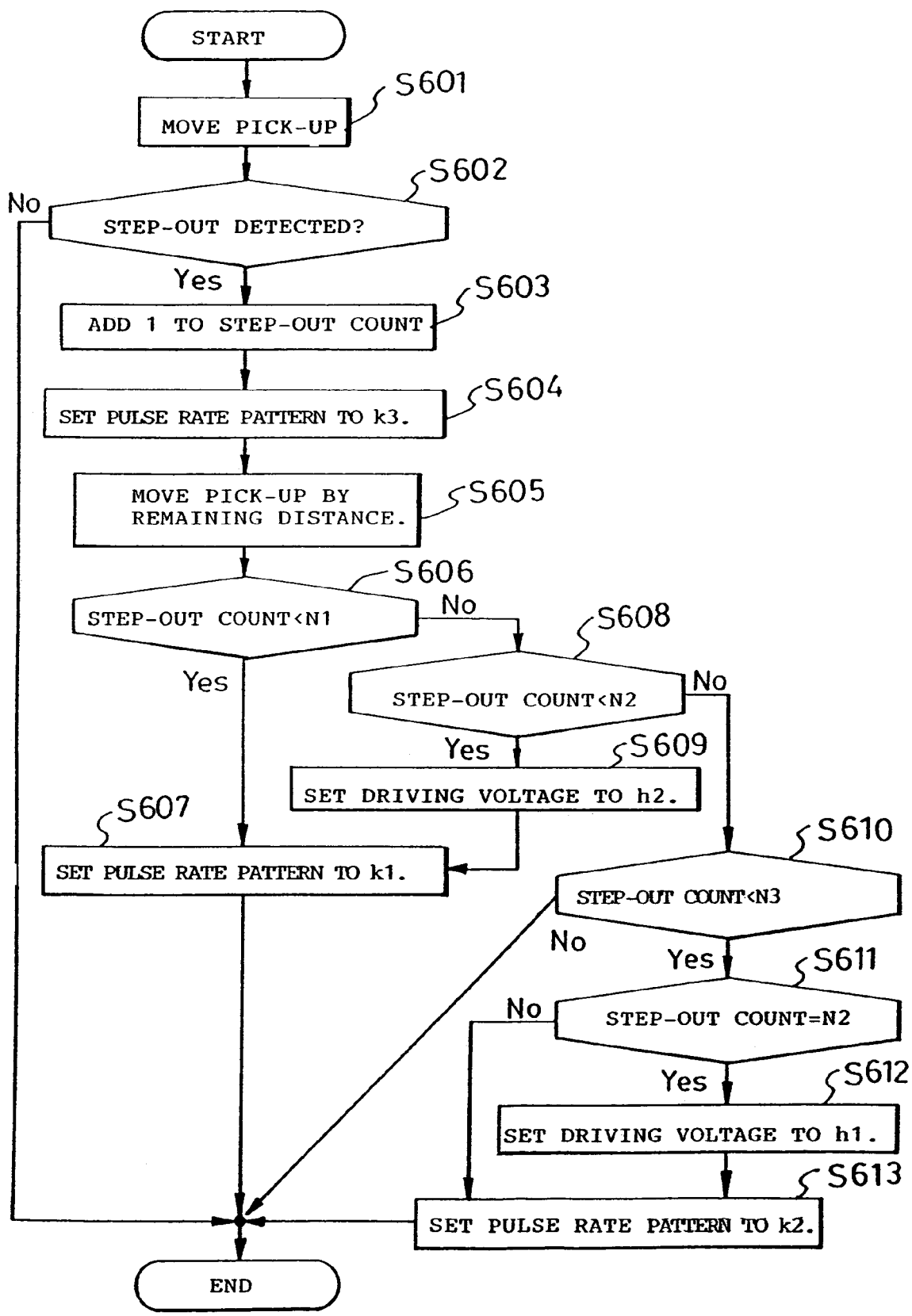
FIG. 52 is a flow chart indicating the operation of the disk apparatus in the thirtieth embodiment of the present invention.
Figure 54:
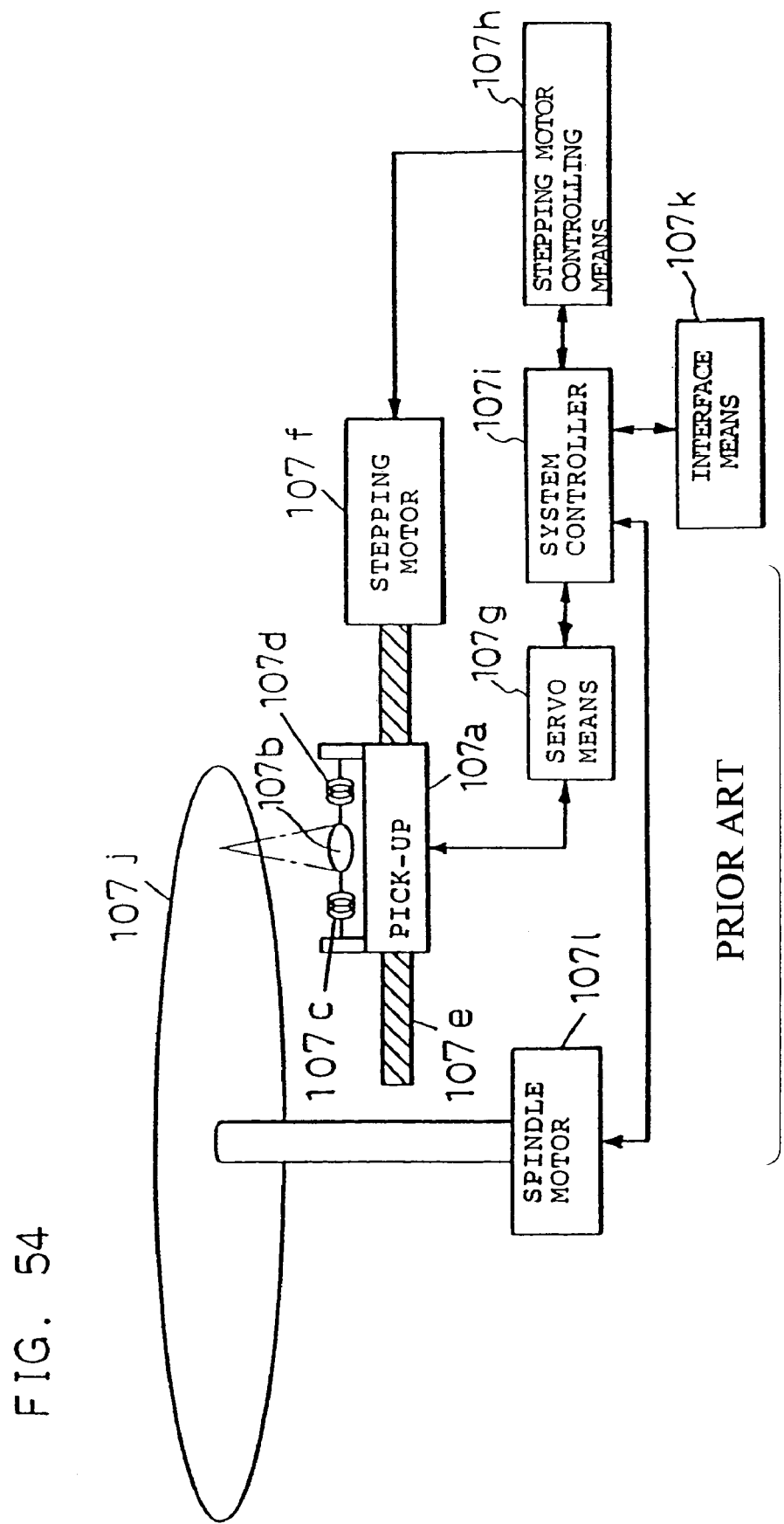
FIG. 54 is a configuration of the conventional disk apparatus.

FIG. 52 is a flow chart indicating the operation of the step-out count deciding means 627 for controlling the driving voltage variable means 616 and the pulse rate pattern variable means 626. FIG. 53 is a graph indicating a pulse rate pattern created and output by the pulse rate pattern creating means 611 in the thirtieth embodiment.

Next, the operation of the disk apparatus formed as explained above in the thirtieth embodiment of the present invention will be explained with reference to FIG. 52.

The operation is completely the same as that described in the above-mentioned twenty-eighth embodiment until the pick-up 603 is moved (step S601) and it is decided whether or not the stepping motor steps out.

When the pick-up 603 is moved, the step-out count deciding means 627 checks whether or not a step-out is detected (step S602). If no step-out is detected, the movement of the pick-up 603 is ended. If a step-out is detected, the number of step-out errors is counted (step S603). The pulse rate pattern variable means 626 thus sets the pulse rate pattern K3 shown in (c) of FIG. 53. The pulse rate pattern variable means 626 sets the pulse rate pattern K3 so that the maximum speed and acceleration are lowered enough below those in the pulse rate pattern K1 (initial value) shown in (a) of FIG. 53 (step S604). Then, the pick-up 603 is moved only by the remaining distance (step S605).

If a step-out is detected, the following processing is executed according to the number of step-out times.

If the step-out count is less than N1 (N1: an integer of 1 or over) (step S606), the pulse rate pattern is set to K1 again and the movement of the pick-up 603 is ended (step S607).

If the step-out count is N1 or over and less than N2 (N2: an integer of N1 or over) (step S608), the driving voltage variable means 616 sets the driving voltage of the stepping motor 607 to h2 (h2>initial value h1). Then, the pulse rate pattern variable means 626 sets the pulse rate pattern to K1 again and ends the movement of the pick-up 603 (step S607).

If the step-out count is N2 or over and less than N3 (N3: an integer of N2 or over) (steps S610 and S611), the driving voltage variable means 616 returns the driving voltage of the stepping motor 607 to the initial value h1 (step S612). Then, the pulse rate pattern variable means 626 sets the pulse rate pattern to K2 shown in (b) of FIG. 53 to end the movement of the pick-up 603 (step S613). The pulse rate pattern K2 indicates that the maximum speed and acceleration are between pulse rate patterns K1 and K2.

If the step-out count is N3 or over (step S610), the movement of the pick-up 603 is ended while the pulse rate pattern K3 set in step S4 is left as is.

Since the disk apparatus defined in the thirtieth embodiment is formed as explained above, if the driving load is changed by an ambient temperature change, degradation of any mechanism part with time, etc., the step-out of the stepping motor is detected, so that the driving voltage of the stepping motor 607 is controlled properly. The disk apparatus defined in the twenty-ninth embodiment can thus transmit the optimal driving force to the pick-up 603 and move the pick-up 603 fast to a target position certainly while keeping the temperature of the stepping motor 607 fixedly.

Although the step-out detecting means 653 shown in the above-mentioned thirtieth embodiment is used for detecting step-out in the thirtieth embodiment, the present invention is not limited only to this configuration. For example, any of the step-out detecting means 650, 651, and 652 used in the twenty-fifth to twenty-seventh embodiments may be used to obtain the same effect as that in the thirtieth embodiment.

Although the driving voltage can be changed over in 2 steps and the pulse rate pattern can be changed over in 3 steps in the thirtieth embodiment, the number of steps for changing over those may be further increased to improve the stability and speed of the pick-up 603 more significantly.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above-mentioned disclosure. Accordingly, it is intended that the appended claims be interpreted as covering all alterations and modifications as fall within the true spirit and scope of the invention.

We claim:

1. A disk apparatus for a disk having helically or concentric circle-like formed tracks comprising:
    a pick-up device for recording or playing back information on or from the disk;
    a servo controller for outputting an error signal when the pick-up is vibrated over a specified value;
    a stepping motor for moving the pick-up device in a radial direction of the disk;
    a system controller for outputting a first command signal when detecting that the error signal output by the servo controller has exceeded the specified value, and for outputting a second command signal when detecting that the error signal has not exceeded the specified value for a fixed time period; and
    a stepping motor controller for controlling the stepping motor by increasing a drive current for maintaining a rotating angle of the stepping motor after receiving the first command signal, and for controlling the stepping motor by decreasing the drive current for maintaining the rotating angle of the stepping motor after receiving the second command signal.

* * * * *